(12) United States Patent
Jones

(10) Patent No.: US 9,706,894 B2
(45) Date of Patent: Jul. 18, 2017

(54) RAG STACK SYSTEM AND METHOD

(71) Applicant: Madison Mark Jones, Bryan, TX (US)

(72) Inventor: Madison Mark Jones, Bryan, TX (US)

(*) Notice: Subject to any disclaimer, the term of this patent is extended or adjusted under 35 U.S.C. 154(b) by 354 days.

(21) Appl. No.: 14/513,553

(22) Filed: Oct. 14, 2014

(65) Prior Publication Data

US 2015/0335222 A1    Nov. 26, 2015

Related U.S. Application Data

(60) Provisional application No. 62/001,180, filed on May 21, 2014.

(51) Int. Cl.
| | |
|---|---|
| *A47L 13/16* | (2006.01) |
| *A47L 13/18* | (2006.01) |
| *A47L 13/51* | (2006.01) |
| *B32B 5/02* | (2006.01) |
| *B32B 5/26* | (2006.01) |
| *A47L 17/08* | (2006.01) |
| *B05B 11/00* | (2006.01) |
| *B65D 83/38* | (2006.01) |

(52) U.S. Cl.
CPC .............. *A47L 13/16* (2013.01); *A47L 13/18* (2013.01); *A47L 13/51* (2013.01); *B32B 5/024* (2013.01); *B32B 5/26* (2013.01); *A47L 17/08* (2013.01); *B05B 11/0037* (2013.01); *B32B 2262/0253* (2013.01); *B32B 2262/0269* (2013.01); *B32B 2262/0276* (2013.01); *B32B 2307/7265* (2013.01); *B32B 2432/00* (2013.01); *B65D 83/384* (2013.01)

(58) Field of Classification Search
CPC .......... A47L 13/10; A47L 13/12; A47L 13/16; A47L 13/18; A47L 13/19; A47L 17/08

USPC ........ 15/118, 208, 209.1, 227, 229.11, 244.3
See application file for complete search history.

(56) References Cited

U.S. PATENT DOCUMENTS

| | | | | |
|---|---|---|---|---|
| 981,192 A | * | 1/1911 | Hollngshead | ........... A47L 13/18 |
| | | | | 15/210.1 |
| 1,736,209 A | * | 11/1929 | Millard | ................ A41D 13/081 |
| | | | | 15/208 |

(Continued)

FOREIGN PATENT DOCUMENTS

| CA | 2480748 | * | 3/2006 |
|---|---|---|---|
| DE | 3824369 | * | 4/1989 |

(Continued)

*Primary Examiner* — Mark Spisich
(74) *Attorney, Agent, or Firm* — Douglas Baldwin

(57) ABSTRACT

A multi-function multi-use rag system and method integrating a variety of substantially planar sheets in a unitized application context is disclosed. The system/method physically integrates a stack of cleaning rags or other materials that may be of different types and have different functional characteristics. These rags are attached together at their outer periphery via sewing or other fastening means. A peripheral segment of the rag stack that is not attached to other layers may allow the stack to be everted to configure one set of a plurality of inner surfaces to form the outer surfaces of the rag stack system. Eversion of the rag stack thus permits formation of a number of different outer surface combinations that is equal to twice the number of stacked rags. Incorporation of internal stack barrier layers in some embodiments allows isolation of individual layers within the rag stack.

3 Claims, 128 Drawing Sheets

(56) References Cited

U.S. PATENT DOCUMENTS

| | | | | |
|---|---|---|---|---|
| 1,968,696 | A * | 7/1934 | Mar | A47K 7/02 15/104.93 |
| 1,994,425 | A * | 3/1935 | Weller | A47L 13/19 15/104.94 |
| 2,068,182 | A * | 1/1937 | Jackson | A41D 13/084 15/227 |
| 2,932,839 | A * | 4/1960 | Flanigan | A47L 13/17 15/209.1 |
| 2,942,285 | A * | 6/1960 | Gray | A47L 13/16 15/118 |
| 3,038,187 | A * | 6/1962 | Nathanson | A47L 13/16 15/118 |
| 3,040,353 | A * | 6/1962 | Gray | A47L 13/16 15/118 |
| 3,183,543 | A * | 5/1965 | Worcester | A47L 13/18 15/104.94 |
| 3,280,517 | A * | 10/1966 | Copeland | A47L 17/08 15/229.12 |
| 3,324,500 | A * | 6/1967 | Fuller | A47L 17/08 134/6 |
| 3,377,151 | A * | 4/1968 | Lanham | A47L 17/08 451/532 |
| 4,477,938 | A * | 10/1984 | Rogut | A47L 17/08 15/118 |
| 4,510,641 | A * | 4/1985 | Morris | A47L 13/17 15/118 |
| 4,769,267 | A * | 9/1988 | Hoyt | A47L 13/17 15/118 |
| 4,856,134 | A * | 8/1989 | Wertz | A47L 13/16 15/104.93 |
| 4,888,229 | A * | 12/1989 | Paley | A47L 13/16 15/209.1 |
| 5,419,015 | A * | 5/1995 | Garcia | A47L 13/20 15/144.2 |
| 5,649,336 | A * | 7/1997 | Finch | A47K 7/02 15/104.94 |
| 5,671,498 | A * | 9/1997 | Martin | A47L 13/16 15/104.93 |
| 5,879,094 | A * | 3/1999 | Lersch | B60S 3/047 15/244.3 |
| 6,811,338 | B1 * | 11/2004 | Manske, Jr. | A01N 25/34 15/104.94 |
| 7,797,783 | B2 * | 9/2010 | Chandler | A63B 60/36 15/118 |
| 2001/0047534 | A1 * | 12/2001 | Sandusky | A41D 19/01 2/158 |
| 2003/0028985 | A1 * | 2/2003 | Prodoehl | A47L 17/08 15/118 |
| 2004/0255421 | A1 * | 12/2004 | Kim | A47K 10/02 15/244.3 |
| 2005/0217045 | A1 * | 10/2005 | Minkler | A47L 13/20 15/104.94 |
| 2006/0135026 | A1 * | 6/2006 | Arendt | A47L 13/16 442/400 |
| 2006/0282968 | A1 * | 12/2006 | Shin | A47K 10/16 15/118 |
| 2009/0126137 | A1 * | 5/2009 | Lyons | A47L 13/18 15/210.1 |
| 2010/0287721 | A1 * | 11/2010 | Lewis | A47L 13/16 15/227 |
| 2011/0131743 | A1 * | 6/2011 | Hale | A47L 13/16 15/223 |
| 2015/0067975 | A1 * | 3/2015 | Lee | A47L 1/15 15/210.1 |

FOREIGN PATENT DOCUMENTS

| | | | |
|---|---|---|---|
| EP | 154070 | * | 9/1985 |
| EP | 326488 | * | 8/1989 |
| EP | 635237 | * | 1/1995 |
| EP | 1316413 | * | 6/2003 |
| GB | 2192327 | * | 1/1988 |
| JP | 2000-116583 | * | 4/2000 |

* cited by examiner

*Prior Art*

*Prior Art*

Prior Art

*Prior Art*

FIG. 6
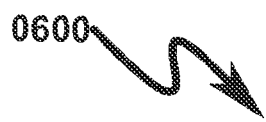
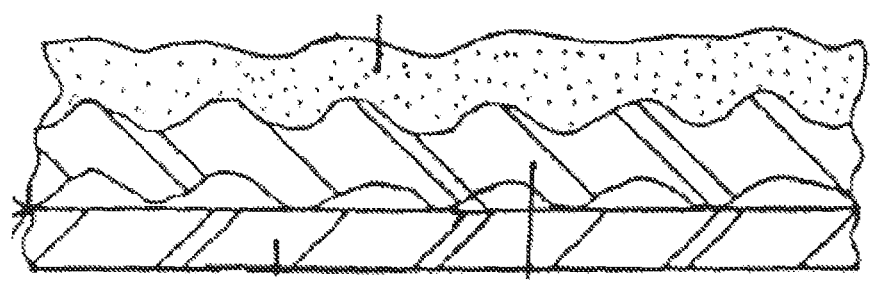
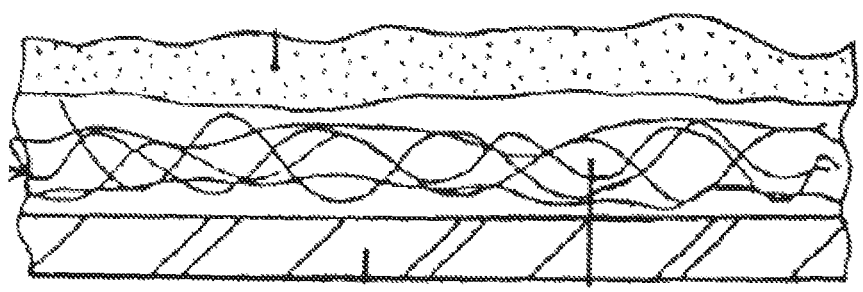
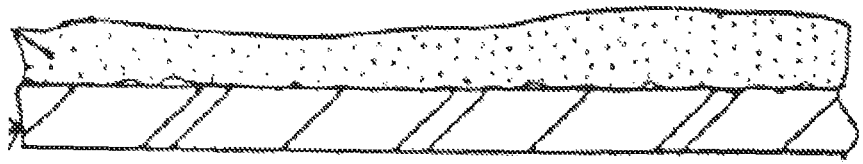
*Prior Art*

*Prior Art*

*FIG. 68*
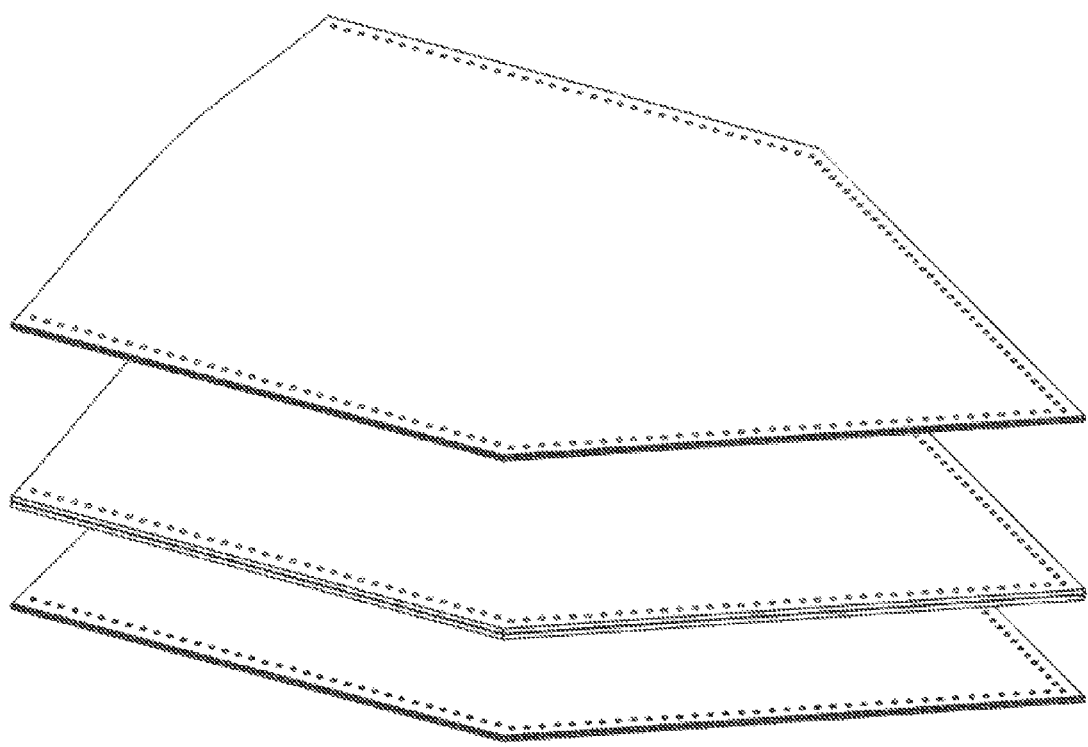

FIG. 114
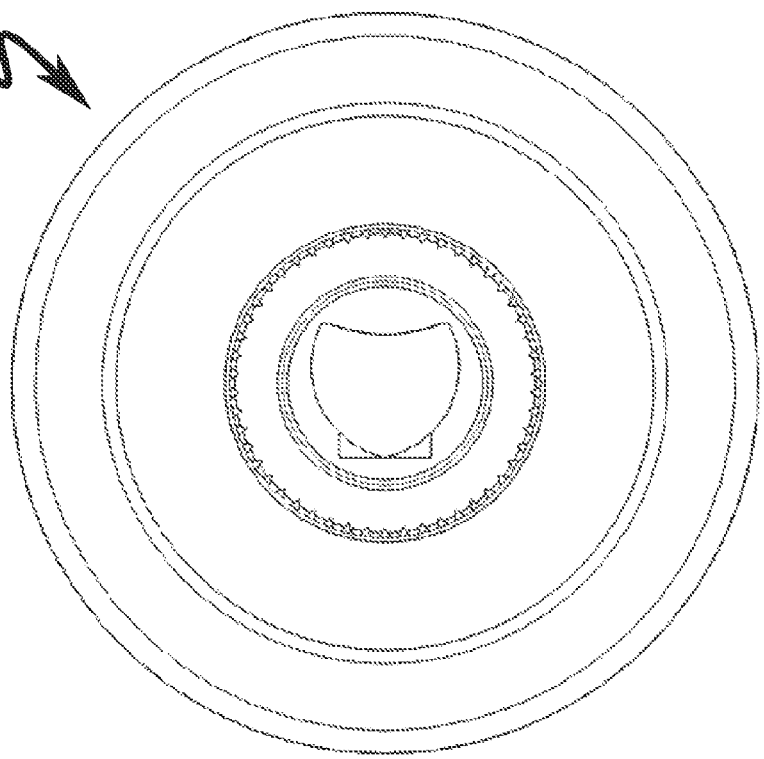
11400
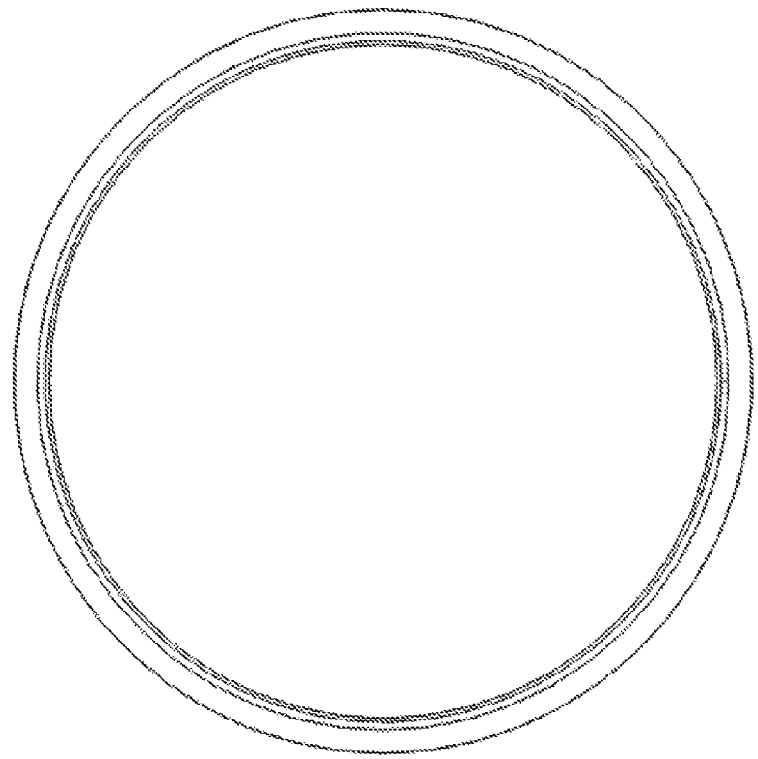

RAG STACK SYSTEM AND METHOD

CROSS REFERENCE TO RELATED APPLICATIONS

U.S. Provisional Patent Applications

This application claims benefit under 35 U.S.C. §119 and incorporates by reference United States Provisional Patent Application for RAG STACK SYSTEM AND METHOD by inventor Madison Mark Jones, filed electronically with the USPTO on May 21, 2014, with Ser. No. 62/001,180, EFS ID 19089915, confirmation number 6884.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for configuring rags for multiple application uses, and specifically to a system/method that allows a multiplicity of cleaning rags to be combined into a singular cleaning rag stack system.

PRIOR ART AND BACKGROUND OF THE INVENTION

Prior Art (0100)-(0800)

The following prior art is related to the present invention and forms a basis for illustrating several novel features of the disclosed invention:
 FIG. 1 (0100)—U.S. Pat. No. 3,327,320 (Forsyth);
 FIG. 2 (0200)—U.S. Pat. No. 4,937,881 (Heise);
 FIG. 3 (0300)—U.S. Pat. No. 5,864,883 (Reo);
 FIG. 4 (0400)-FIG. 6 (0600)—U.S. Pat. No. 5,922,336 (Tebbe);
 FIG. 7 (0700)-FIG. 8 (0800)—U.S. Pat. No. 6,539,549 (Peters).

While all of these systems incorporate the use of material that may be incorporated into a glove or rag cleaning system, these systems are limited to a single rag stack of two components and do not provide any capability for multi-rag stacking. Furthermore, there appears to be no methodology in the prior art to limit cross-contamination from one rag to another rag in the cleaning systems.

Deficiencies in the Prior Art

The prior art as detailed above suffers from the following deficiencies:
 Prior art rag systems do not allow integration of rags into a unitary structure.
 Prior art rag systems do not permit all sides of a rag to be fully utilized.
 Prior art rag systems do not allow isolation between the rag components and allow cross-contamination between the layers.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:
 (1) Provide for a rag stack system and method that allows integration of rags into a unitary structure.
 (2) Provide for a rag stack system and method that permits all sides of a rag to be fully utilized.
 (3) Provide for a rag stack system and method that allows isolation between the rag components and allow cross-contamination between the layers.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention utilizes a planar rag stack (PRS) consisting of three or more sheets of substantially flat material of identical peripheral form in conjunction with peripheral stack attachment (PSA) to generate an integrated rag stack assembly (RSA). The peripheral form of the RSA is substantially rectangular to facilitate hand insertion between the layers of the RSA. The PSA is configured to mechanically couple the PRS at or near an outer perimeter of the sheets. The mechanical coupling of the PRS comprises continuous attachment at 50% or more of the outer perimeter, thus permitting one edge of the PRS to be accessible for both eversion and hand insertion.

BRIEF DESCRIPTION OF THE DRAWINGS

For a fuller understanding of the advantages provided by the invention, reference should be made to the following detailed description together with the accompanying drawings wherein.

FIG. 6 illustrates a prior art glove system from U.S. Pat. No. 5,922,336 (Tebbe);

FIG. 62 illustrates a top right front perspective view of a preferred exemplary invention system irregular pentagonal embodiment with sewn mechanical coupling of the planar rag stack (PRS);

FIG. 68 illustrates a top right rear perspective assembly view of a preferred exemplary invention system irregular pentagonal embodiment with sewn mechanical coupling of the planar rag stack (PRS);

FIG. 114 illustrates top and bottom views of an exemplary invention kit embodiment implementing a dry erase kit incorporating a rag stack canister that retains dry erase markers;

FIG. 123 illustrates a top right front perspective view of a preferred exemplary invention embodiment that has been everted and a top right rear perspective view of a preferred exemplary invention embodiment that has been everted;

FIG. 124 illustrates a bottom right front perspective view of a preferred exemplary invention embodiment that has been everted and a top front face perspective view of a preferred exemplary invention embodiment that has been everted;

FIG. 125 illustrates an exemplary three-layer rag stack comprising chamois/waffle microfiber, waffle microfiber/glass cleaning cloth, and stainless/scrub material pairs;

FIG. 126 illustrates a flowchart depicting a preferred exemplary invention method;

FIG. 127 illustrates a flowchart depicting an alternate preferred exemplary invention method; and FIG. 128 illustrates a flowchart depicting an alternate pentagonal preferred exemplary invention method.

DESCRIPTION OF THE PRESENTLY PREFERRED EXEMPLARY EMBODIMENTS

Figure 1:
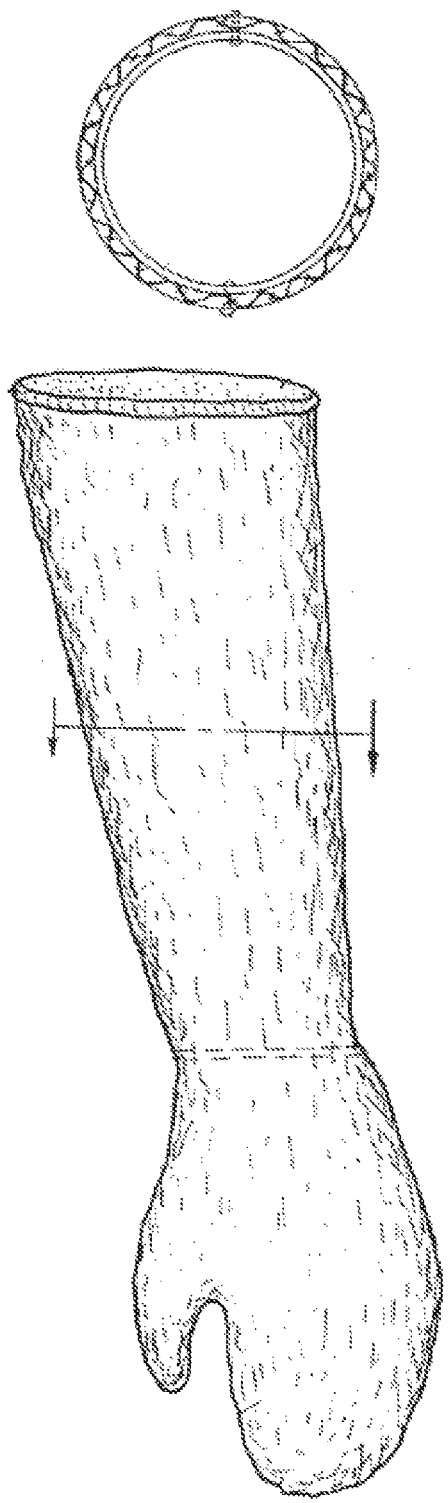
FIG. 1 illustrates a prior art glove system from U.S. Pat. No. 3,327,320 (Forsyth)
Figure 2:
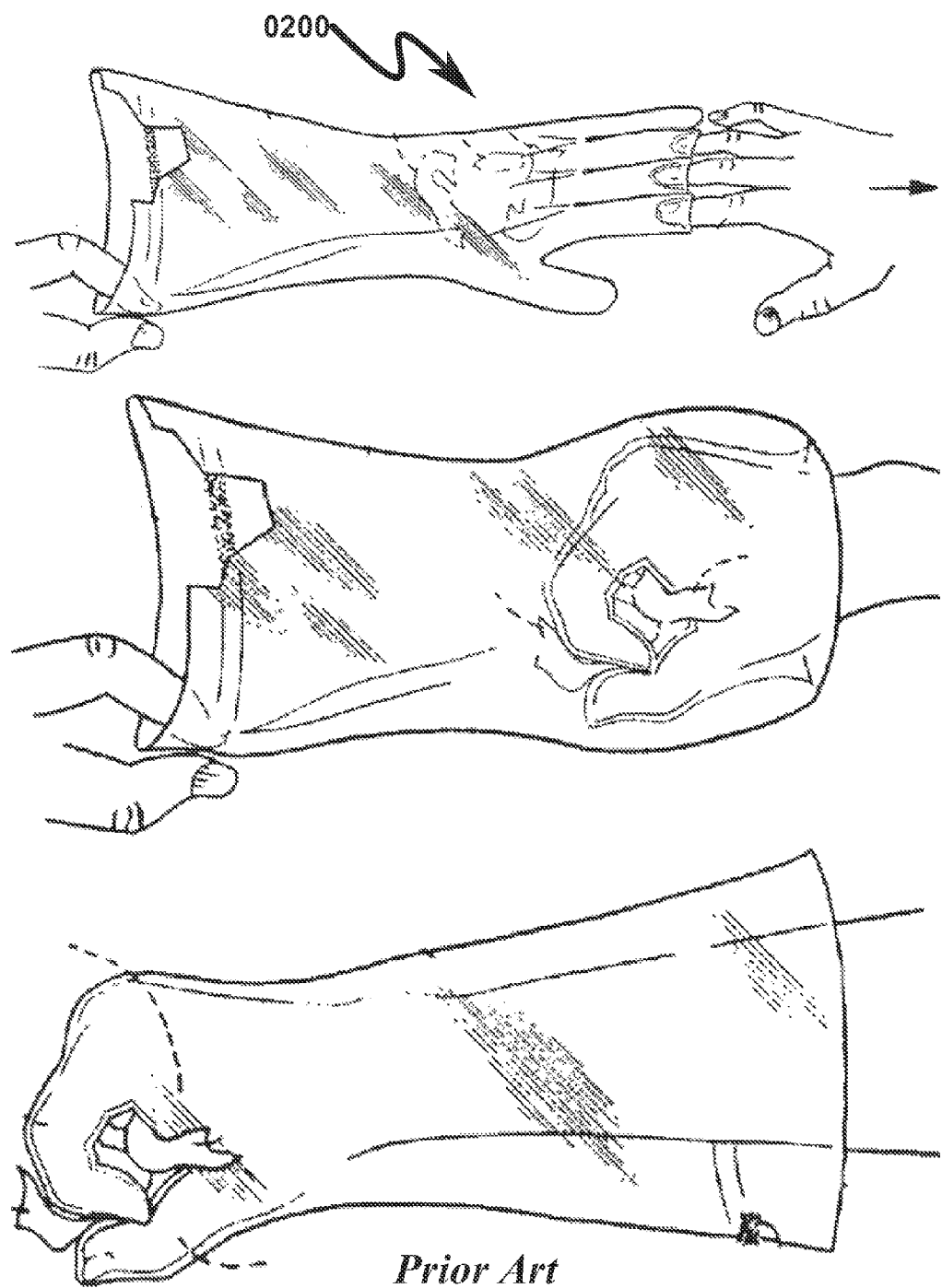
FIG. 2 illustrates a prior art glove system from U.S. Pat. No. 4,937,881 (Heise)
Figure 3:
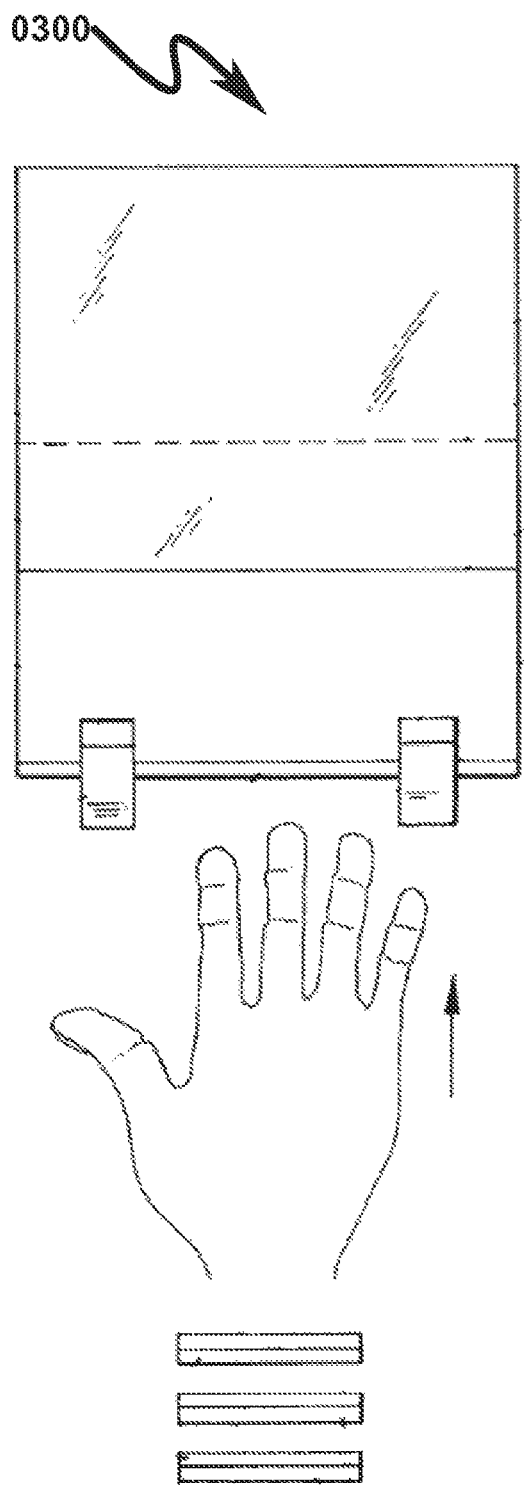
FIG. 3 illustrates a prior art glove system from U.S. Pat. No. 5,864,883 (Reo)
Figure 4:
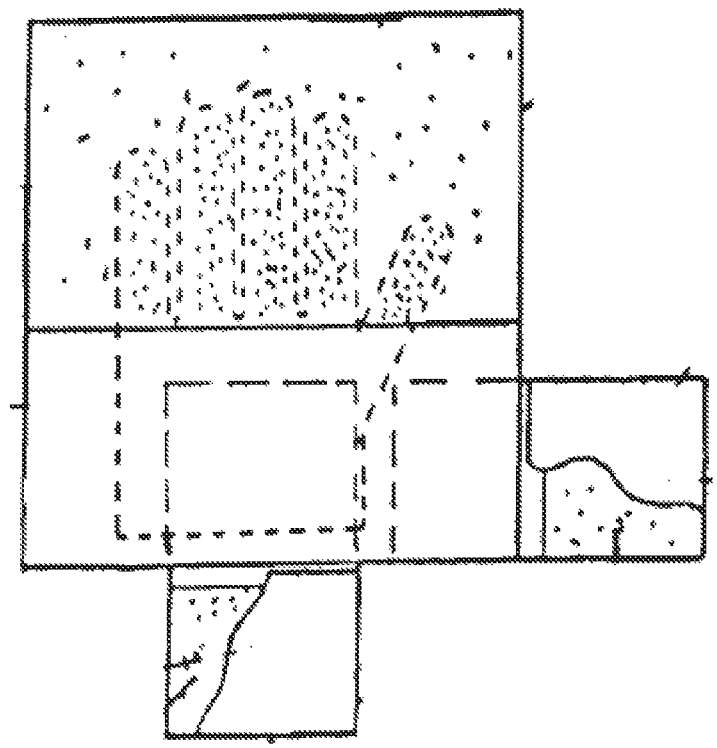
FIG. 4 illustrates a prior art glove system from U.S. Pat. No. 5,922,336 (Tebbe)
Figure 5:
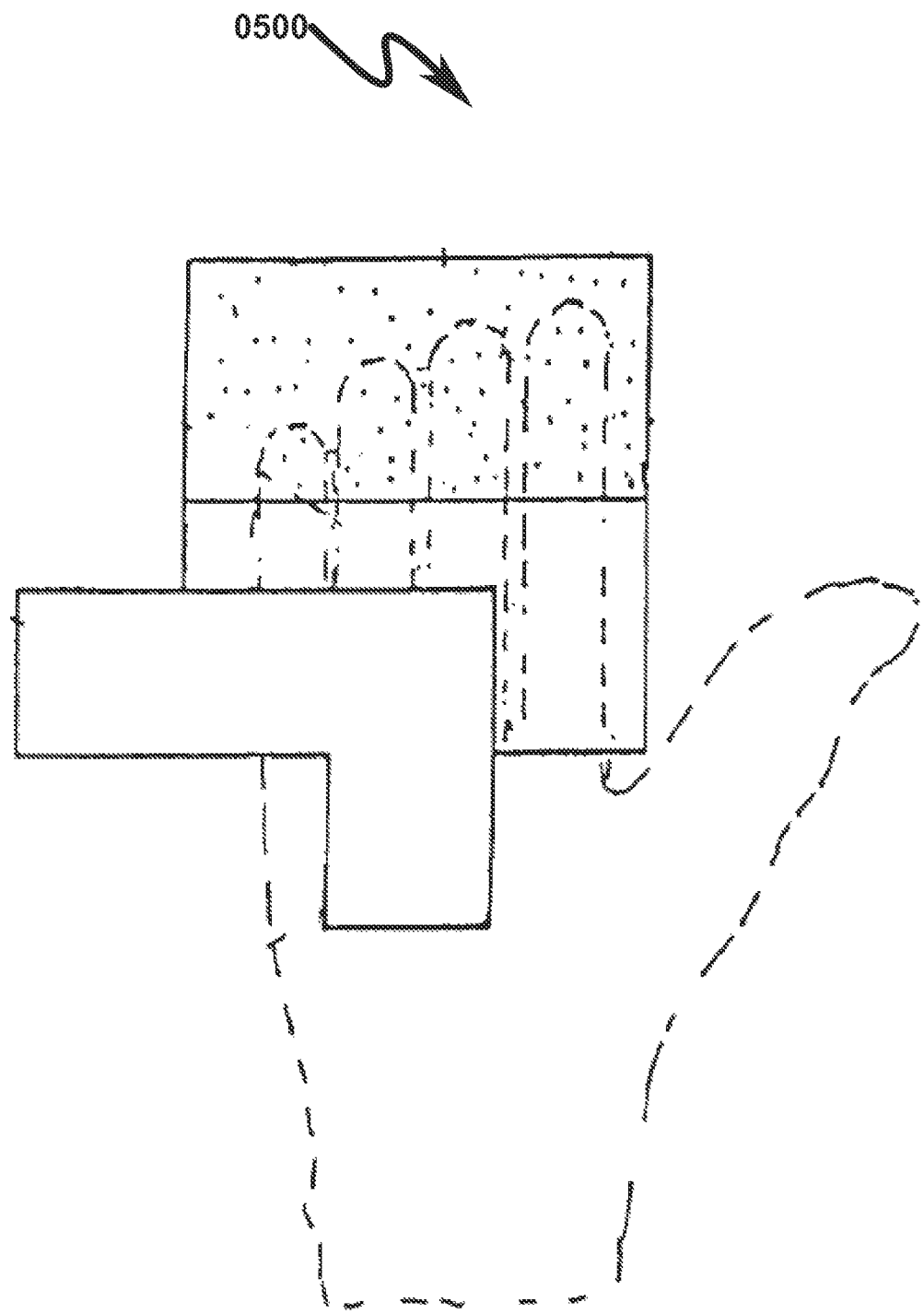
FIG. 5 illustrates a prior art glove system from U.S. Pat. No. 5,922,336 (Tebbe)
Figure 7:
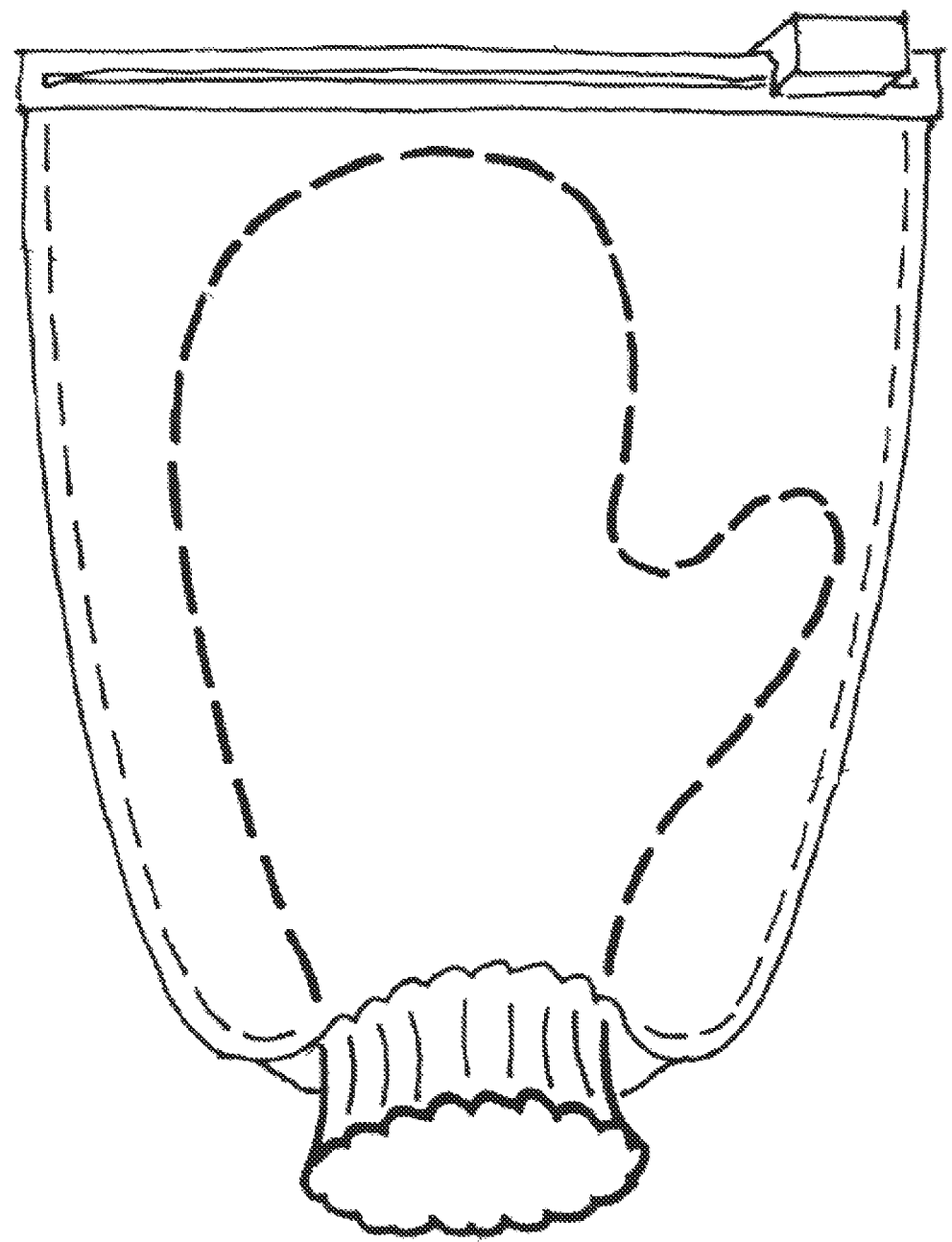
FIG. 7 illustrates a prior art glove system from U.S. Pat. No. 6,539,549 (Peters)
Figure 8:
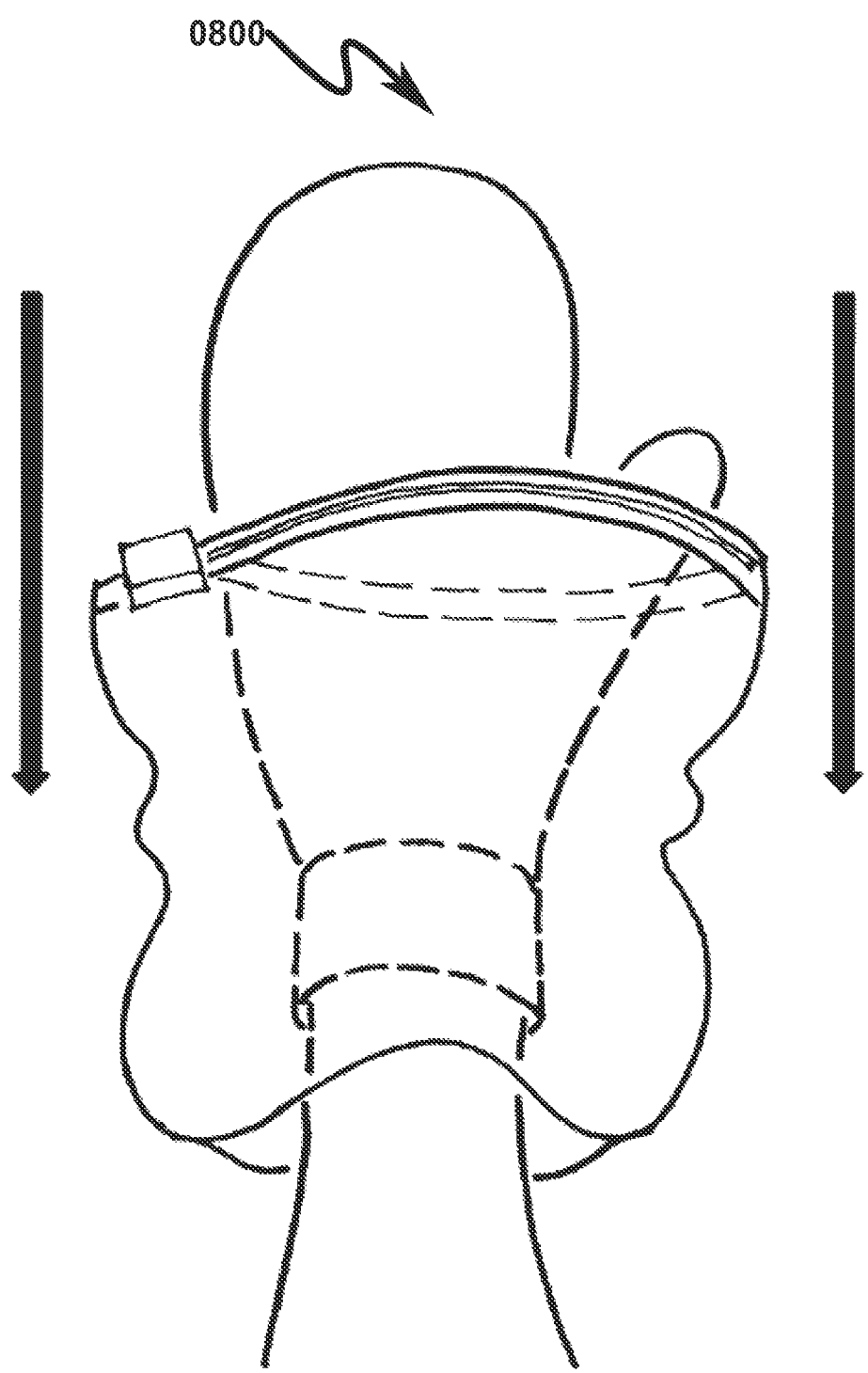
FIG. 8 illustrates a prior art glove system from U.S. Pat. No. 6,539,549 (Peters)

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RAG STACK SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

PRS Layer Thickness not Limitive

The planar rag stack (PRS) illustrated in the following embodiments may incorporate individual stack layers of varying thicknesses. The illustrated embodiments do not limit the extent of these thicknesses or number of layers that may constitute a PRS.

PRS Bonding not Limitive

The planar rag stack (PRS) illustrated in the following embodiments may incorporate stack layers in which different stack layer materials are bonded together with a fluid barrier membrane between the different layers. This incorporation of internal stack barrier layers in some embodiments allows liquid isolation of individual layers within the rag stack.

Rectangular Embodiment System Overview (0900)-(2000)

Figure 9:
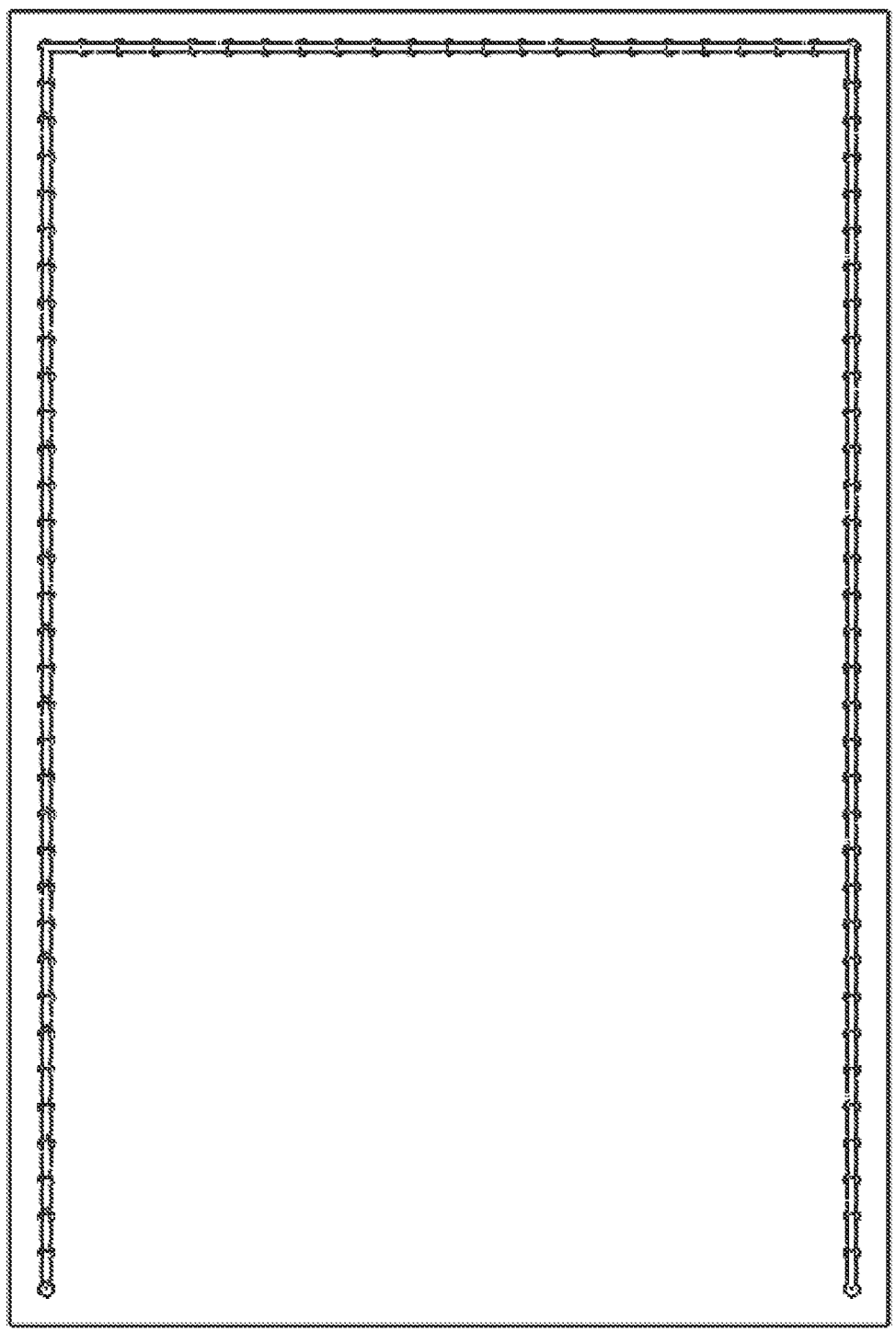
FIG. 9 illustrates a top view of a preferred exemplary invention system rectangular embodiment with sewn mechanical coupling of the planar rag stack (PRS)
Figure 10:
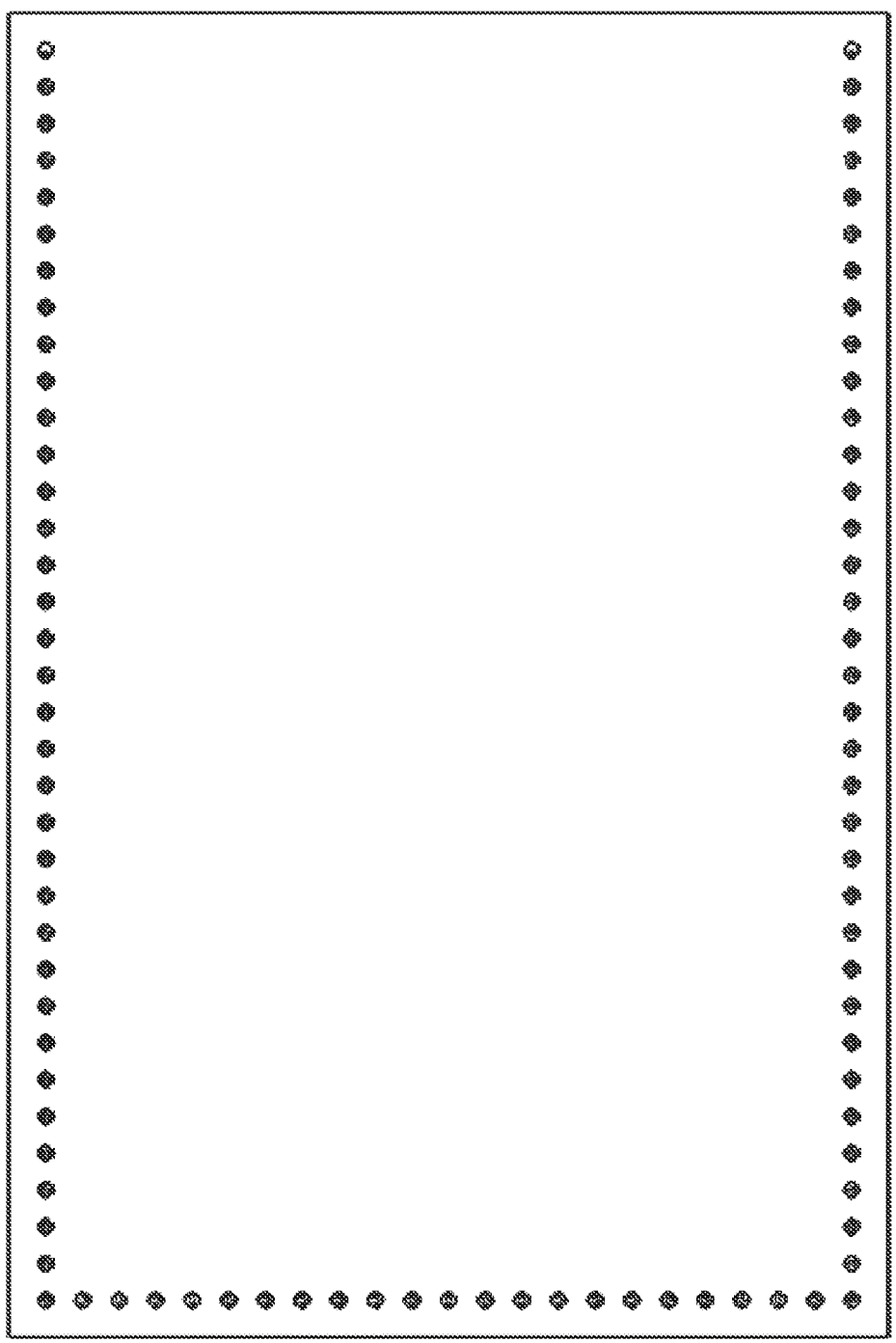
FIG. 10 illustrates a bottom view of a preferred exemplary invention system rectangular embodiment with stitching omitted with sewn mechanical coupling of the planar rag stack (PRS)
Figure 11:
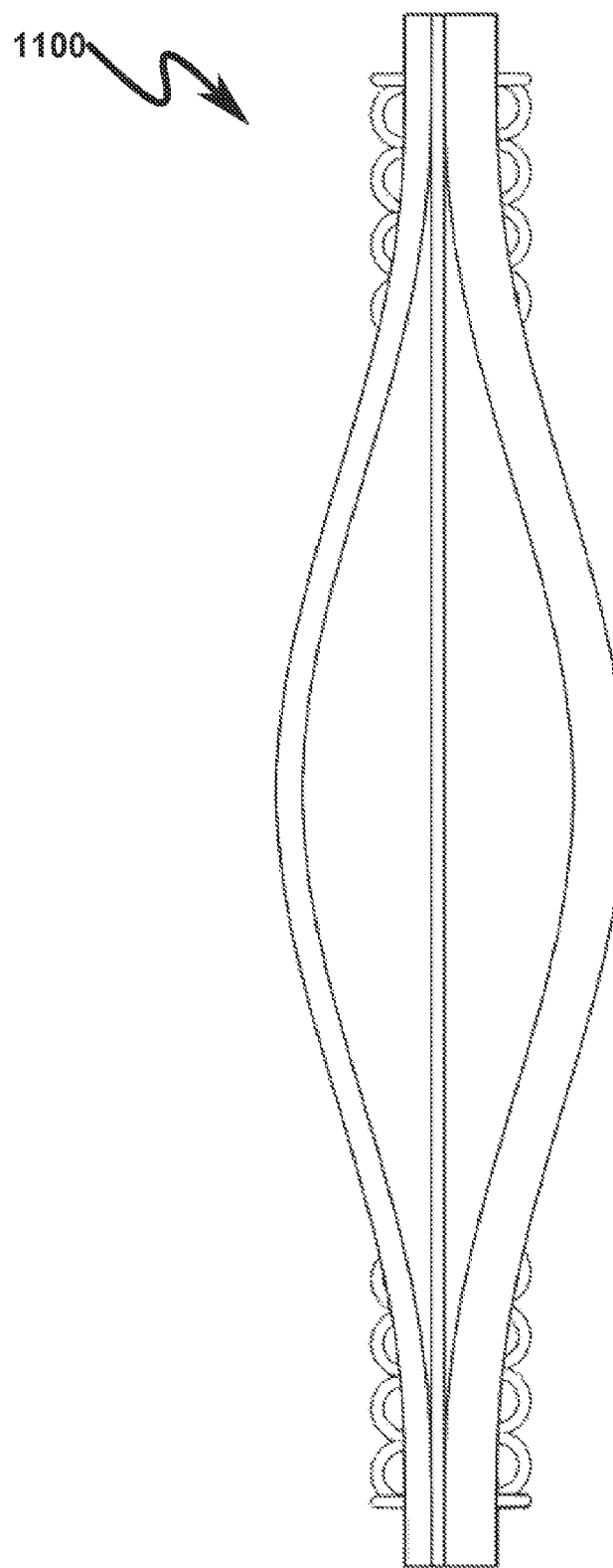
FIG. 11 illustrates a front view of a preferred exemplary invention system rectangular embodiment with sewn mechanical coupling of the planar rag stack (PRS)
Figure 12:
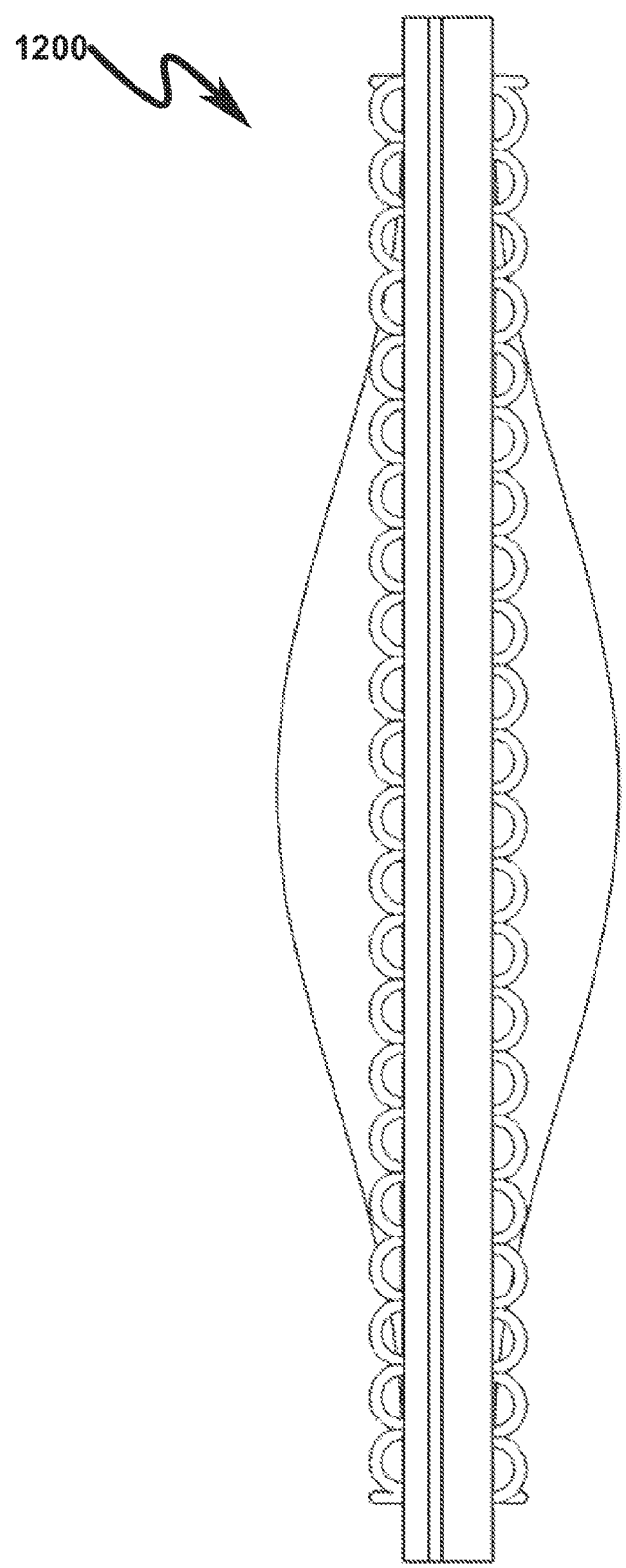
FIG. 12 illustrates a back view of a preferred exemplary invention system rectangular embodiment with sewn mechanical coupling of the planar rag stack (PRS)
Figure 13:
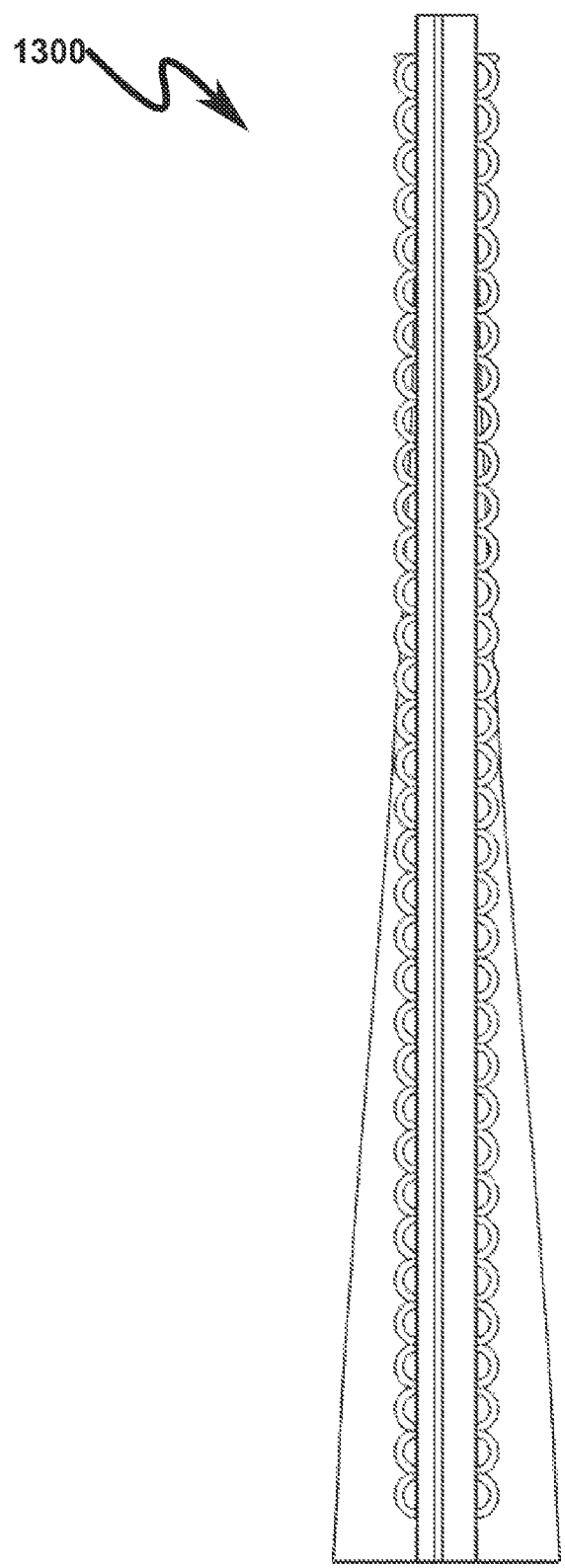
FIG. 13 illustrates a side view of a preferred exemplary invention system rectangular embodiment with sewn mechanical coupling of the planar rag stack (PRS)
Figure 14:
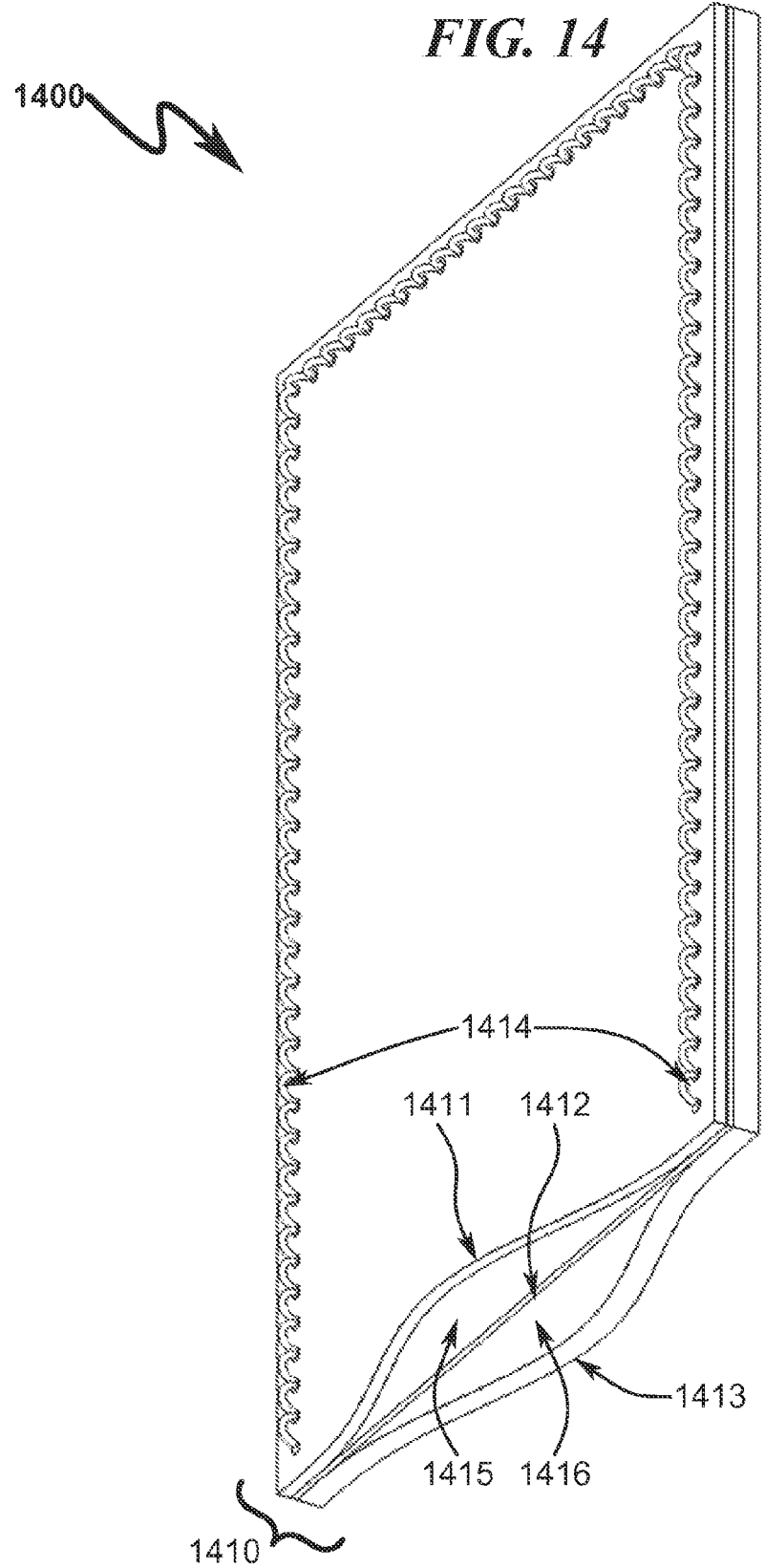
FIG. 14 illustrates a top right front perspective view of a preferred exemplary invention system rectangular embodiment with sewn mechanical coupling of the planar rag stack (PRS)
Figure 15:
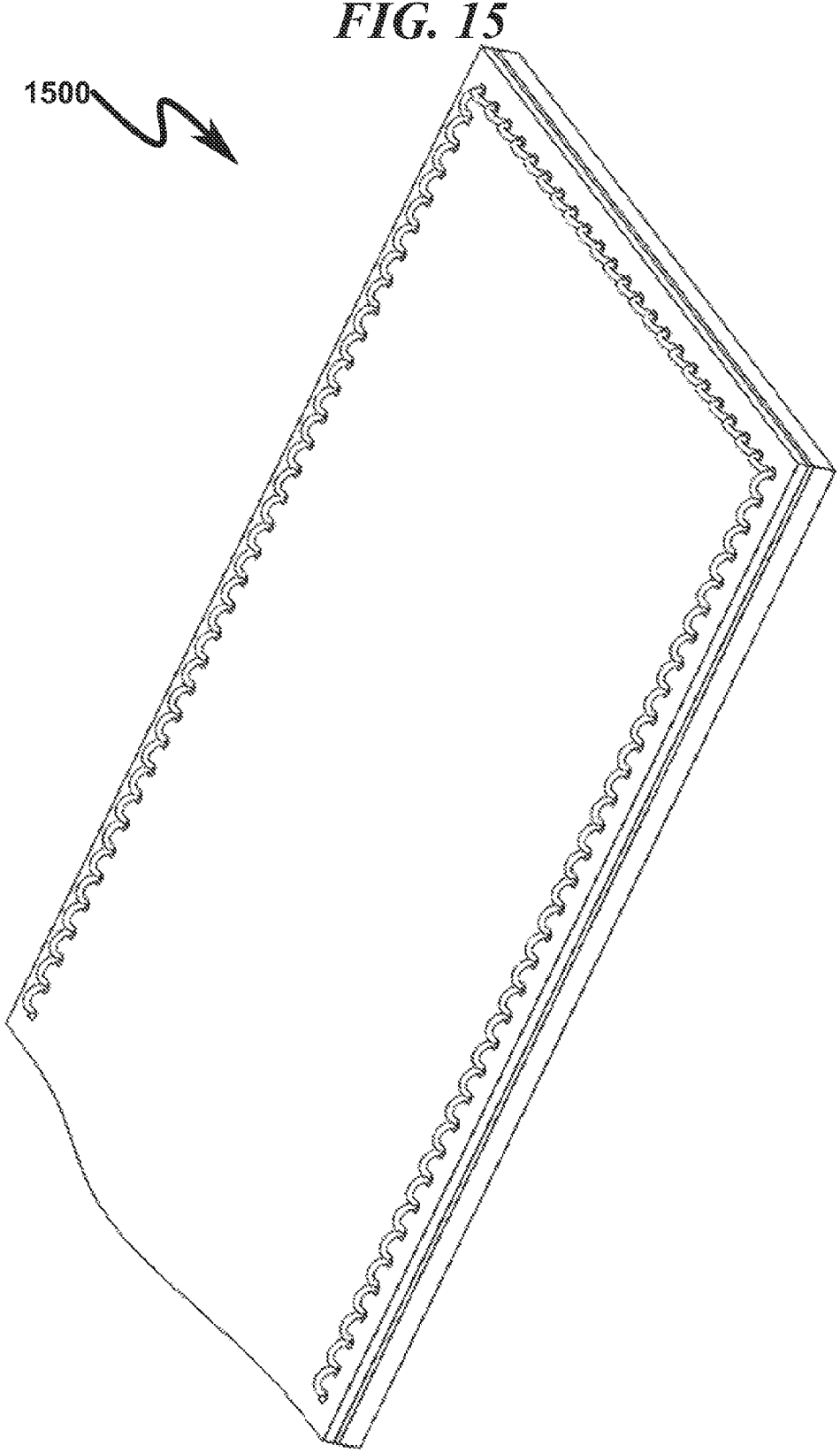
FIG. 15 illustrates a top right rear perspective view of a preferred exemplary invention system rectangular embodiment with sewn mechanical coupling of the planar rag stack (PRS)
Figure 16:
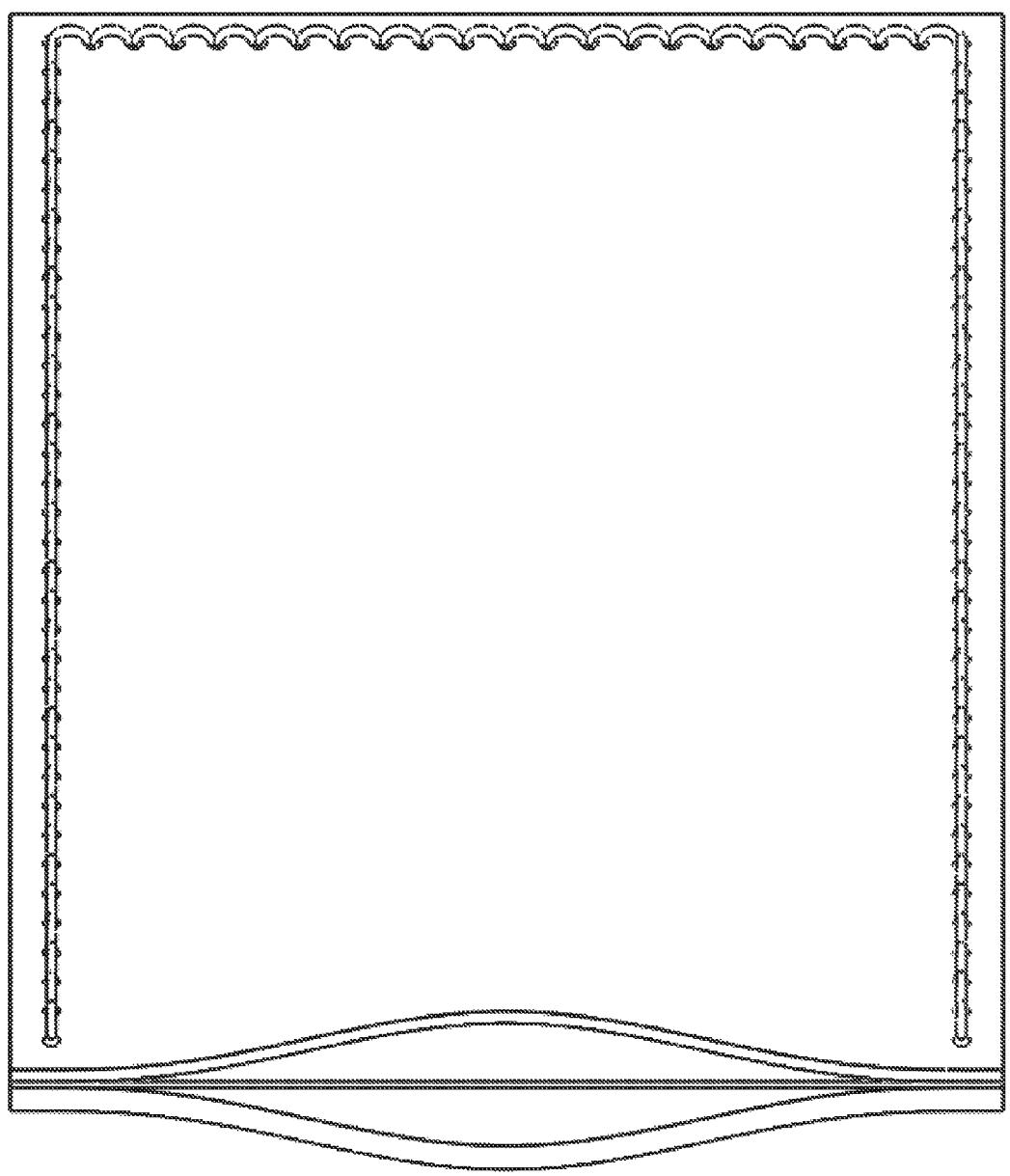
FIG. 16 illustrates a top front perspective view of a preferred exemplary invention system rectangular embodiment with sewn mechanical coupling of the planar rag stack (PRS)
Figure 17:
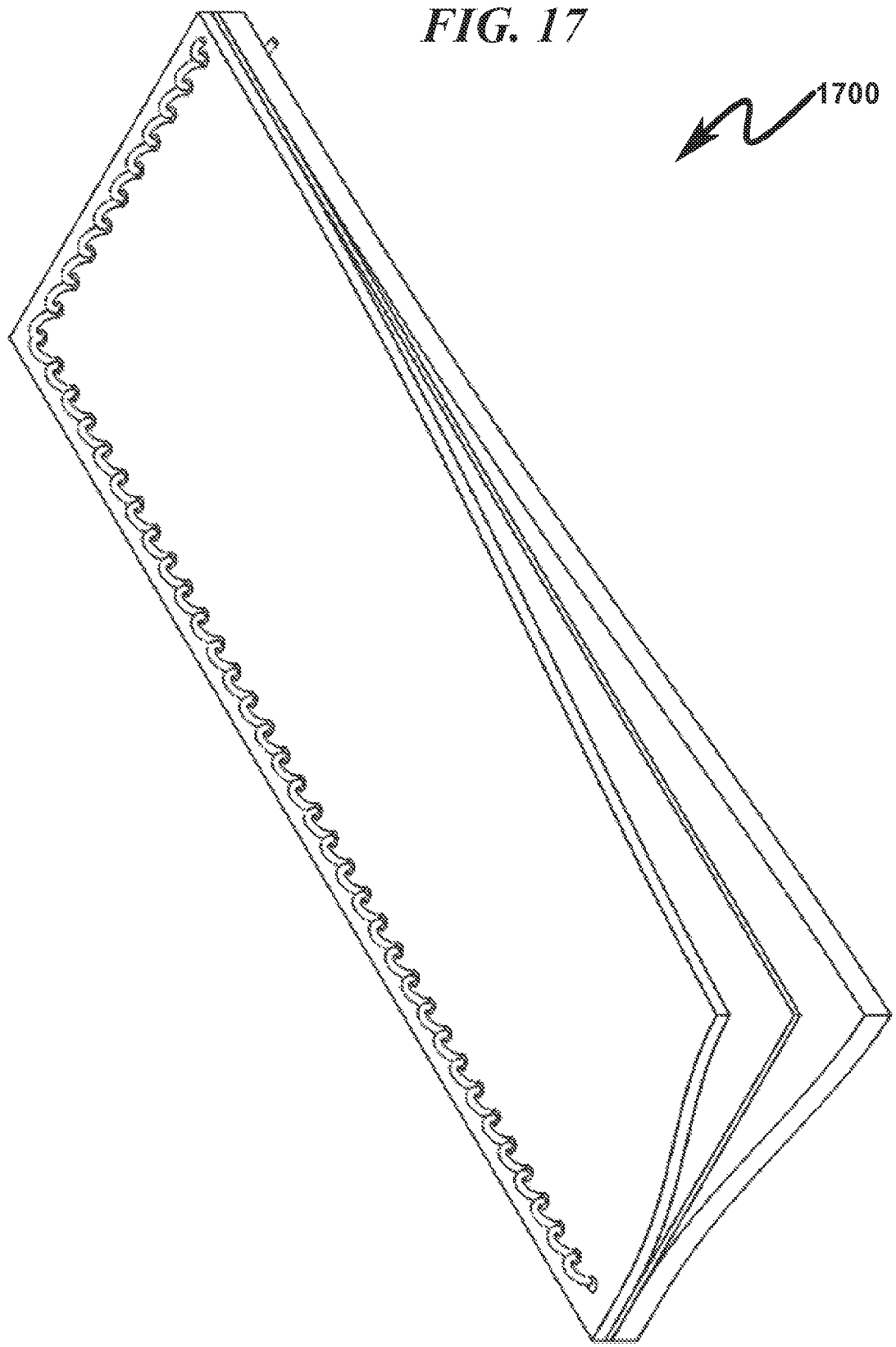
FIG. 17 illustrates a front-to-rear side sectional perspective view of a preferred exemplary invention system rectangular embodiment with sewn mechanical coupling of the planar rag stack (PRS)
Figure 18:
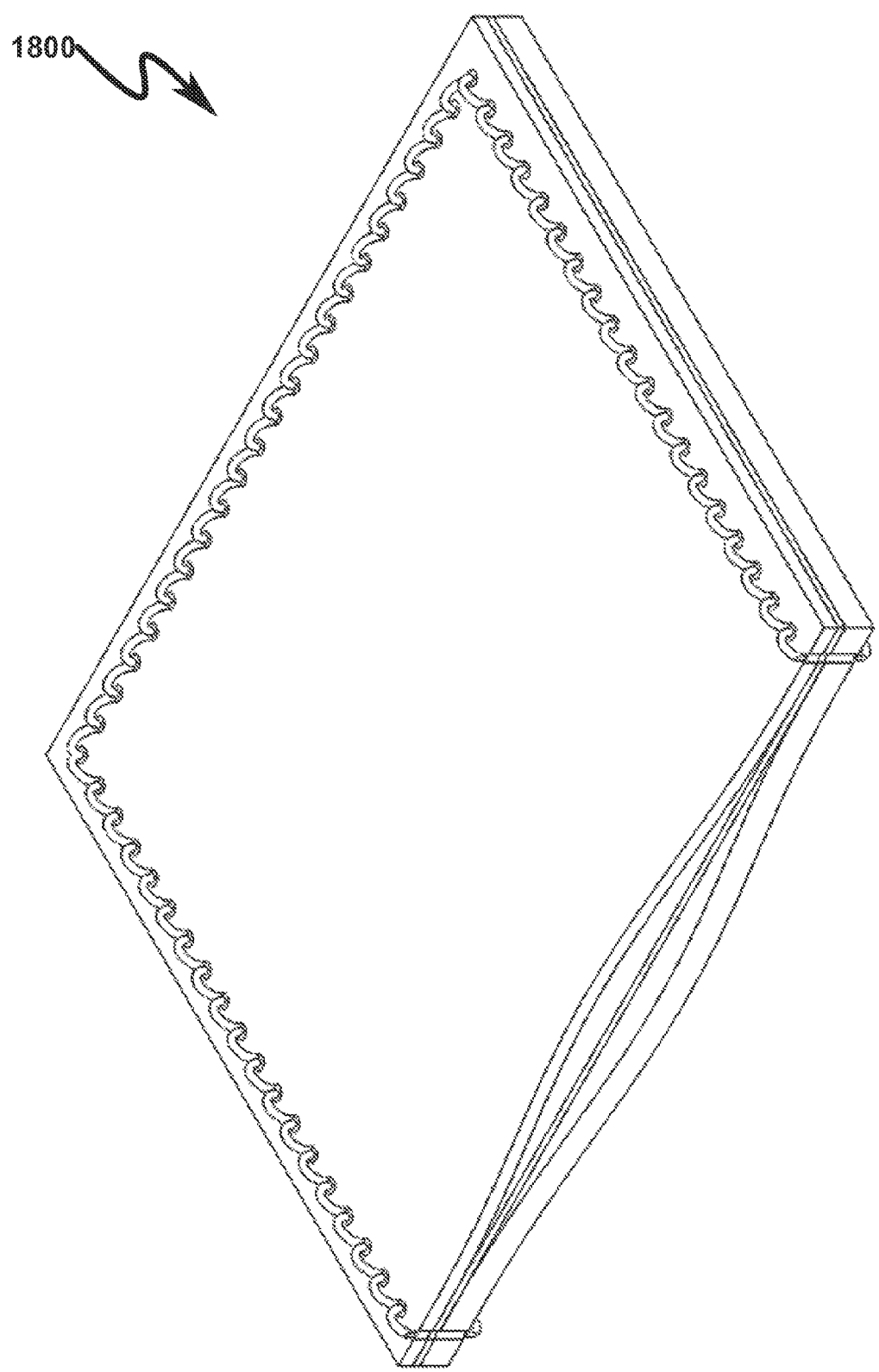
FIG. 18 illustrates a side-to-side front sectional perspective view of a preferred exemplary invention system rectangular embodiment with sewn mechanical coupling of the planar rag stack (PRS)
Figure 19:
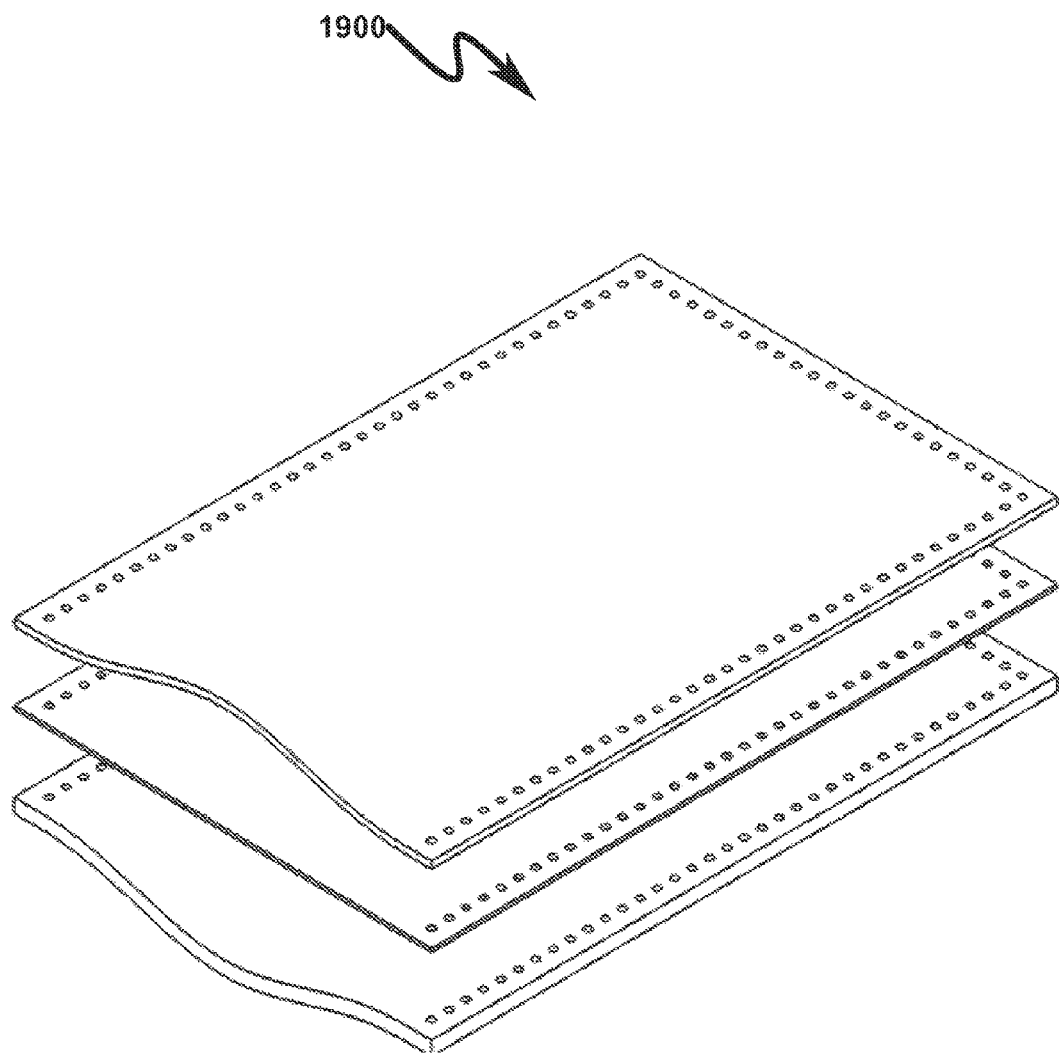
FIG. 19 illustrates a top right front perspective assembly view of a preferred exemplary invention system rectangular embodiment with sewn mechanical coupling of the planar rag stack (PRS)
Figure 20:
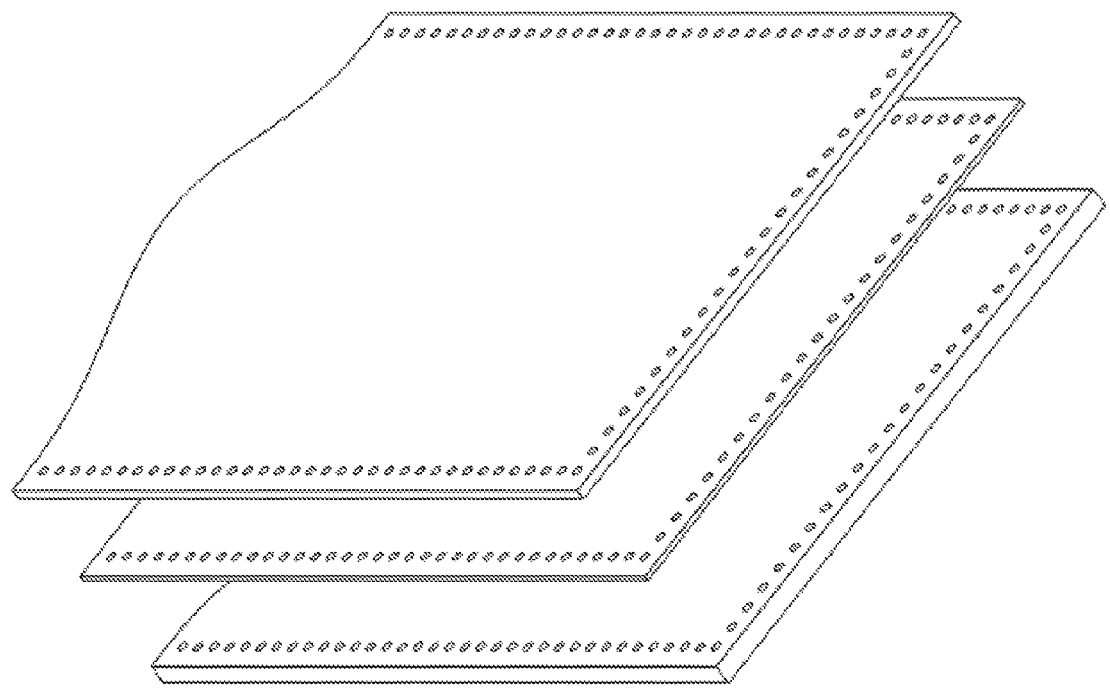
FIG. 20 illustrates a top right rear perspective assembly view of a preferred exemplary invention system rectangular embodiment with sewn mechanical coupling of the planar rag stack (PRS)

A general overview of a preferred exemplary invention rectangular form embodiment is depicted in FIG. 9 (0900)-FIG. 20 (2000). As generally depicted in these drawings and particularly in FIG. 14 (1400), this rectangular embodiment of the invention incorporates a planar rag stack (PRS) (1410) comprising three or more sheets (1411, 1412, 1413) of substantially flat material of identical peripheral form. This peripheral form is substantially rectangular in this preferred embodiment. A peripheral stack attachment (PSA) (here depicted as a sewn attachment (1414) between the PRS layers) is configured to mechanically couple the PRS at or near an outer perimeter of the sheets (1411, 1412, 1413) such that the mechanical coupling of the PRS (1410) comprises continuous attachment at 50% or more of the outer perimeter.

This configuration permits hand entry into one of the inner regions (1415, 1416) of the open end of the PRS (1410) between layers of the PRS sheets (1411, 1412, 1413). Layers of the PRS may comprise sheets (1411, 1412, 1413) having different characteristics. For example, any of the following sheet types is anticipated in this arrangement:
  waffle microfiber;
  glass cleaning cloth;
  stainless cleaning cloth;
  scrubbing cloth;
  microfiber sheet;
  terry sheet;
  chamois sheet;
  finishing sheet;
  finishing cloth;
  SCOTCH-BRITE® sheet;
  abrasive cloth; and
  plastic sheet.

It should be noted that the system may incorporate a plastic isolation sheet as an inner sheet (1412) between other types of sheets to provide for isolation between the outer sheets (1411, 1413) and thus prevent contamination from one sheet (1411) to another sheet (1413) within the PRS (1410).

While the PRS (1410) is depicted has only comprising three sheets (1411, 1412, 1413) in this diagram, any number of sheets may be stacked to form the PRS (1410) in this and other depicted embodiments. A significant feature of this and other depicted embodiments is the ability for the inner sheet surfaces within the PRS (1410) to be everted ("turned inside-out") to make them the exposed sheets of the PRS (1410). By limiting the mechanical coupling of the PRS (1410) to comprise continuous attachment at 50% or more of the outer perimeter the inner sheets may be everted and used as the external surface of the PRS (1410). This eversion provides for as many sheet combinations as there are layers in the PRS (1410), as a non-everted configuration will always be available along with N−1 everted configurations where N is equal to the number of sheets in the PRS (1410).

Thermally Sealed Embodiment System Overview (2100)-(3200)

Figure 21:
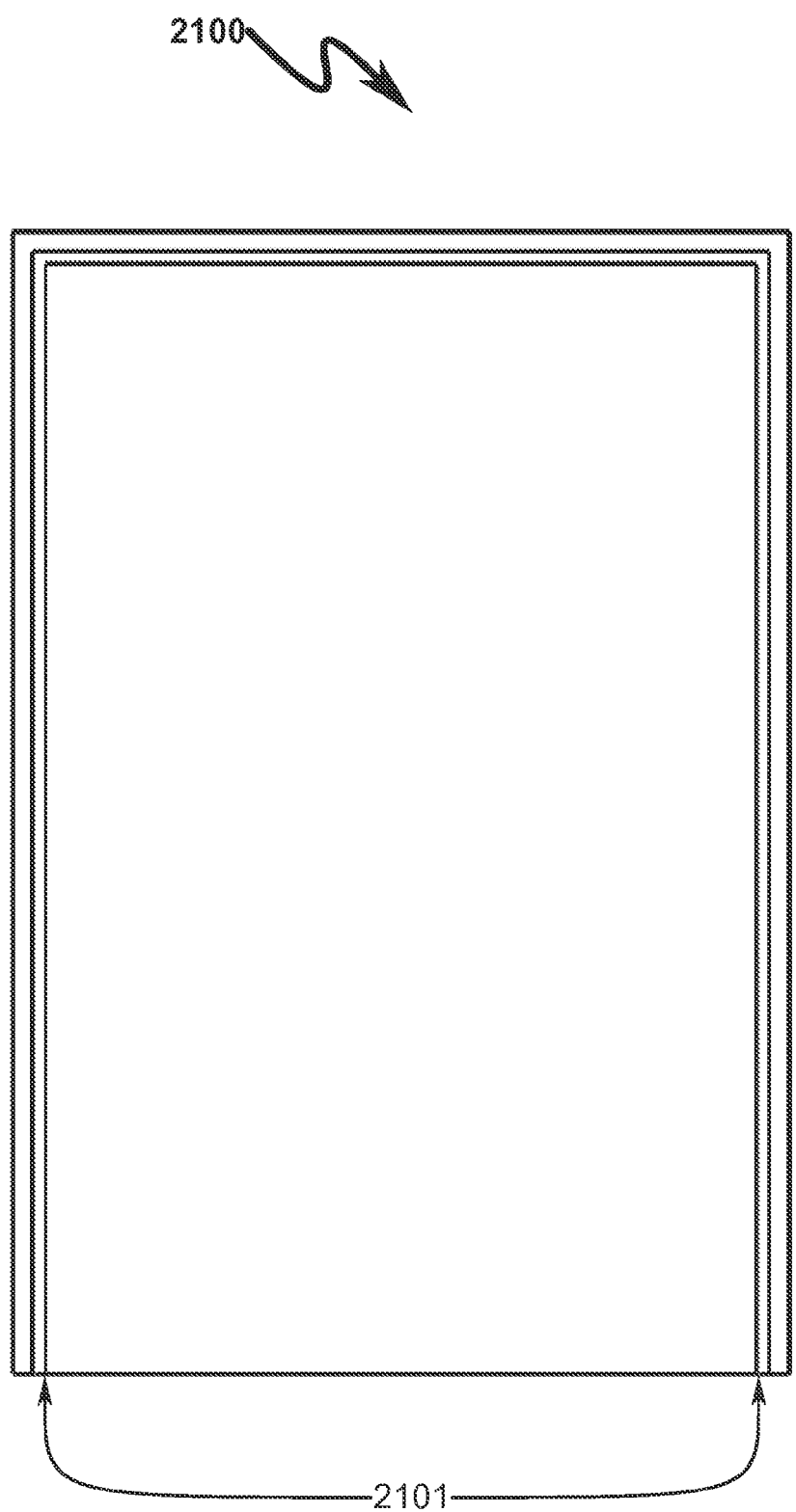
FIG. 21 illustrates a top view of a preferred exemplary invention system rectangular embodiment with thermally sealed mechanical coupling of the planar rag stack (PRS)
Figure 22:
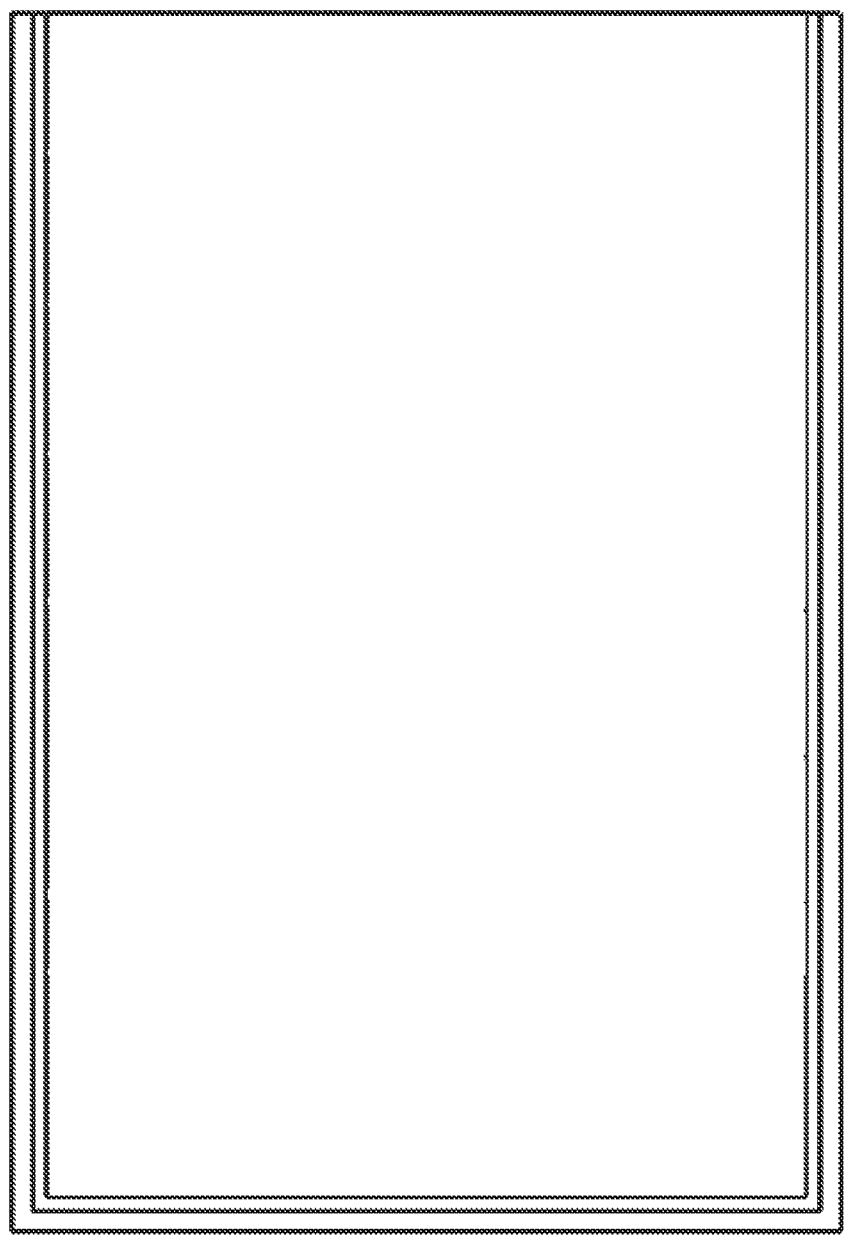
FIG. 22 illustrates a bottom view of a preferred exemplary invention system rectangular embodiment with stitching omitted with thermally sealed mechanical coupling of the planar rag stack (PRS)
Figure 23:
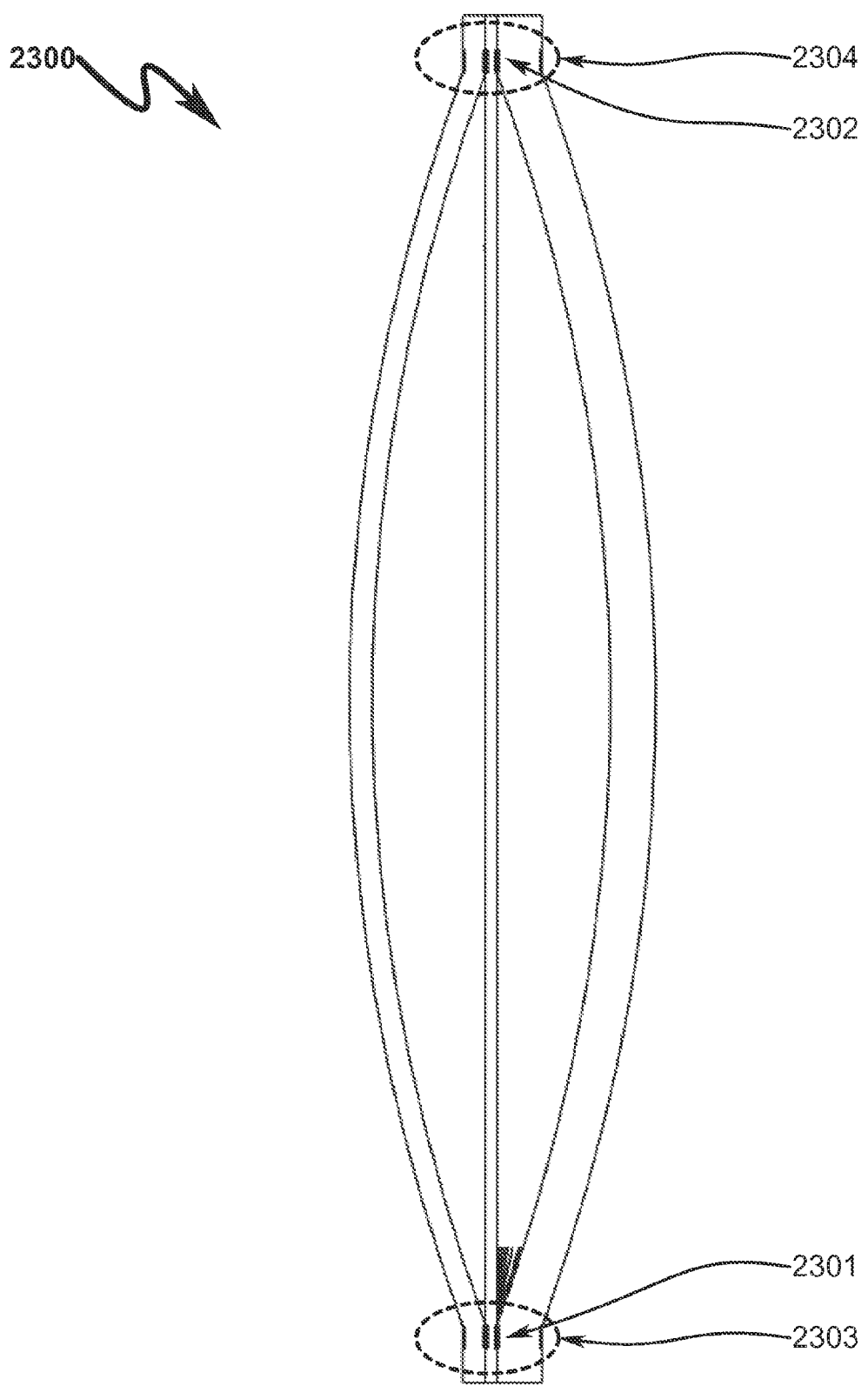
FIG. 23 illustrates a front view of a preferred exemplary invention system rectangular embodiment with thermally sealed mechanical coupling of the planar rag stack (PRS)
Figure 24:
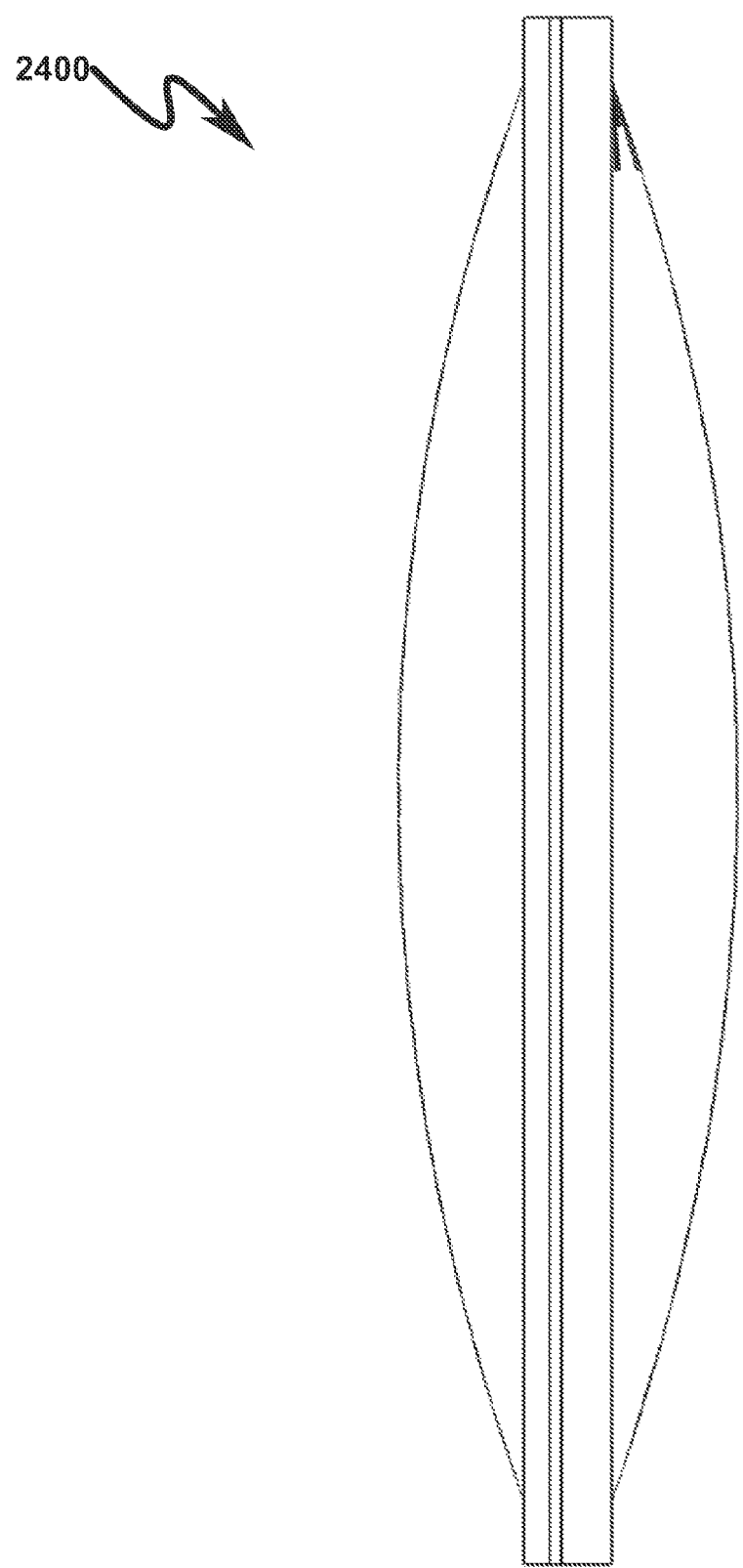
FIG. 24 illustrates a back view of a preferred exemplary invention system rectangular embodiment with thermally sealed mechanical coupling of the planar rag stack (PRS)
Figure 25:
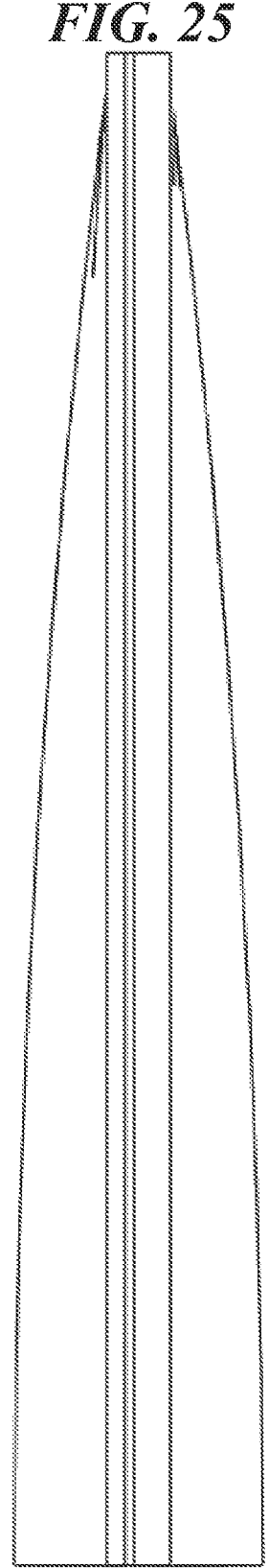
FIG. 25 illustrates a side view of a preferred exemplary invention system rectangular embodiment with thermally sealed mechanical coupling of the planar rag stack (PRS)
Figure 26:
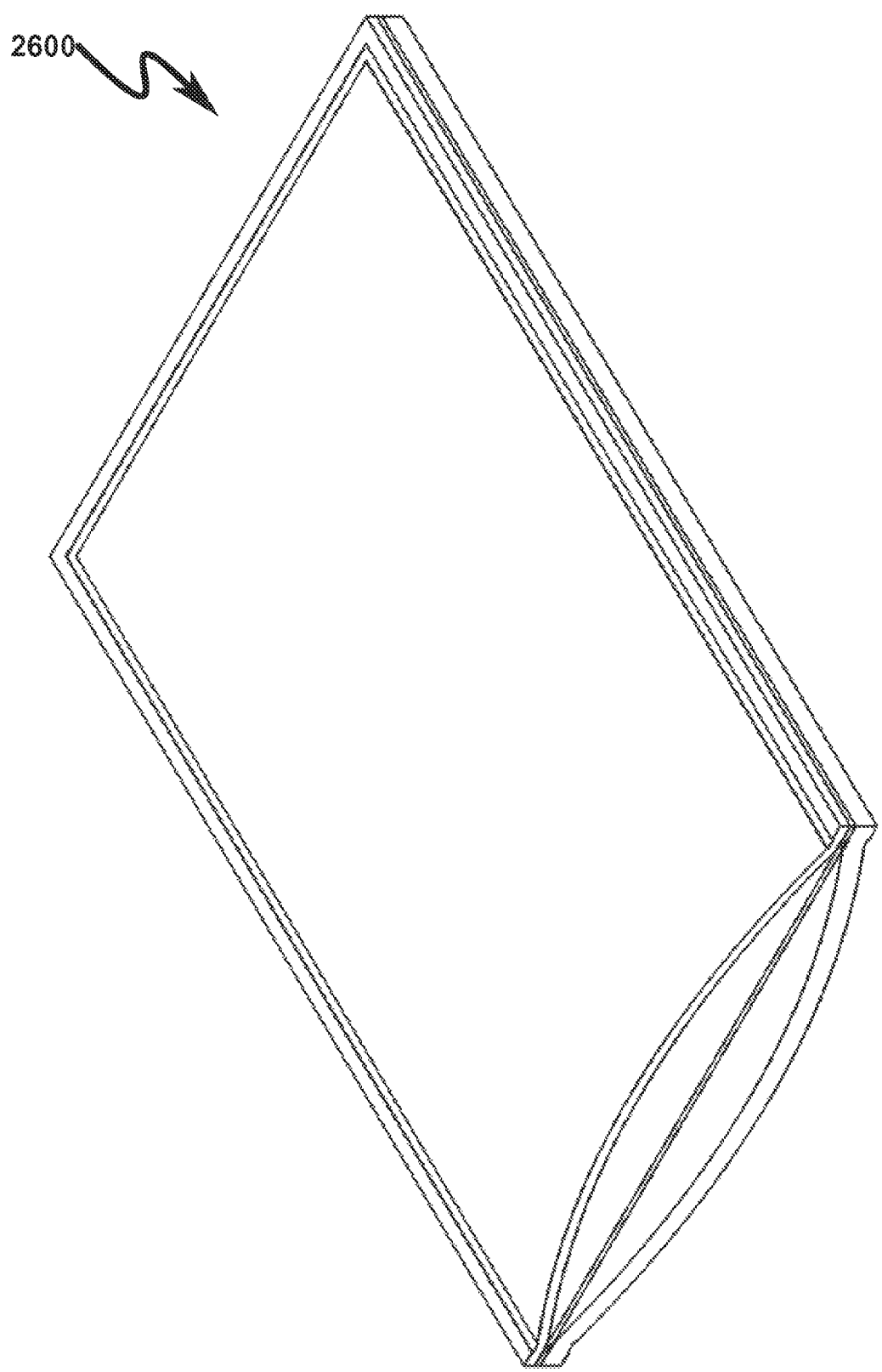
FIG. 26 illustrates a top right front perspective view of a preferred exemplary invention system rectangular embodiment with thermally sealed mechanical coupling of the planar rag stack (PRS)
Figure 27:
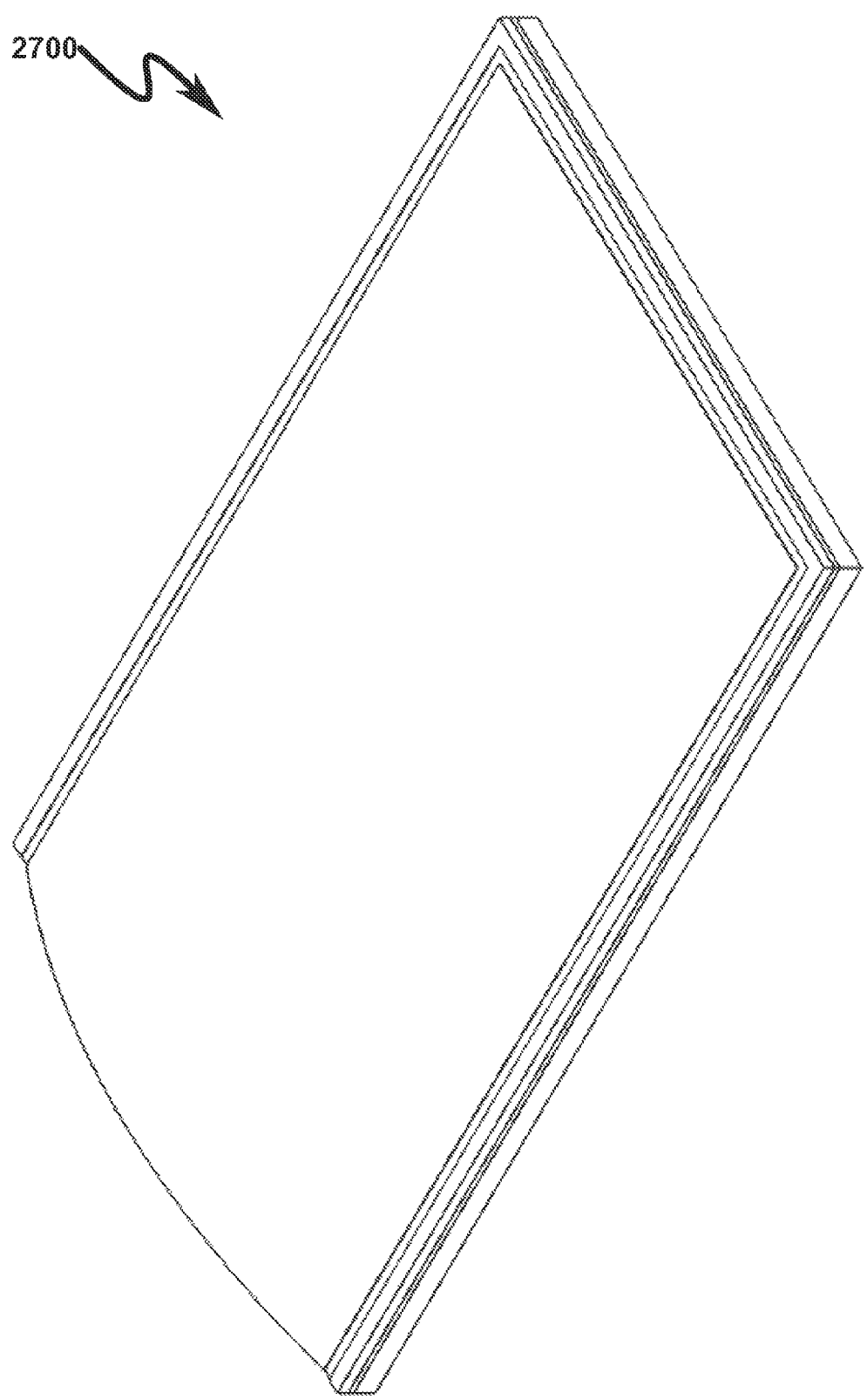
FIG. 27 illustrates a top right rear perspective view of a preferred exemplary invention system rectangular embodiment with thermally sealed mechanical coupling of the planar rag stack (PRS)
Figure 28:
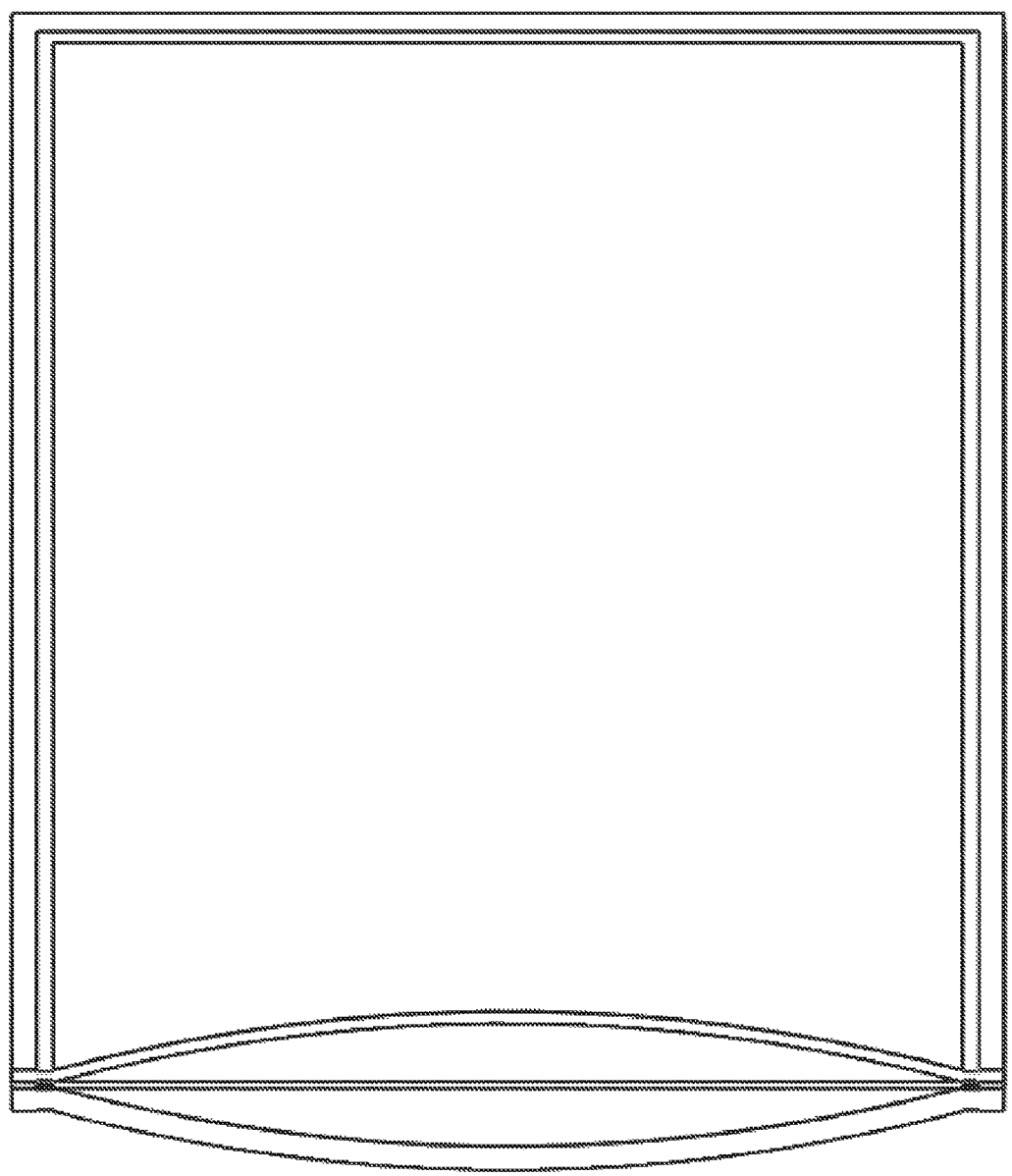
FIG. 28 illustrates a top front perspective view of a preferred exemplary invention system rectangular embodiment with thermally sealed mechanical coupling of the planar rag stack (PRS)
Figure 29:
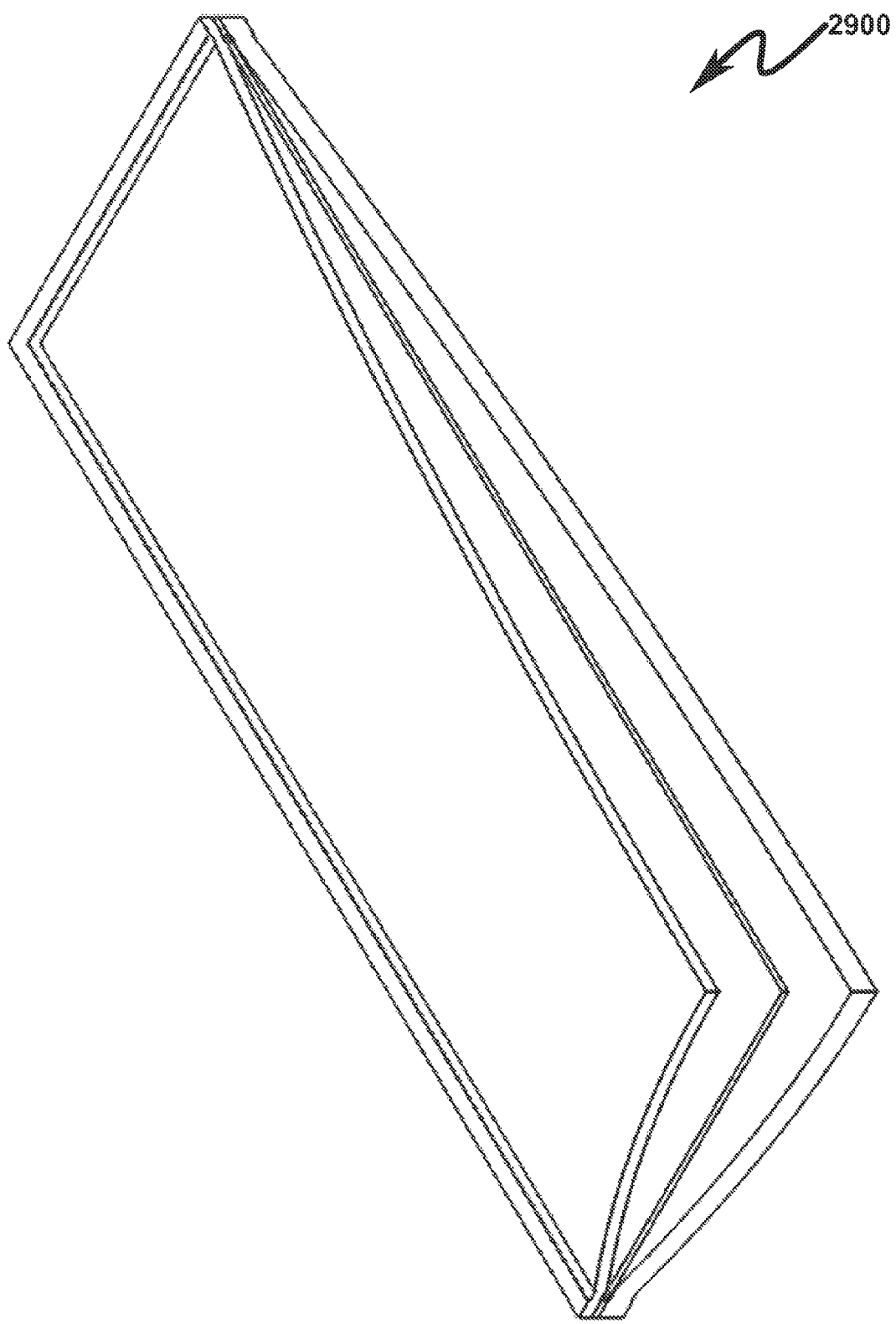
FIG. 29 illustrates a front-to-rear side sectional perspective view of a preferred exemplary invention system rectangular embodiment with thermally sealed mechanical coupling of the planar rag stack (PRS)
Figure 30:
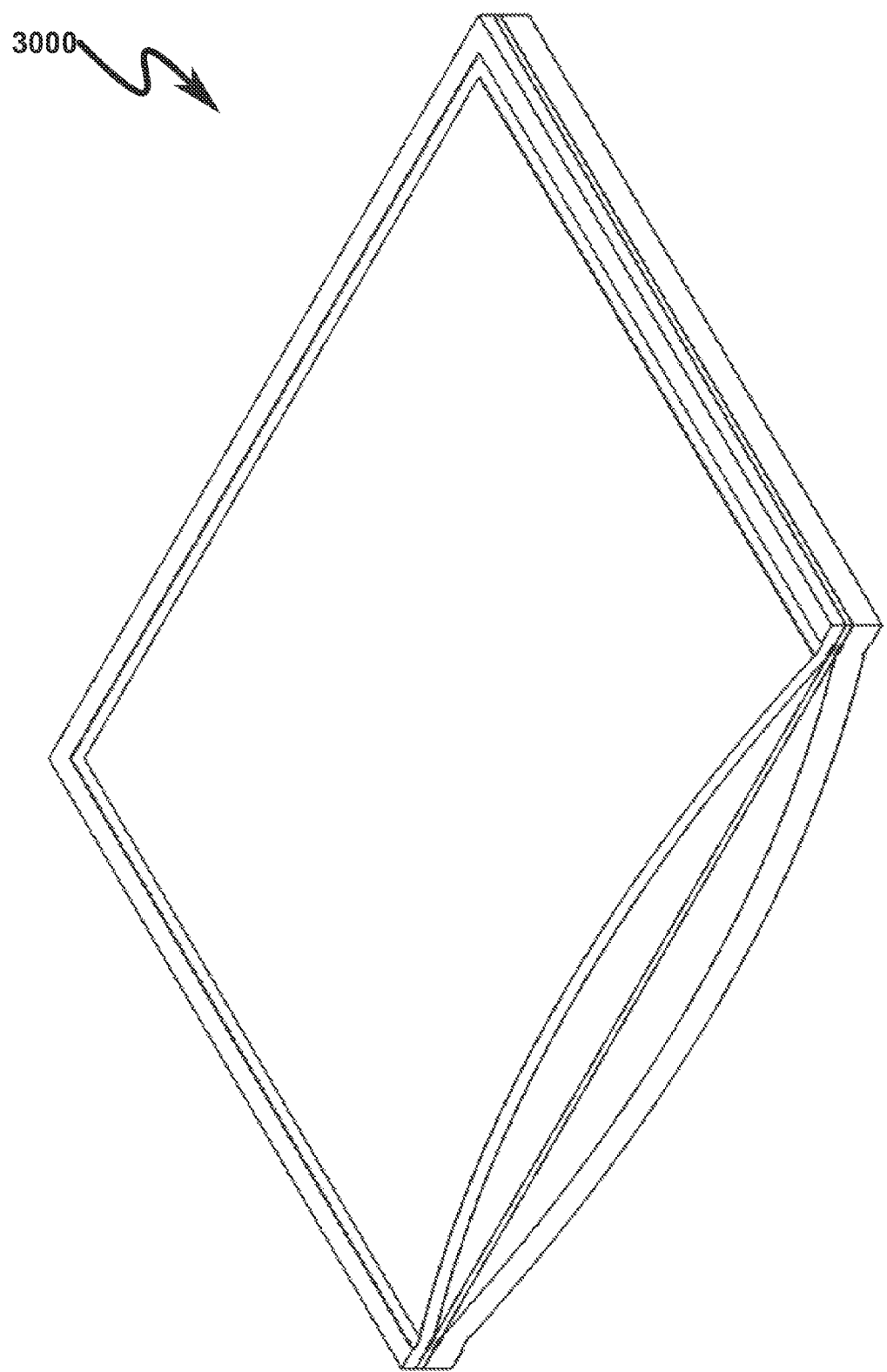
FIG. 30 illustrates a side-to-side front sectional perspective view of a preferred exemplary invention system rectangular embodiment with thermally sealed mechanical coupling of the planar rag stack (PRS)
Figure 31:
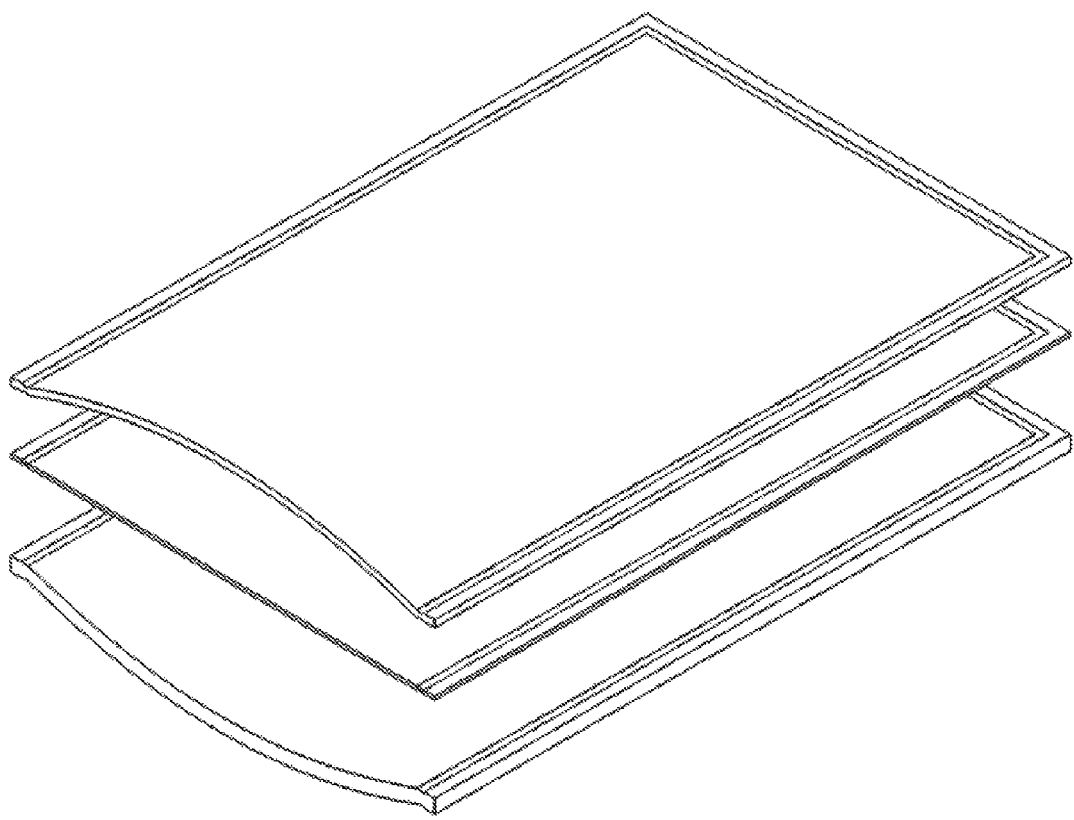
FIG. 31 illustrates a top right front perspective assembly view of a preferred exemplary invention system rectangular embodiment with thermally sealed mechanical coupling of the planar rag stack (PRS)
Figure 32:
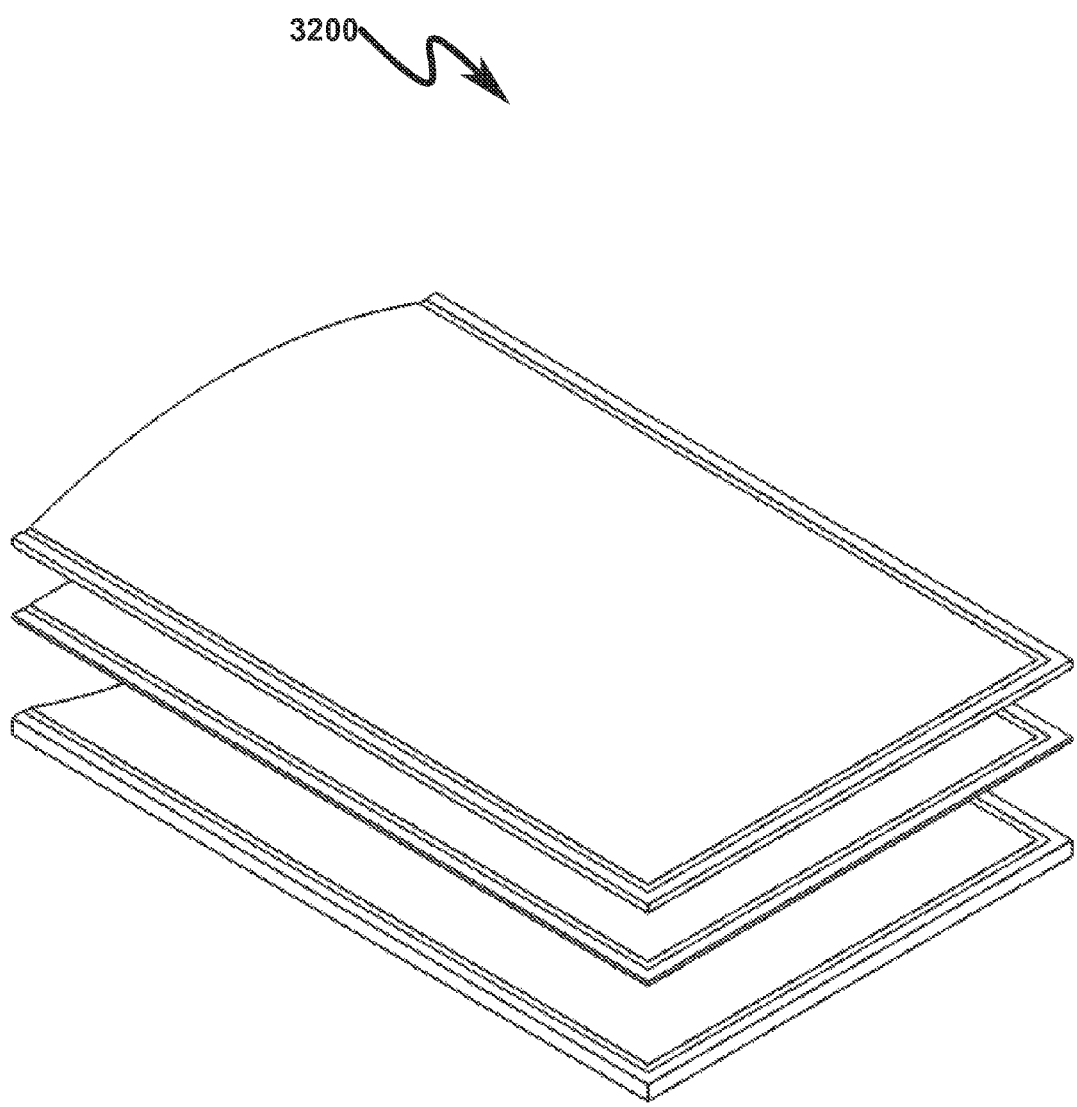
FIG. 32 illustrates a top right rear perspective assembly view of a preferred exemplary invention system rectangular embodiment with thermally sealed mechanical coupling of the planar rag stack (PRS)

As depicted in FIG. 9 (0900)-FIG. 20 (2000), one preferred system embodiment utilizes traditional sewn stitching to mechanically form the peripheral stack attachment (PSA). Another preferred embodiment may use thermal sealing or other thermally activated attachment to mechanically couple the PRS together. As generally depicted in FIG. 21 (2100)-FIG. 32 (3200), and particularly in FIG. 21 (2100), this rectangular embodiment of the invention incorporates a sealing periphery (2101) around the outer edge of the PRS. As depicted in the side views of FIG. 23 (2300), this thermal sealing may incorporate voids (2301, 2302) within the sheet periphery (2303, 2304) that are thermally activated to mechanically couple the sheets or in some circumstances these voids may be filled with glue to form the mechanical coupling of the sheets.

Peripherally Sealed Embodiment System Overview (3300)-(4400)

Figure 33:
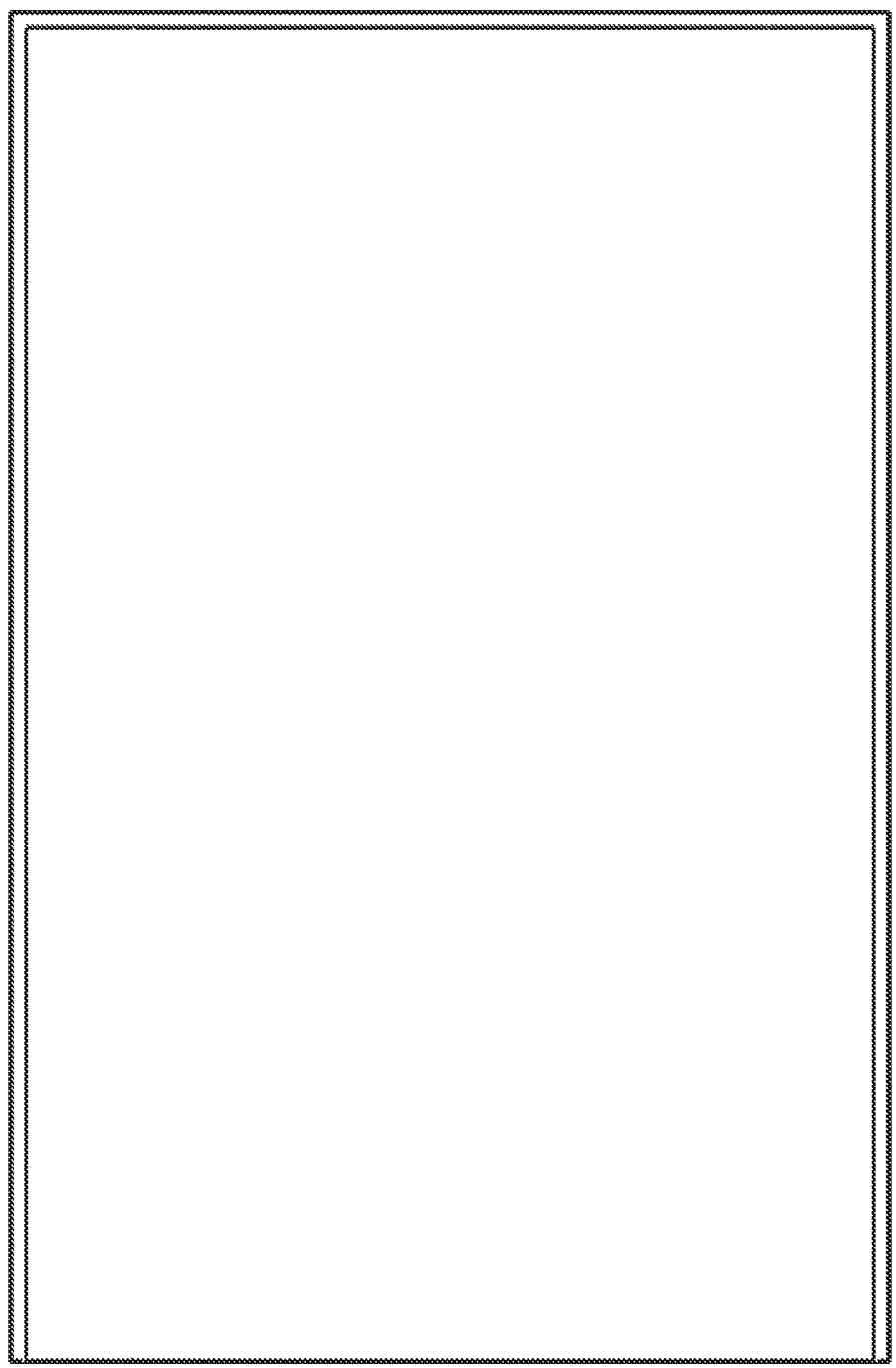
FIG. 33 illustrates a top view of a preferred exemplary invention system rectangular embodiment with peripherally sealed mechanical coupling of the planar rag stack (PRS)
Figure 34:
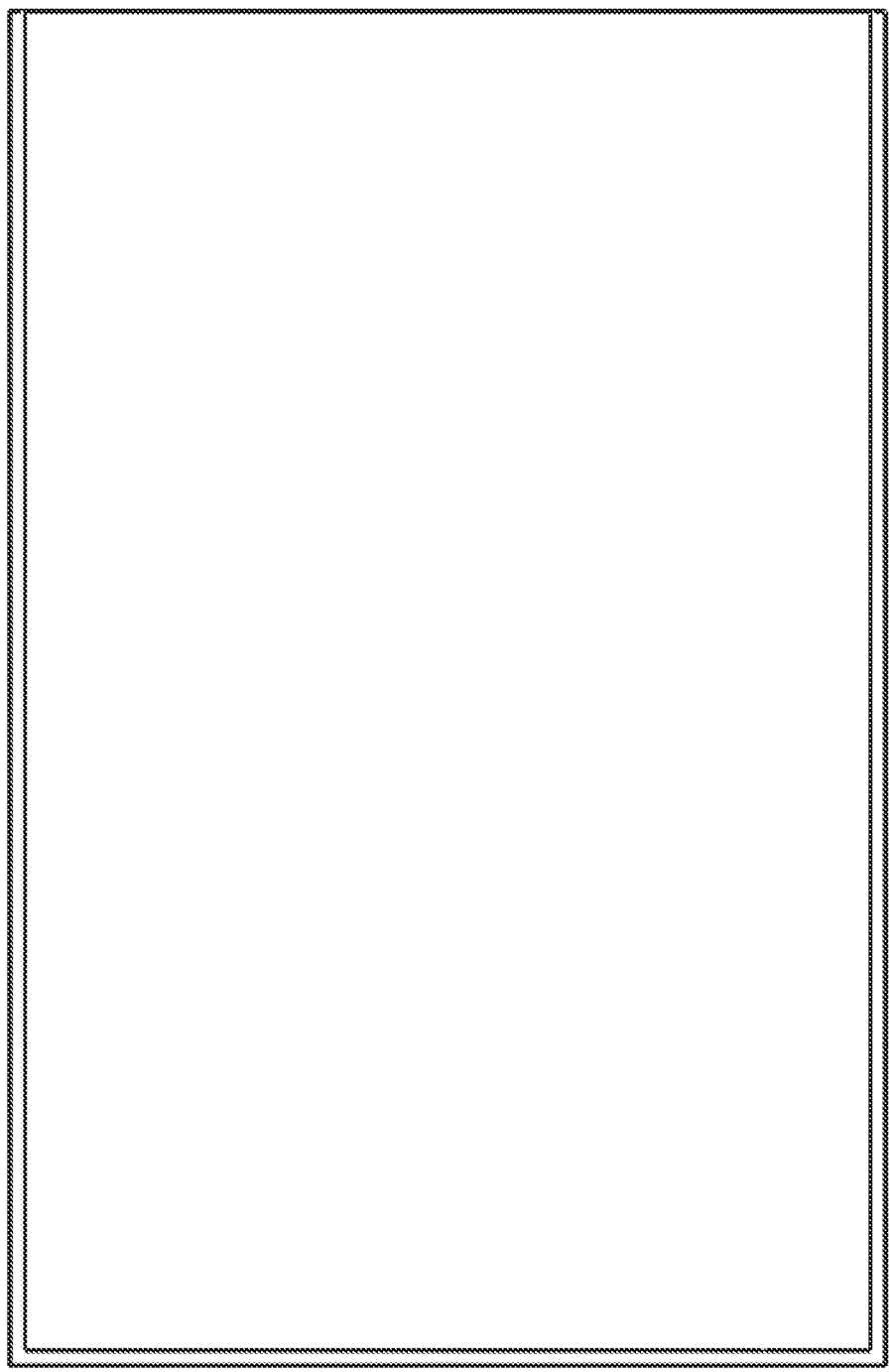
FIG. 34 illustrates a bottom view of a preferred exemplary invention system rectangular embodiment with stitching omitted with peripherally sealed mechanical coupling of the planar rag stack (PRS)
Figure 35:
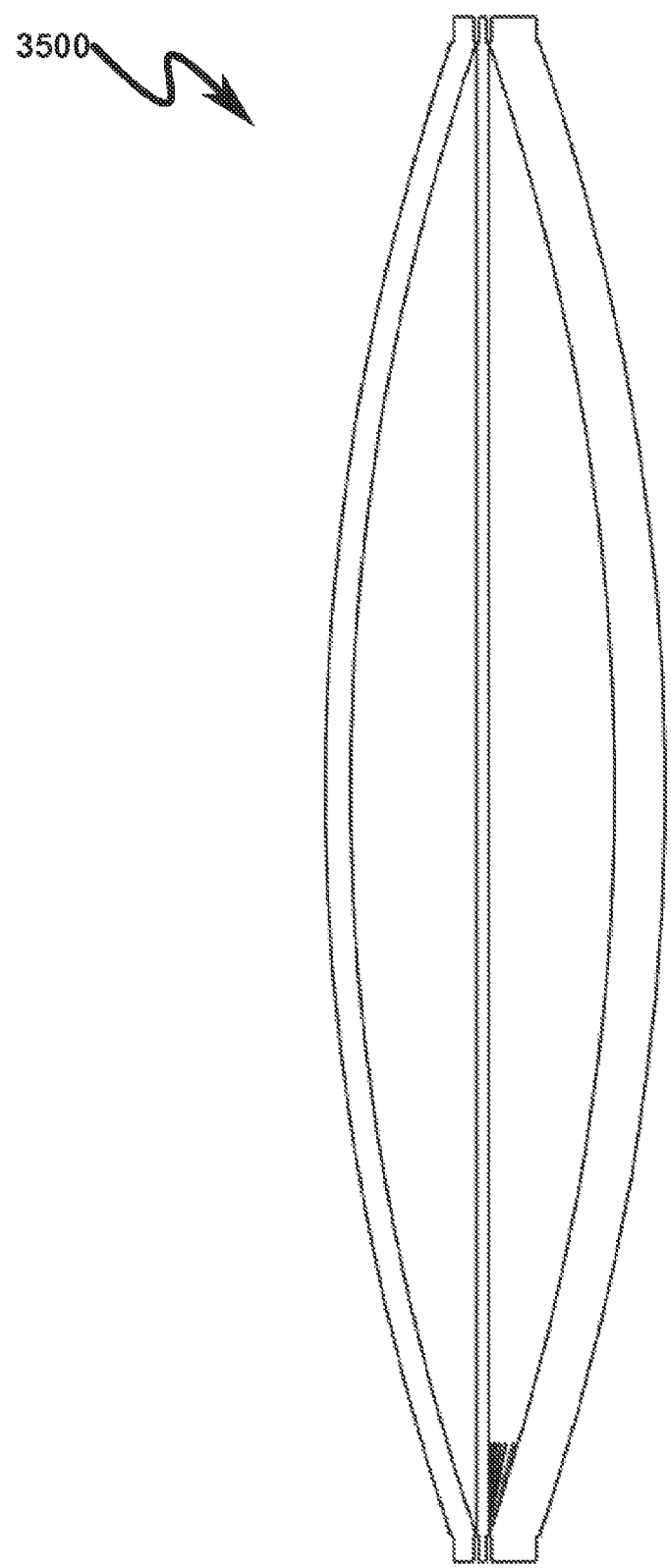
FIG. 35 illustrates a front view of a preferred exemplary invention system rectangular embodiment with peripherally sealed mechanical coupling of the planar rag stack (PRS)
Figure 36:
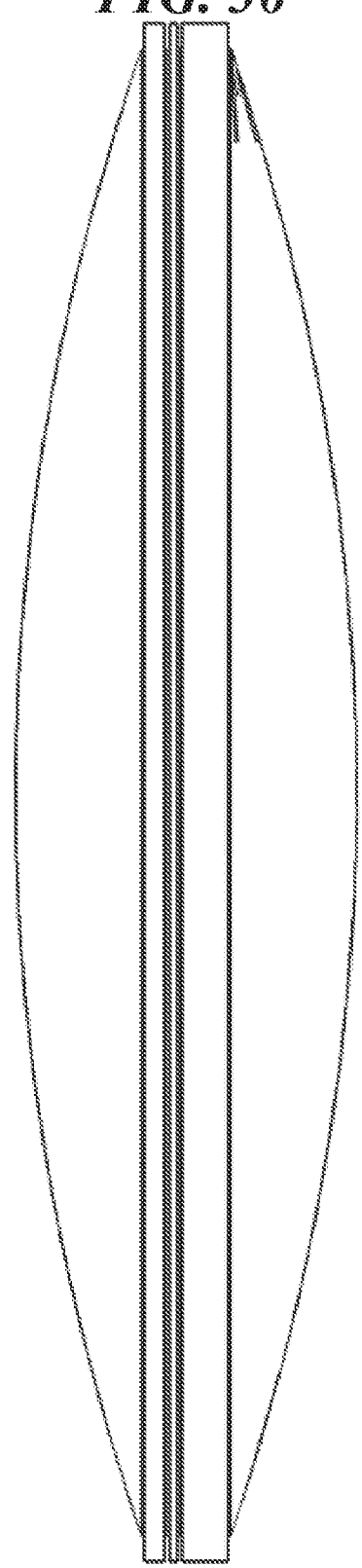
FIG. 36 illustrates a back view of a preferred exemplary invention system rectangular embodiment with peripherally sealed mechanical coupling of the planar rag stack (PRS)
Figure 37:
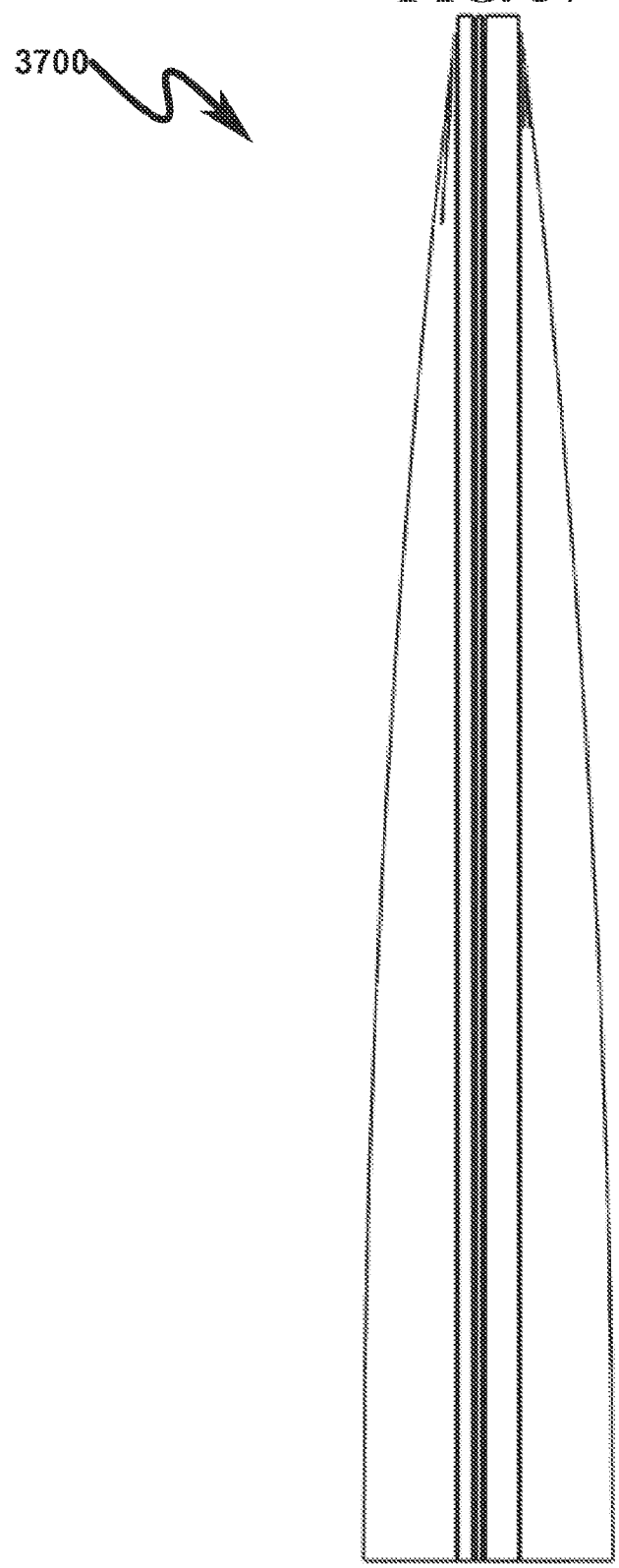
FIG. 37 illustrates a side view of a preferred exemplary invention system rectangular embodiment with peripherally sealed mechanical coupling of the planar rag stack (PRS)
Figure 38:
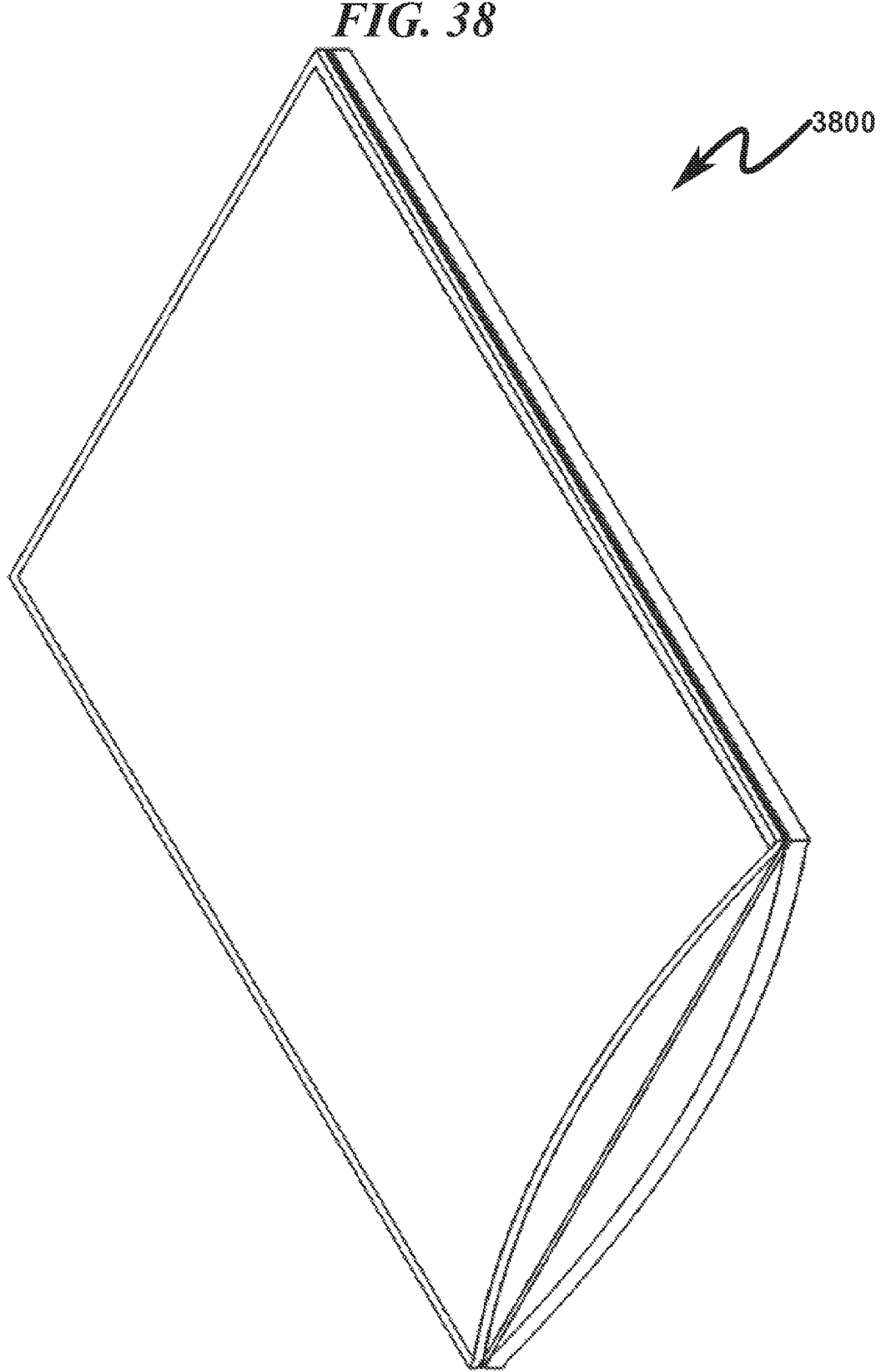
FIG. 38 illustrates a top right front perspective view of a preferred exemplary invention system rectangular embodiment with peripherally sealed mechanical coupling of the planar rag stack (PRS)
Figure 39:
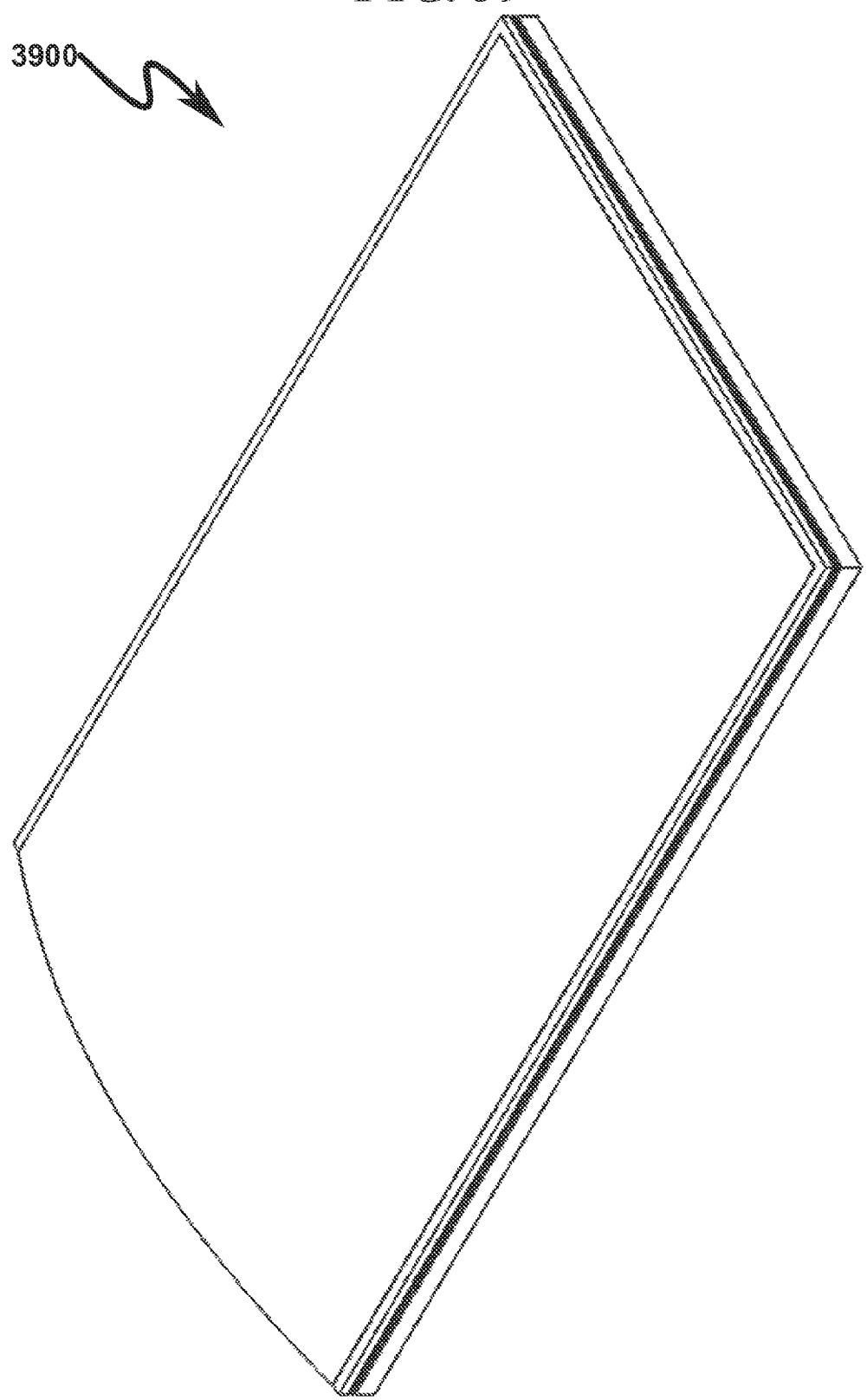
FIG. 39 illustrates a top right rear perspective view of a preferred exemplary invention system rectangular embodiment with peripherally sealed mechanical coupling of the planar rag stack (PRS)
Figure 40:
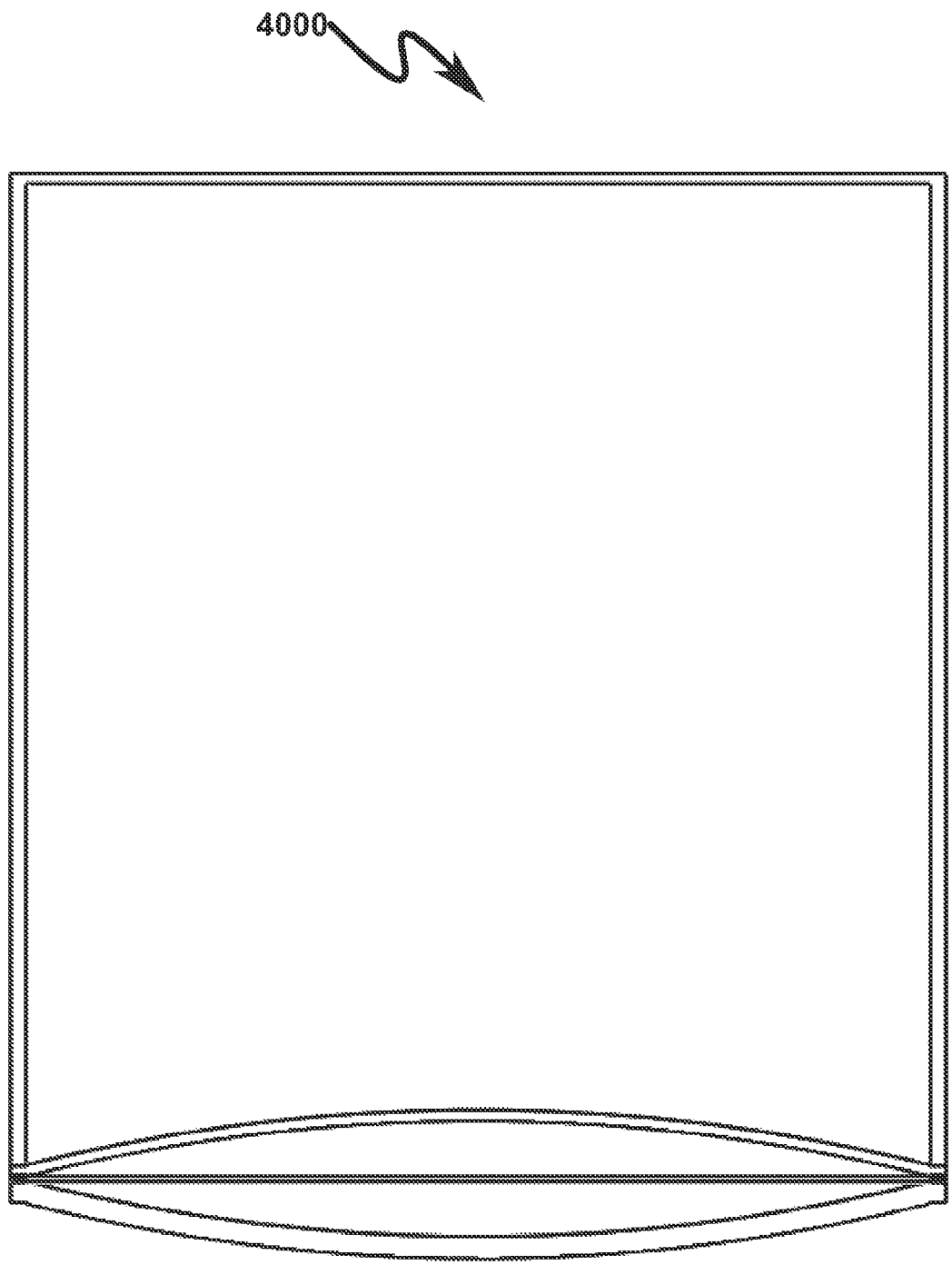
FIG. 40 illustrates a top front perspective view of a preferred exemplary invention system rectangular embodiment with peripherally sealed mechanical coupling of the planar rag stack (PRS)
Figure 41:
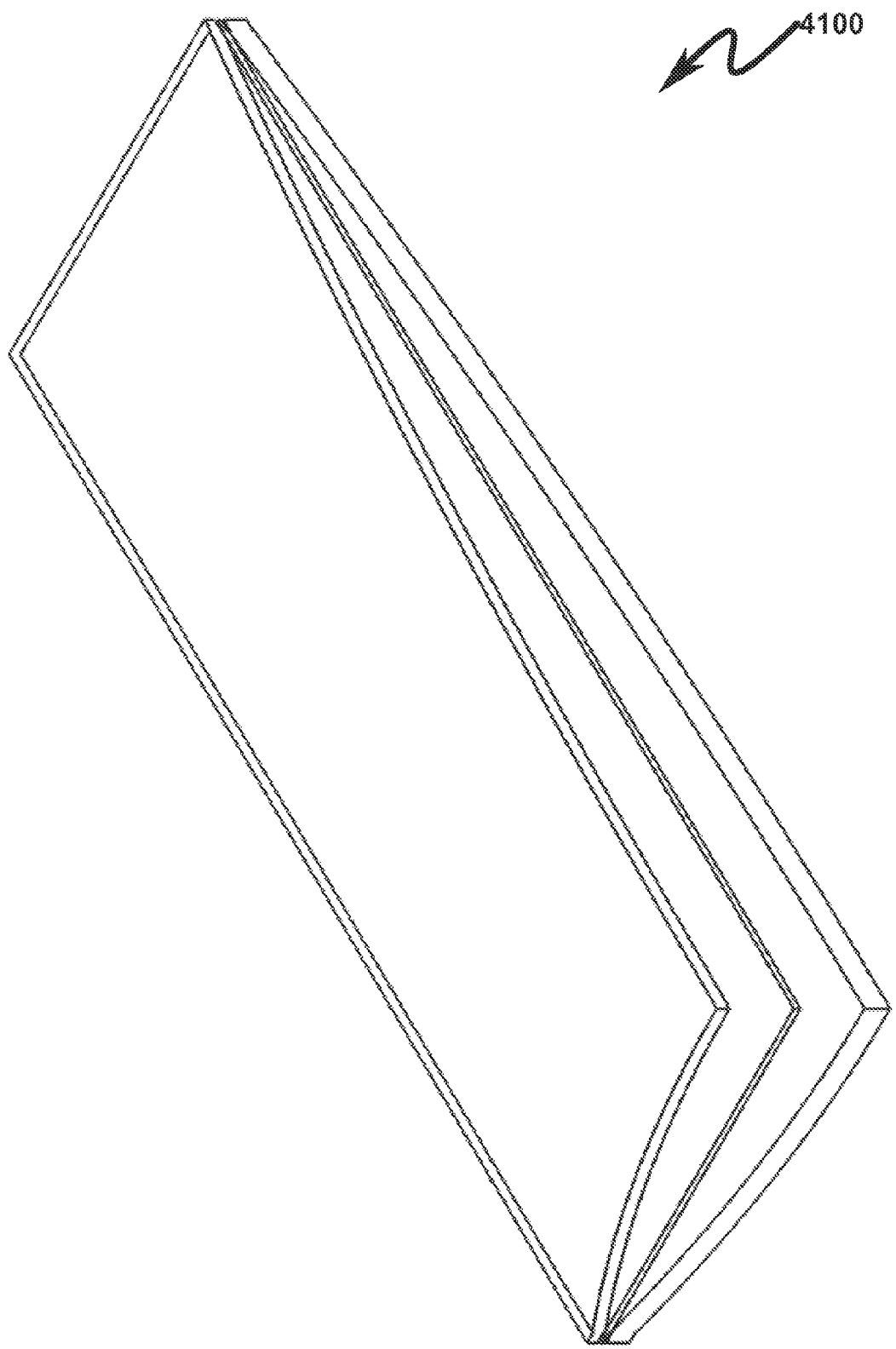
FIG. 41 illustrates a front-to-rear side sectional perspective view of a preferred exemplary invention system rectangular embodiment with peripherally sealed mechanical coupling of the planar rag stack (PRS)
Figure 42:
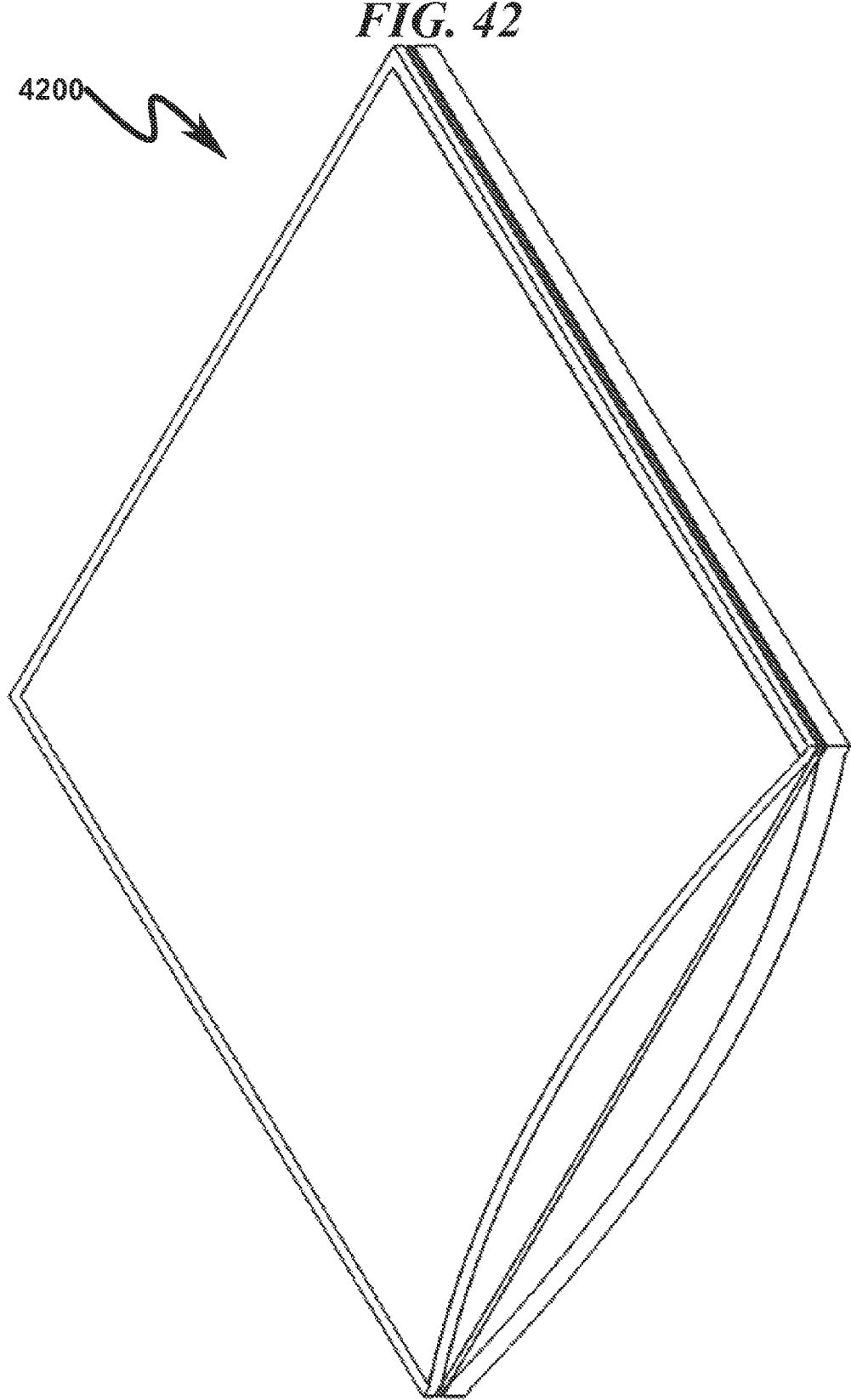
FIG. 42 illustrates a side-to-side front sectional perspective view of a preferred exemplary invention system rectangular embodiment with peripherally sealed mechanical coupling of the planar rag stack (PRS)
Figure 43:
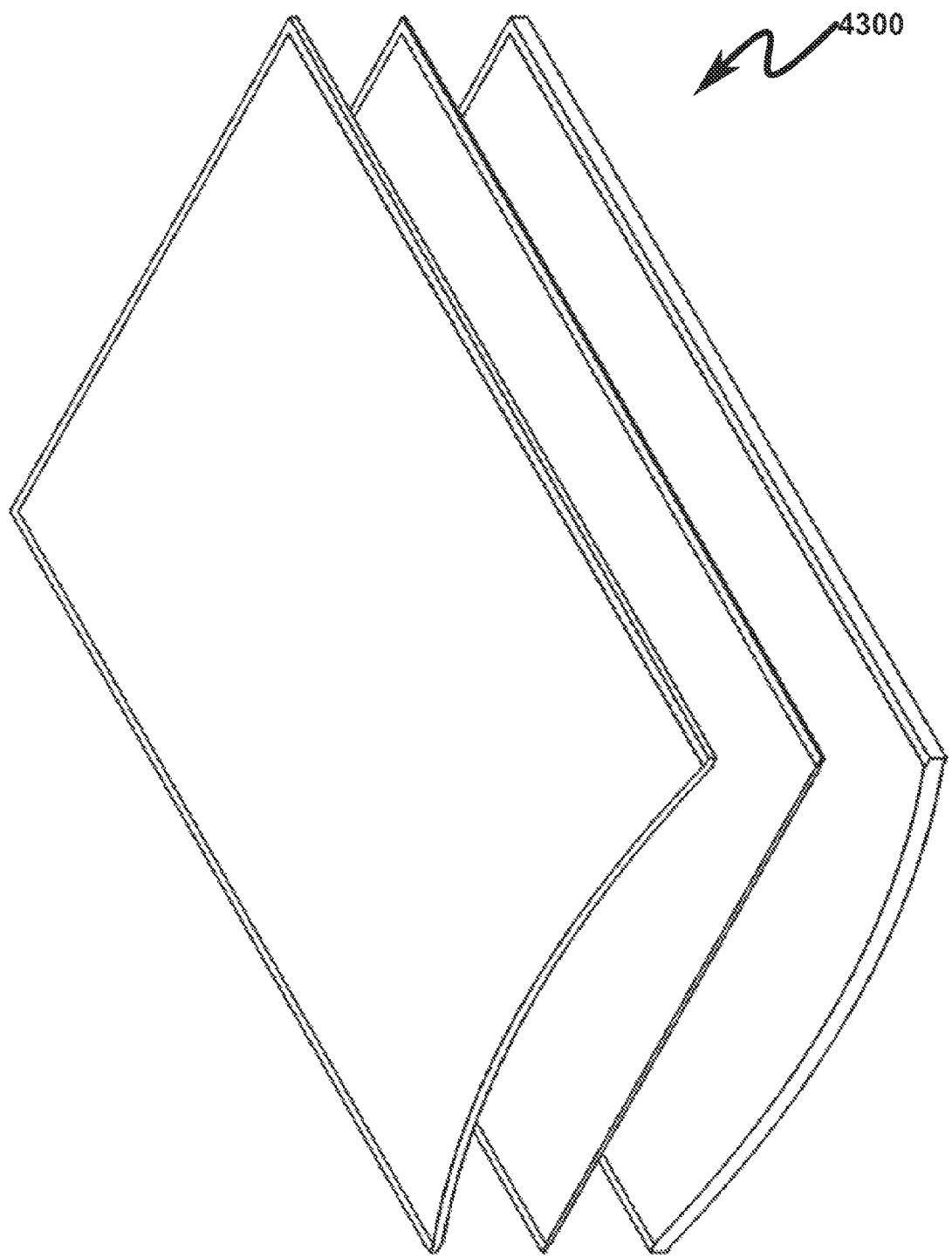
FIG. 43 illustrates a top right front perspective assembly view of a preferred exemplary invention system rectangular embodiment with peripherally sealed mechanical coupling of the planar rag stack (PRS)
Figure 44:
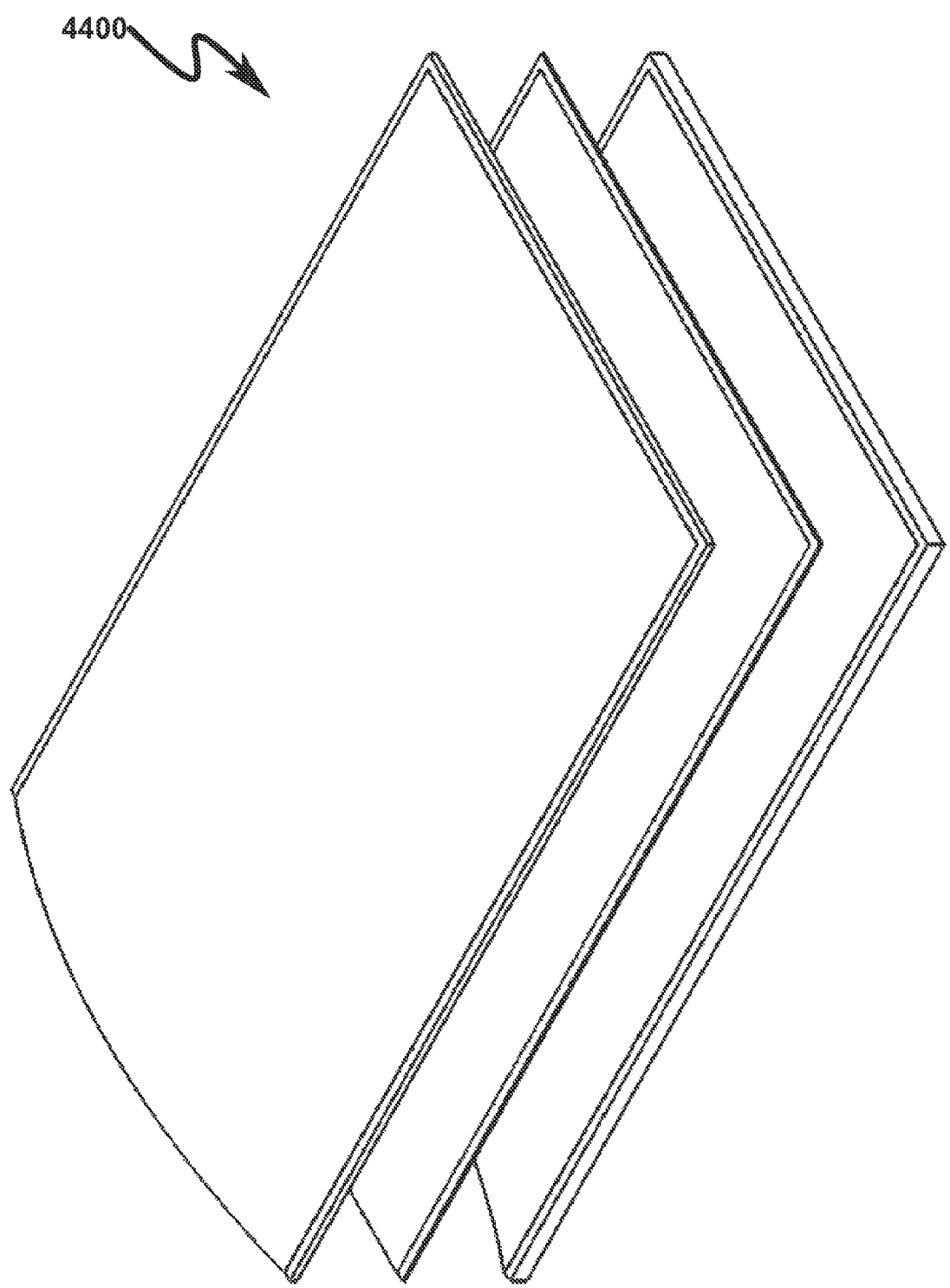
FIG. 44 illustrates a top right rear perspective assembly view of a preferred exemplary invention system rectangular embodiment with peripherally sealed mechanical coupling of the planar rag stack (PRS)

As generally depicted in FIG. 33 (3300)-FIG. 44 (4400), in some preferred embodiments the periphery sealing will occur at and include the outer edge of the PRS. This can be accomplished by either trimming material from the embodiment illustrated in FIG. 21 (2100)-FIG. 32 (3200), or by simply adjusting the position of the sealing periphery (2101) to be coincident with the peripheral edge of the PRS rather than being inset within the peripheral edge of the PRS.

Semi-Circular Embodiment System Overview (4500)-(5600)

Figure 45:
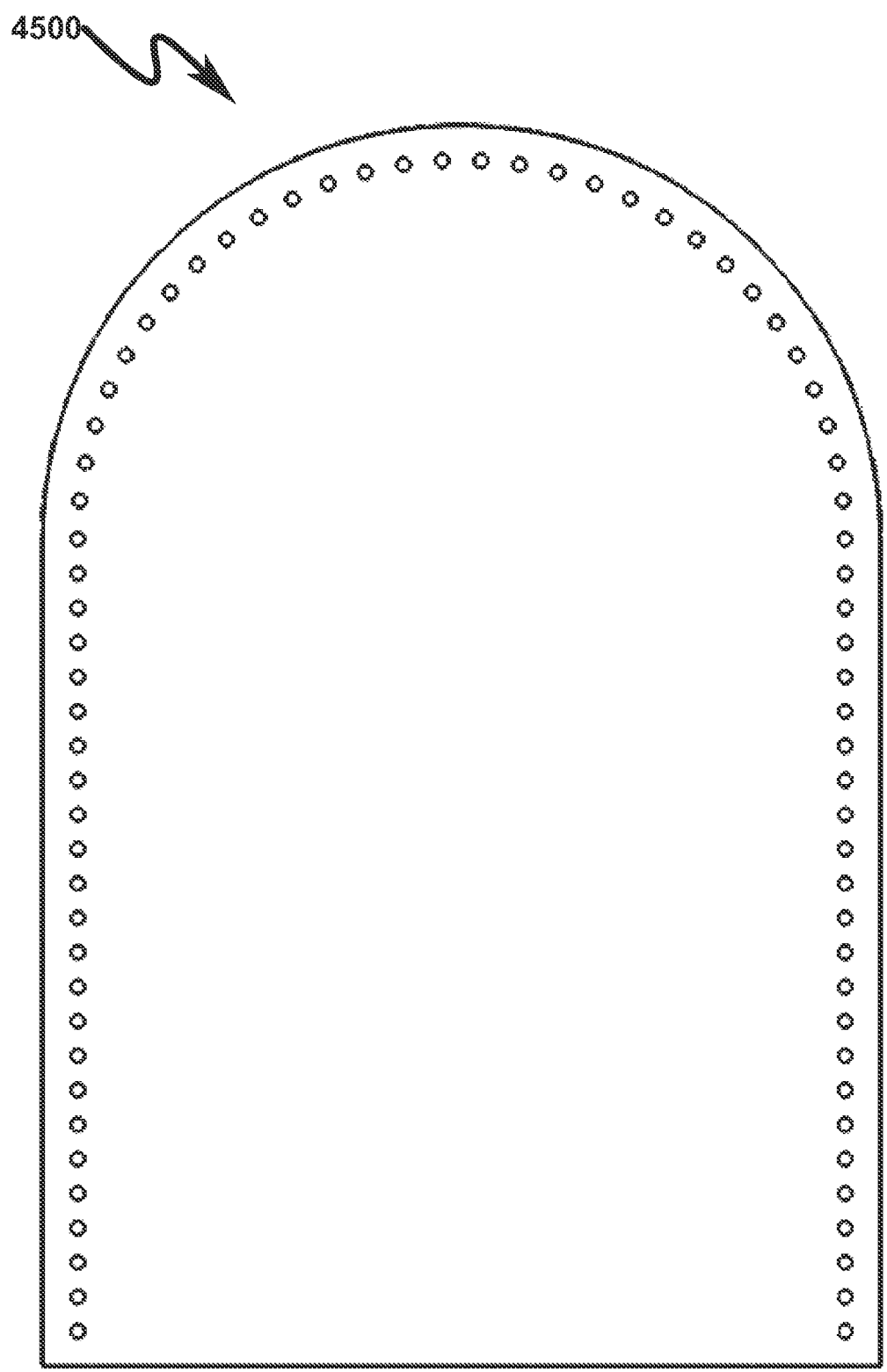
FIG. 45 illustrates a top view of a preferred exemplary invention system rectangular/semi-circular embodiment with sewn mechanical coupling of the planar rag stack (PRS)
Figure 46:
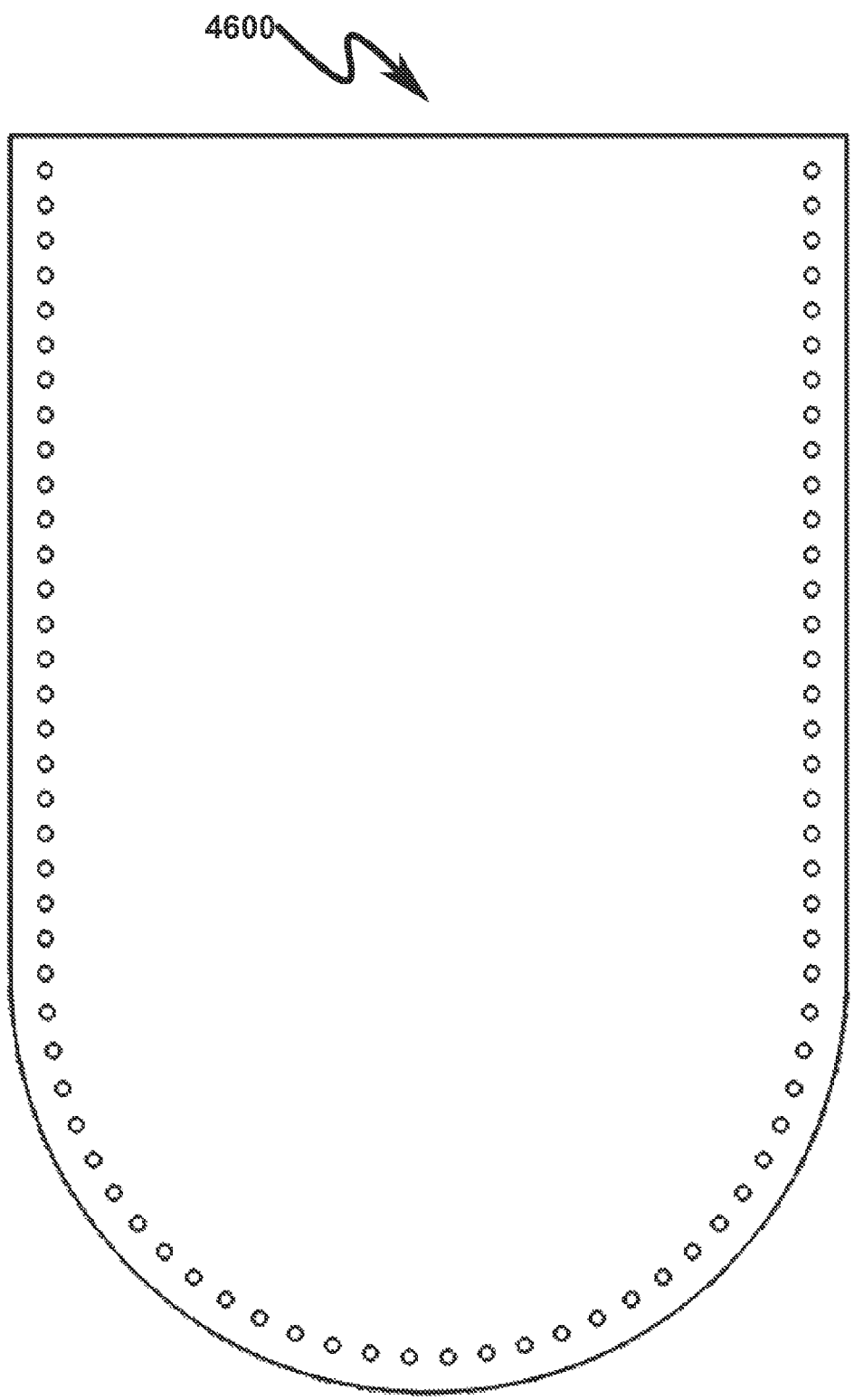
FIG. 46 illustrates a bottom view of a preferred exemplary invention system rectangular/semi-circular embodiment with stitching omitted with sewn mechanical coupling of the planar rag stack (PRS)
Figure 47:
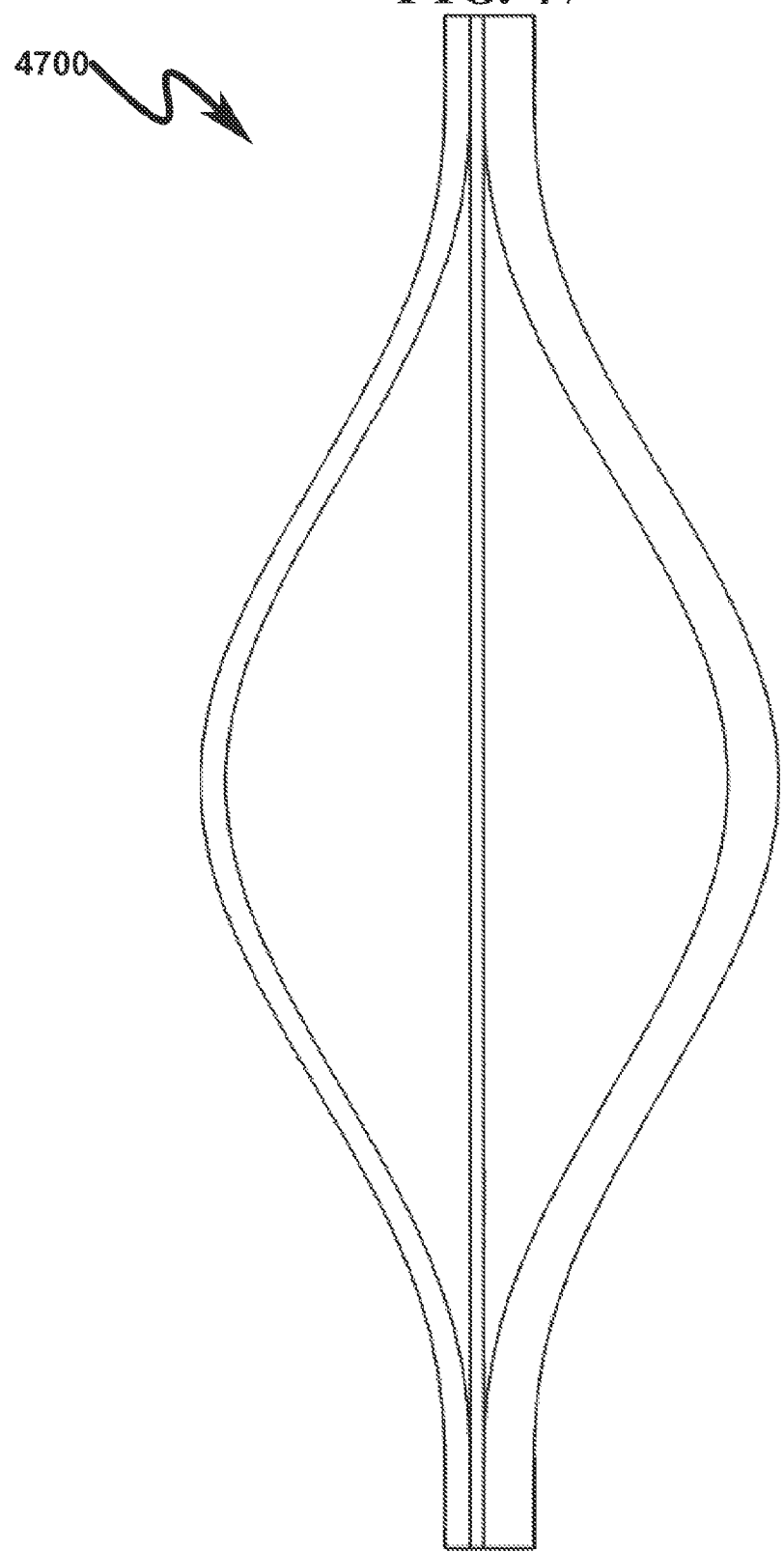
FIG. 47 illustrates a front view of a preferred exemplary invention system rectangular/semi-circular embodiment with sewn mechanical coupling of the planar rag stack (PRS)
Figure 48:
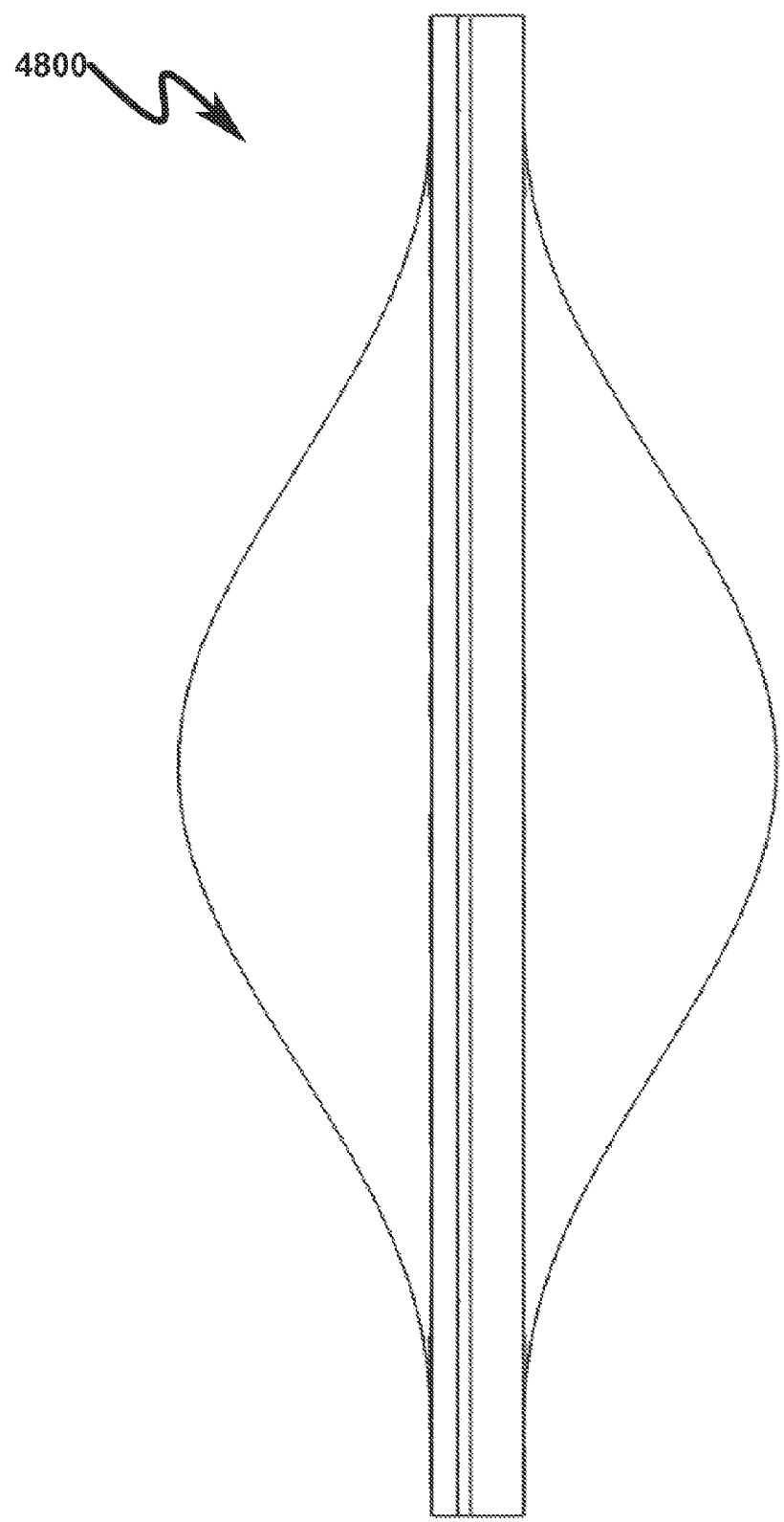
FIG. 48 illustrates a back view of a preferred exemplary invention system rectangular/semi-circular embodiment with sewn mechanical coupling of the planar rag stack (PRS)
Figure 49:
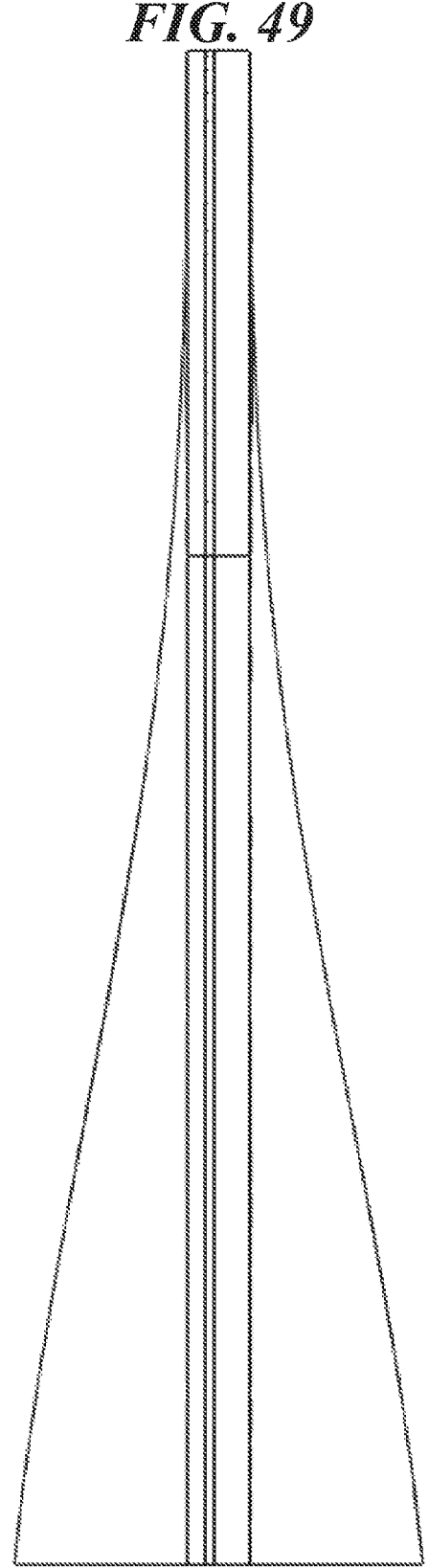
FIG. 49 illustrates a side view of a preferred exemplary invention system rectangular/semi-circular embodiment with sewn mechanical coupling of the planar rag stack (PRS)
Figure 50:
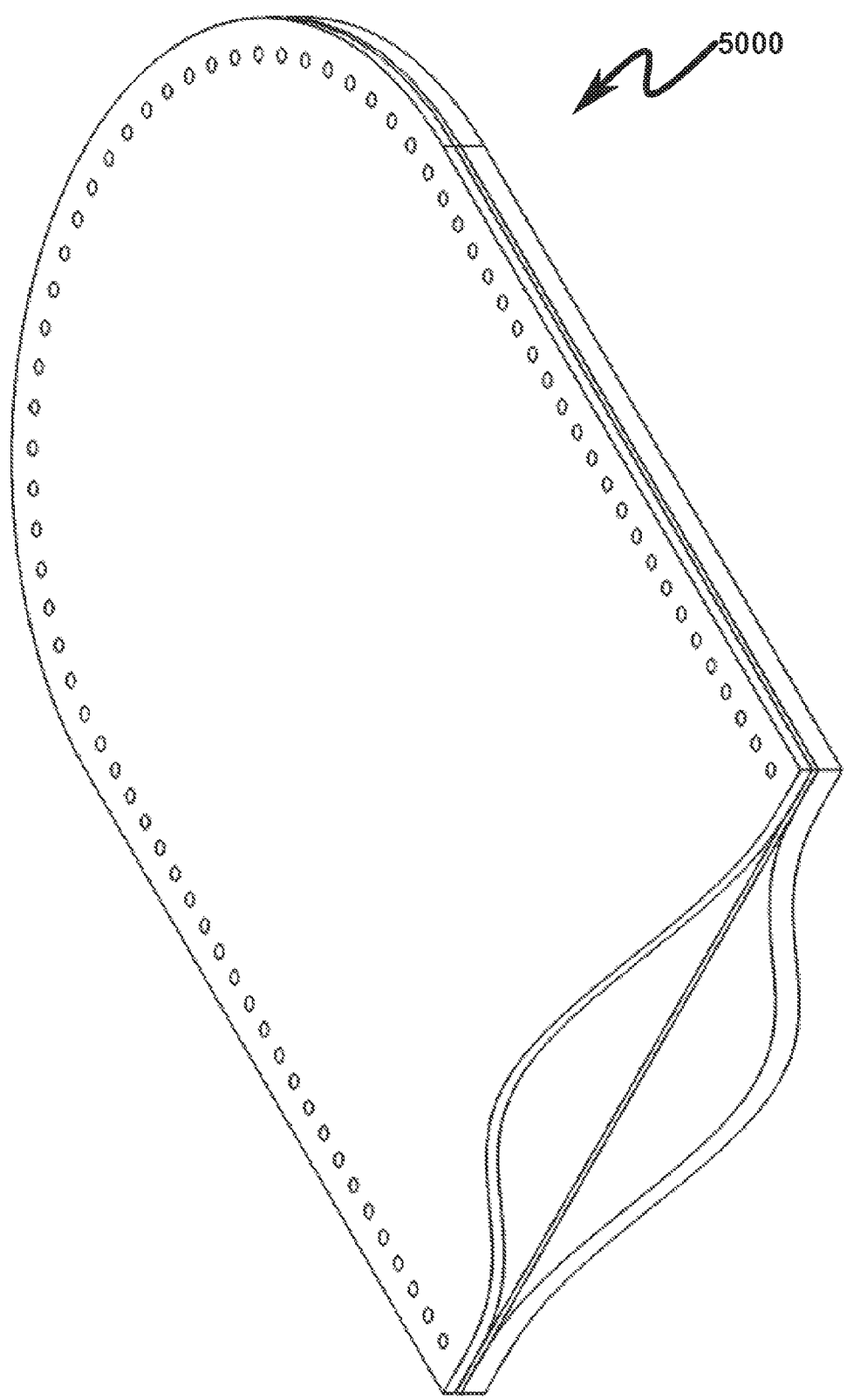
FIG. 50 illustrates a top right front perspective view of a preferred exemplary invention system rectangular/semi-circular embodiment with sewn mechanical coupling of the planar rag stack (PRS)
Figure 51:
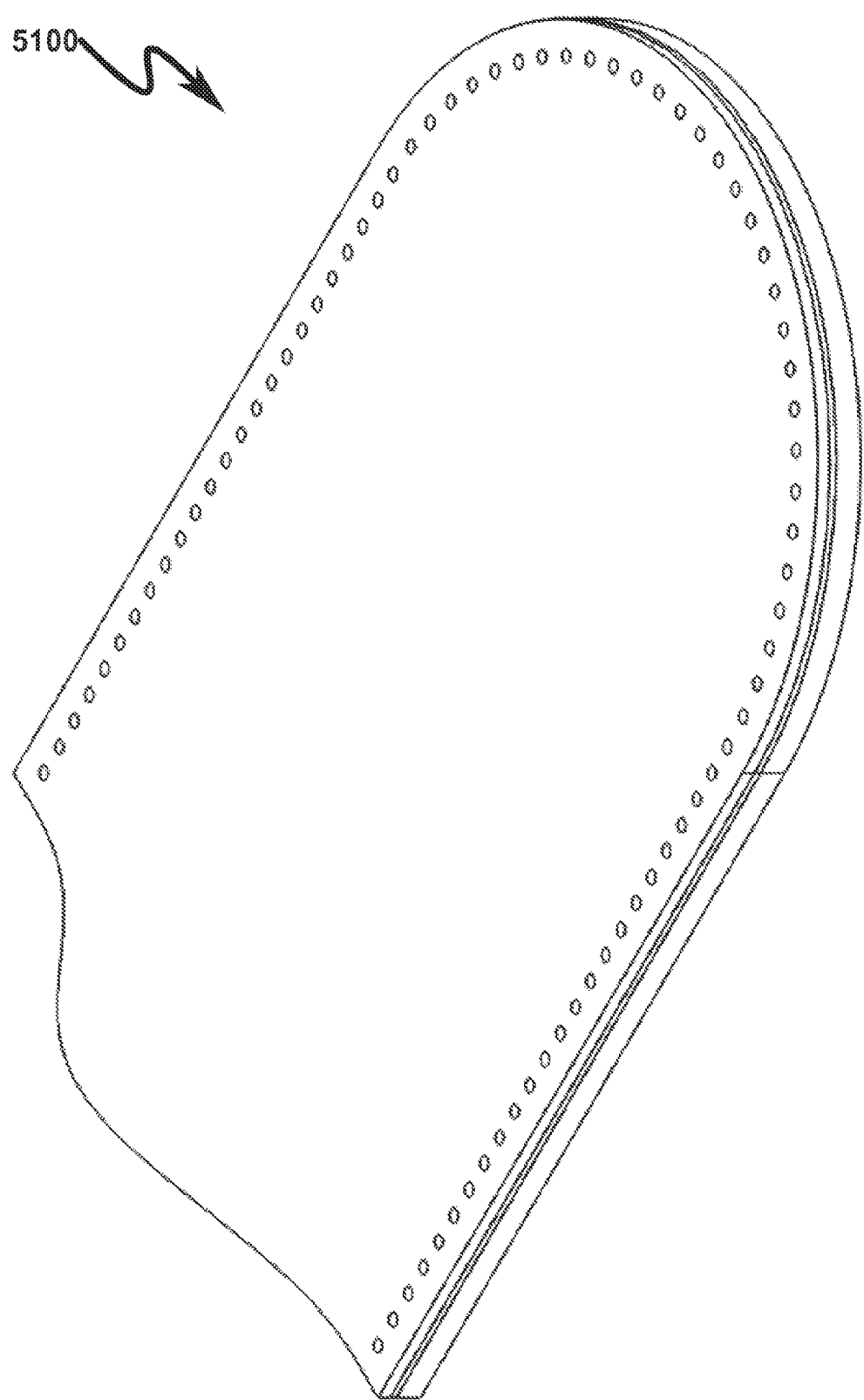
FIG. 51 illustrates a top right rear perspective view of a preferred exemplary invention system rectangular/semi-circular embodiment with sewn mechanical coupling of the planar rag stack (PRS)
Figure 52:
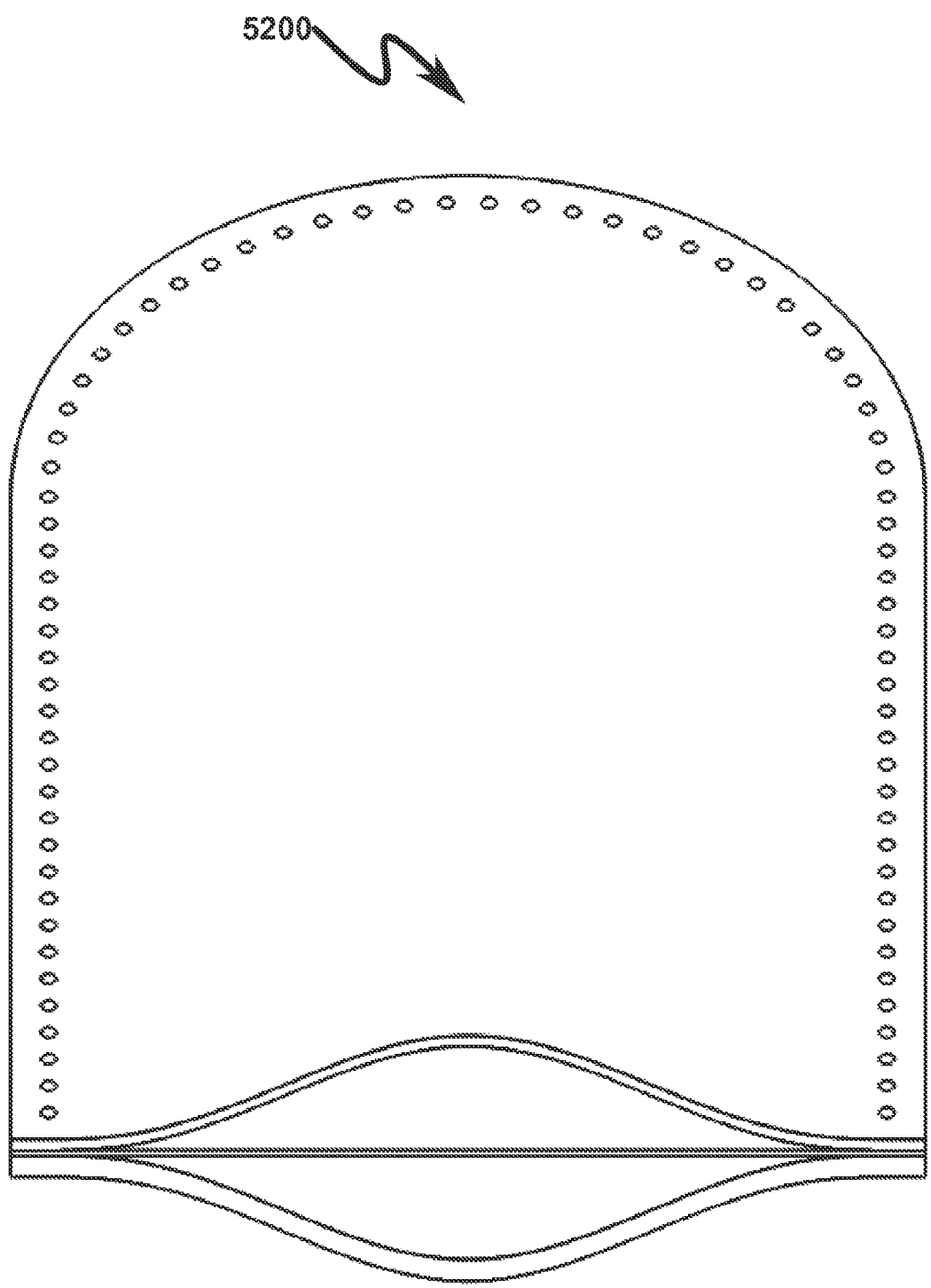
FIG. 52 illustrates a top front perspective view of a preferred exemplary invention system rectangular/semi-circular embodiment with sewn mechanical coupling of the planar rag stack (PRS)
Figure 53:
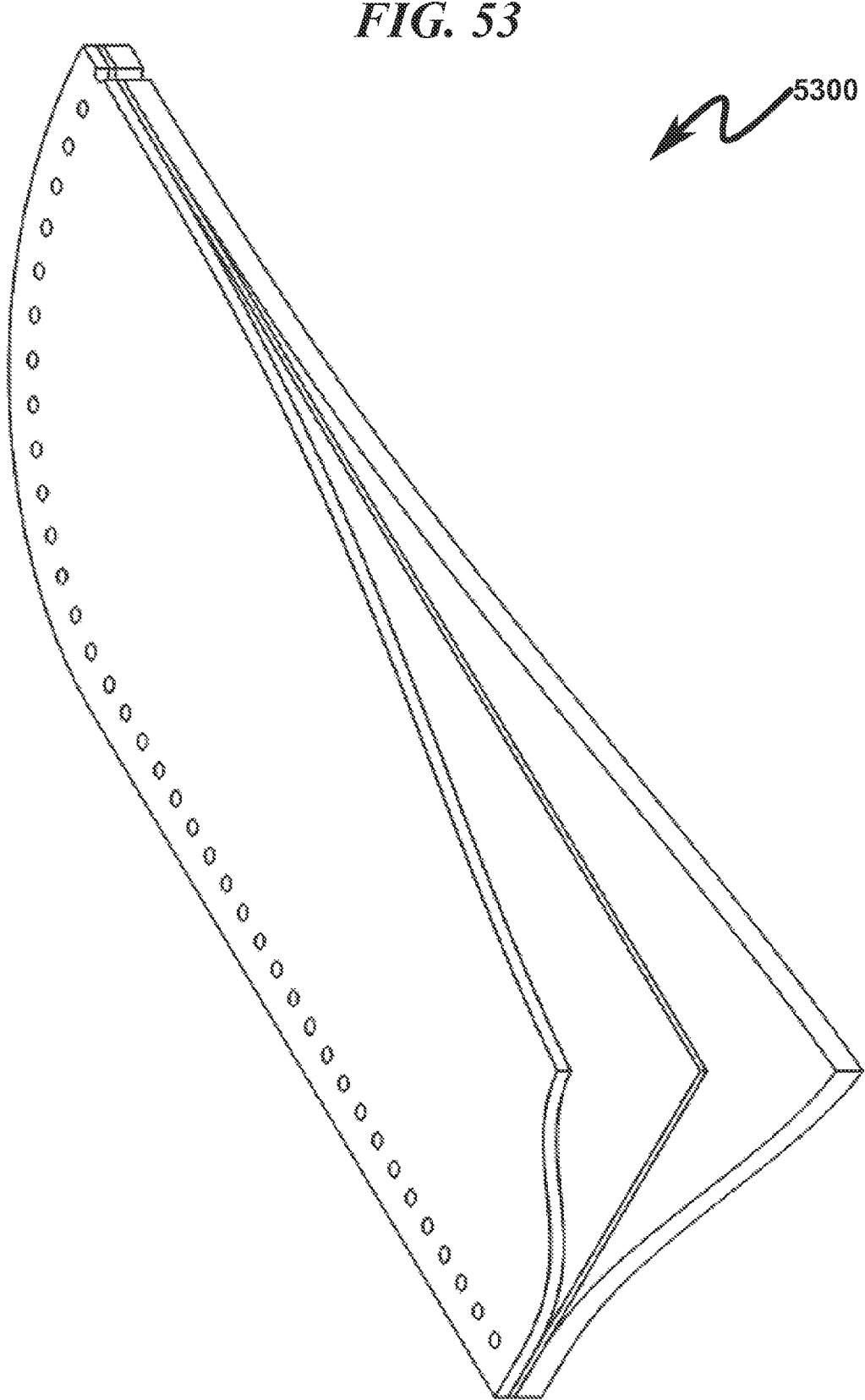
FIG. 53 illustrates a front-to-rear side sectional perspective view of a preferred exemplary invention system rectangular/semi-circular embodiment with sewn mechanical coupling of the planar rag stack (PRS)
Figure 54:
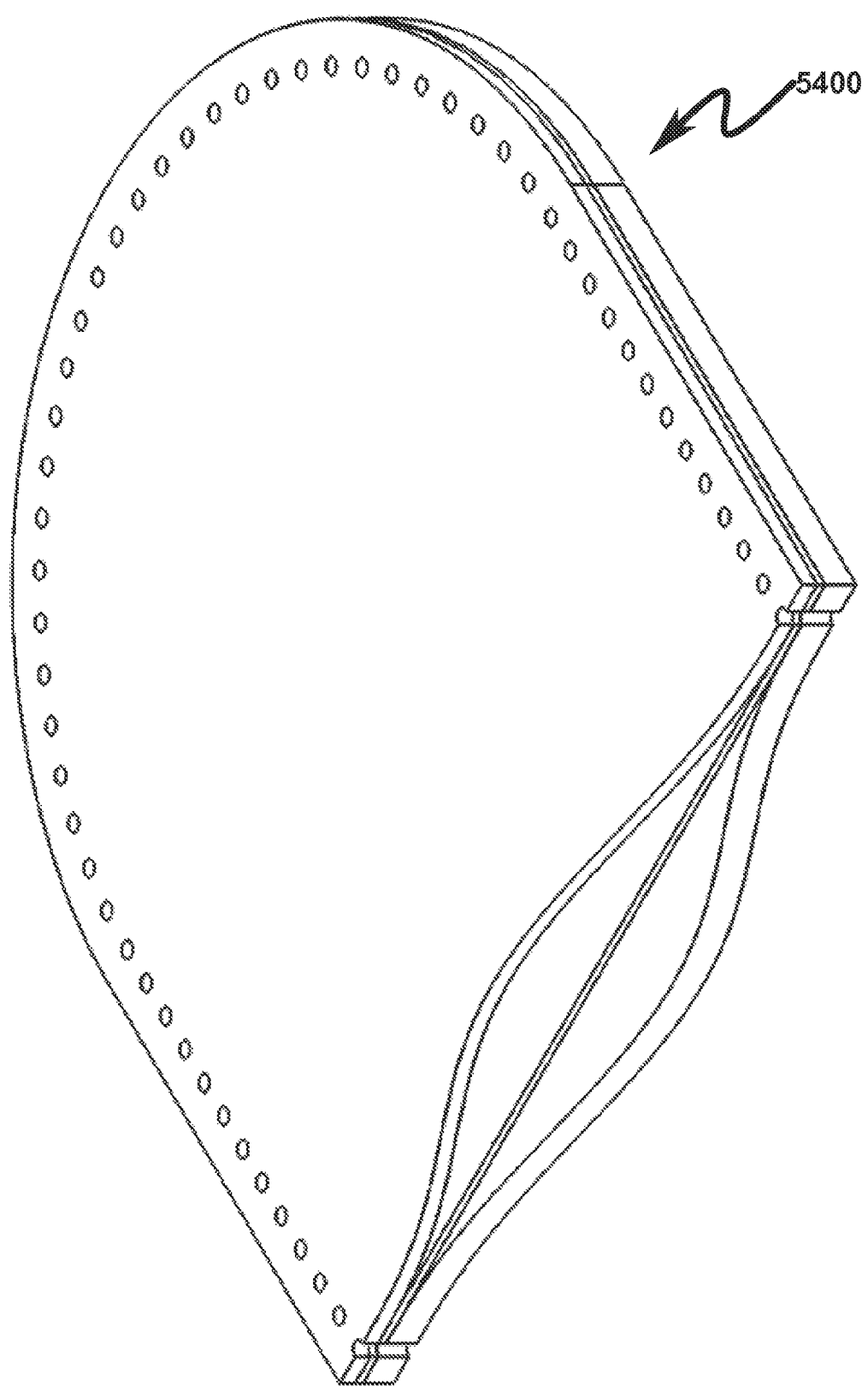
FIG. 54 illustrates a side-to-side front sectional perspective view of a preferred exemplary invention system rectangular/semi-circular embodiment with sewn mechanical coupling of the planar rag stack (PRS)
Figure 55:
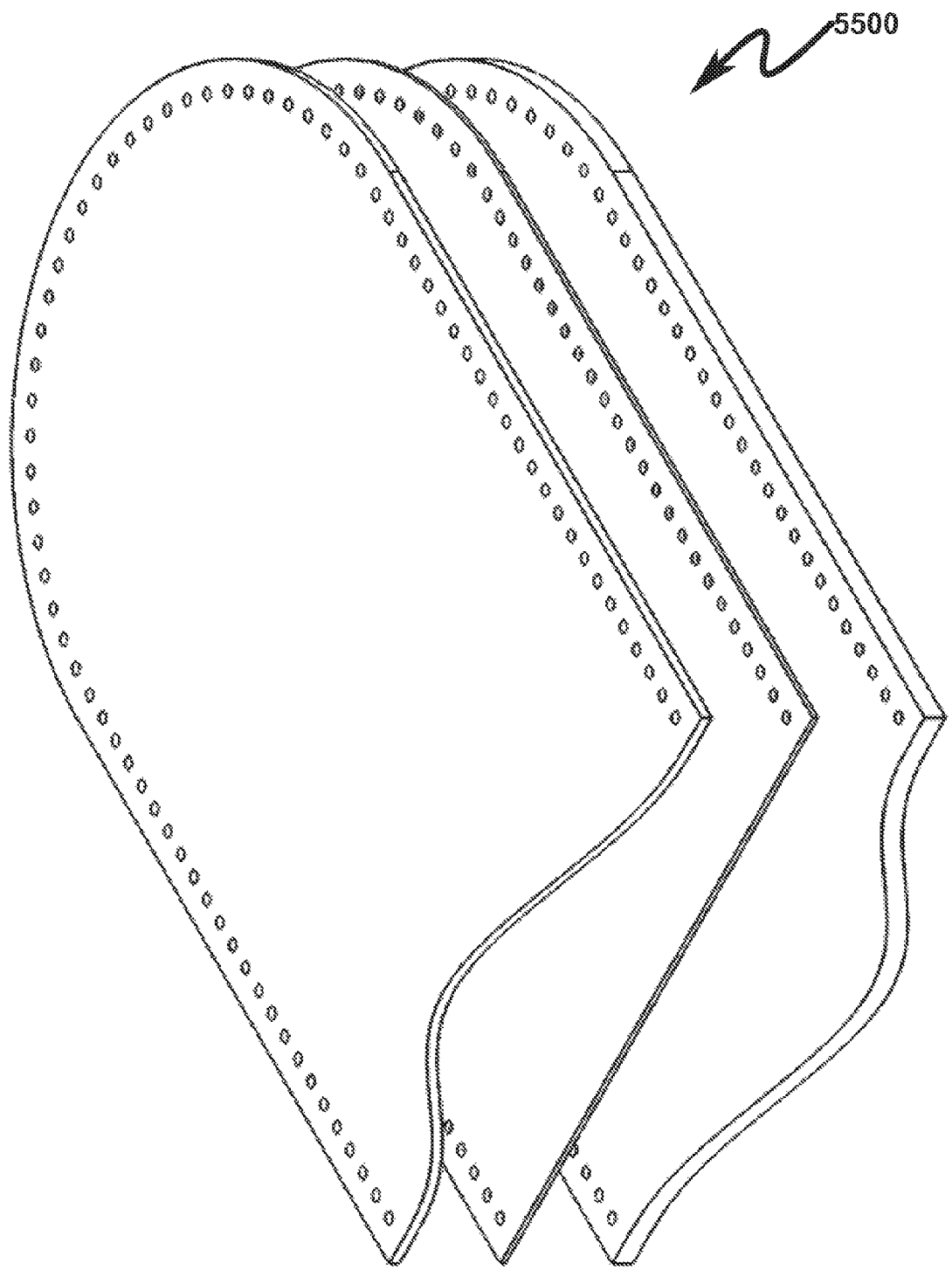
FIG. 55 illustrates a top right front perspective assembly view of a preferred exemplary invention system rectangular/semi-circular embodiment with sewn mechanical coupling of the planar rag stack (PRS)
Figure 56:
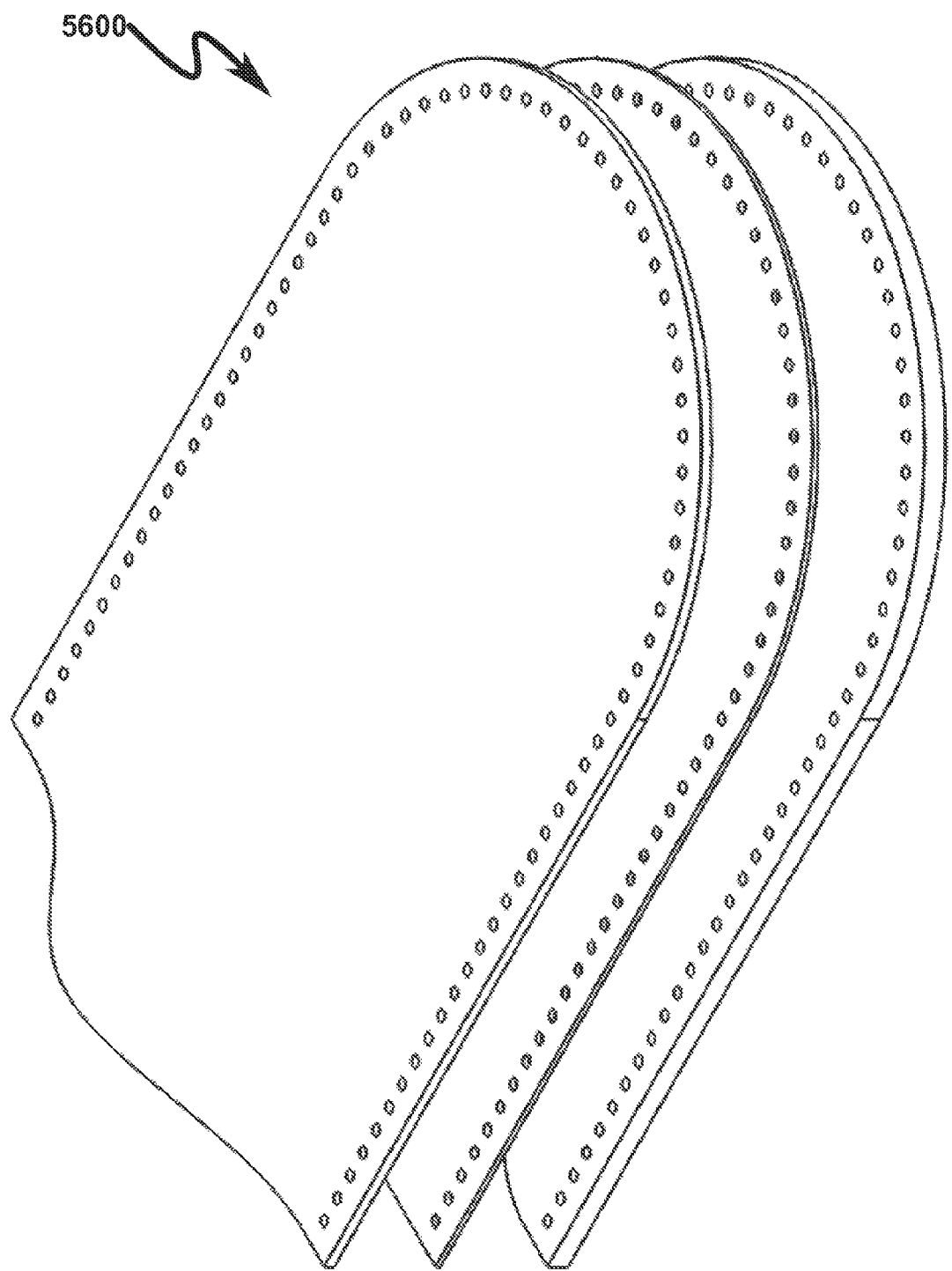
FIG. 56 illustrates a top right rear perspective assembly view of a preferred exemplary invention system rectangular/semi-circular embodiment with sewn mechanical coupling of the planar rag stack (PRS)

A preferred variation of the preferred exemplary invention rectangular form embodiment depicted in FIG. 9 (0900)-FIG. 20 (2000) incorporates a semi-circular edge on the periphery of the PRS as generally depicted in FIG. 45 (4500)-FIG. 56 (5600). These diagrams illustrate a hybrid of the PSA attachment methodologies depicted in the previous diagrams. Rather than use sewn stitching, the sheets are thermally attached to each other via the penetration of multiple holes through the PRS (or equivalently via the use of circular spot welding) as depicted in the drawings. This hole penetration/spot welding can be accomplished by a hot lance that fuses material within each layer of the PRS to other layers to form a mechanical bond. Of course, the use of the previously described attachment methodologies (sewn stitching and thermal attachment) is also possible using this form of outer PRS periphery attachment arrangement.

Pentagonal Embodiment System Overview (5700)-(6800)

Figure 57:
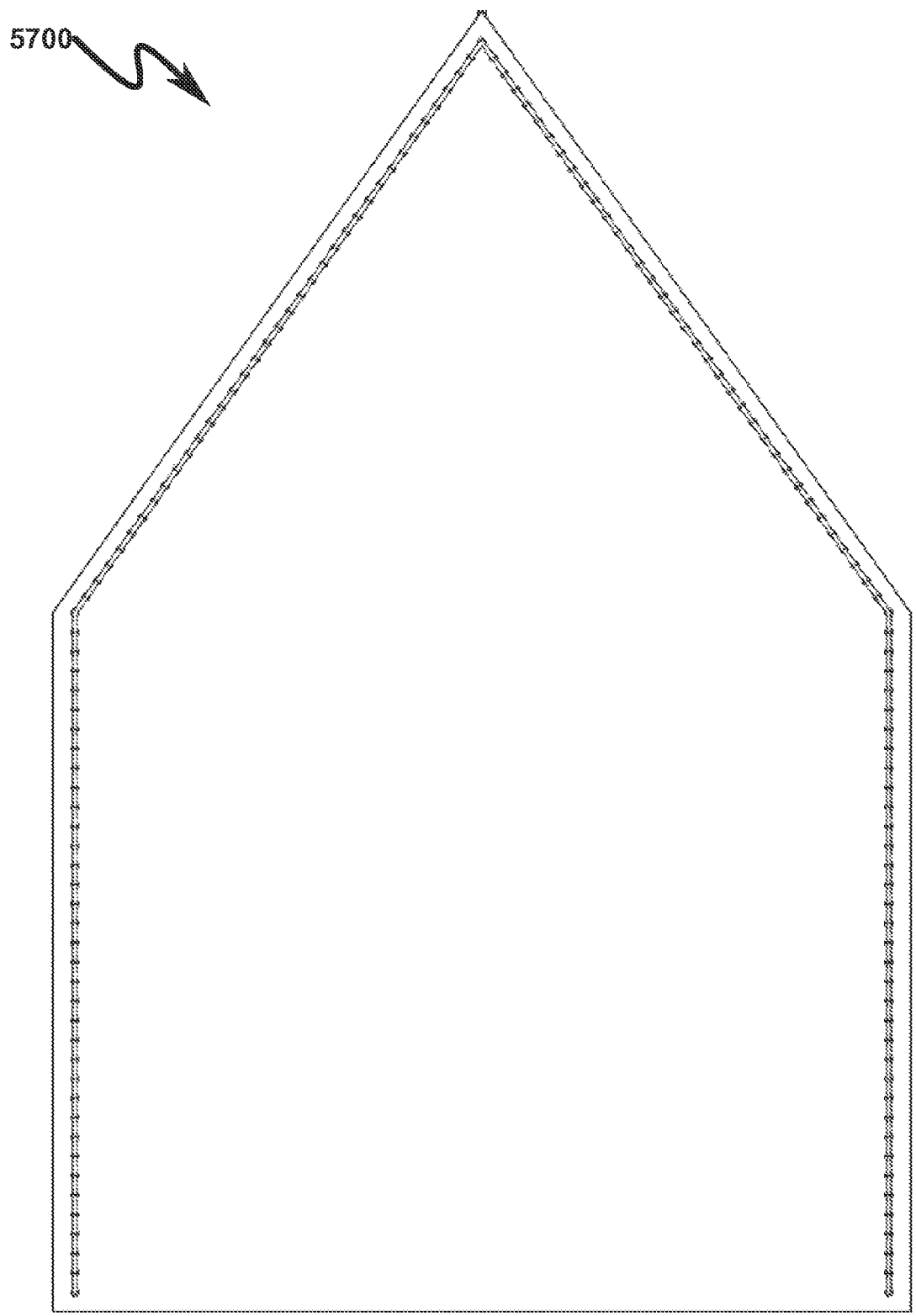
FIG. 57 illustrates a top view of a preferred exemplary invention system irregular pentagonal embodiment with sewn mechanical coupling of the planar rag stack (PRS)
Figure 58:
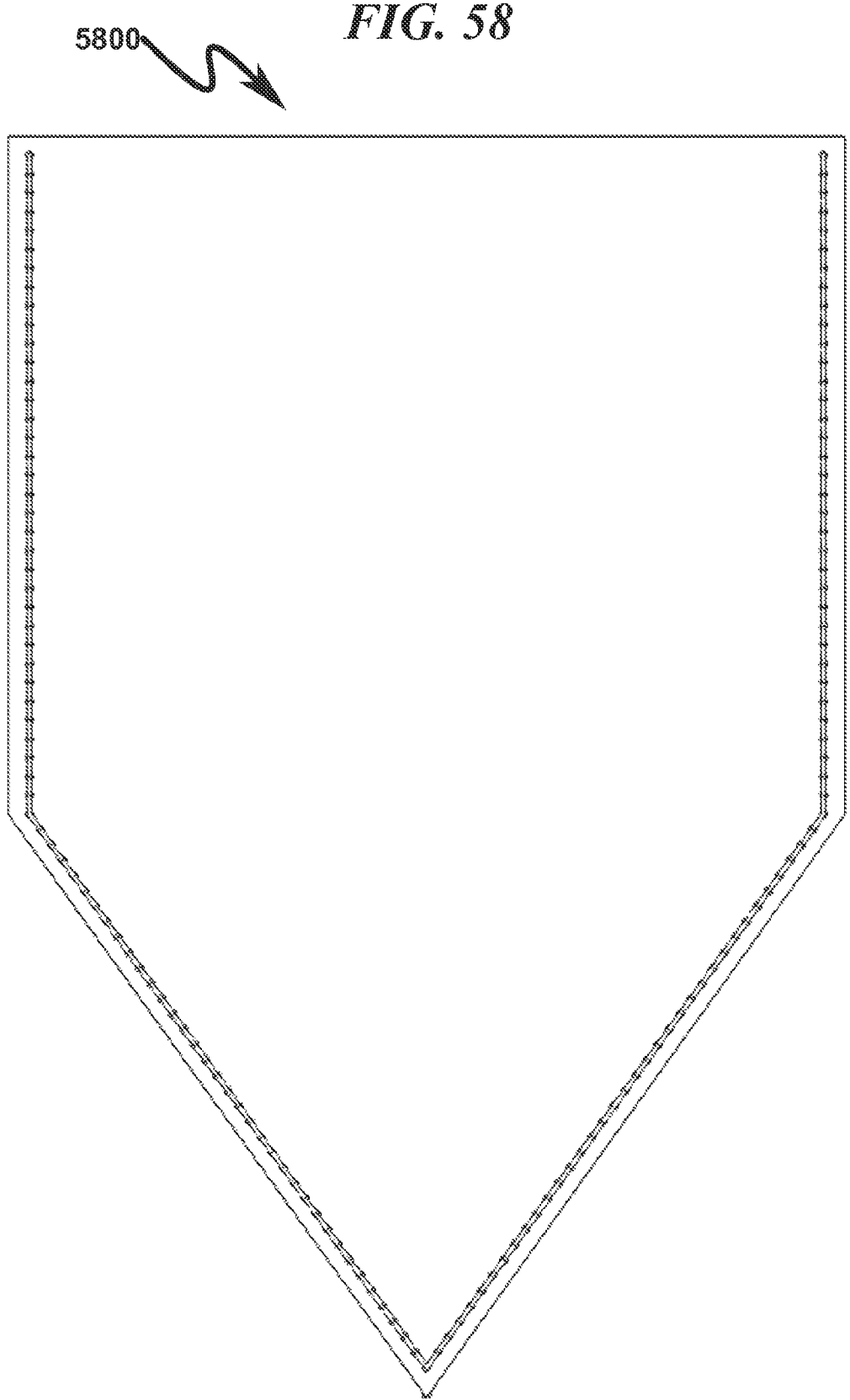
FIG. 58 illustrates a bottom view of a preferred exemplary invention system irregular pentagonal embodiment with sewn mechanical coupling of the planar rag stack (PRS)
Figure 59:
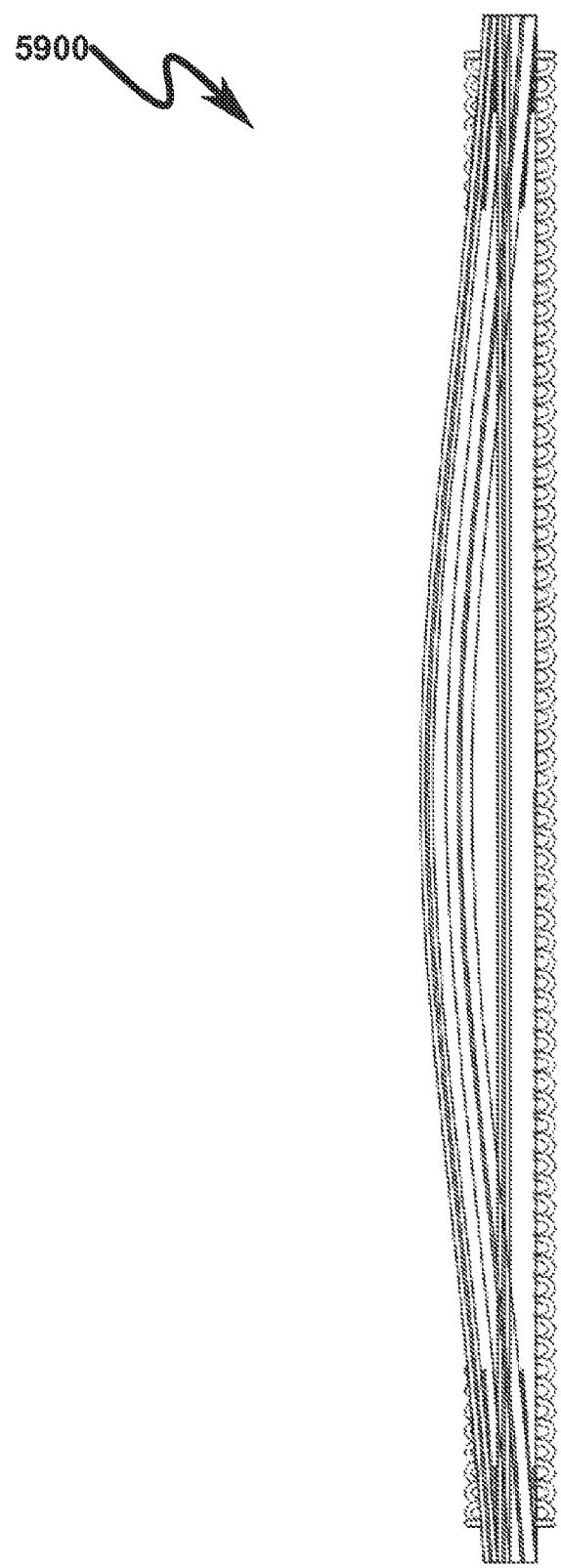
FIG. 59 illustrates a front view of a preferred exemplary invention system irregular pentagonal embodiment with sewn mechanical coupling of the planar rag stack (PRS)
Figure 60:
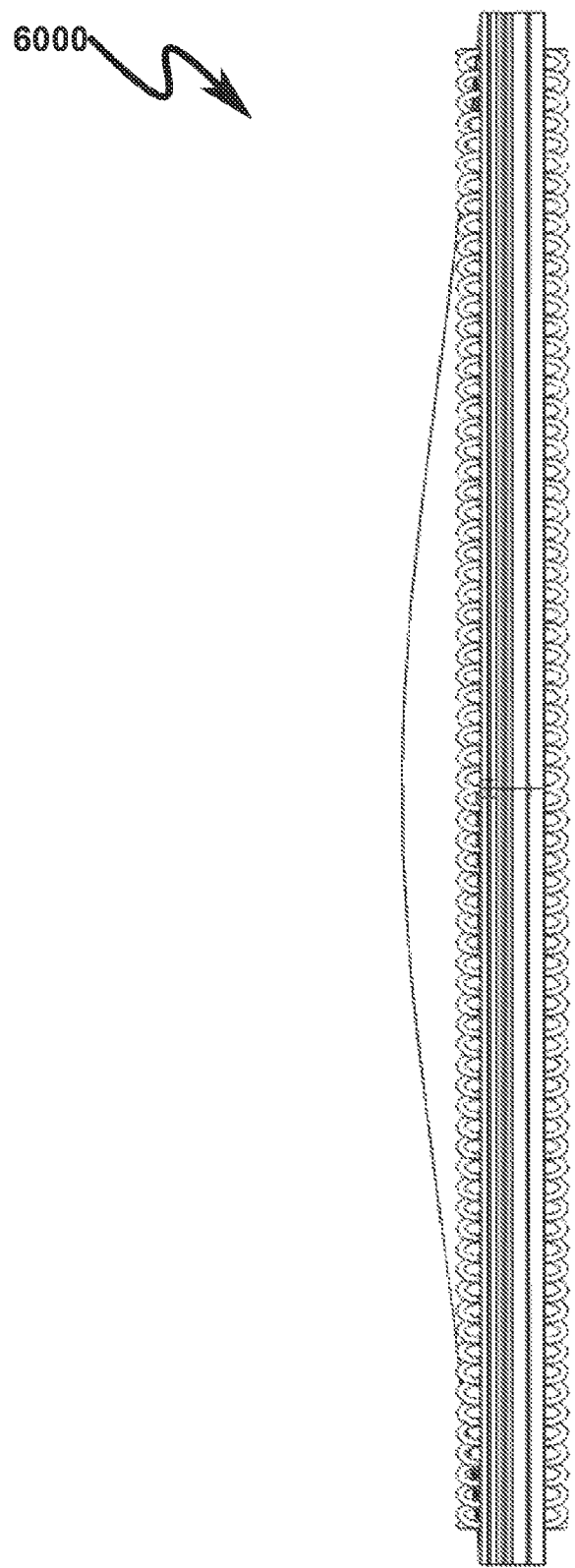
FIG. 60 illustrates a back view of a preferred exemplary invention system irregular pentagonal embodiment with sewn mechanical coupling of the planar rag stack (PRS)
Figure 61:
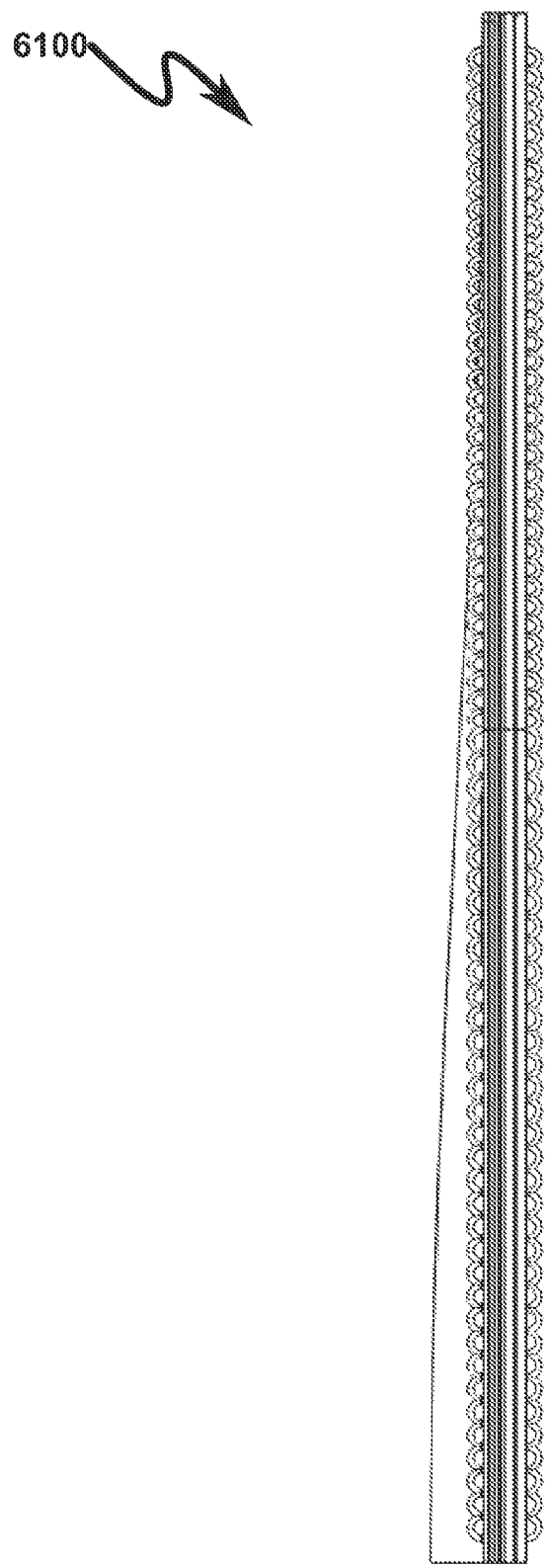
FIG. 61 illustrates a side view of a preferred exemplary invention system irregular pentagonal embodiment with sewn mechanical coupling of the planar rag stack (PRS)
Figure 63:
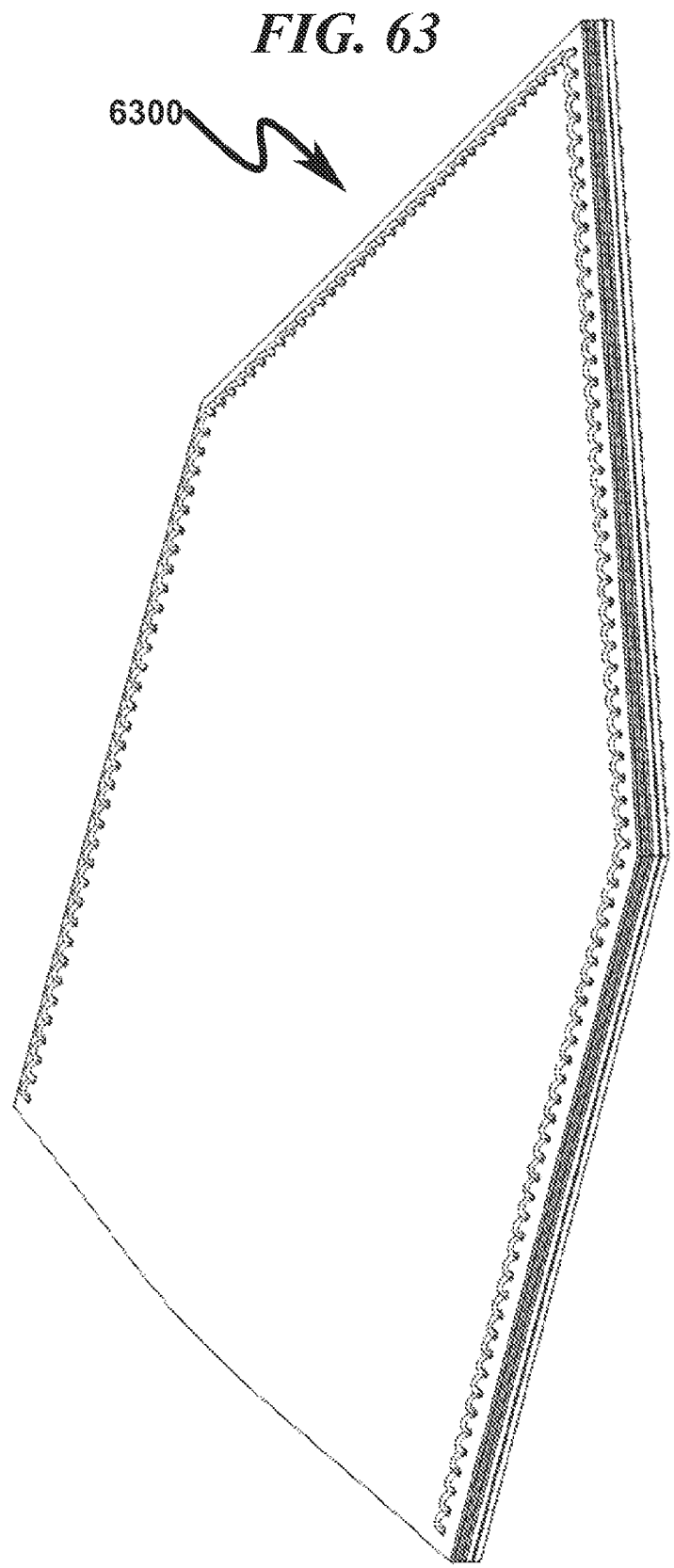
FIG. 63 illustrates a top right rear perspective view of a preferred exemplary invention system irregular pentagonal embodiment with sewn mechanical coupling of the planar rag stack (PRS)
Figure 64:
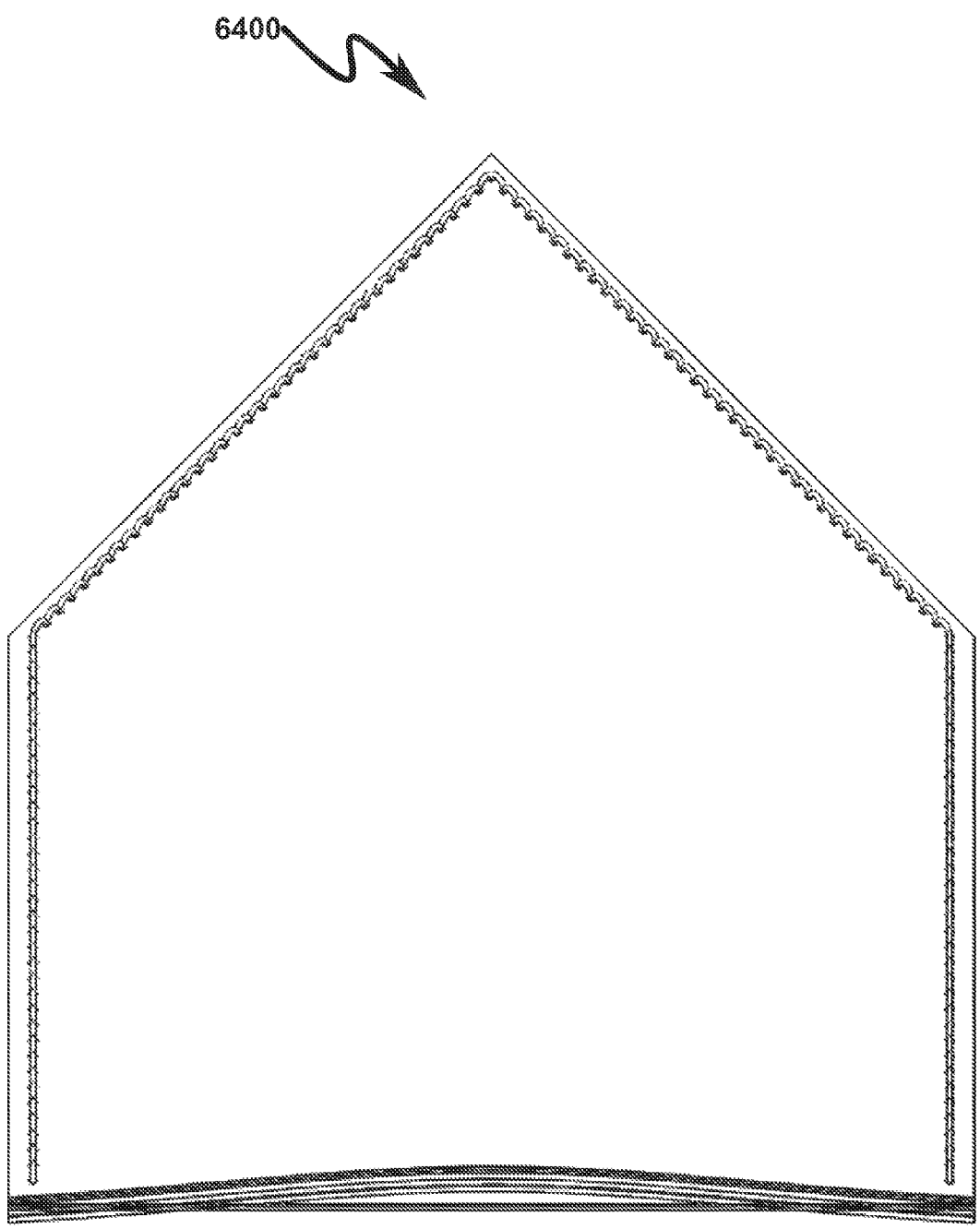
FIG. 64 illustrates a top front perspective view of a preferred exemplary invention system irregular pentagonal embodiment with sewn mechanical coupling of the planar rag stack (PRS)
Figure 65:
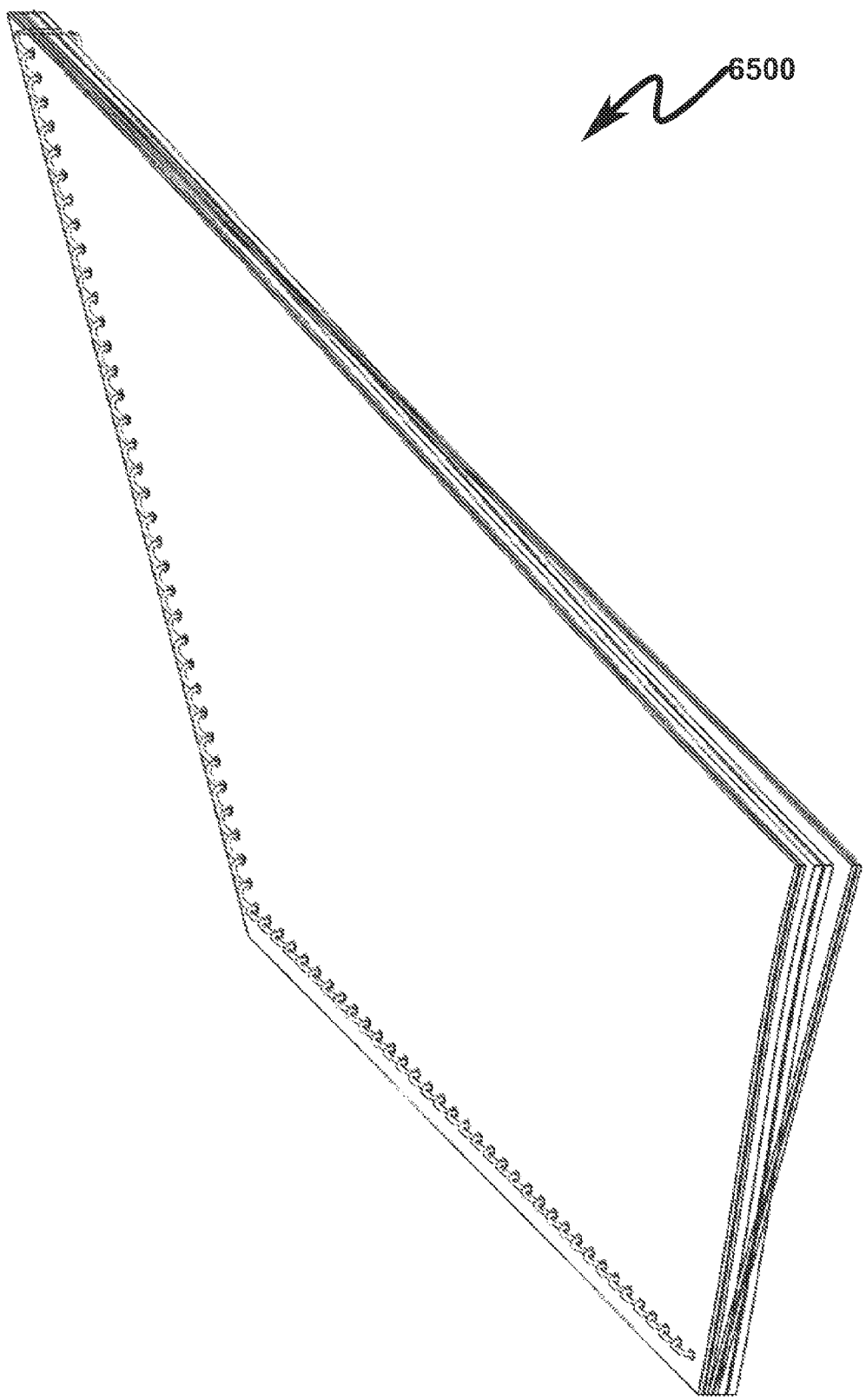
FIG. 65 illustrates a front-to-rear side sectional perspective view of a preferred exemplary invention system irregular pentagonal embodiment with sewn mechanical coupling of the planar rag stack (PRS)
Figure 66:
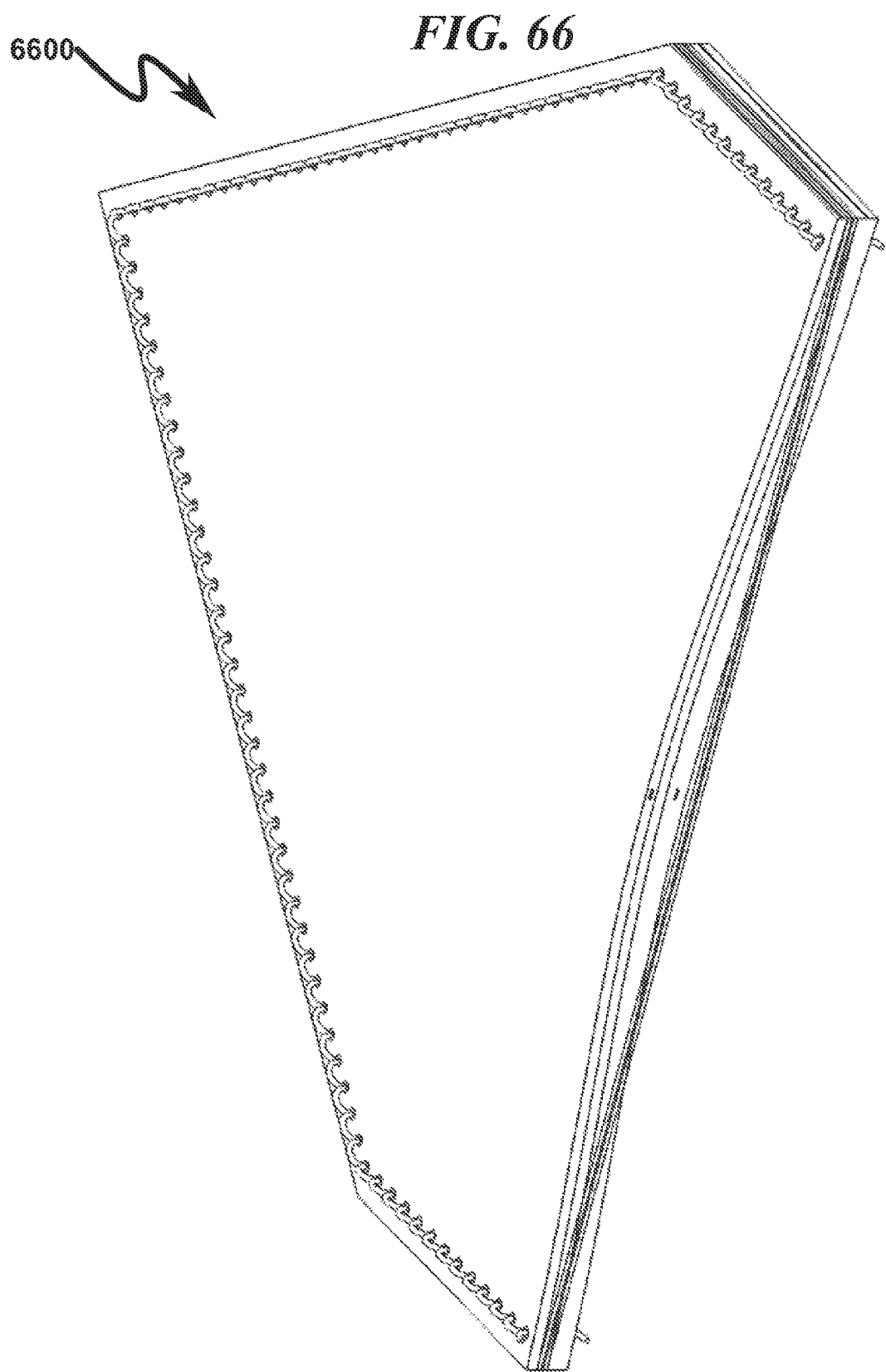
FIG. 66 illustrates a side-to-side front sectional perspective view of a preferred exemplary invention system irregular pentagonal embodiment with sewn mechanical coupling of the planar rag stack (PRS)
Figure 67:
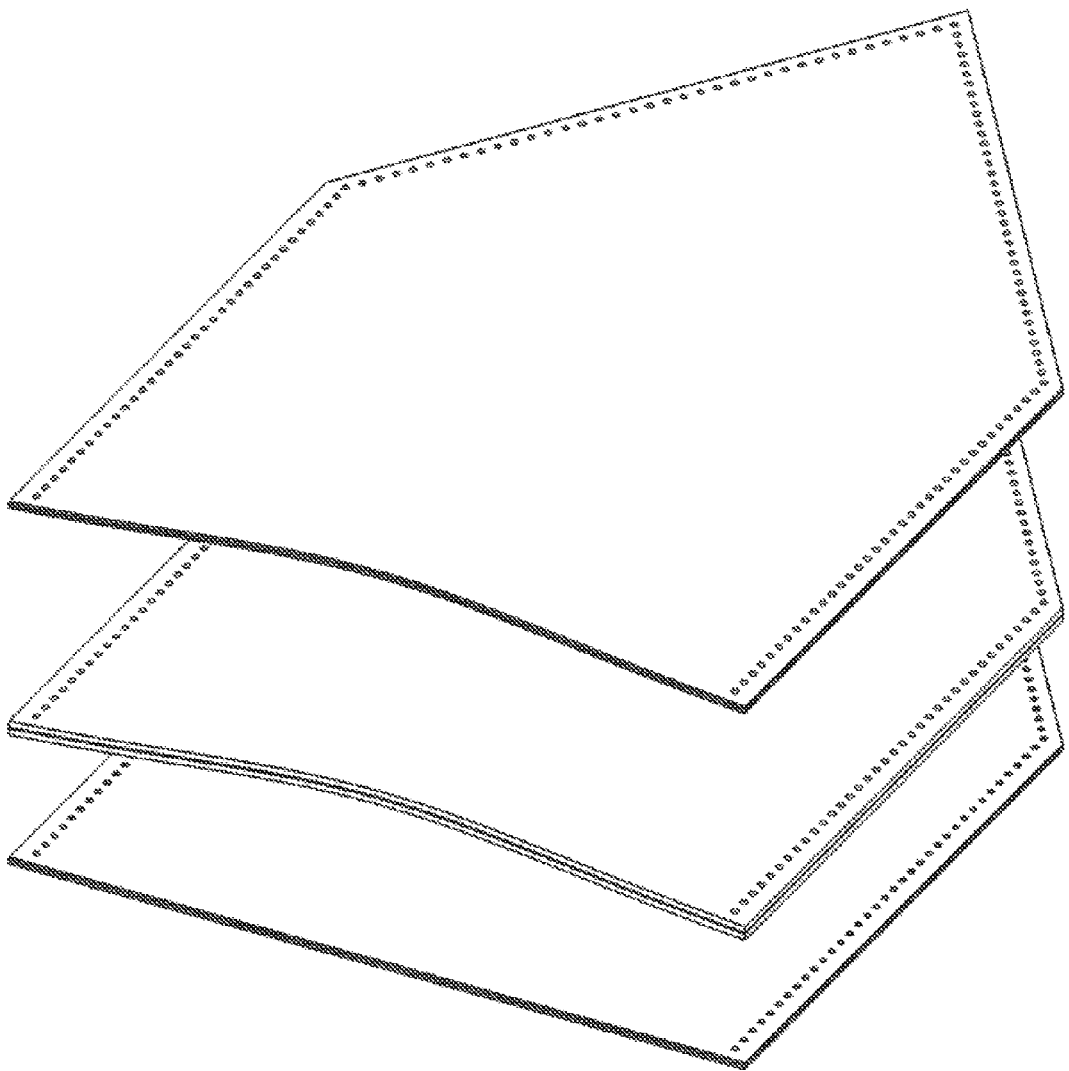
FIG. 67 illustrates a top right front perspective assembly view of a preferred exemplary invention system irregular pentagonal embodiment with sewn mechanical coupling of the planar rag stack (PRS)

A preferred variation of the preferred exemplary invention rectangular form embodiment depicted in FIG. 9 (0900)-FIG. 20 (2000) incorporates irregular pentagonal peripheral edge on the periphery of the PRS as generally depicted in FIG. 57 (5700)-FIG. 68 (6800). These diagrams illustrate a hybrid of the PSA attachment methodologies depicted in the previous diagrams. While the rag stack in this example is sewn, it may also be attached using other means as previously discussed.

The advantage of this configuration is that the apex tip of the pentagon may be used to clean hard-to-reach spaces. Additionally, this form may be configured for minimal material waste when constructing the rag stack.

Exemplary Rolled Rag Stack (6900)-(7200)

Figure 69:
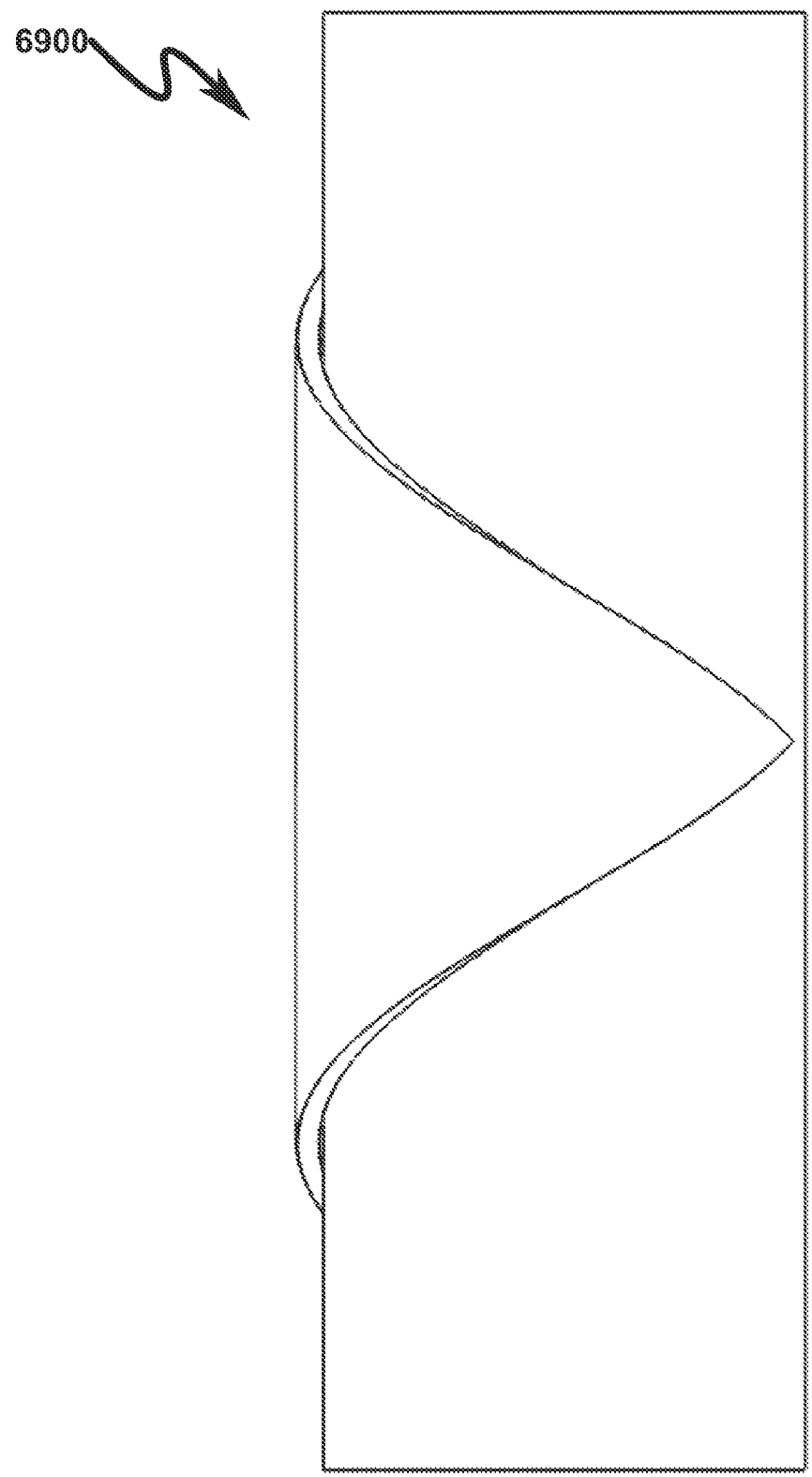
FIG. 69 illustrates a front view of a preferred exemplary invention system irregular pentagonal embodiment with sewn mechanical coupling of the planar rag stack (PRS) in rolled form.
Figure 70:
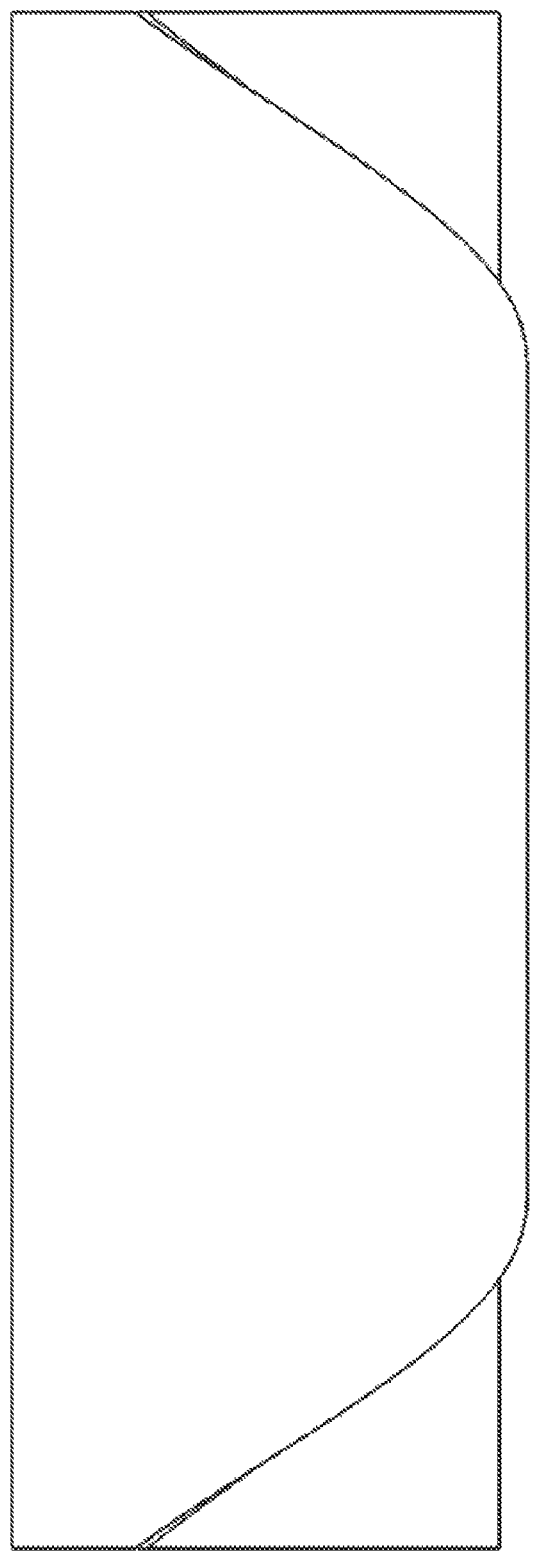
FIG. 70 illustrates a rear view of a preferred exemplary invention system irregular pentagonal embodiment with sewn mechanical coupling of the planar rag stack (PRS) in rolled form.
Figure 71:
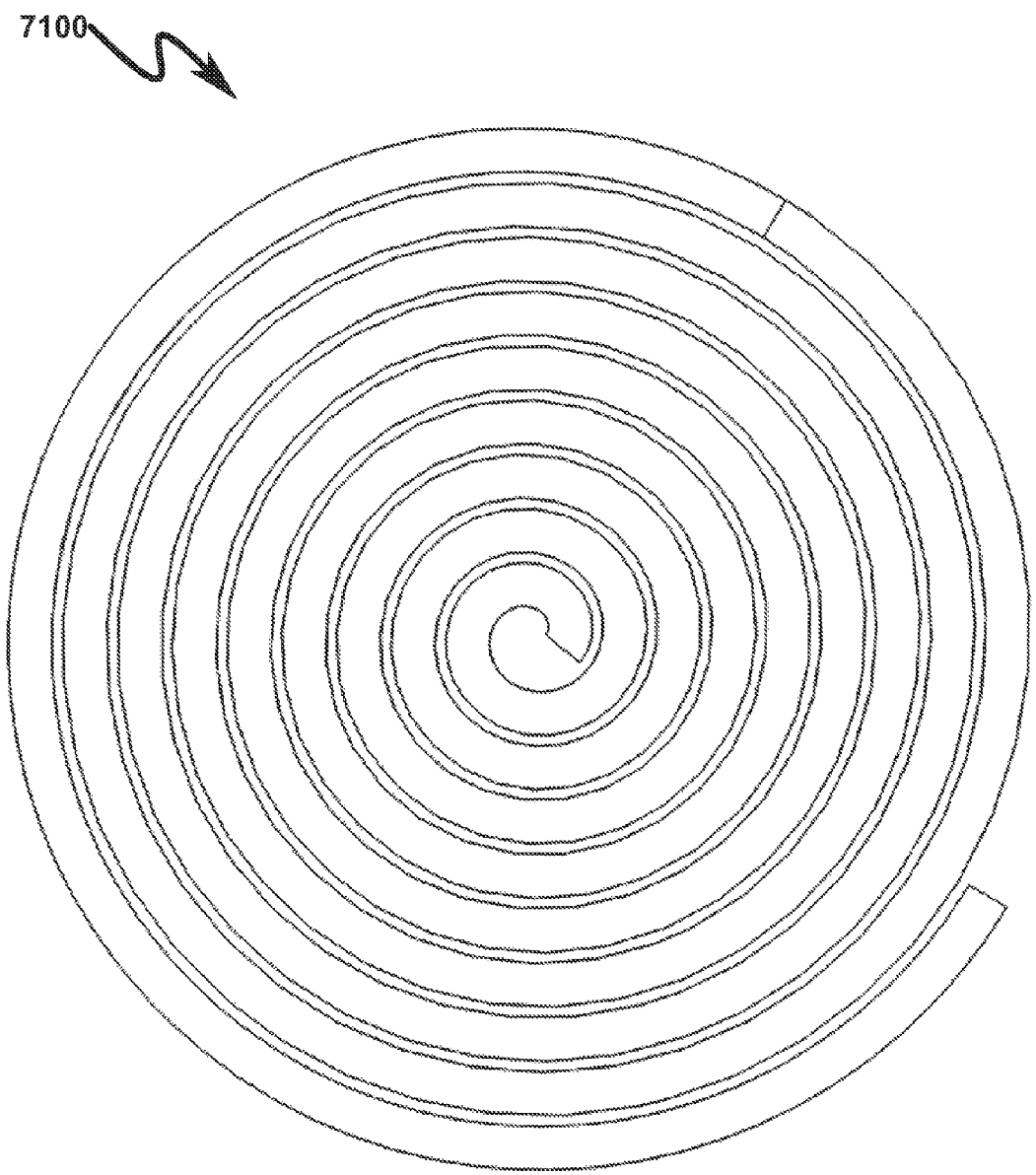
FIG. 71 illustrates a top view of a preferred exemplary invention system irregular pentagonal embodiment with sewn mechanical coupling of the planar rag stack (PRS) in rolled form.
Figure 72:
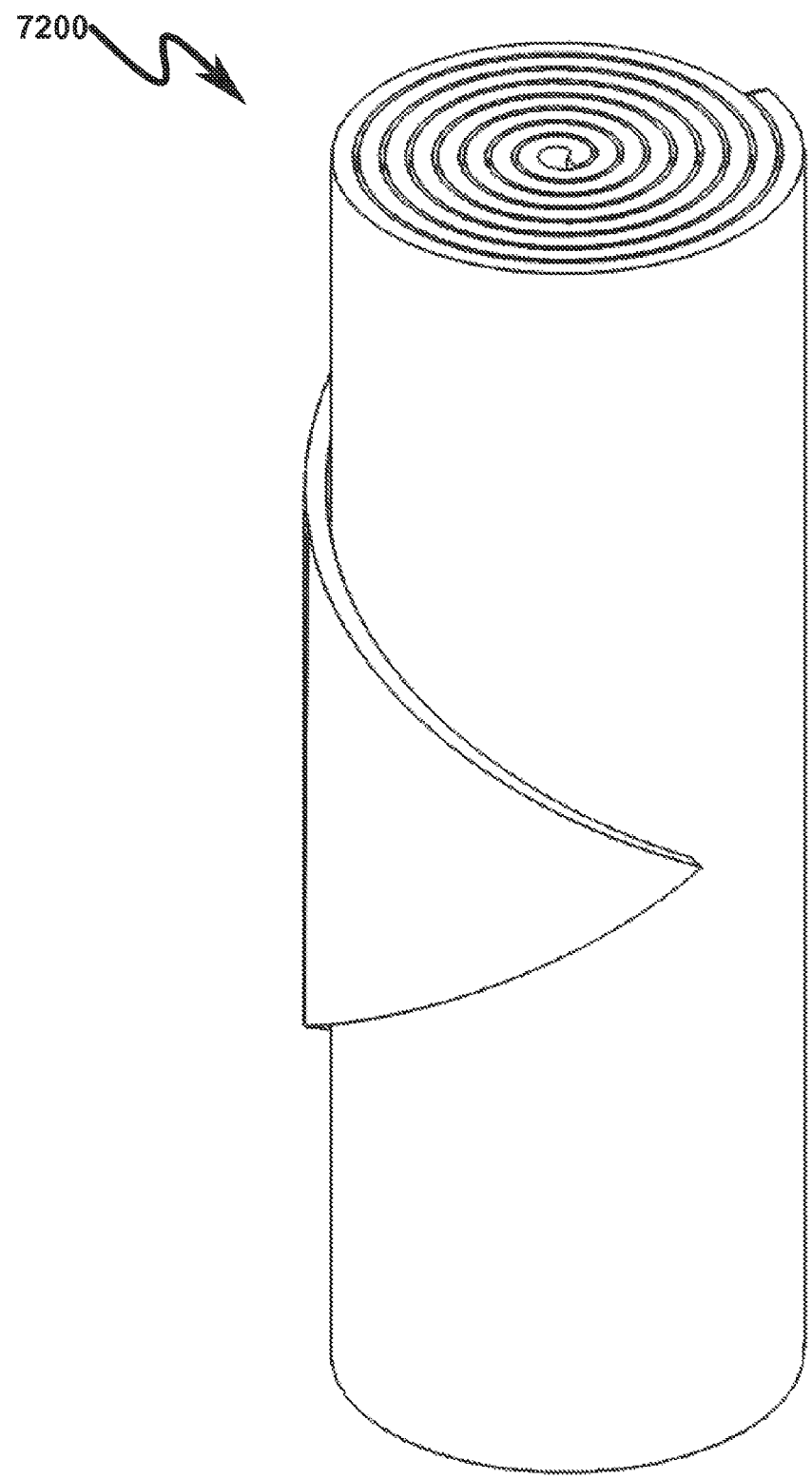
FIG. 72 illustrates a top front perspective view of a preferred exemplary invention system irregular pentagonal embodiment with sewn mechanical coupling of the planar rag stack (PRS) in rolled form.

As depicted in FIG. 69 (6900)-FIG. 72 (7200), the rag stacks described herein may be rolled into a cylindrical form. This cylindrical form may then be used in conjunction with a variety of rag stack canisters as described below to form an integrated cleaning system that comprises the rag stack and means for providing cleaning and other solutions. This integrated cleaning system both protects the rag stack from contamination but also provides a means for supplying application-specific products associated with the cleaning process and/or the use of the rag stack.

Suitable uses for this configuration include cleaning, dusting, buffing, scouring, disinfecting, leather treatment, waxing, etc. Thus, the rag stack described herein may be mated with an associated range of products depending on application context.

Exemplary Rag Stack Kits (7300)-(12000)

Figure 73:
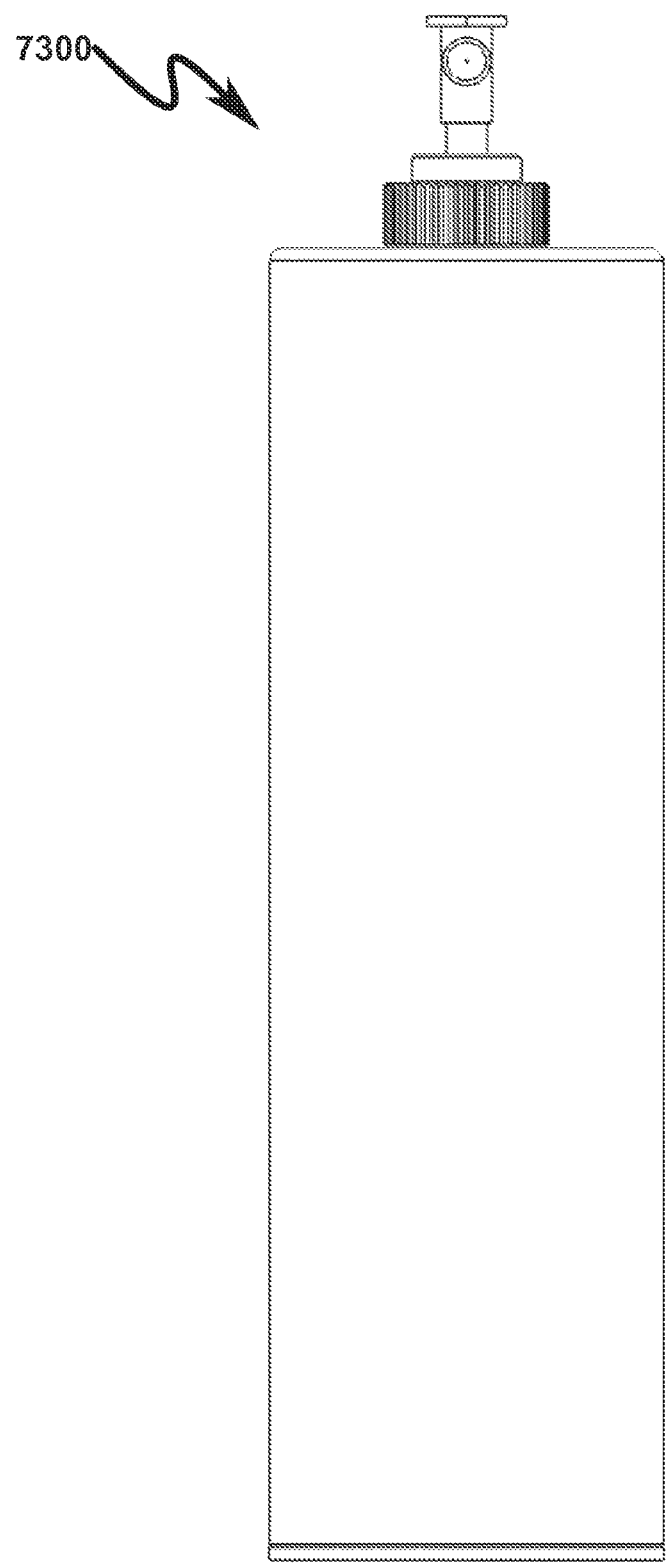
FIG. 73 illustrates a front view of an exemplary invention kit embodiment incorporating a one-piece rag stack canister that comprises an integrated pump spray attachment.
Figure 74:
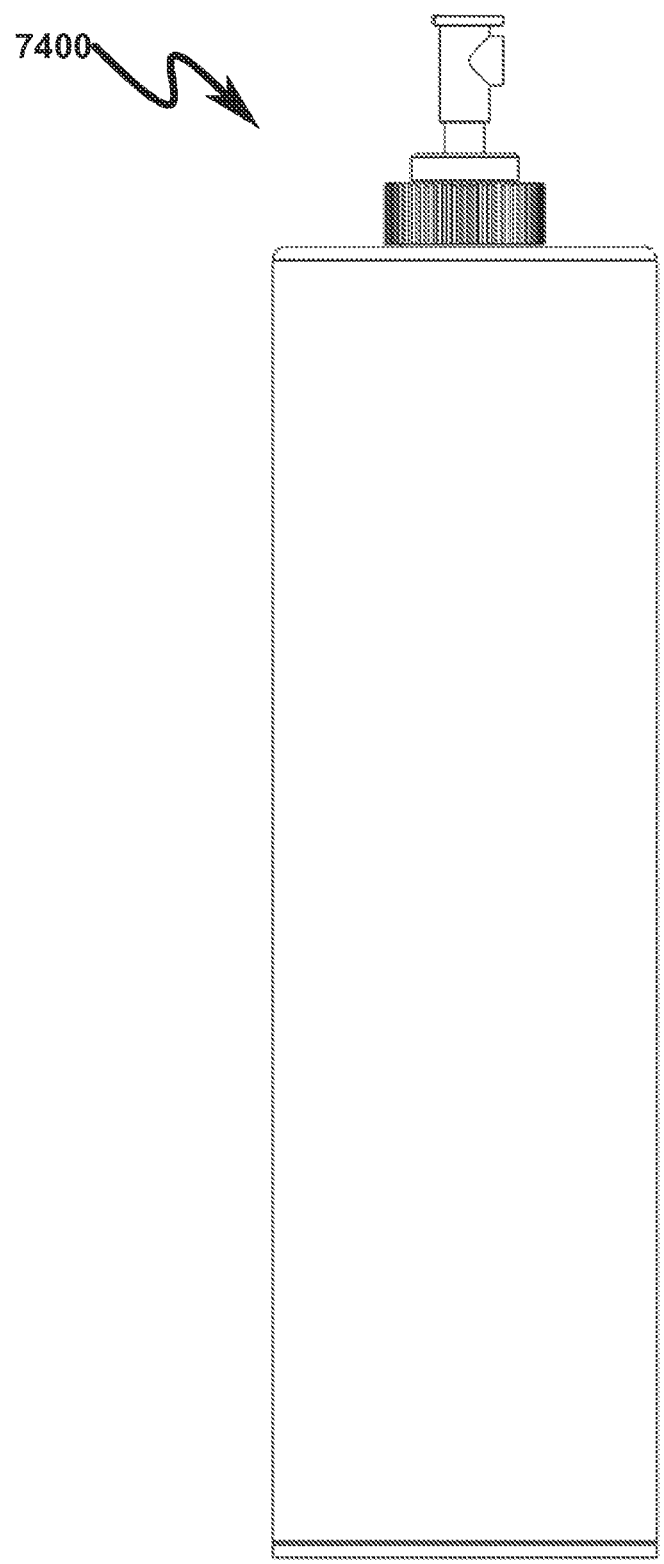
FIG. 74 illustrates a side view of an exemplary invention kit embodiment incorporating a one-piece rag stack canister that comprises an integrated pump spray attachment.
Figure 75:
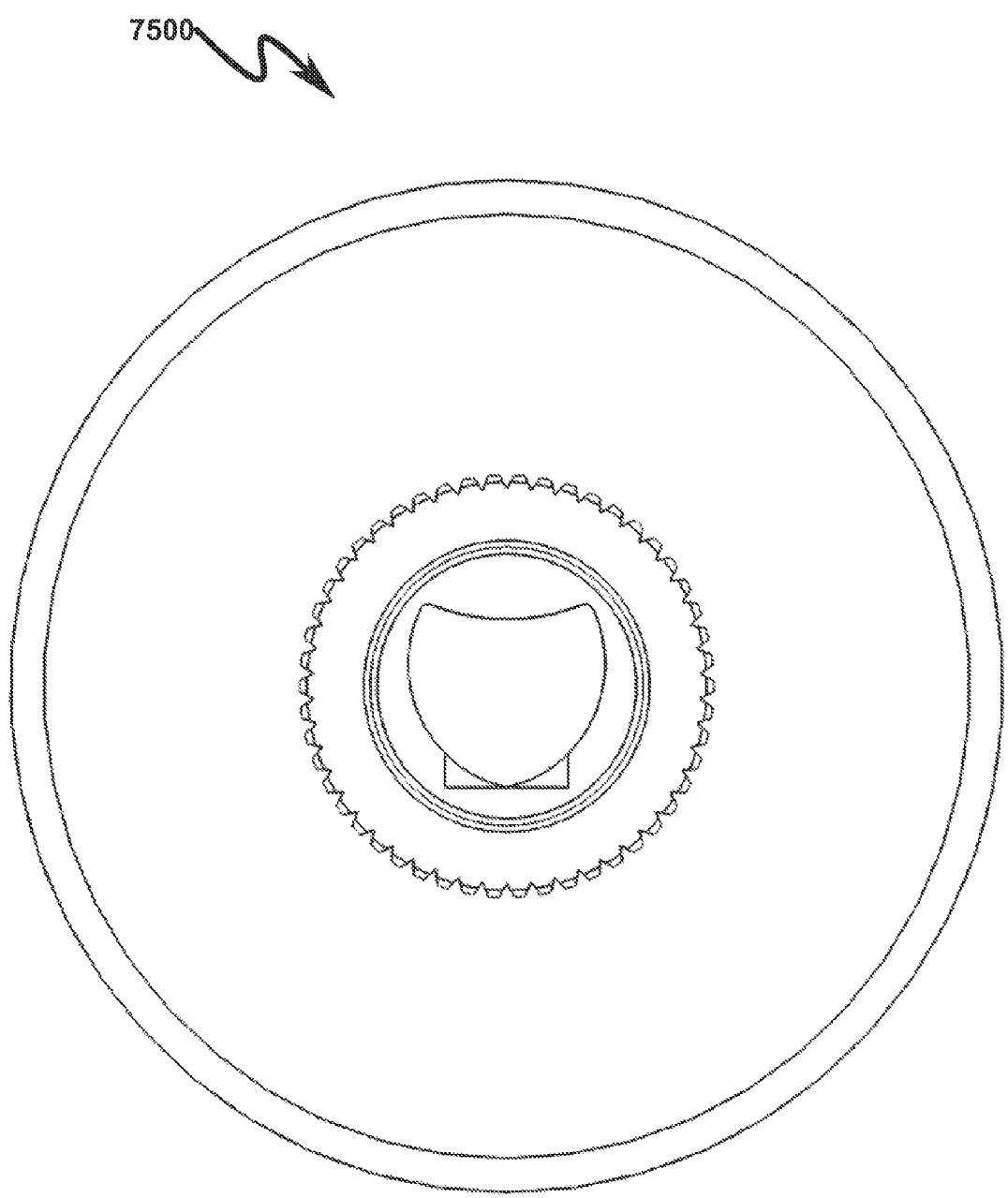
FIG. 75 illustrates a top view of an exemplary invention kit embodiment incorporating a one-piece rag stack canister that comprises an integrated pump spray attachment.
Figure 76:
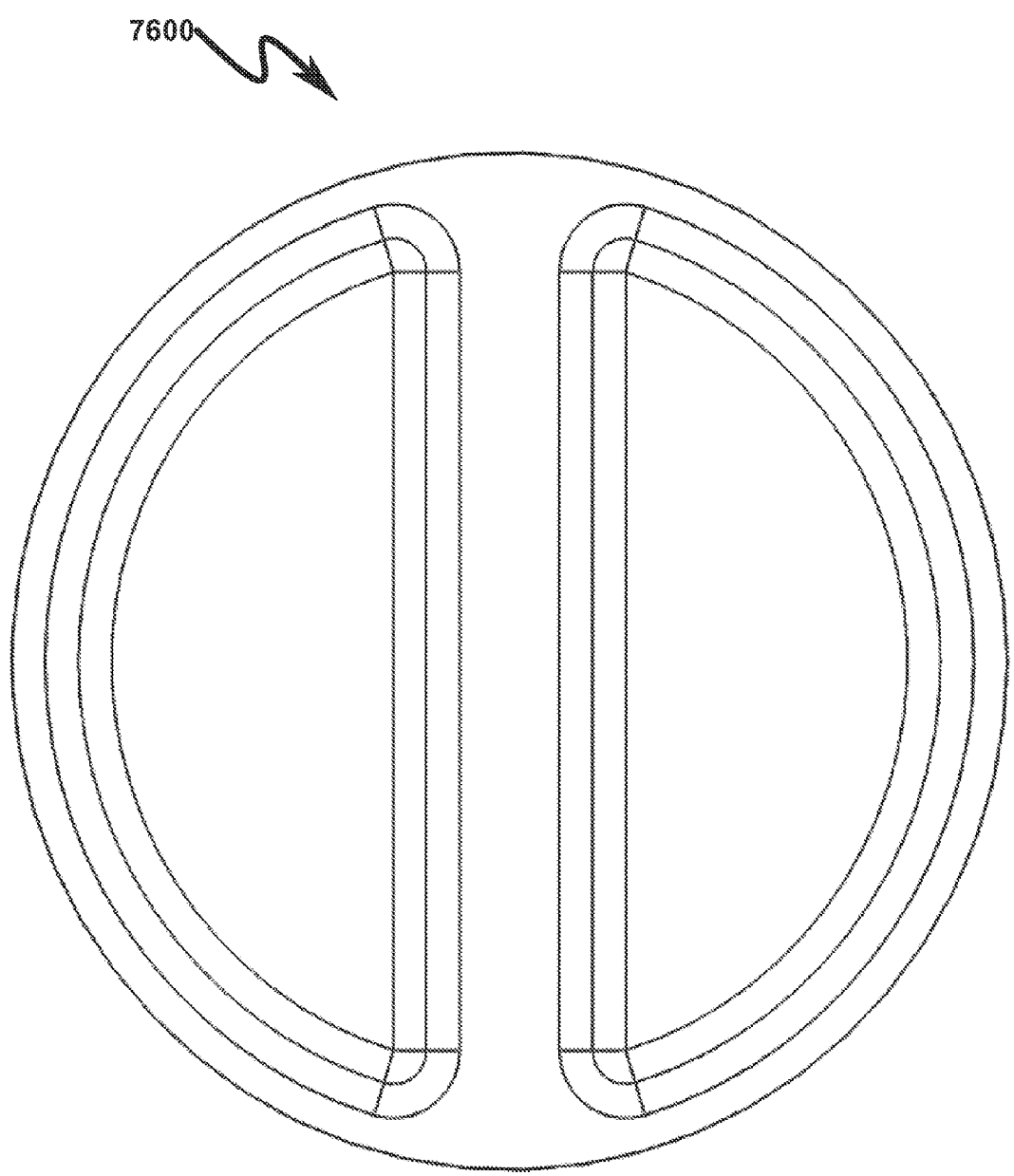
FIG. 76 illustrates a bottom view of an exemplary invention kit embodiment incorporating a one-piece rag stack canister that comprises an integrated pump spray attachment.
Figure 77:
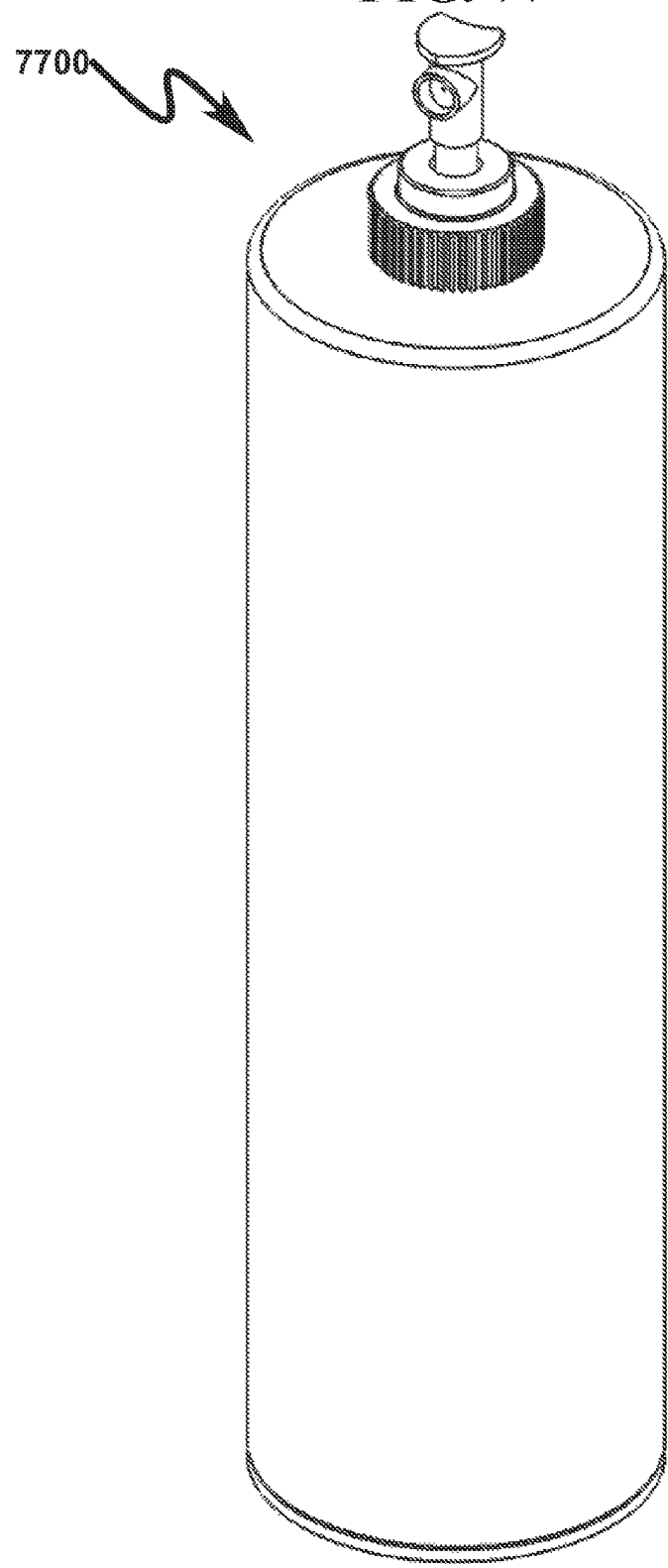
FIG. 77 illustrates a top right perspective view of an exemplary invention kit embodiment incorporating a one-piece rag stack canister that comprises an integrated pump spray attachment.
Figure 78:
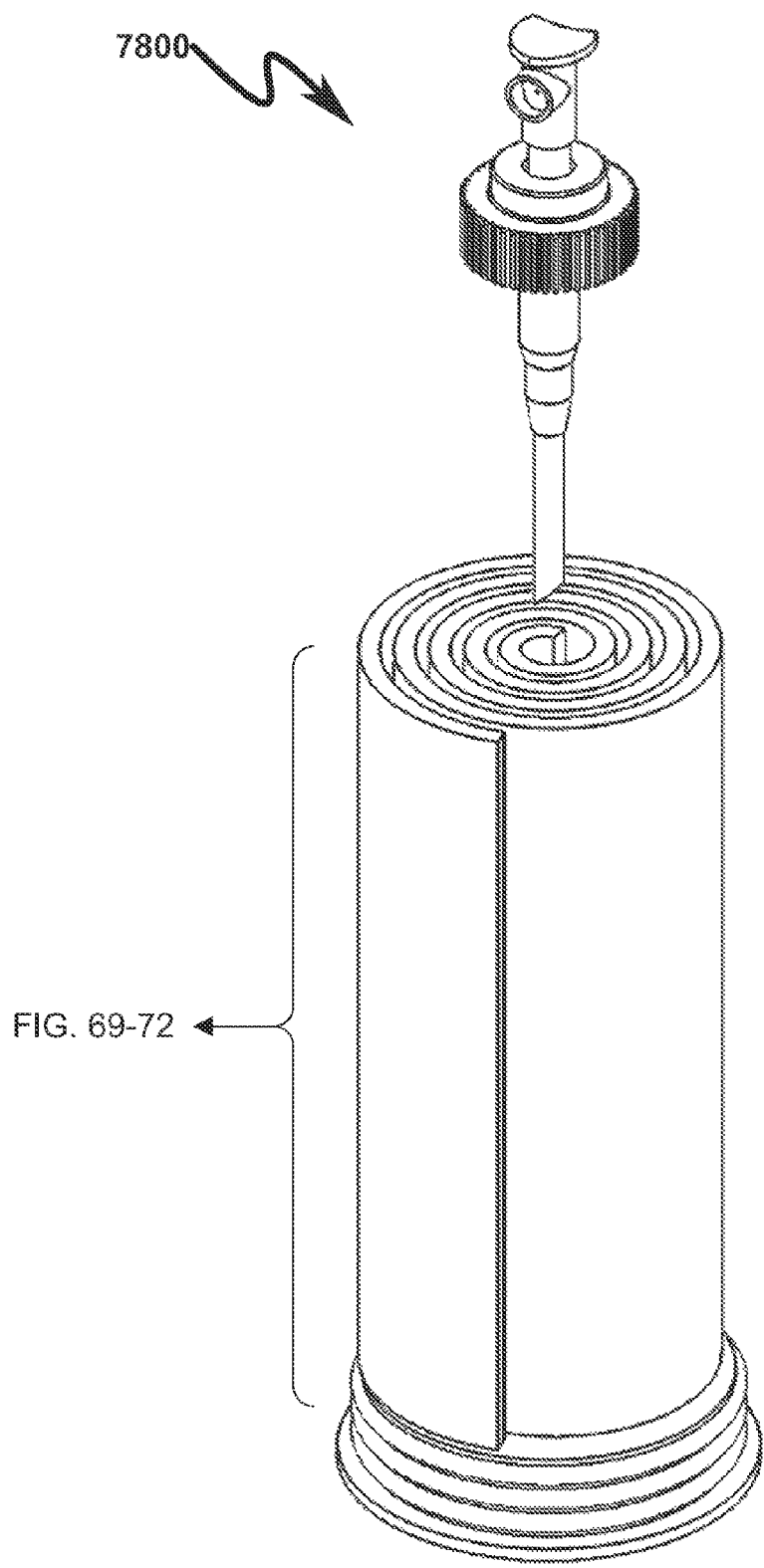
FIG. 78 illustrates a top right perspective view of an exemplary invention kit embodiment incorporating a one-piece rag stack canister that comprises an integrated pump spray attachment with the one-piece rag stack canister hidden from view.
Figure 79:
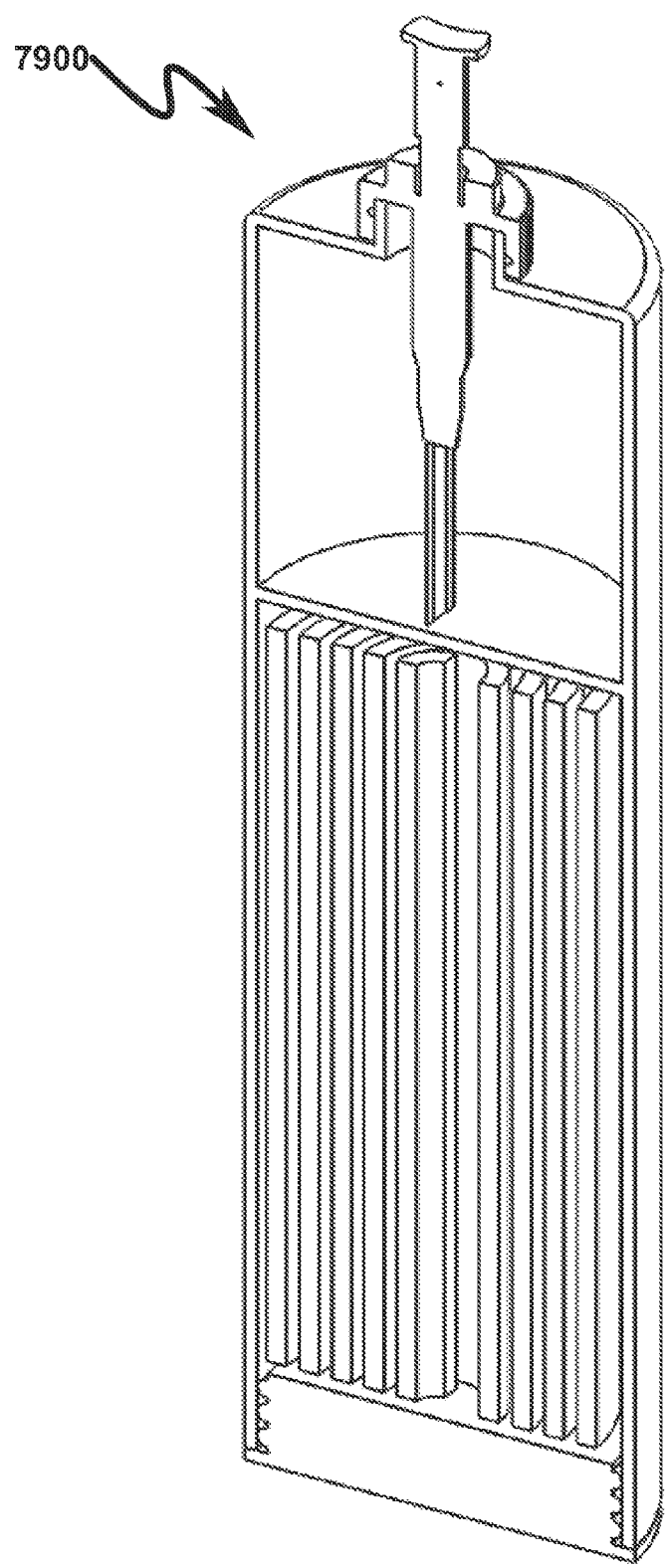
FIG. 79 illustrates a top right perspective sectional view of an exemplary invention kit embodiment incorporating a one-piece rag stack canister that comprises an integrated pump spray attachment.
Figure 120:
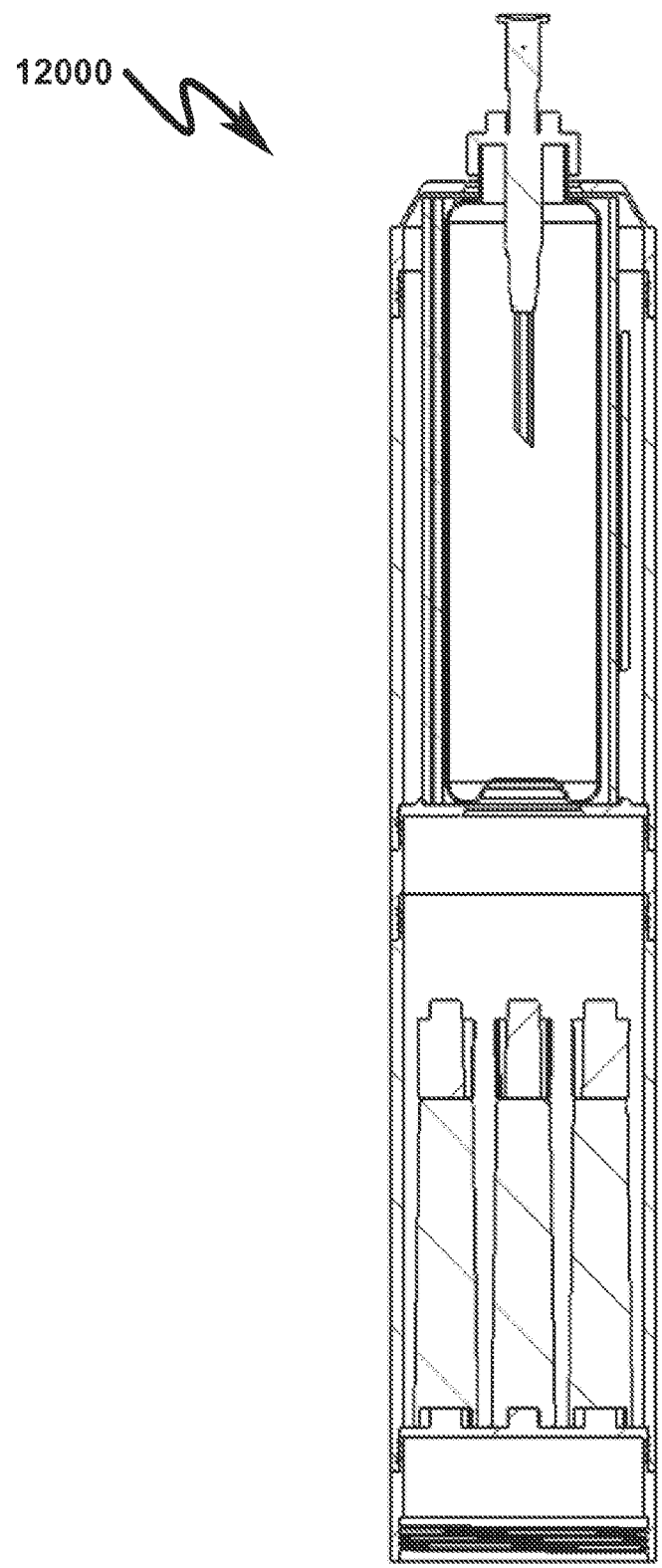
FIG. 120 illustrates a front sectional view of an exemplary invention kit embodiment implementing a dry erase kit incorporating a rag stack canister that retains dry erase markers.

The rag stack system described herein may be combined with a rag stack canister in a variety of forms as depicted in FIG. 73 (7300)-FIG. 120 (12000) to form a variety of rag stack kits configured for cleaning or the application of fluid or other material using one or more of the rag stack layers. While a wide variety of these kits are anticipated, the discussion below details several preferred kitting embodiments.

Rag Stack Pump Spray Canister Kit (7300)-(8000)

Figure 80:
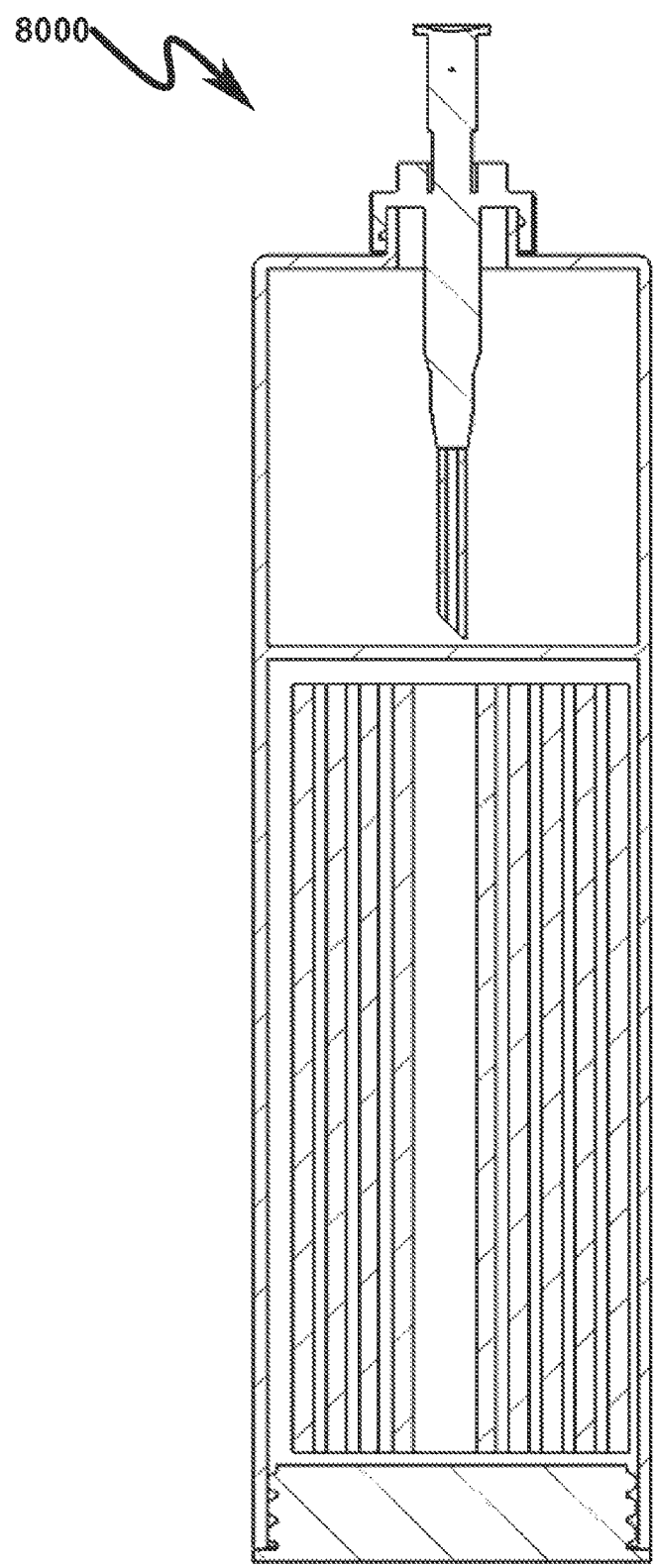
FIG. 80 illustrates a front sectional view of an exemplary invention kit embodiment incorporating a one-piece rag stack canister that comprises an integrated pump spray attachment.

As depicted in FIG. 73 (7300)-FIG. 80 (8000), the rag stacks described herein may be combined in a kit form embodiment with a rag stack canister that permits integration of a pump spray apparatus. This configuration permits the rag stack to be rolled into a cylindrical form and inserted into one end of the rag stack canister while the opposite end of the rag stack canister is configured to contain a liquid dispensed by a conventional pump spray attachment.

Rag Stack Canister Dimensions not Limitive

Figure 81:
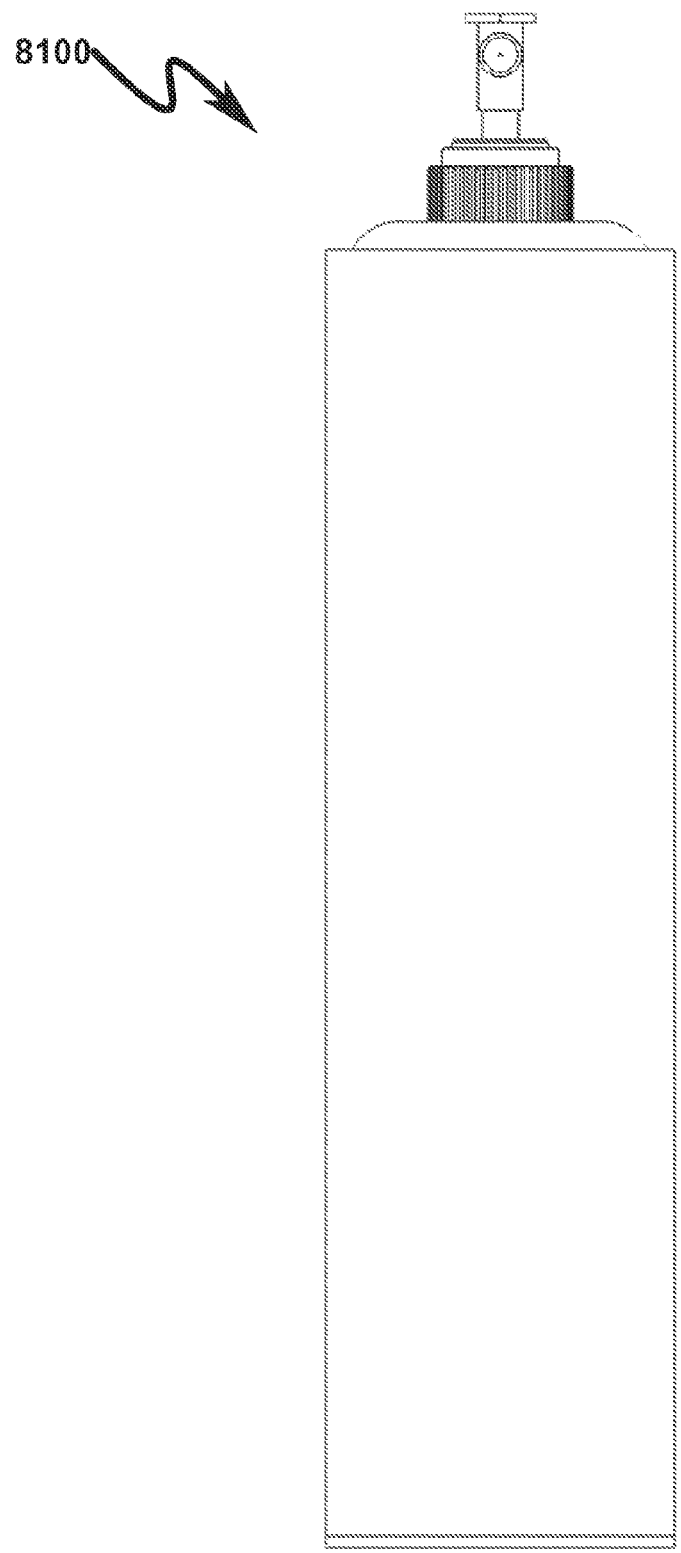
FIG. 81 illustrates a front view of an exemplary invention kit embodiment incorporating a one-piece rag stack canister that retains a removable pump spray bottle.
Figure 82:
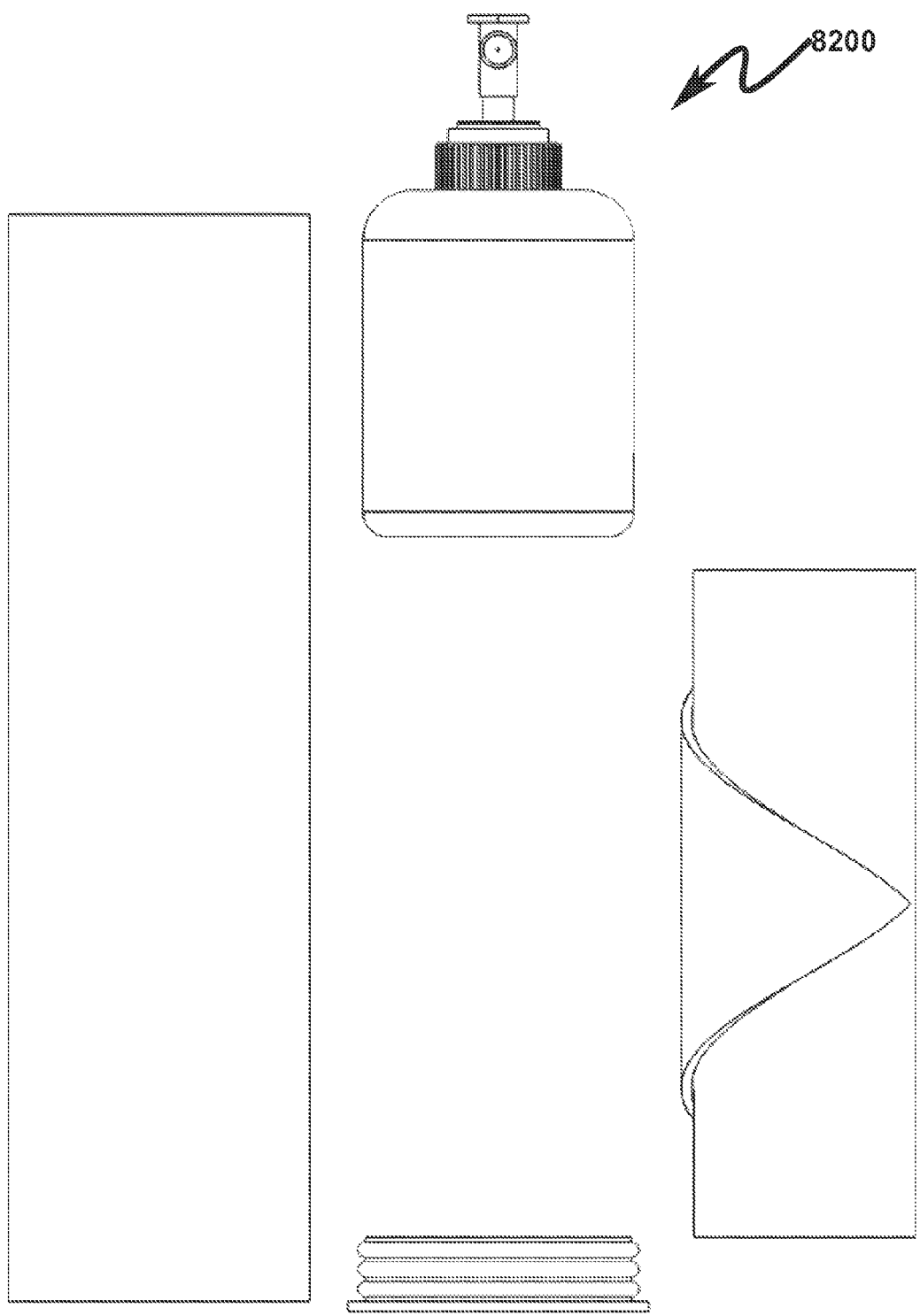
FIG. 82 illustrates a side view of an exemplary invention kit embodiment incorporating a one-piece rag stack canister that retains a removable pump spray bottle.
Figure 83:
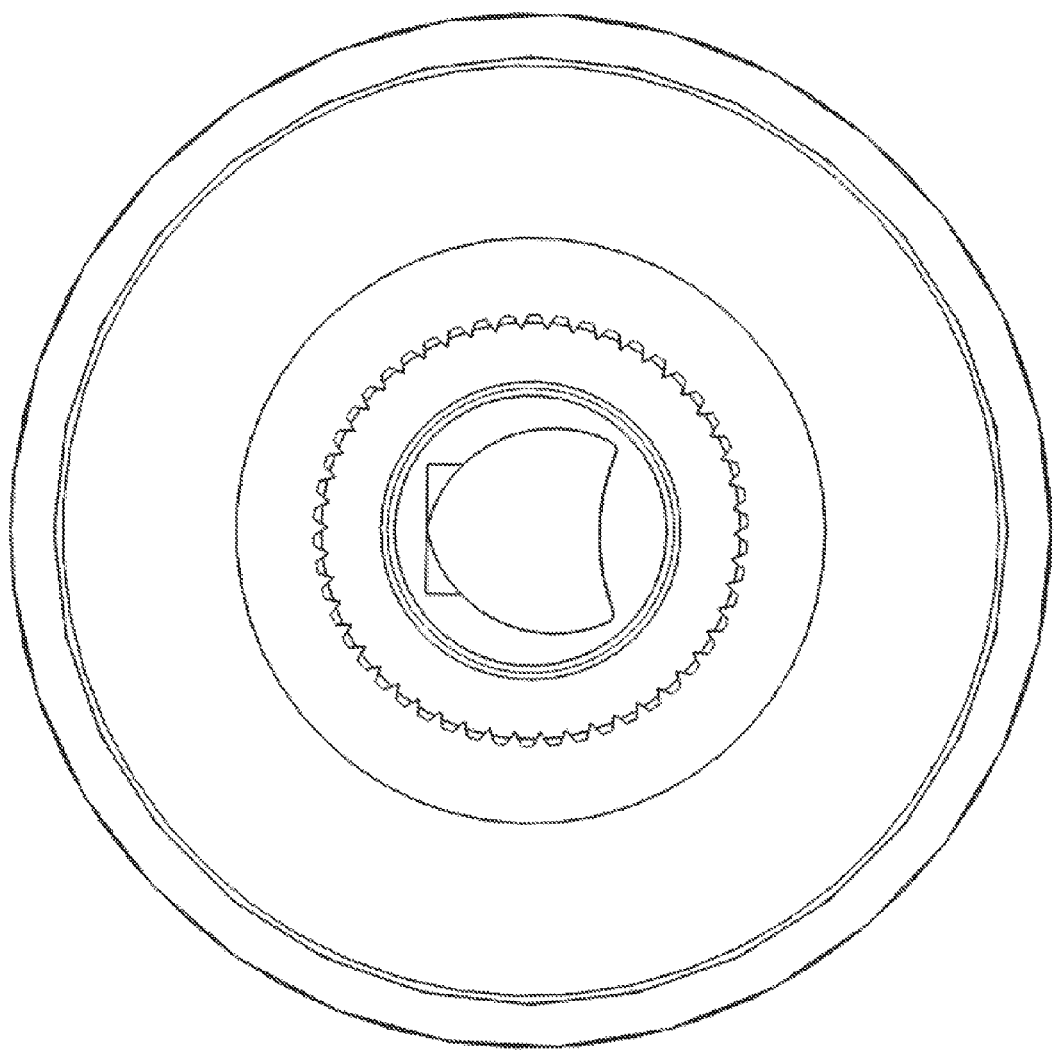
FIG. 83 illustrates a top view of an exemplary invention kit embodiment incorporating a one-piece rag stack canister that retains a removable pump spray bottle.
Figure 84:
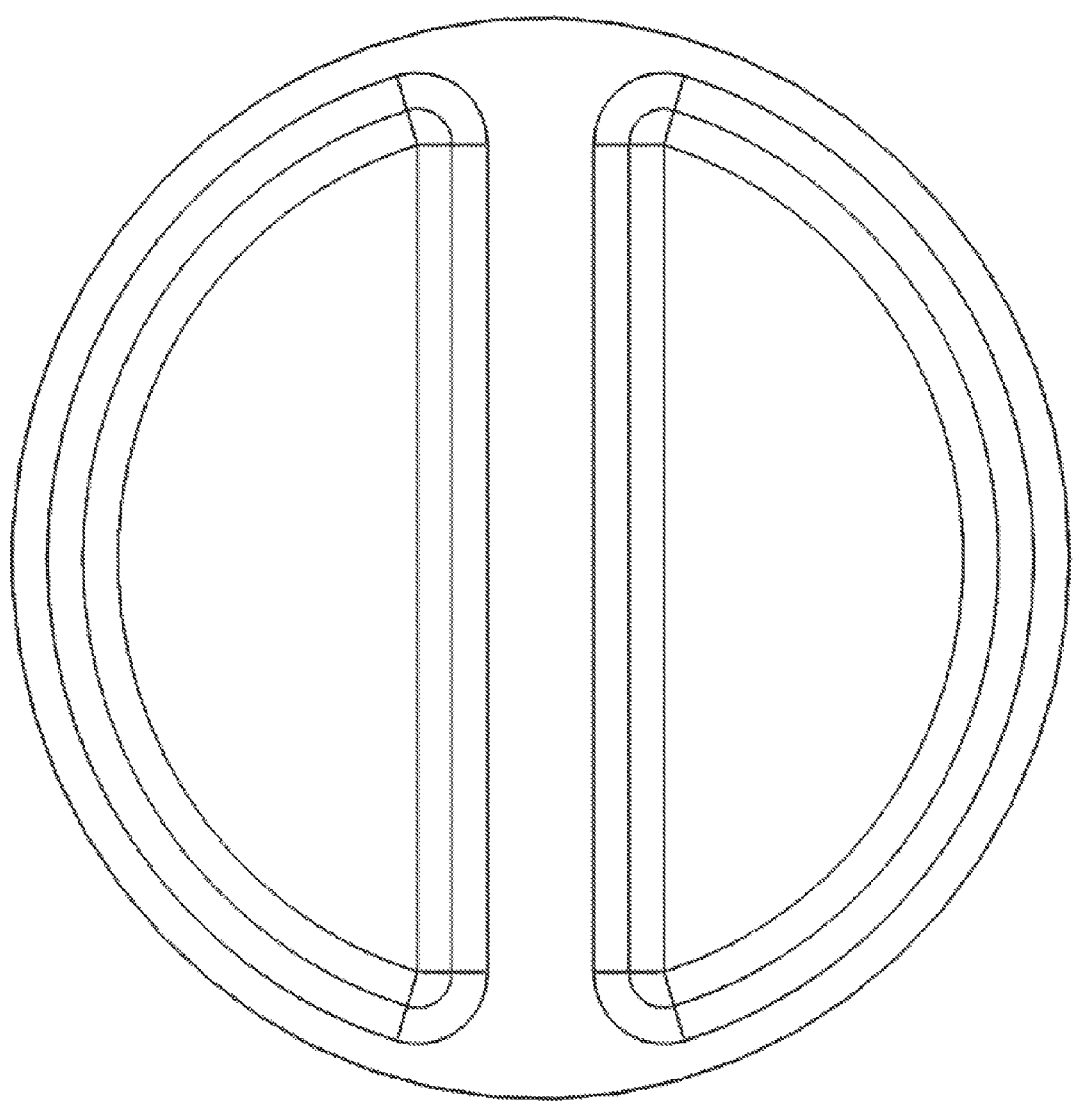
FIG. 84 illustrates a bottom view of an exemplary invention kit embodiment incorporating a one-piece rag stack canister that retains a removable pump spray bottle.
Figure 85:
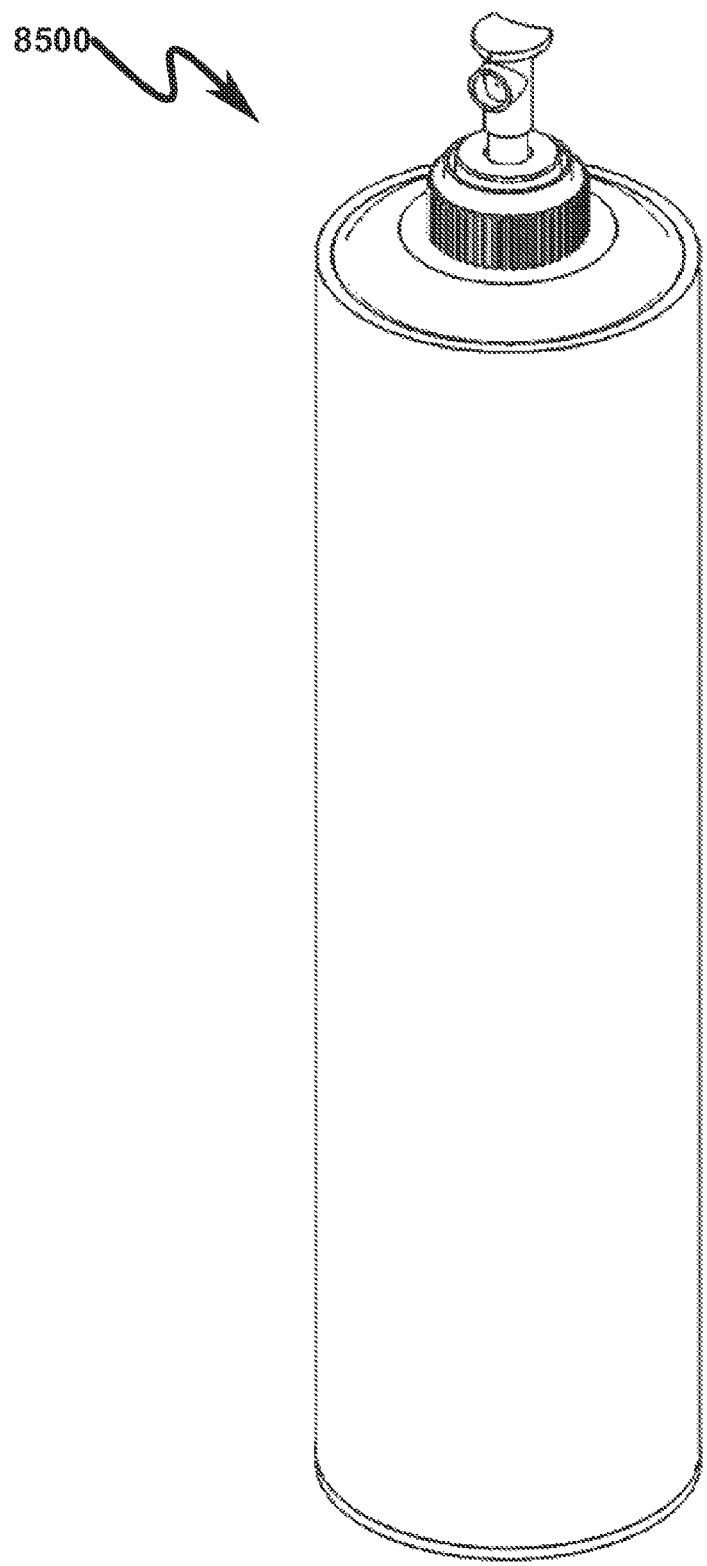
FIG. 85 illustrates a top right perspective view of an exemplary invention kit embodiment incorporating a one-piece rag stack canister that retains a removable pump spray bottle.
Figure 86:
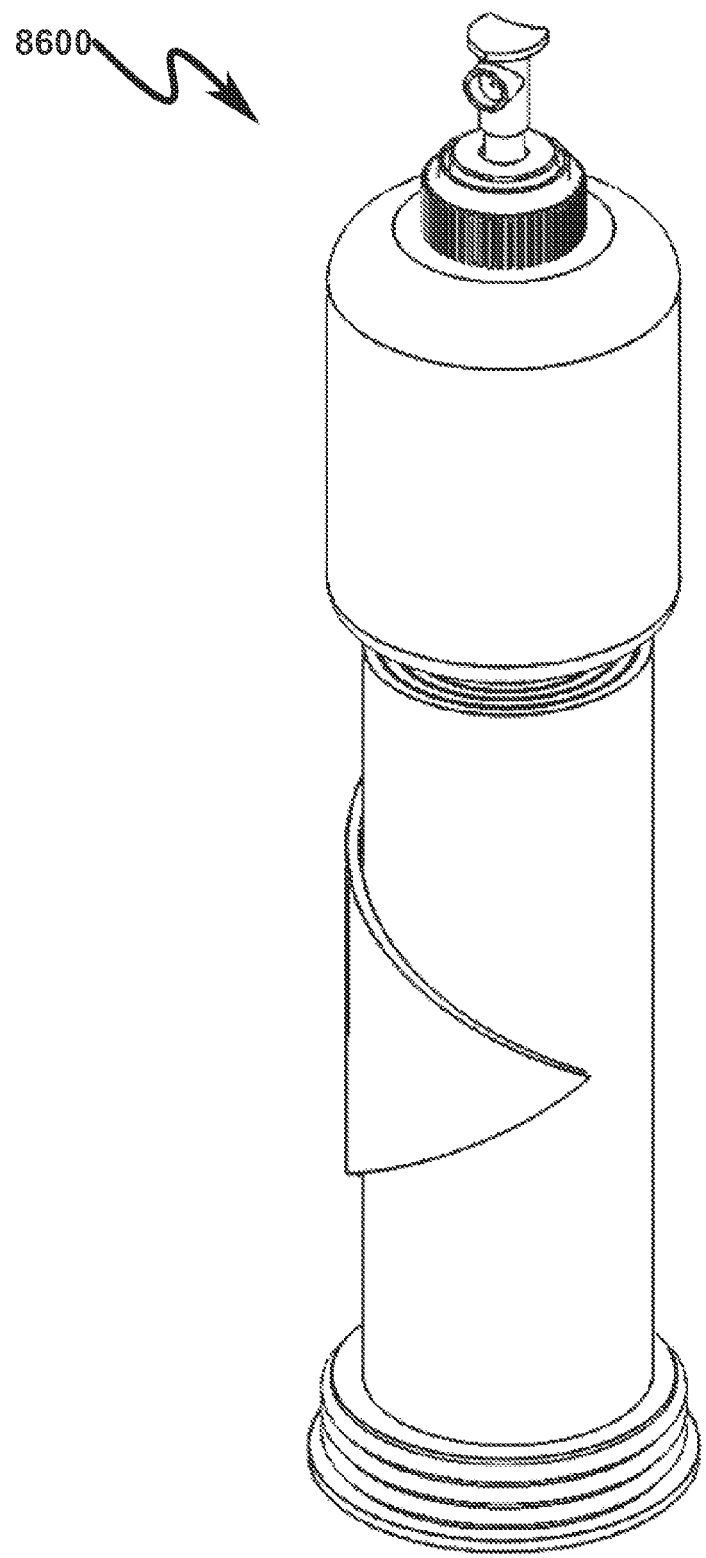
FIG. 86 illustrates a top right perspective view of an exemplary invention kit embodiment incorporating a one-piece rag stack canister that retains a removable pump spray bottle with the one-piece rag stack canister hidden from view.
Figure 88:
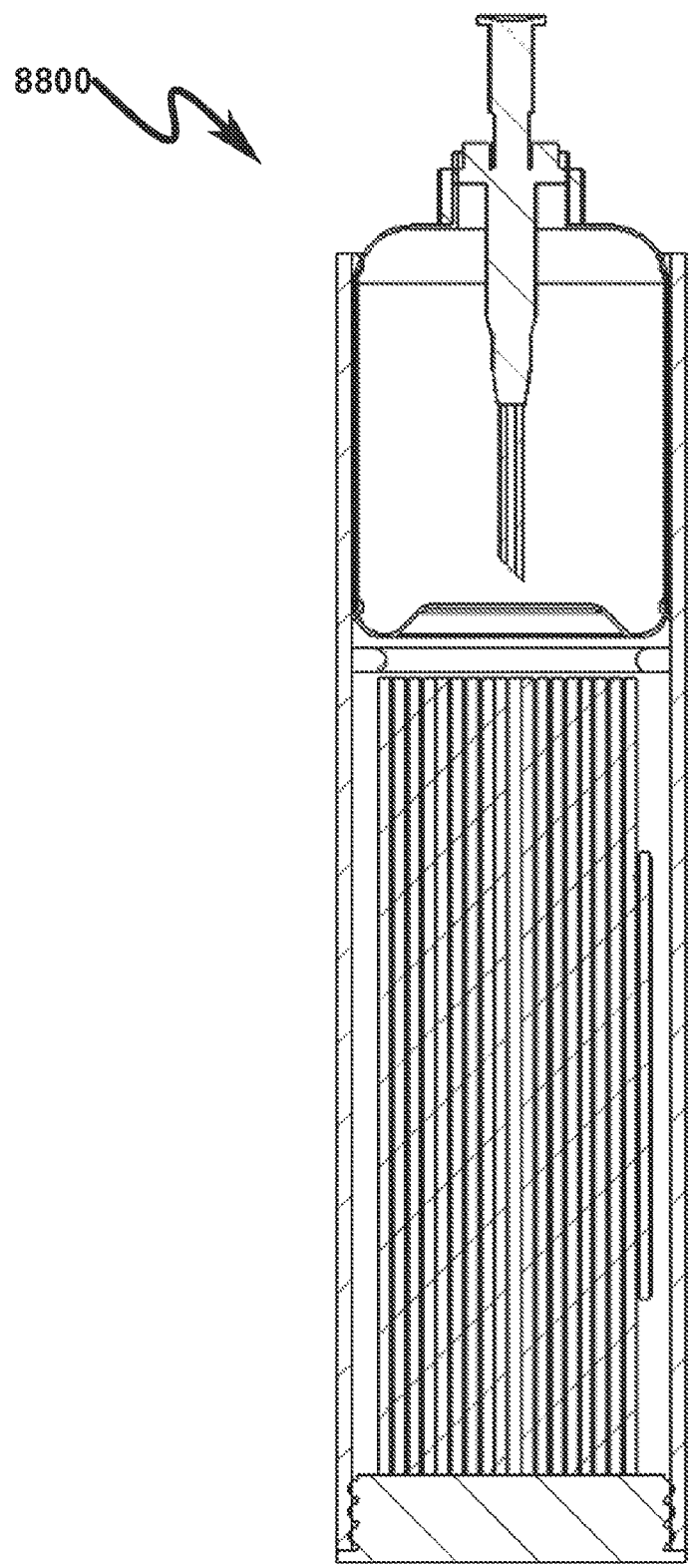
FIG. 88 illustrates a front sectional view of an exemplary invention kit embodiment incorporating a one-piece rag stack canister that retains a removable pump spray bottle.
Figure 97:
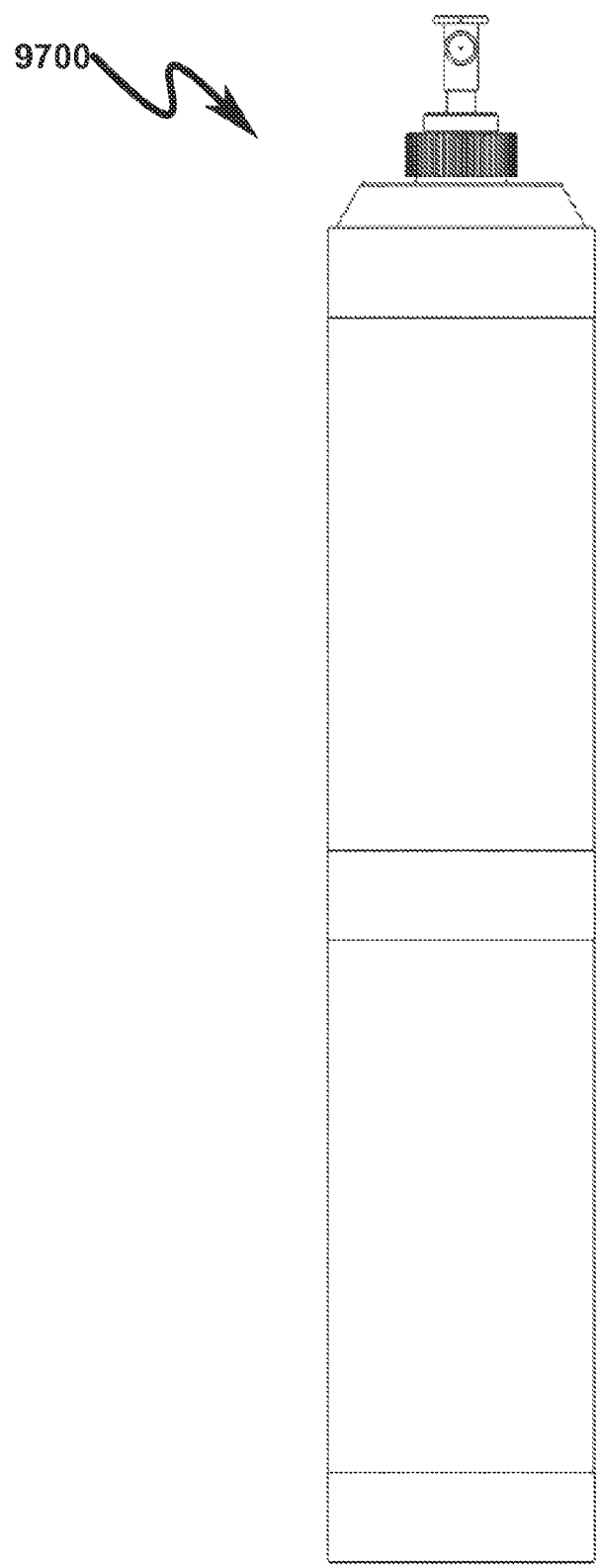
FIG. 97 illustrates a front view of an exemplary invention kit embodiment incorporating a two-piece rag stack canister that retains a removable pump spray bottle.
Figure 104:
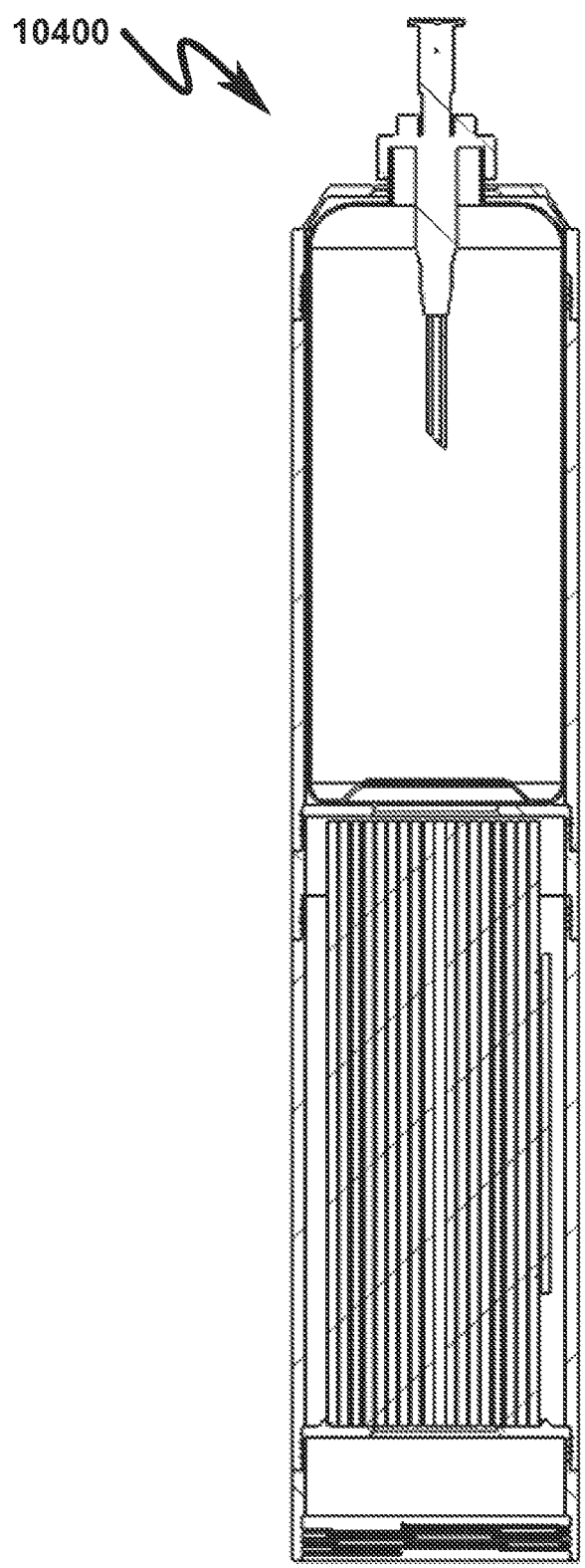
FIG. 104 illustrates a front sectional view of an exemplary invention kit embodiment incorporating a two-piece rag stack canister that retains a removable pump spray bottle.

As depicted in FIG. 81 (8100)-FIG. 88 (8800), the rag stack canister may be configured to support a variety of pump spray bottles (shortened as indicated in FIG. 81 (8100)-FIG. 88 (8800) or longer as indicated in FIG. 97 (9700)-FIG. 104 (10400)). While not specifically illustrated, the rag stack canisters depicted herein may support full-size pump spray bottles or aerosol cans or may be configured as depicted in FIG. 81 (8100)-FIG. 88 (8800) to support a shortened pump spray bottle or aerosol can. In many optimal configurations the overall length of the rag stack canister and associated pump spray bottle or aerosol can are in the range of 8 to 12 inches in length and in the range of 2.5 to 3.5 inches in diameter. These optimal dimensions may support pump spray bottles and/or aerosol cans in the range of 2 to 8 inches in length.

Rag Stack Pump Spray Bottle Canister Kit (8100)-(8800)

Figure 87:
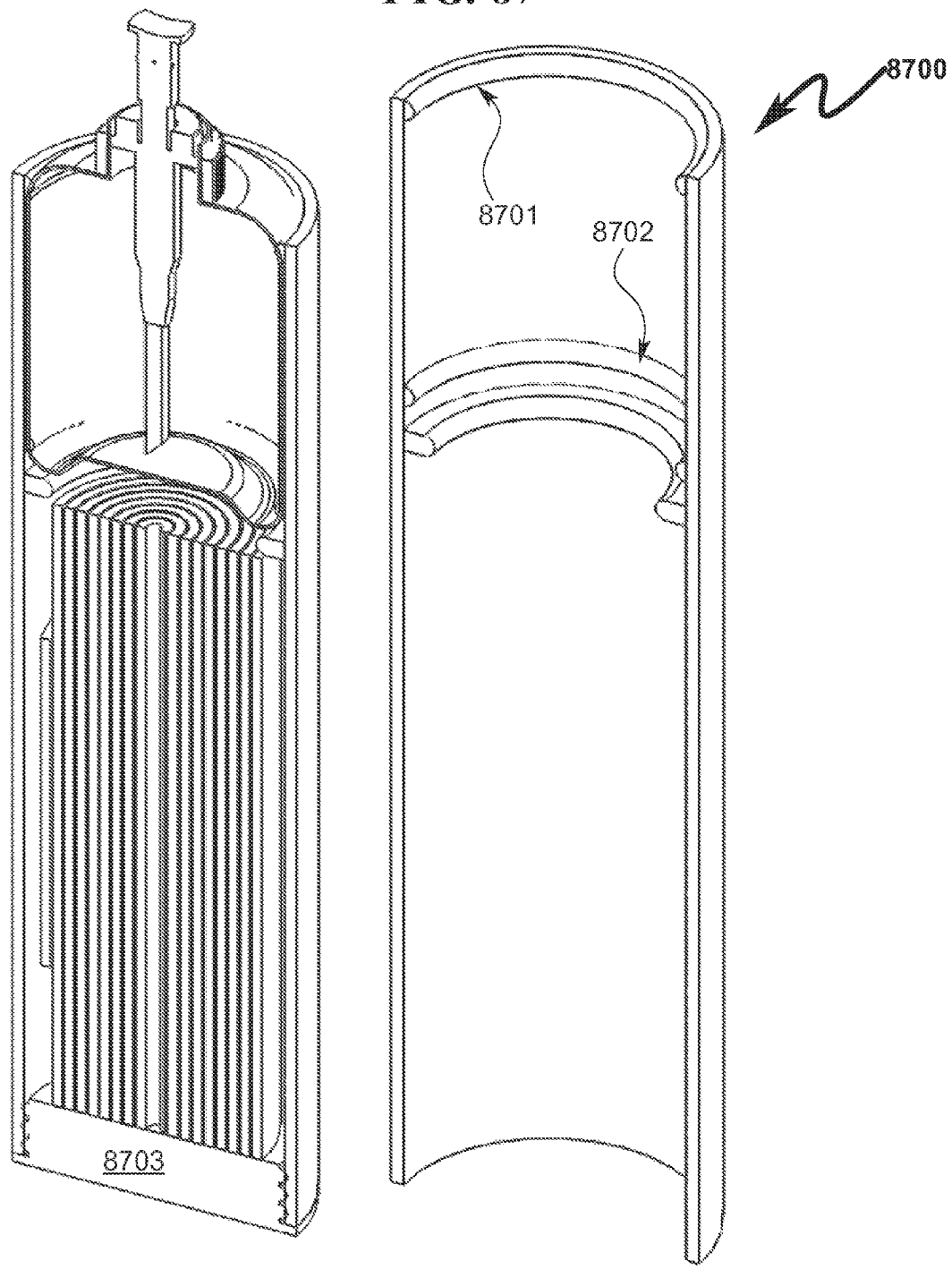
FIG. 87 illustrates a top right perspective sectional view of an exemplary invention kit embodiment incorporating a one-piece rag stack canister that retains a removable pump spray bottle.

As depicted in FIG. 81 (8100)-FIG. 88 (8800), the rag stacks described herein may be combined in a kit form embodiment with a one-piece rag stack canister that permits combination with a pump spray bottle. This configuration permits the rag stack to be rolled into a cylindrical form and inserted into one end of the rag stack canister while the opposite end of the rag stack canister is configured to retain a pump spray bottle. As indicated in FIG. 87 (8700), internal lips (8701, 8702) within the rag stack canister cylinder are configured to grip the sides of the pump spray bottle when inserted into the rag stack canister.

Rag Stack Aerosol Spray Canister Kit (8900)-(9600)

Figure 89:
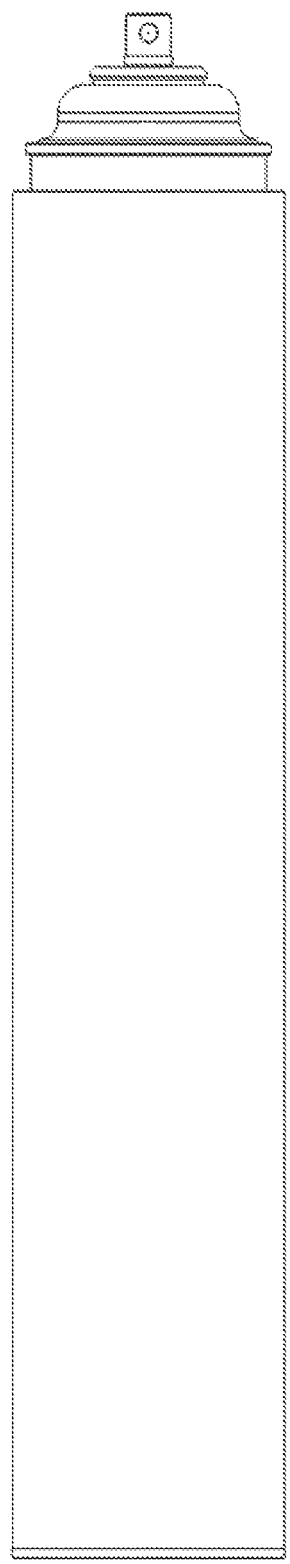
FIG. 89 illustrates a front view of an exemplary invention kit embodiment incorporating a one-piece rag stack canister that retains a removable aerosol spray can.
Figure 90:
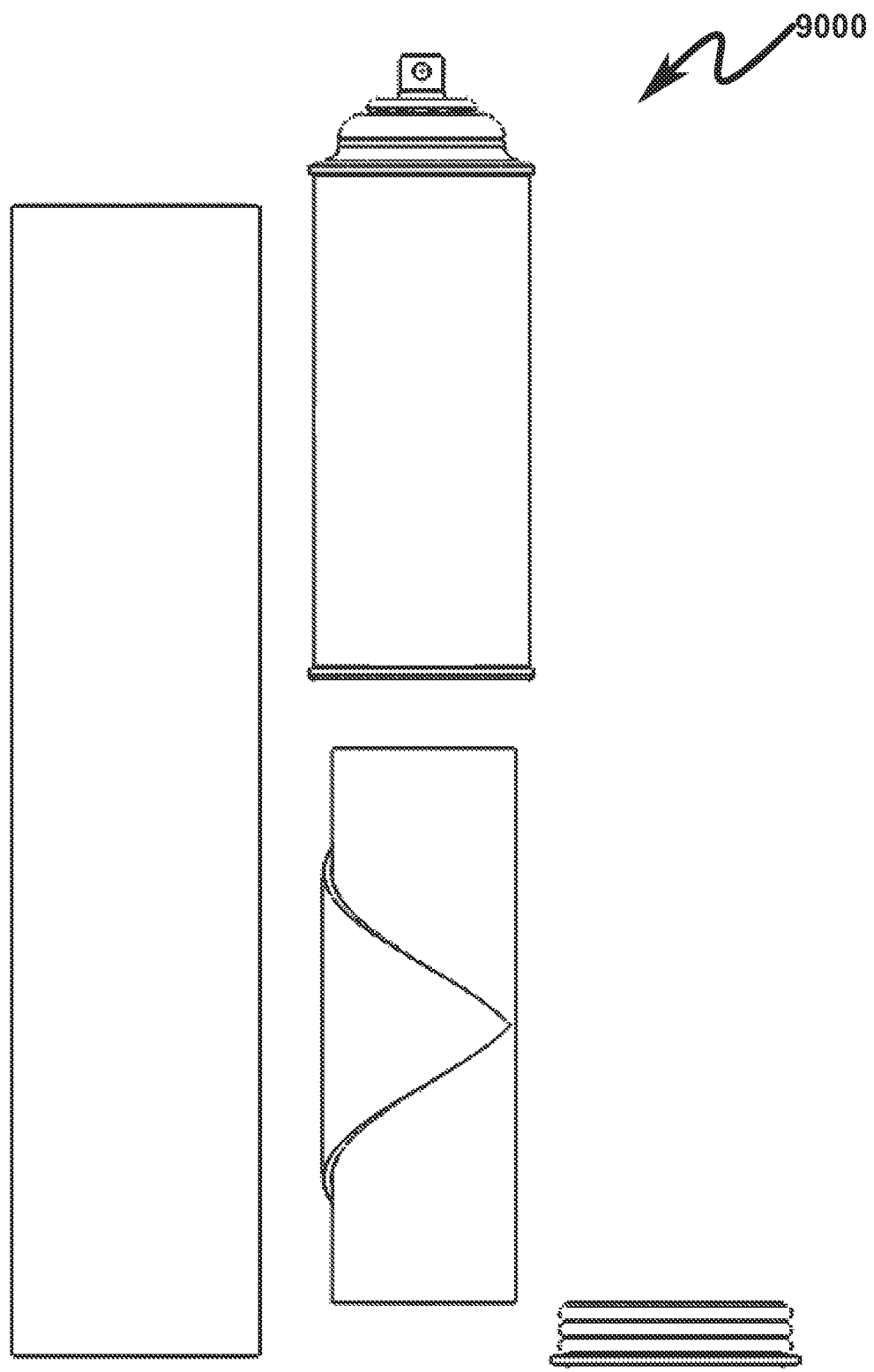
FIG. 90 illustrates a side view of an exemplary invention kit embodiment incorporating a one-piece rag stack canister that retains a removable aerosol spray can.
Figure 91:
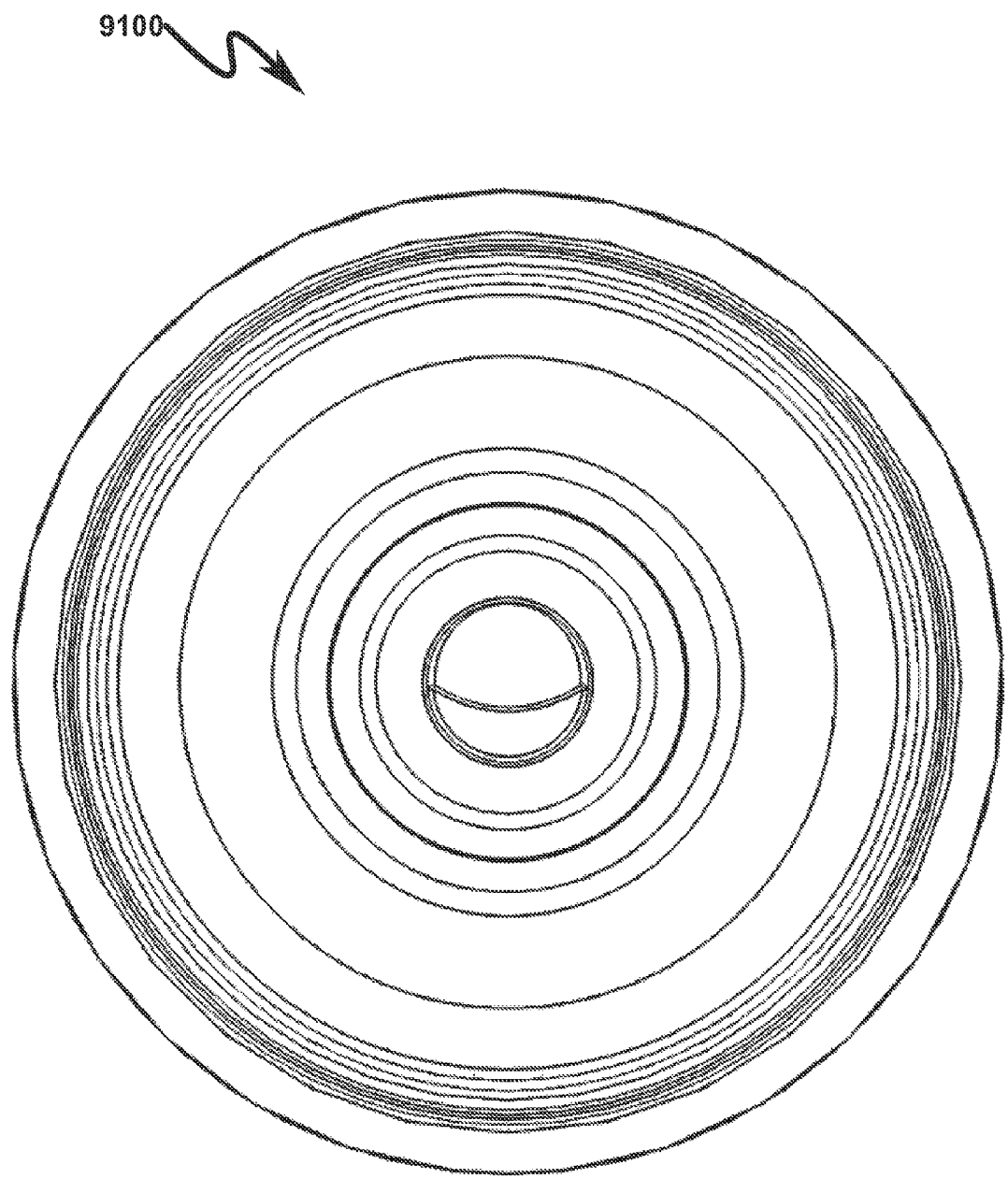
FIG. 91 illustrates a top view of an exemplary invention kit embodiment incorporating a one-piece rag stack canister that retains a removable aerosol spray can.
Figure 92:
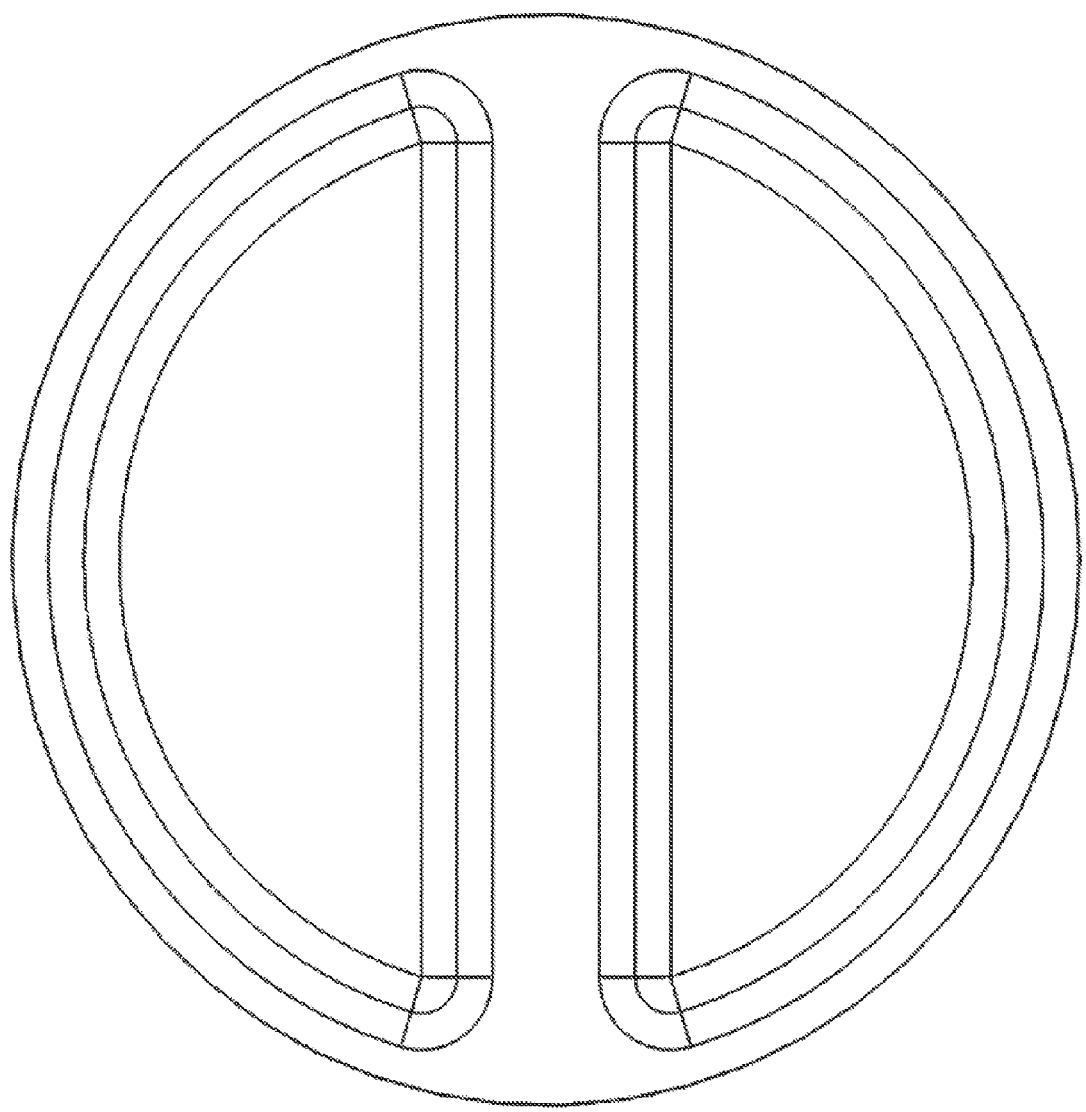
FIG. 92 illustrates a bottom view of an exemplary invention kit embodiment incorporating a one-piece rag stack canister that retains a removable aerosol spray can.
Figure 93:
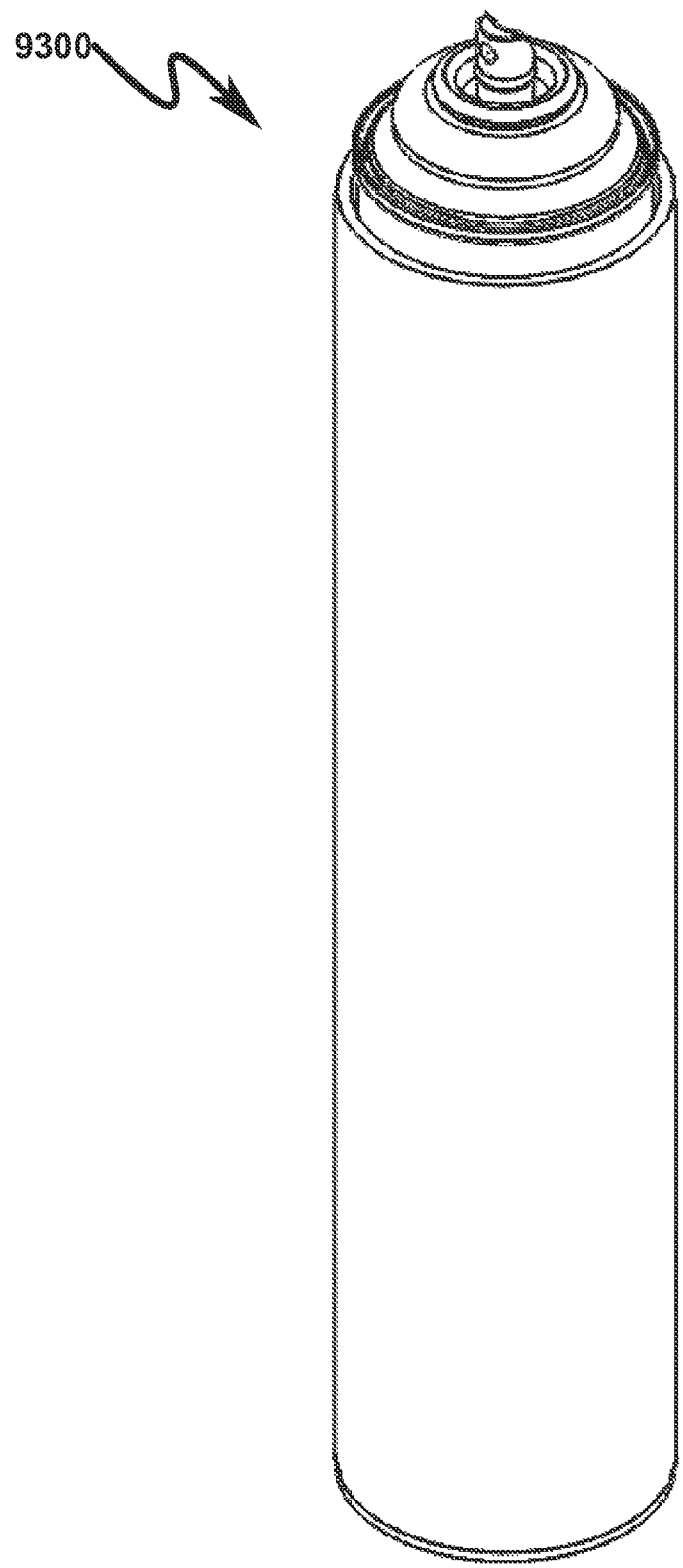
FIG. 93 illustrates a top right perspective view of an exemplary invention kit embodiment incorporating a one-piece rag stack canister that retains a removable aerosol spray can.
Figure 94:
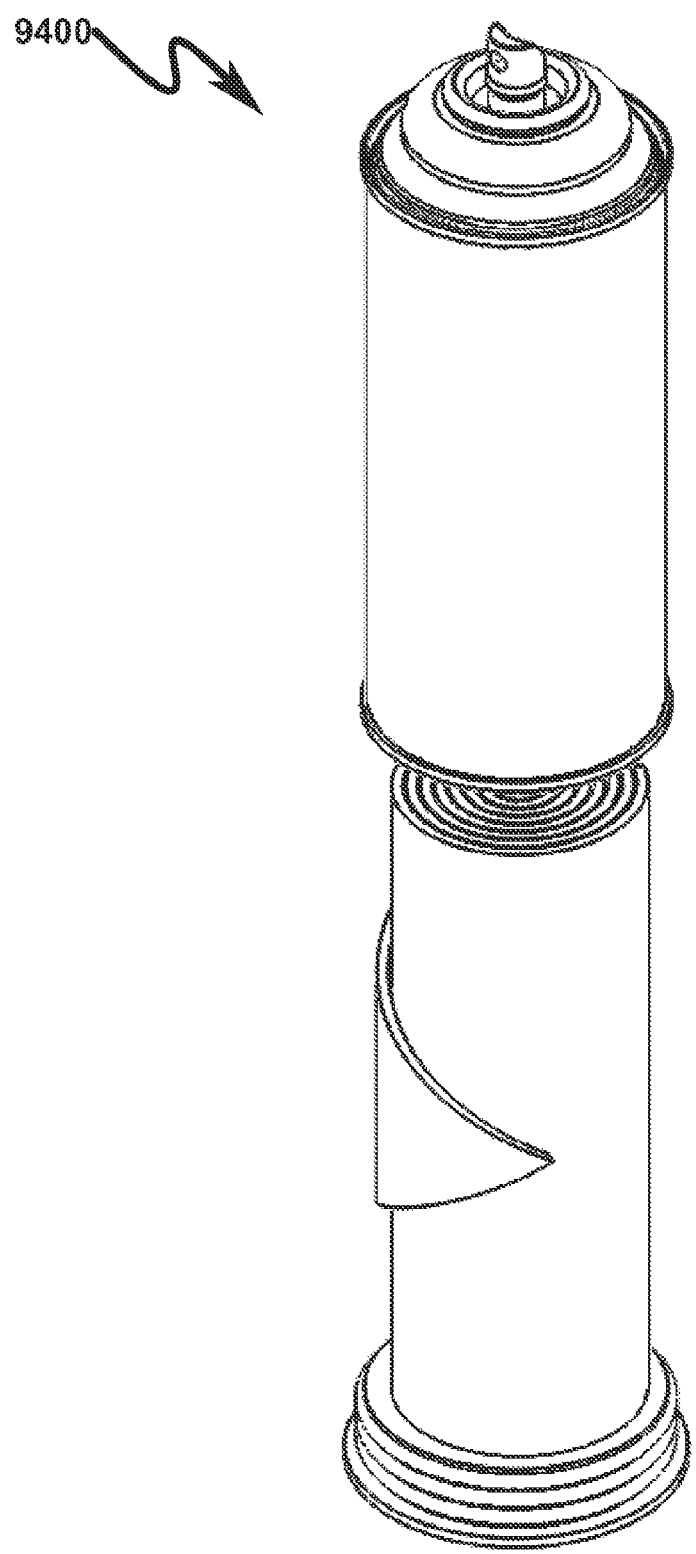
FIG. 94 illustrates a top right perspective view of an exemplary invention kit embodiment incorporating a one-piece rag stack canister that retains a removable aerosol spray can with the one-piece rag stack canister hidden from view.
Figure 95:
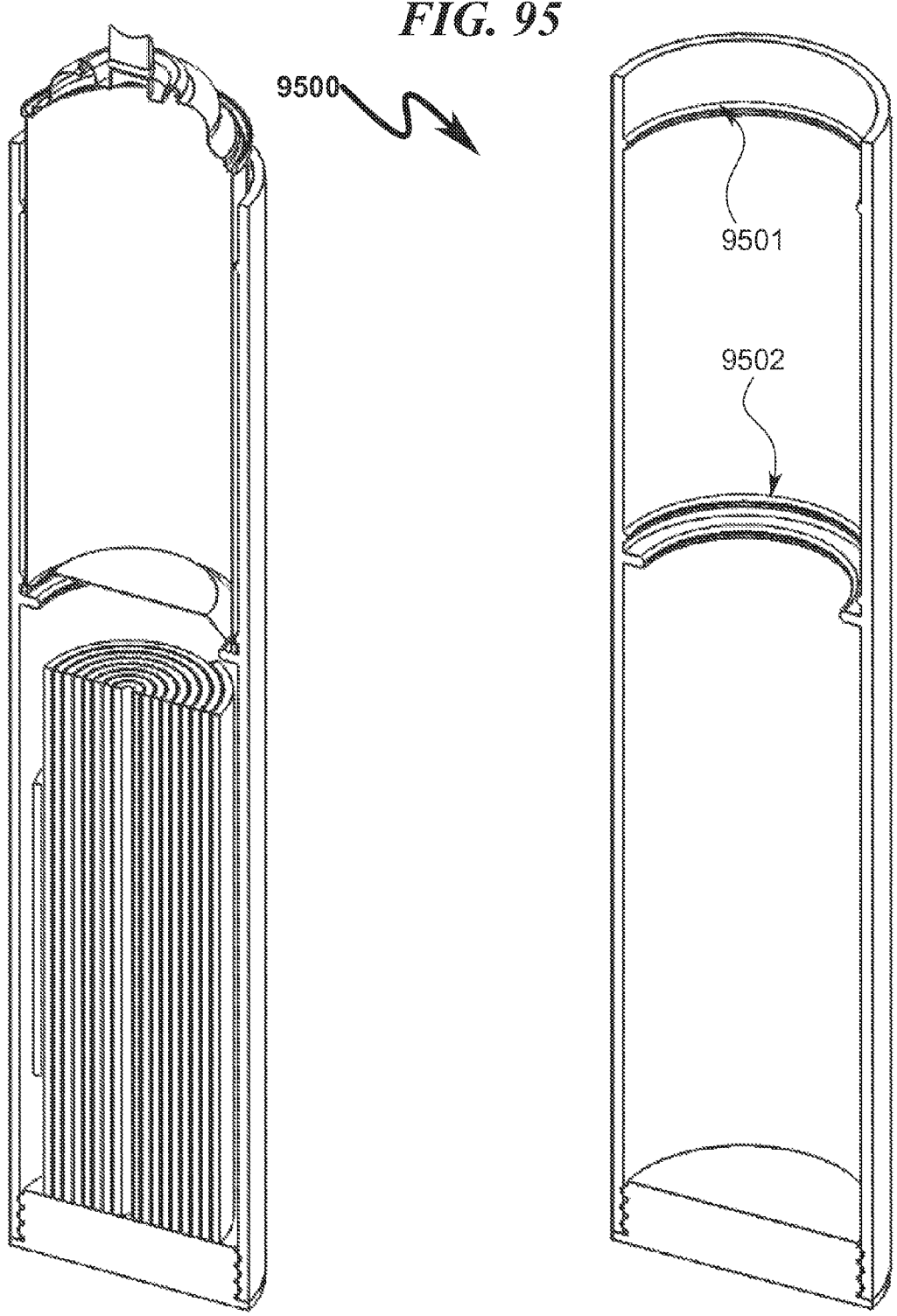
FIG. 95 illustrates a top right perspective sectional view of an exemplary invention kit embodiment incorporating a one-piece rag stack canister that retains a removable aerosol spray can.
Figure 96:
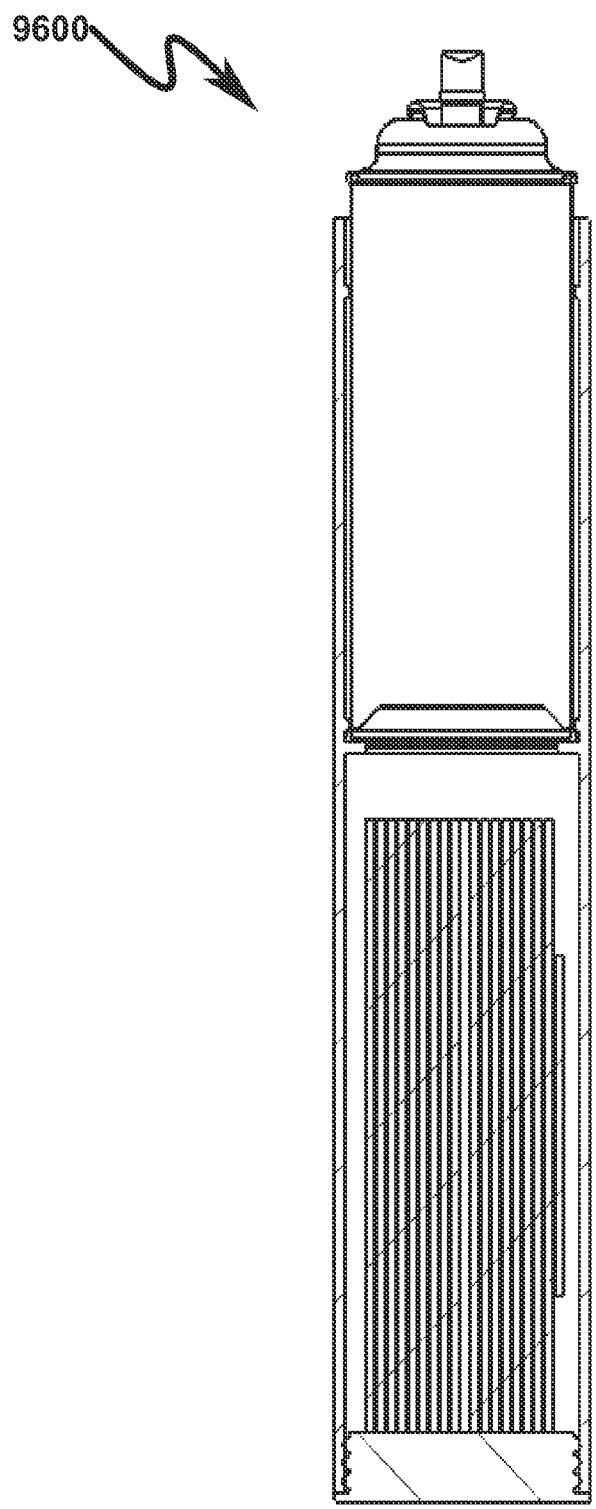
FIG. 96 illustrates a front sectional view of an exemplary invention kit embodiment incorporating a one-piece rag stack canister that retains a removable aerosol spray can.

As depicted in FIG. 89 (8900)-FIG. 96 (9600), the rag stacks described herein may be combined in a kit form embodiment with a one-piece rag stack canister that permits combination with an aerosol spray can. This configuration permits the rag stack to be rolled into a cylindrical form and inserted into one end of the rag stack canister while the opposite end of the rag stack canister is configured to retain an aerosol spray can. As indicated in FIG. 95 (9500), internal lips (9501, 9502) within the rag stack canister cylinder are configured to grip the sides of the aerosol spray can when inserted into the rag stack canister.

Rag Stack Pump Spray Canister Kit (9700)-(10400)

Figure 98:
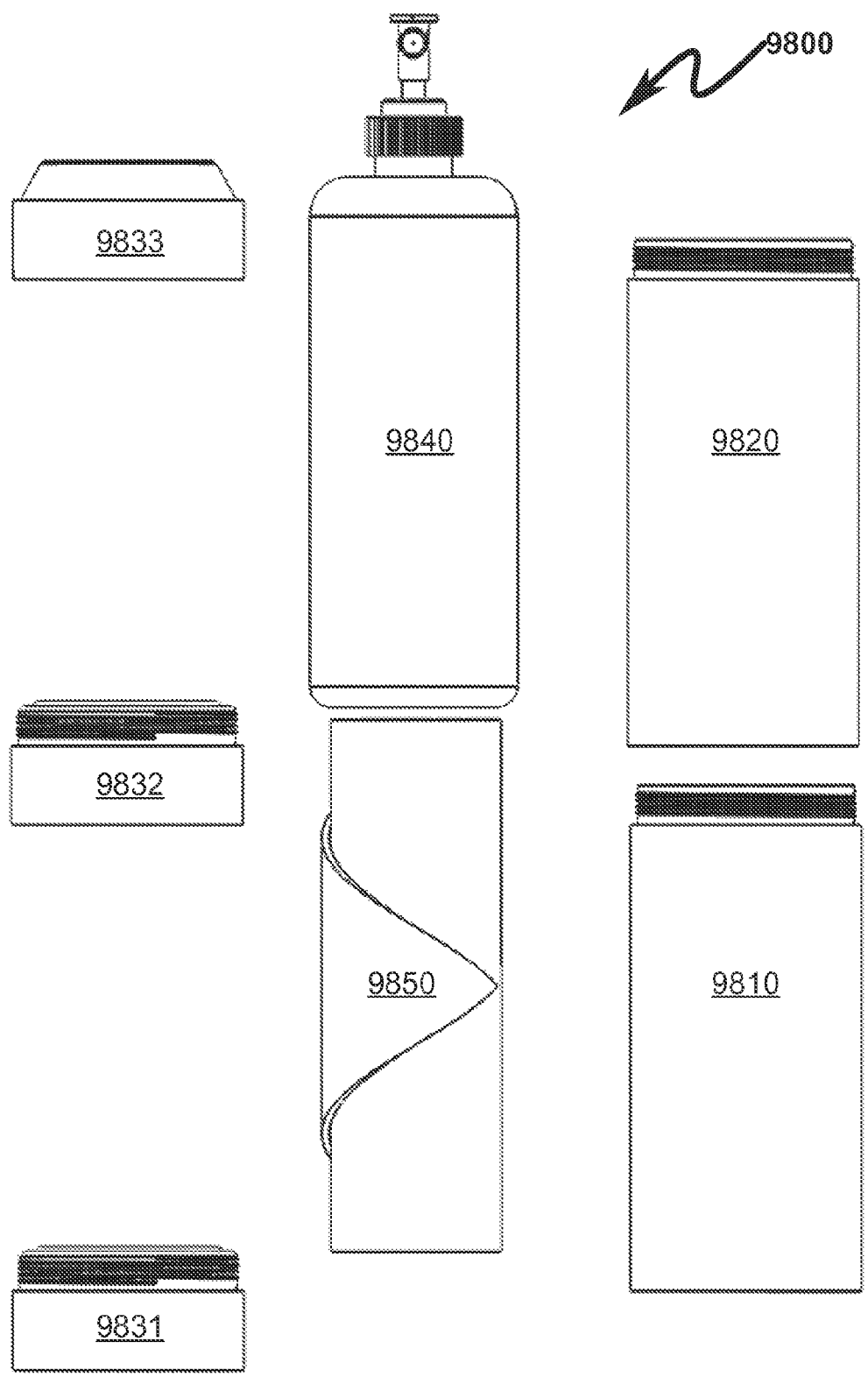
FIG. 98 illustrates a side view of an exemplary invention kit embodiment incorporating a two-piece rag stack canister that retains a removable pump spray bottle.
Figure 99:
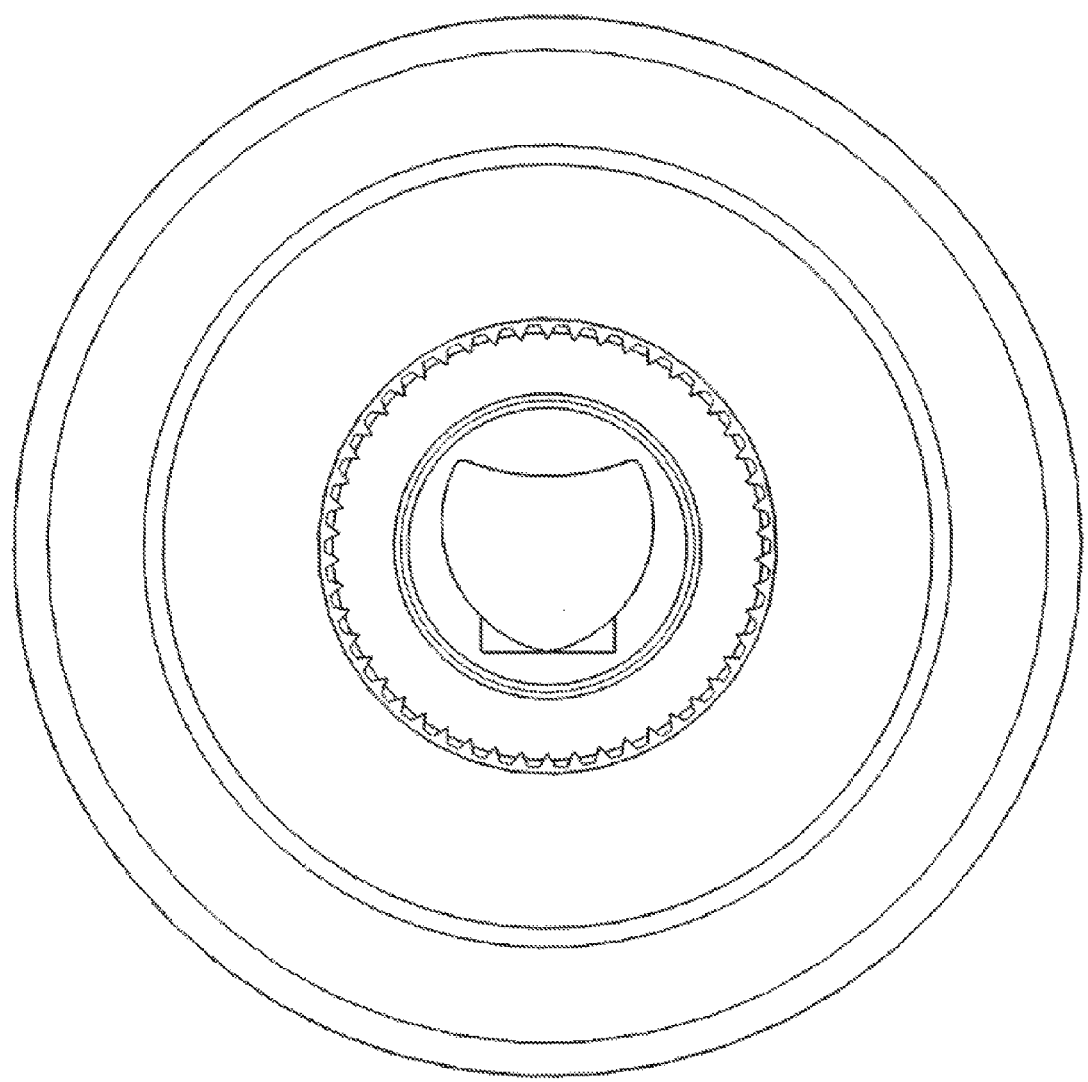
FIG. 99 illustrates a top view of an exemplary invention kit embodiment incorporating a two-piece rag stack canister that retains a removable pump spray bottle.
Figure 100:
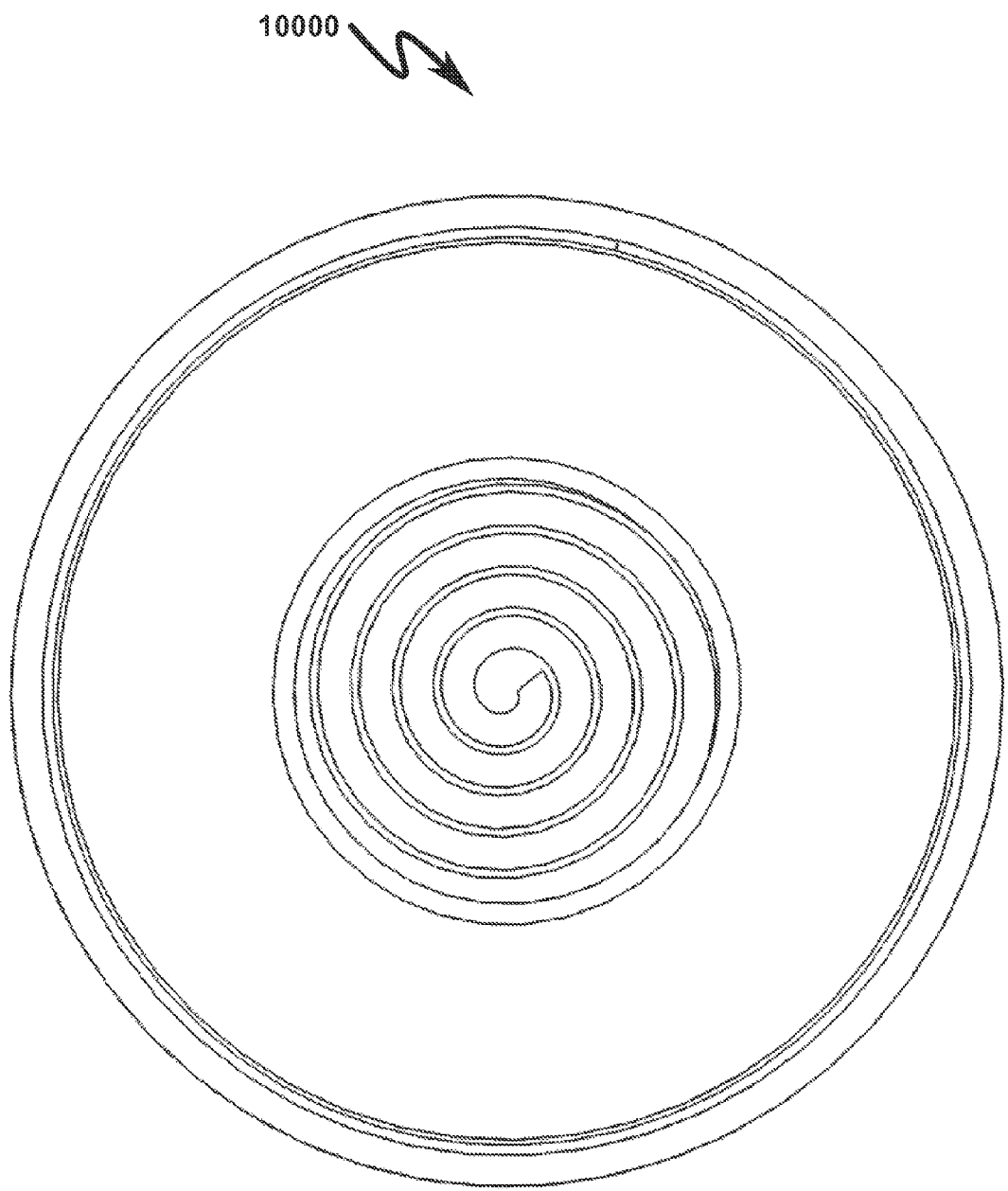
FIG. 100 illustrates a bottom view of an exemplary invention kit embodiment incorporating a two-piece rag stack canister that retains a removable pump spray bottle.
Figure 101:
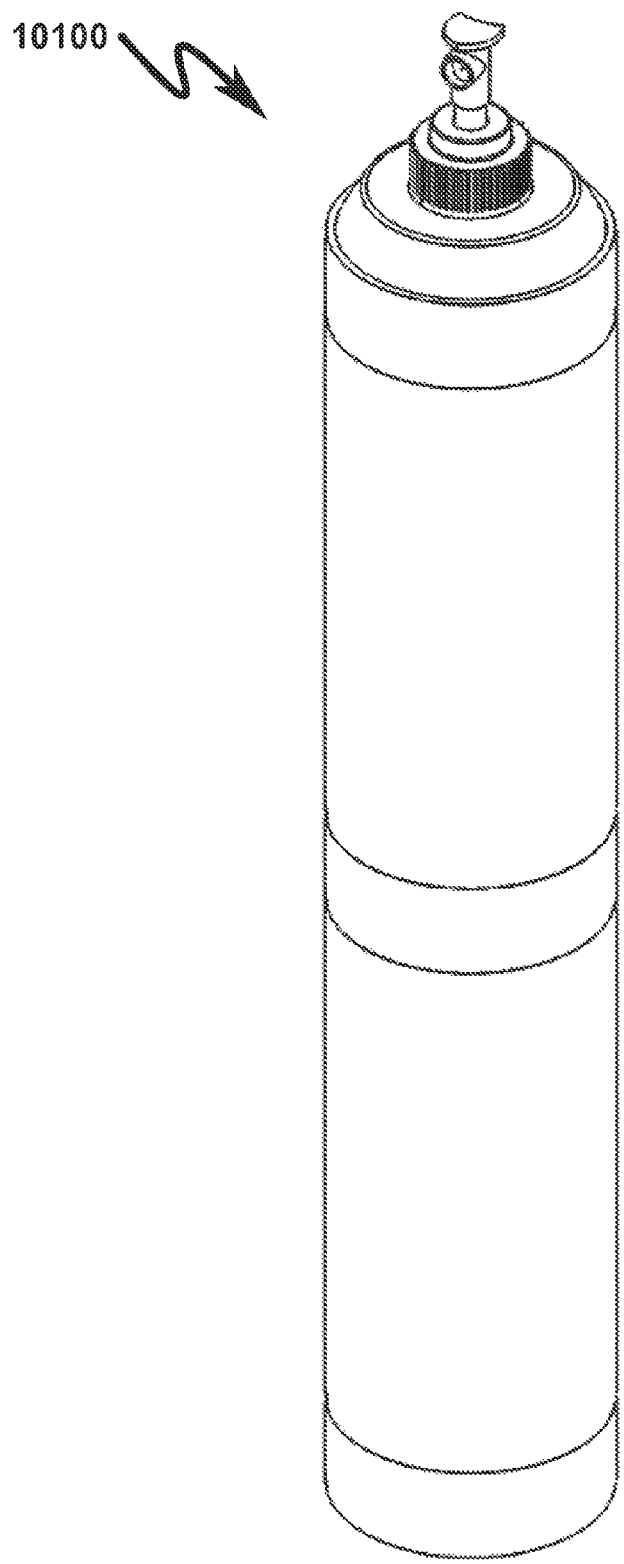
FIG. 101 illustrates a top right perspective view of an exemplary invention kit embodiment incorporating a two-piece rag stack canister that retains a removable pump spray bottle.
Figure 102:
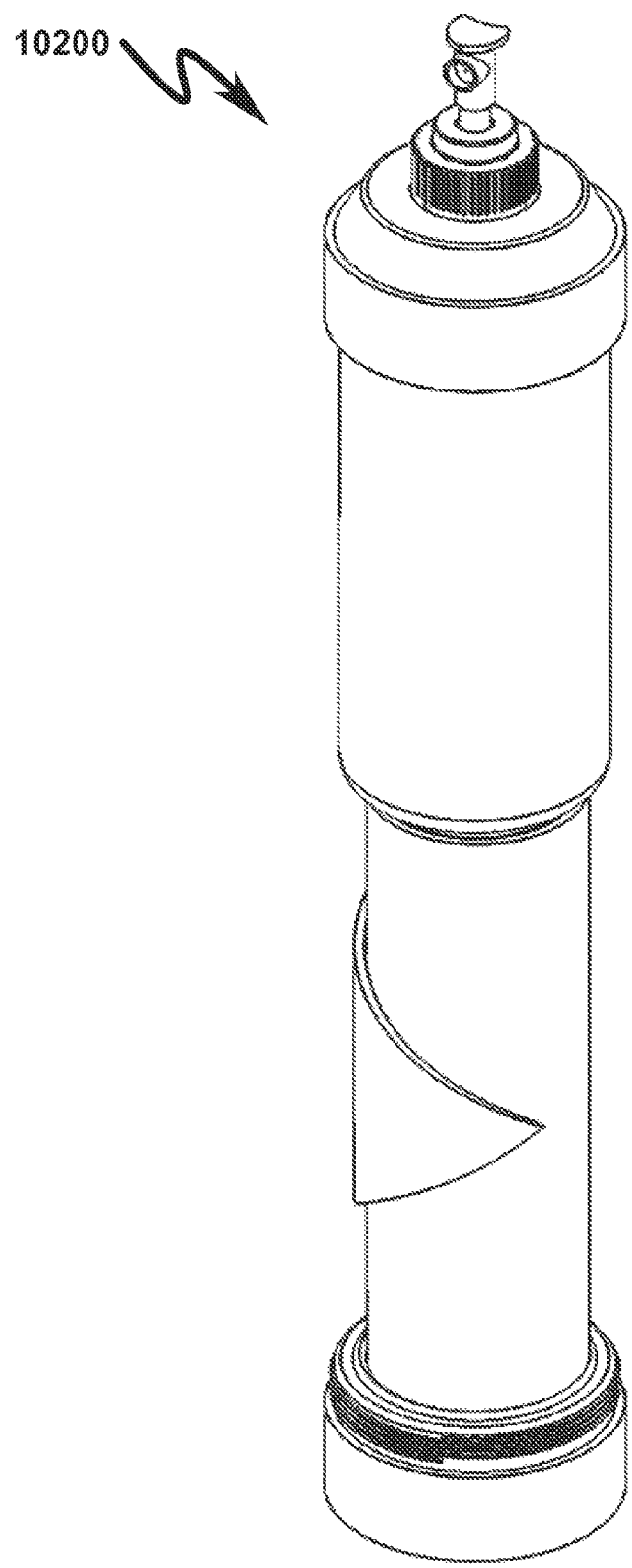
FIG. 102 illustrates a top right perspective view of an exemplary invention kit embodiment incorporating a two-piece rag stack canister that retains a removable pump spray bottle with the two-piece rag stack canister hidden from view.
Figure 103:
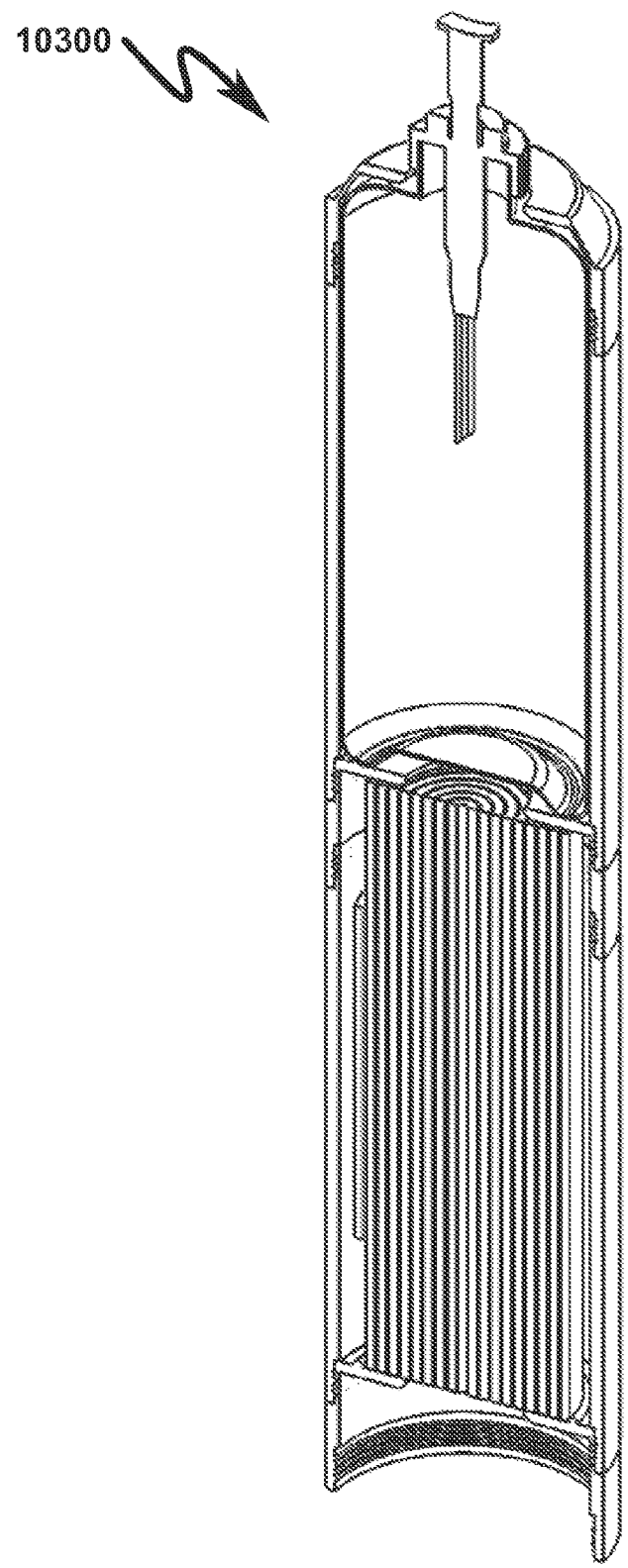
FIG. 103 illustrates a top right perspective sectional view of an exemplary invention kit embodiment incorporating a two-piece rag stack canister that retains a removable pump spray bottle.

As depicted in FIG. 97 (9700)-FIG. 104 (10400), the rag stacks described herein may be combined in a kit form embodiment with a two-piece rag stack canister that permits combination with pump spray bottle. This configuration permits the rag stack to be rolled into a cylindrical form and inserted into one end of the rag stack canister while the opposite end of the rag stack canister is configured to retain a pump spray bottle. As indicated in FIG. 98 (9800), the rag stack cylinder may be sectioned into a first section (9810) containing the pump spray bottle (9840) and a second section (9820) containing the rag stack (9850). These sections (9810, 9820) are partitioned and terminated by a series of caps (9831, 9832, 9833) which screw onto the sections (9810, 9820). The disassembled view of FIG. 98 (9800) provides more detail as to the positioning of each component in this preferred exemplary system embodiment.

Rag Stack Aerosol Spray Canister Kit (10500)-(11200)

Figure 105:
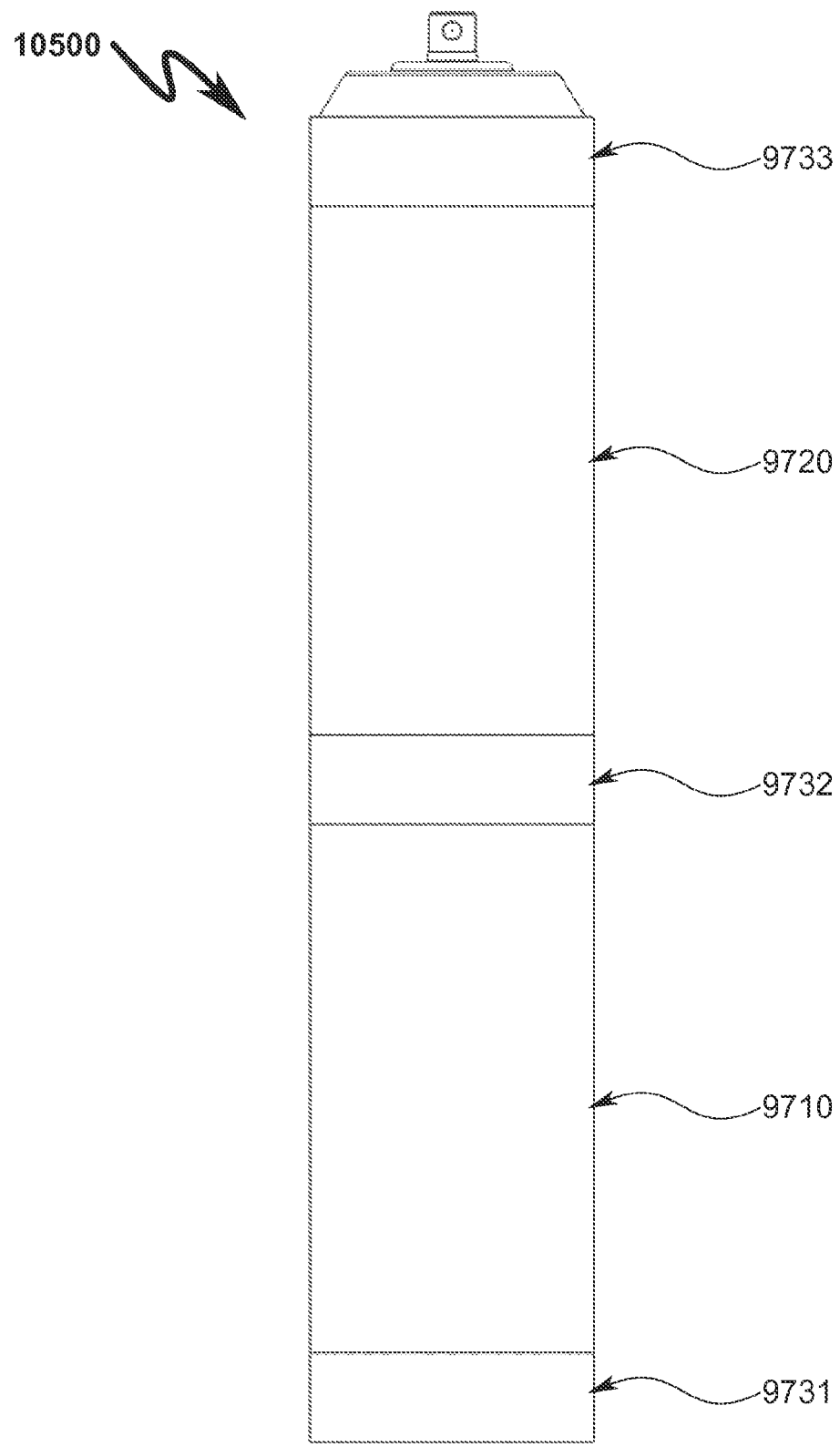
FIG. 105 illustrates a front view of an exemplary invention kit embodiment incorporating a two-piece rag stack canister that retains a removable aerosol spray can.
Figure 106:
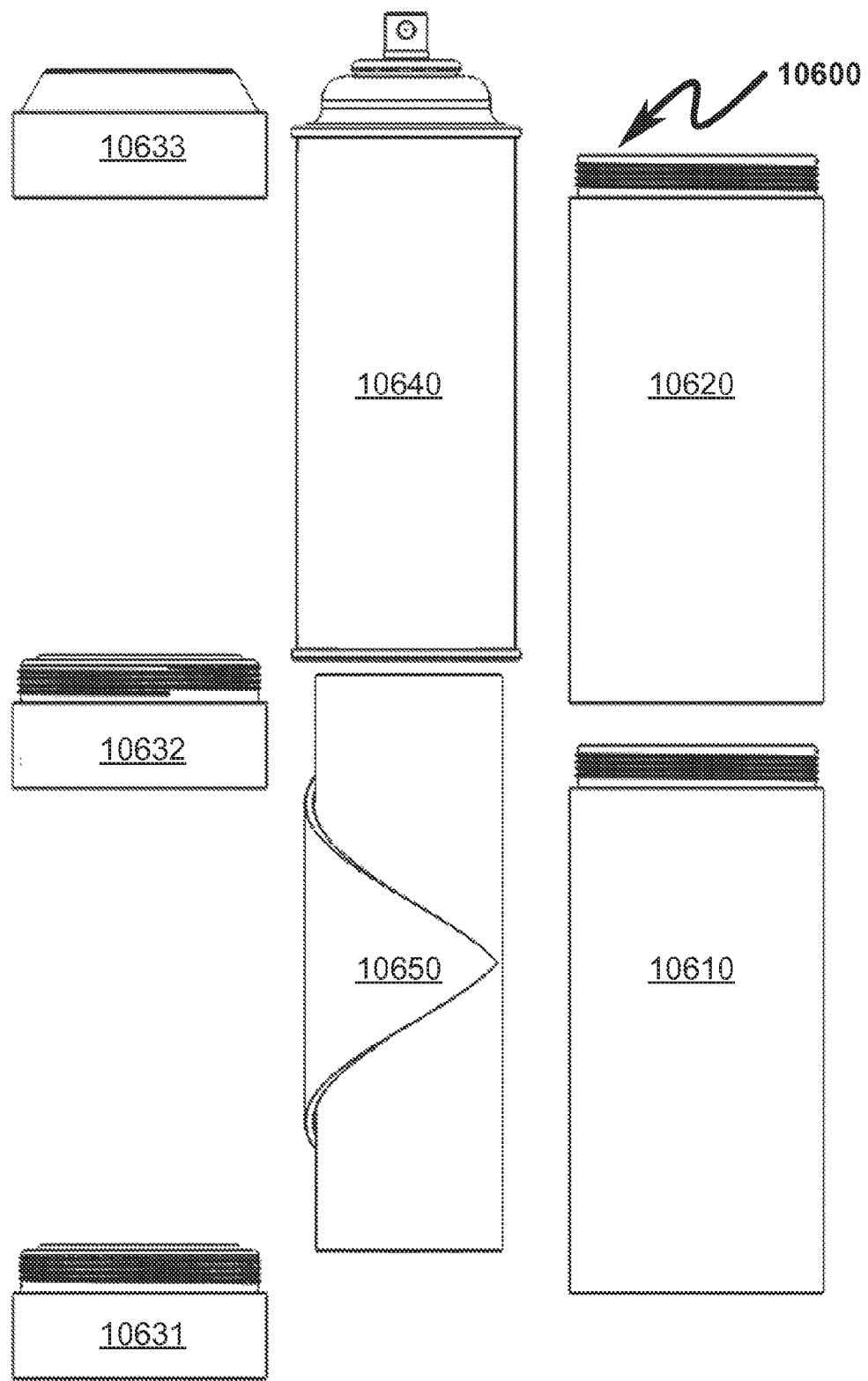
FIG. 106 illustrates a side view of an exemplary invention kit embodiment incorporating a two-piece rag stack canister that retains a removable aerosol spray can.
Figure 107:
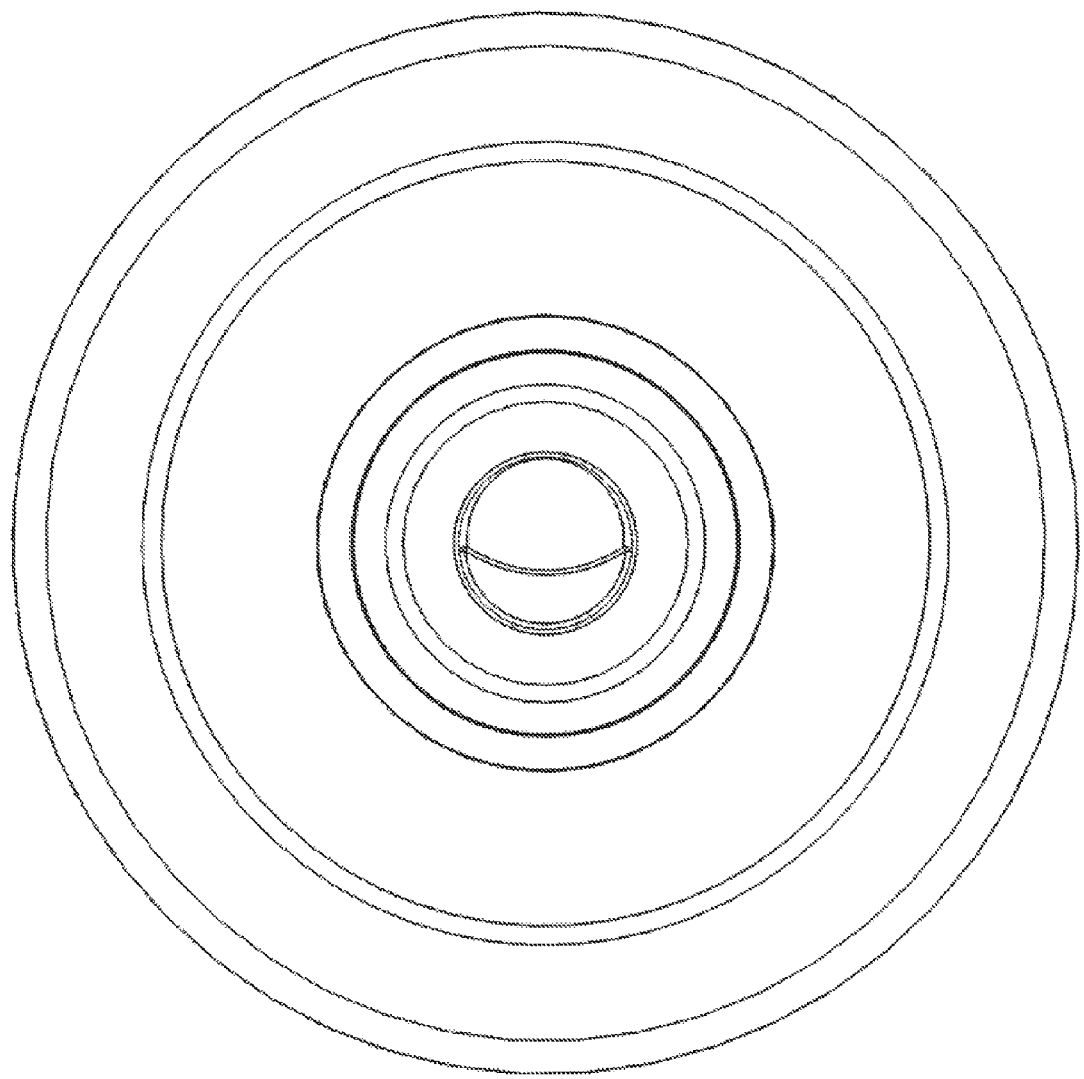
FIG. 107 illustrates a top view of an exemplary invention kit embodiment incorporating a two-piece rag stack canister that retains a removable aerosol spray can.
Figure 108:
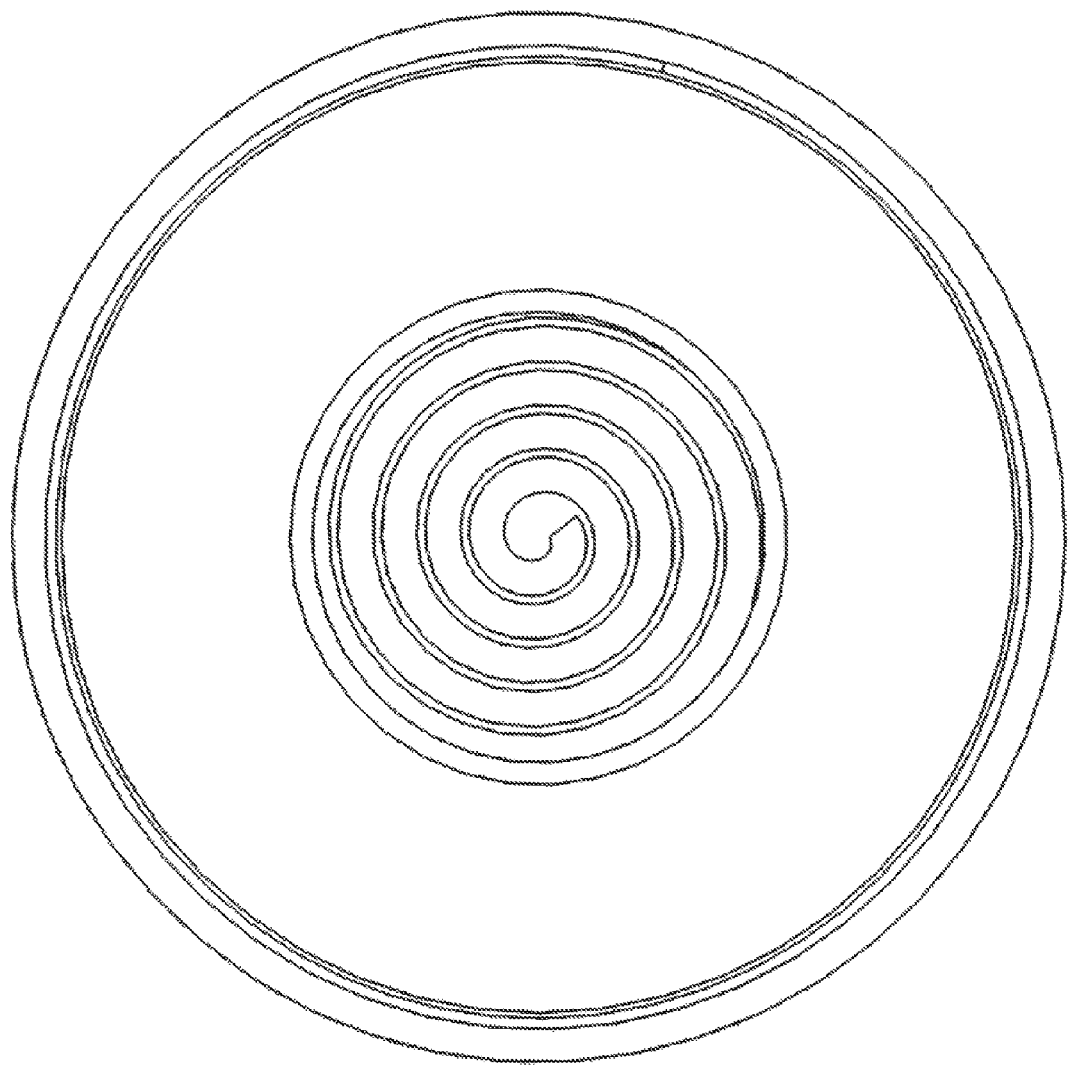
FIG. 108 illustrates a bottom view of an exemplary invention kit embodiment incorporating a two-piece rag stack canister that retains a removable aerosol spray can.
Figure 109:
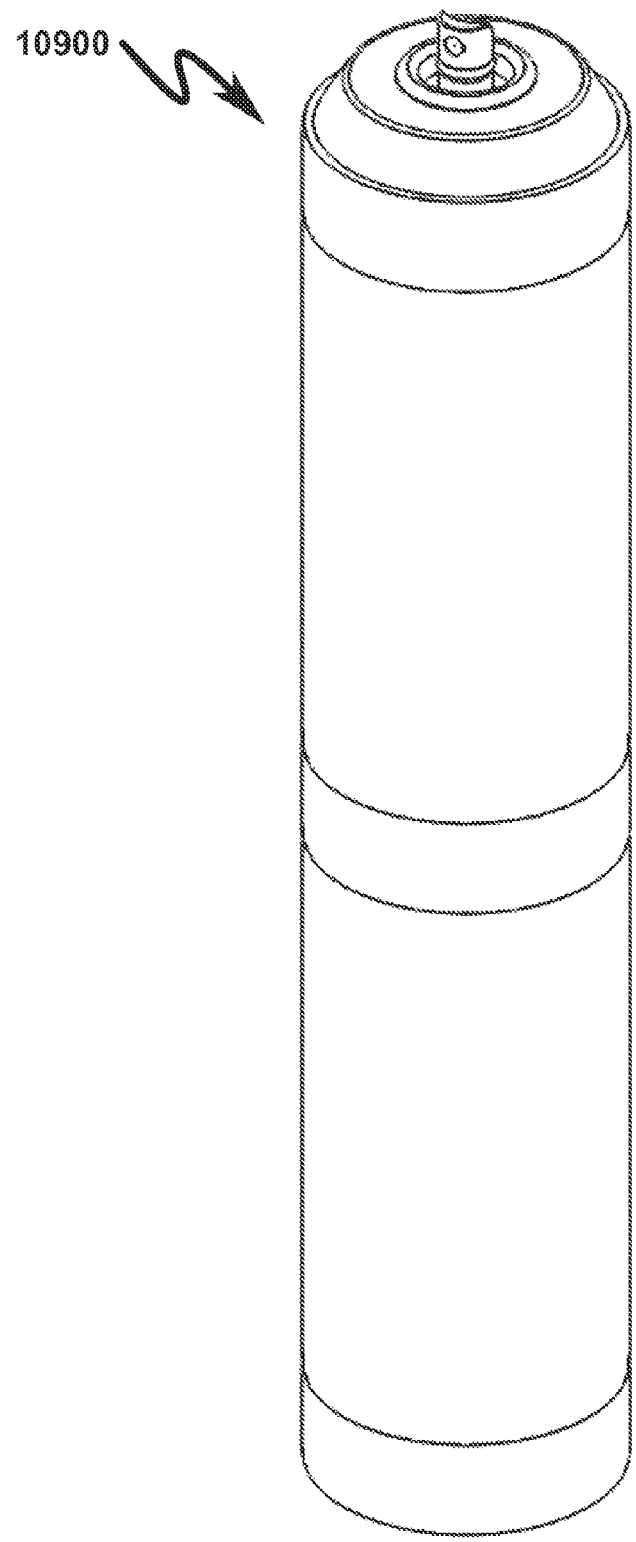
FIG. 109 illustrates a top right perspective view of an exemplary invention kit embodiment incorporating a two-piece rag stack canister that retains a removable aerosol spray can.
Figure 110:
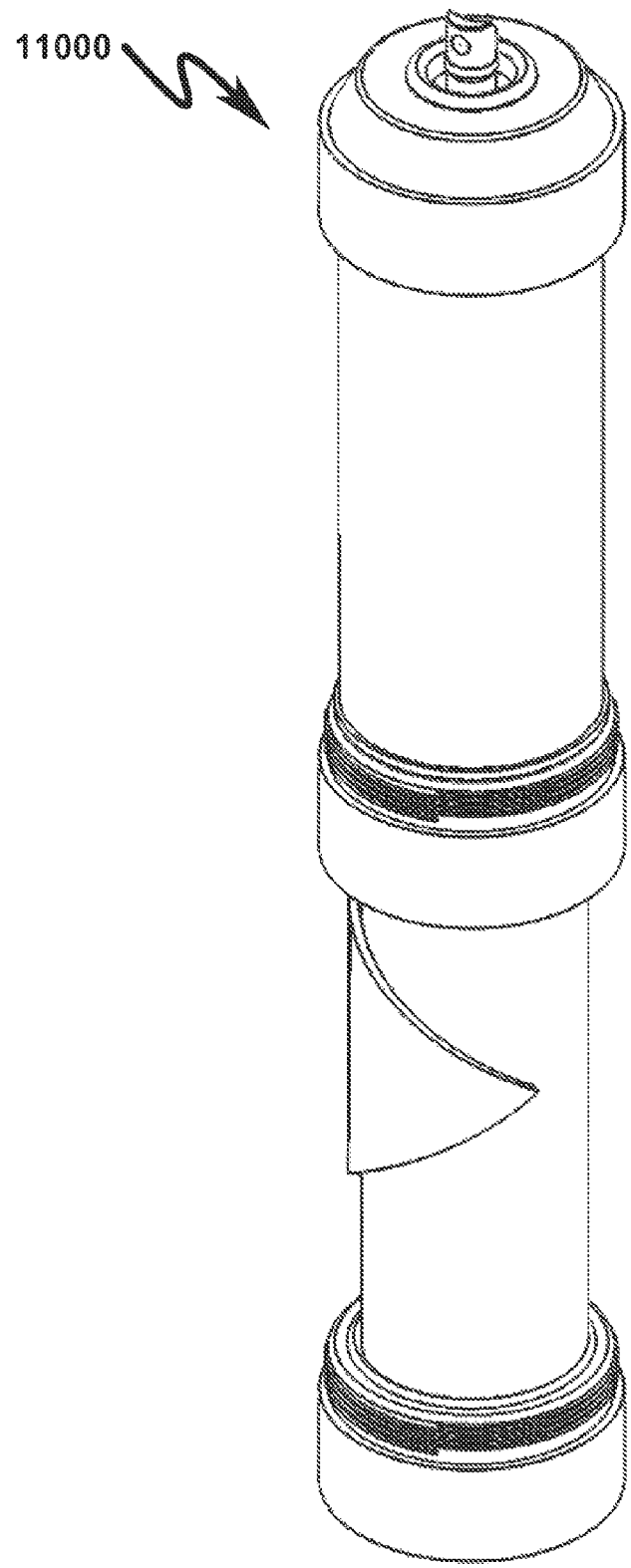
FIG. 110 illustrates a top right perspective view of an exemplary invention kit embodiment incorporating a two-piece rag stack canister that retains a removable aerosol spray can with the two-piece rag stack canister hidden from view.
Figure 111:
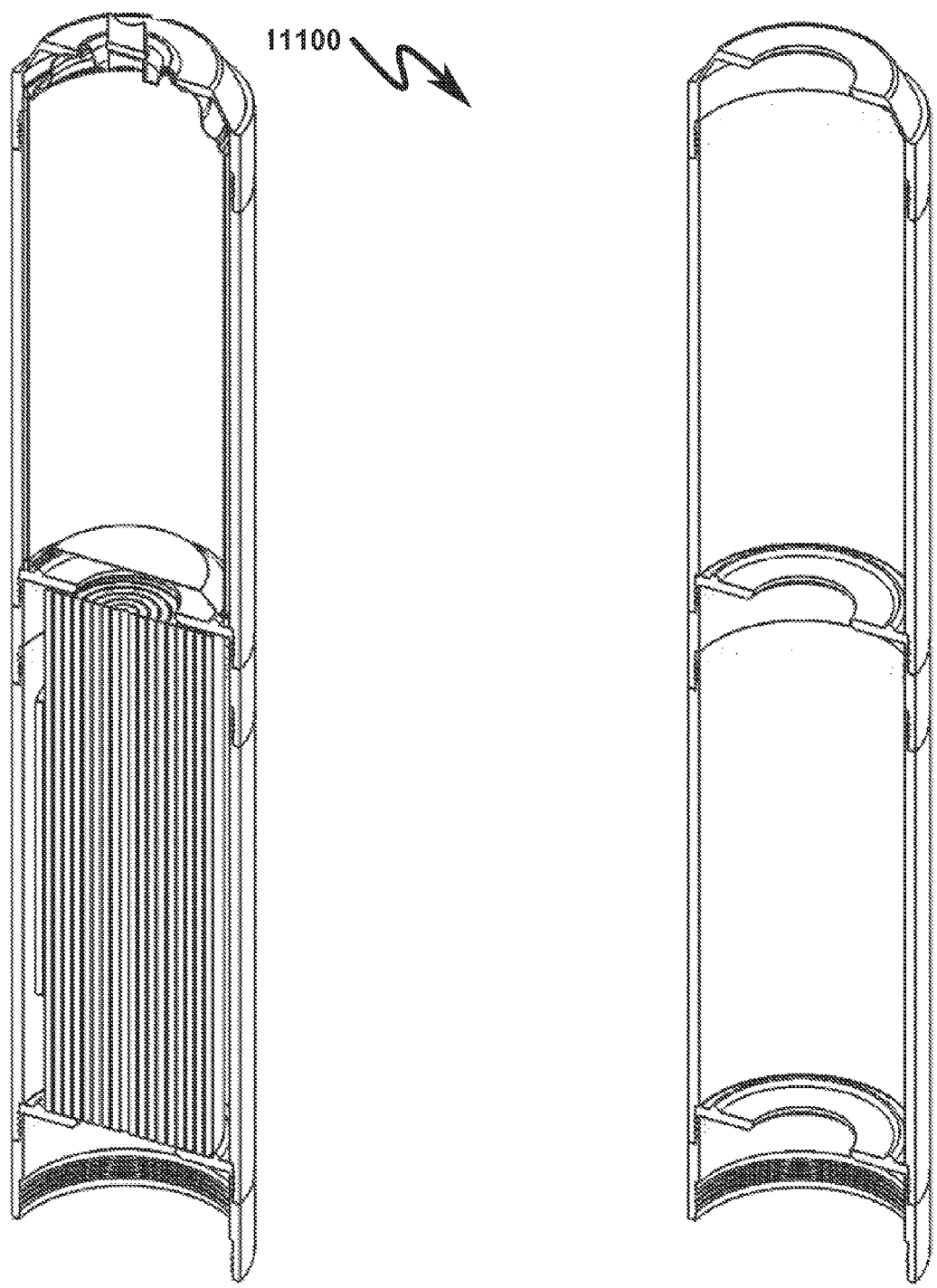
FIG. 111 illustrates a top right perspective sectional view of an exemplary invention kit embodiment incorporating a two-piece rag stack canister that retains a removable aerosol spray can.
Figure 112:
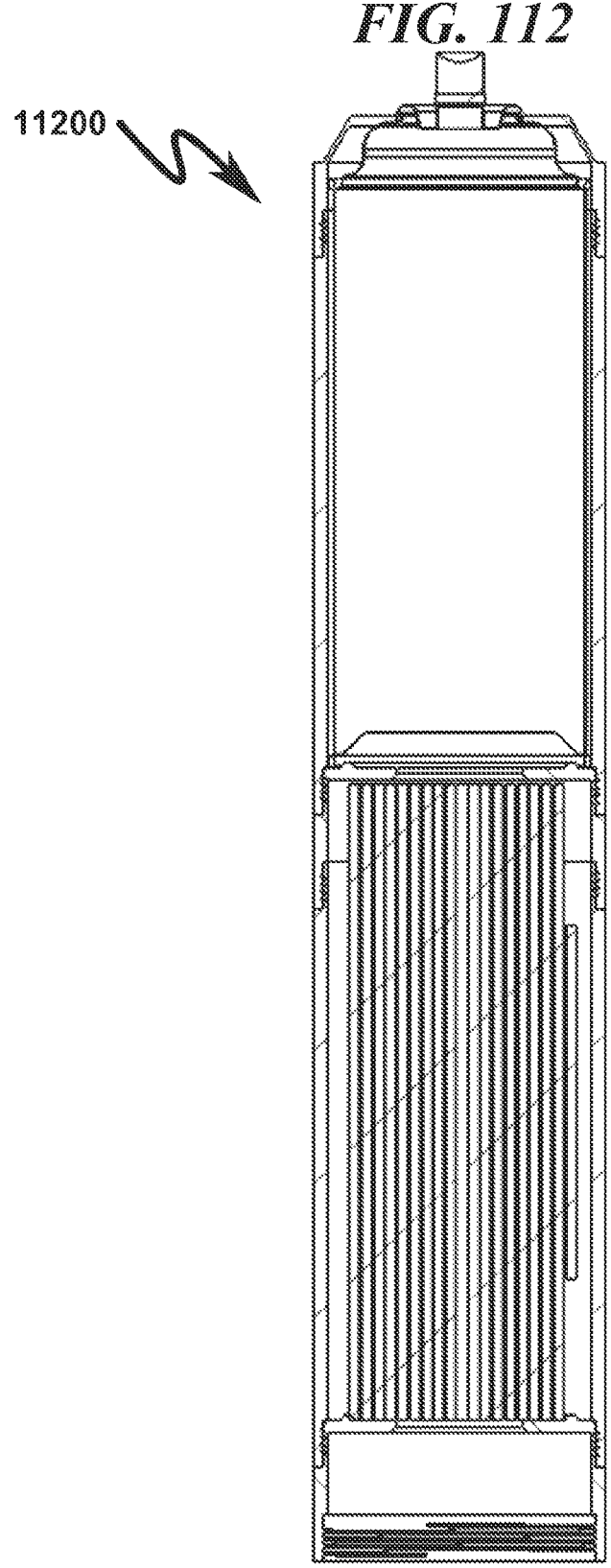
FIG. 112 illustrates a front sectional view of an exemplary invention kit embodiment incorporating a two-piece rag stack canister that retains a removable aerosol spray can.

As depicted in FIG. 105 (10500)-FIG. 112 (11200), the rag stacks described herein may be combined in a kit form embodiment with a two-piece rag stack canister that permits combination with an aerosol spray can. This configuration permits the rag stack to be rolled into a cylindrical form and inserted into one end of the rag stack canister while the opposite end of the rag stack canister is configured to retain an aerosol spray can. As indicated in FIG. 106 (10600), the rag stack cylinder may be sectioned into a first section (10610) containing the aerosol spray can (10640) and a second section (10620) containing the rag stack (10650). These sections (10610, 10620) are partitioned and terminated by a series of caps (10631, 10632, 10633) which screw onto the sections (10610, 10620). The disassembled view of FIG. 106 (10600) provides more detail as to the positioning of each component in this preferred exemplary system embodiment.

Rag Stack Dry Erase Kit (11300)-(12000)

Figure 113:
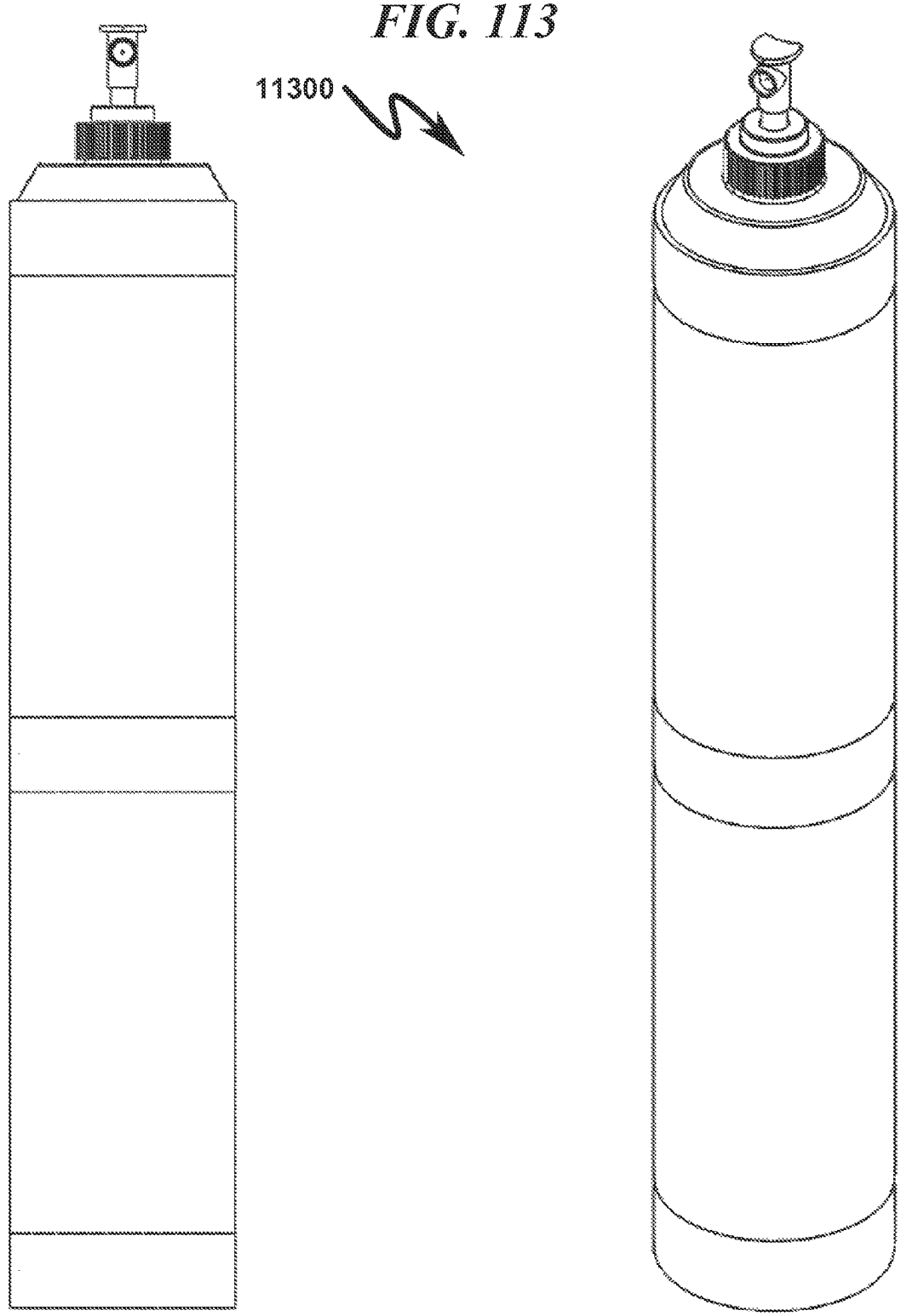
FIG. 113 illustrates front and front perspective views of an exemplary invention kit embodiment implementing a dry erase kit incorporating a rag stack canister that retains dry erase markers.
Figure 115:
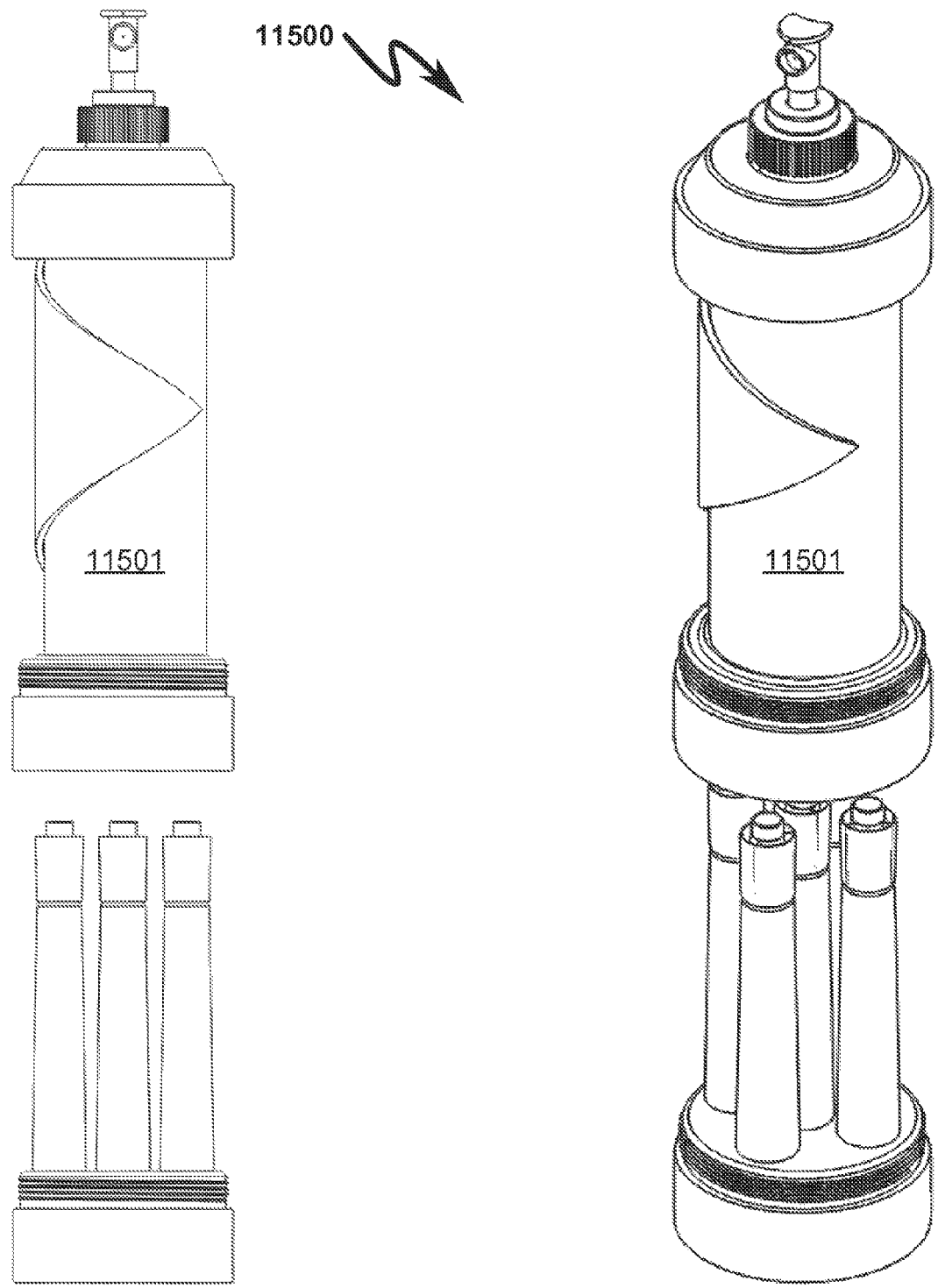
FIG. 115 illustrates front and front perspective views of an exemplary invention kit embodiment implementing a dry erase kit incorporating a rag stack canister that retains dry erase markers with rag stack canister hidden.
Figure 116:
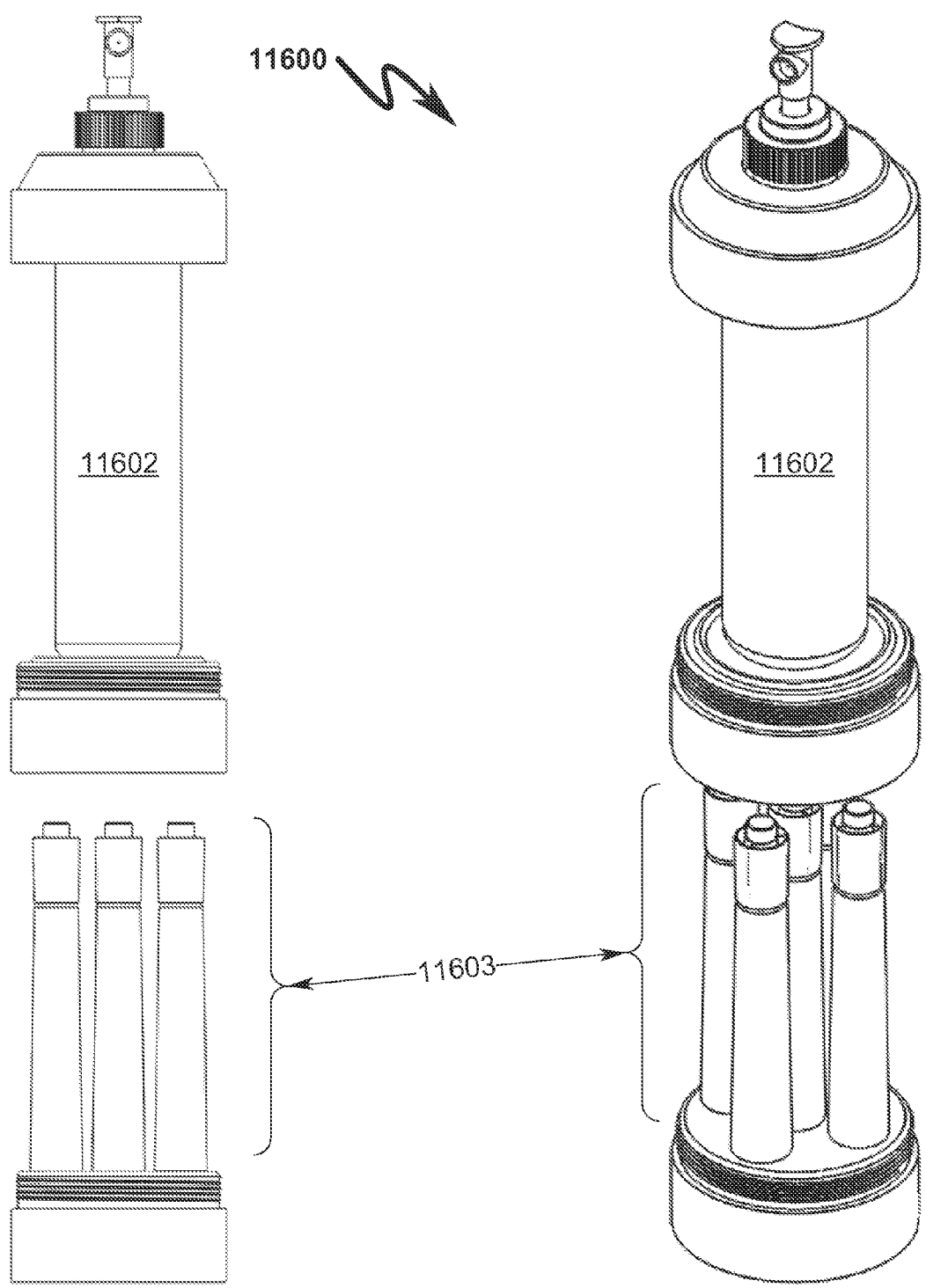
FIG. 116 illustrates front and front perspective views of an exemplary invention kit embodiment implementing a dry erase kit incorporating a rag stack canister that retains dry erase markers with rag stack and rag stack canister hidden.
Figure 117:
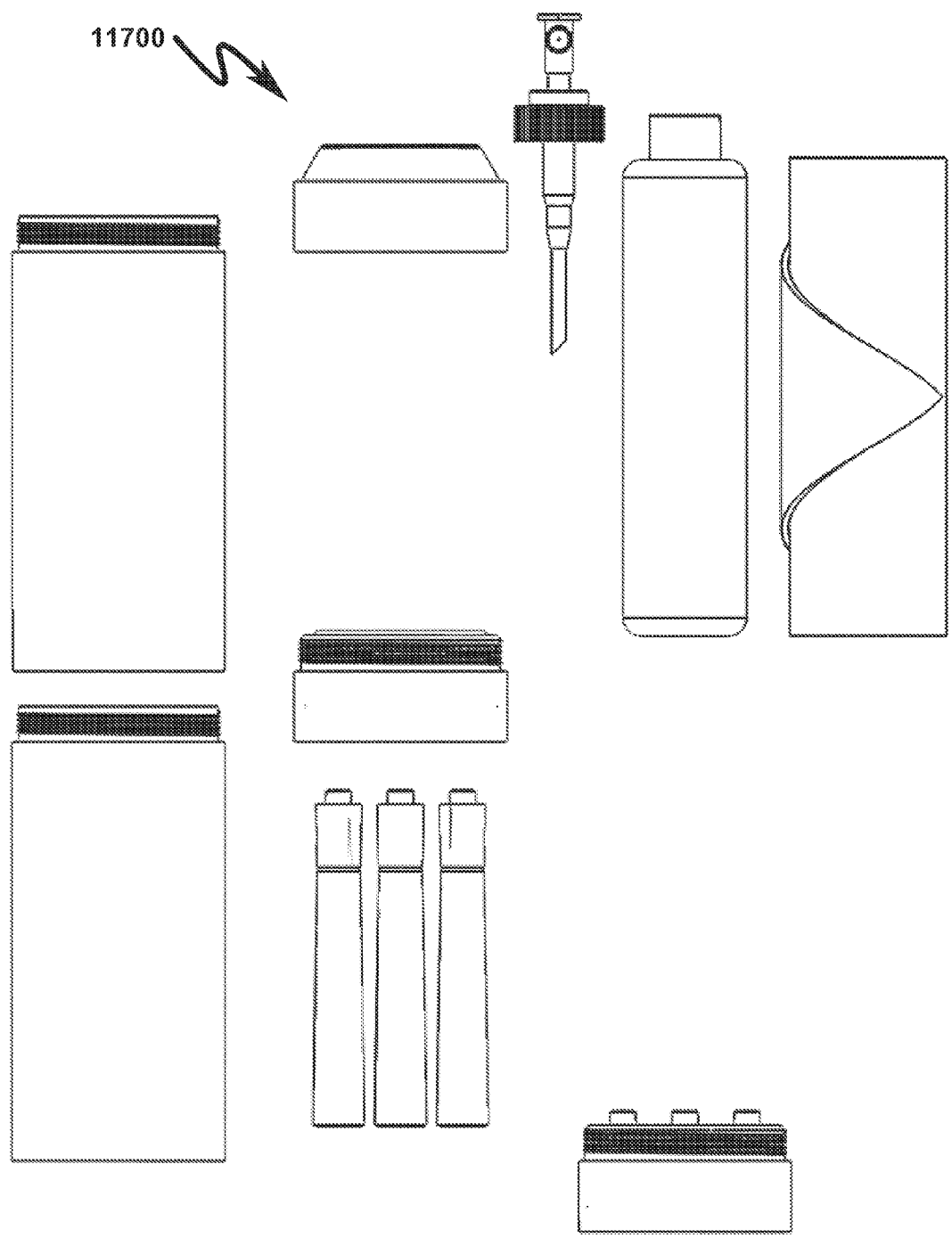
FIG. 117 illustrates a front exploded view of an exemplary invention kit embodiment implementing a dry erase kit incorporating a rag stack canister that retains dry erase markers.
Figure 118:
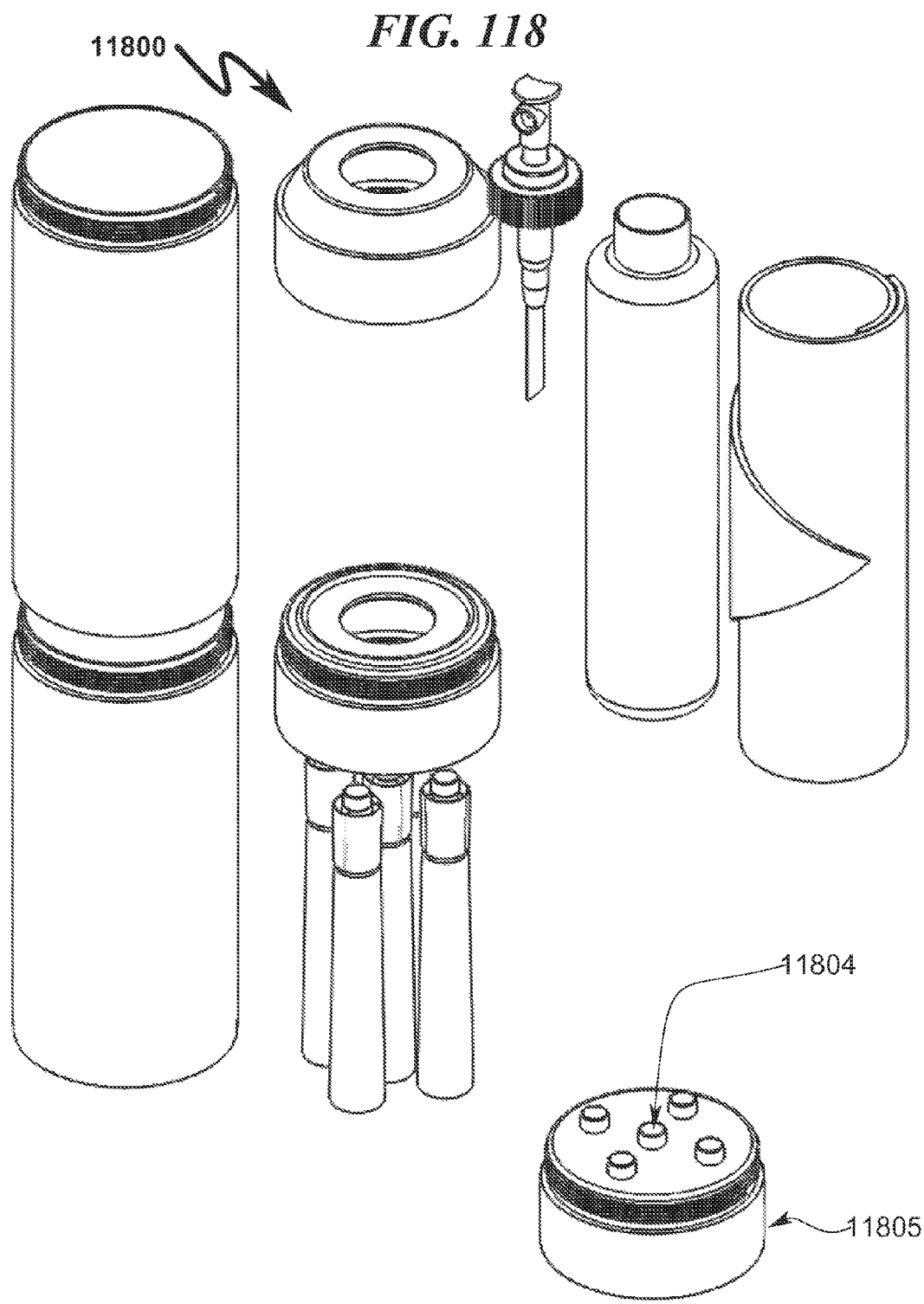
FIG. 118 illustrates a front exploded perspective view of an exemplary invention kit embodiment implementing a dry erase kit incorporating a rag stack canister that retains dry erase markers.
Figure 119:
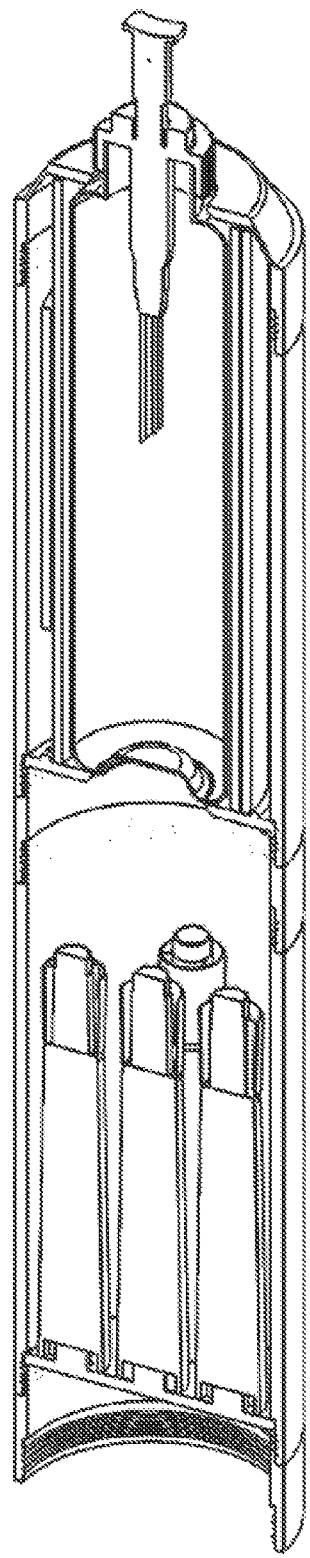
FIG. 119 illustrates a top right perspective sectional view of an exemplary invention kit embodiment implementing a dry erase kit incorporating a rag stack canister that retains dry erase markers.

As depicted in FIG. 113 (11300)-FIG. 120 (12000), the rag stacks described herein may be combined in a kit form embodiment that supports a dry erase board marker/cleaning kit. This configuration permits the rag stack (11501) to be rolled into a cylindrical form around a pump spray bottle (11601) at one end of the rag stack canister while the opposite end of the rag stack canister is configured to retain markers (11603) for a dry erase board. This combination of cleaning and marking function within one kit has the advantage that all components of the system can be organized into a single apparatus, thus minimizing the chance of loss of markers or cleaning rag. The use of the multi-layer rag stack (11501) in this application also has the advantage of improved dry erase board cleaning as compared to conventional dry erase board rectangular erasers. As depicted in FIG. 118 (11800), the endcap of the rag stack canister may incorporate retention nibs (11804) that mate with the bottom of the markers (11603) to secure the markers (11603) within the rag stack canister kit.

It should be noted that while the dry erase kit configuration illustrated in FIG. 113 (11300)-FIG. 120 (12000) incorporates a two-piece rag stack canister, a one-piece rag stack canister as depicted in FIG. 81 (8100)-FIG. 88 (8800) is also possible wherein the end cap (11805) for the two-piece design is incorporated as the end plug (8703) of the one-piece design, with incorporation of the retention nibs (11804) that mate with the bottom of the dry erase markers (11603). In either configuration, the use of screw-type connections is optional, as the plug-type design (8703) may be used in either configuration based on application requirements and design goals.

Exemplary Automotive/Golf Application Context (12100)

Figure 121:
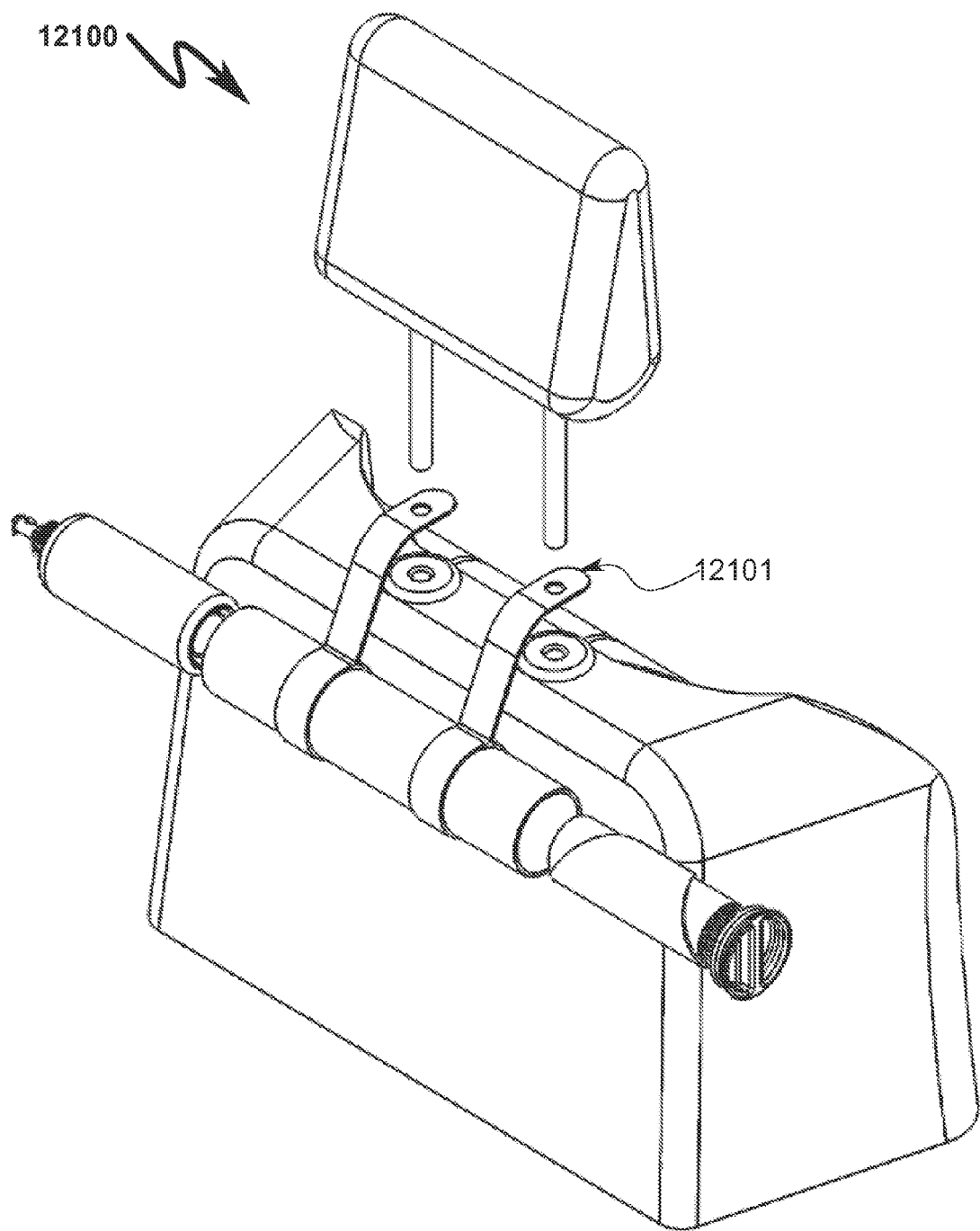
FIG. 121 illustrates an exemplary attachment means between a typical rag stack canister and an automobile headrest.

As depicted in FIG. 121 (12100), the present invention as embodied in a rag stack canister may be advantageously applied to an automotive, golfing, or other application by the use of headrest support tabs (12101) or the like to attach the rag stack canister to an automotive headrest or like support on a golf cart. This configuration permits ease of access to the rag stack and associated cleaning products that are stored within the canister body. In this application context the rag stack kit may be used to clean the interior of a car or provide the necessary multi-cloth cleaning system necessary to clean golf clubs while golfing.

The present invention anticipates that the headrest support tabs (12101) may incorporate provisions for a carabineer or other hook that permits the rag stack canister to be attached to a work belt or other personnel harness. This kitting configuration is useful for cleaning personnel who may wish to be mobile yet still have the ability to perform cleaning operations using both the rag stack and a spray or aerosol fluid dispenser.

Aerosol/Spray Fluids not Limitive

The present invention anticipates that kits combining a variety of rag stack complements and specialized aerosol/ spray fluids may be useful in many circumstances. For example, a spray disinfectant may be combined with antibacterial cleaning cloth as part of the rag stack, with an alternate rag stack element incorporating an air freshener to reduce odor after the cleanup is completed. This might have application in situations where an automobile child carrier is cleaned after a child experienced a car sickness event.

Multi-Layer Stack Example (12200)-(12400)

Figure 122:
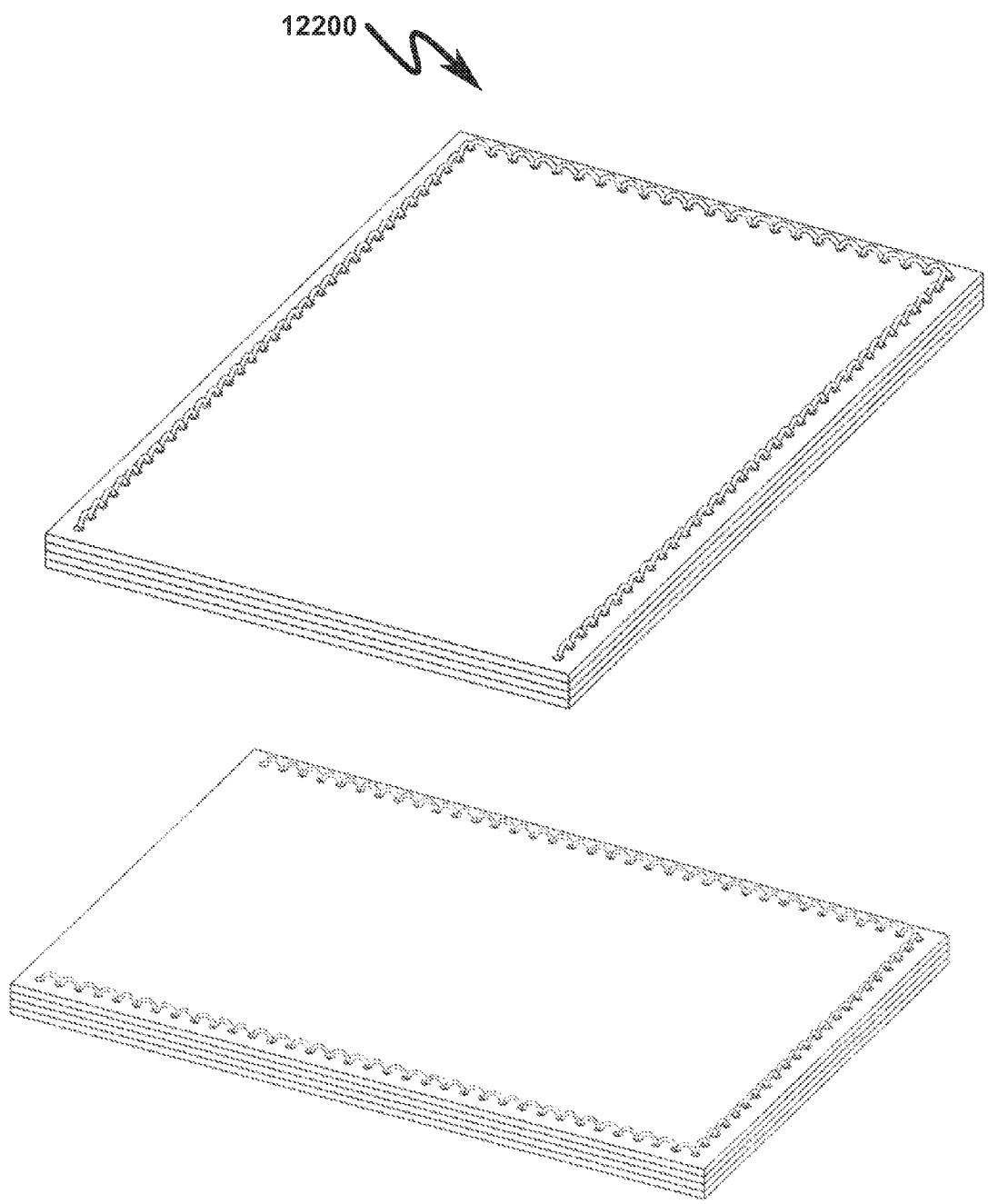
FIG. 122 illustrates a top front perspective view of an exemplary 4-layer PRS rag stack and a top rear perspective view of an exemplary 4-layer PRS rag stack.
Figure 123:
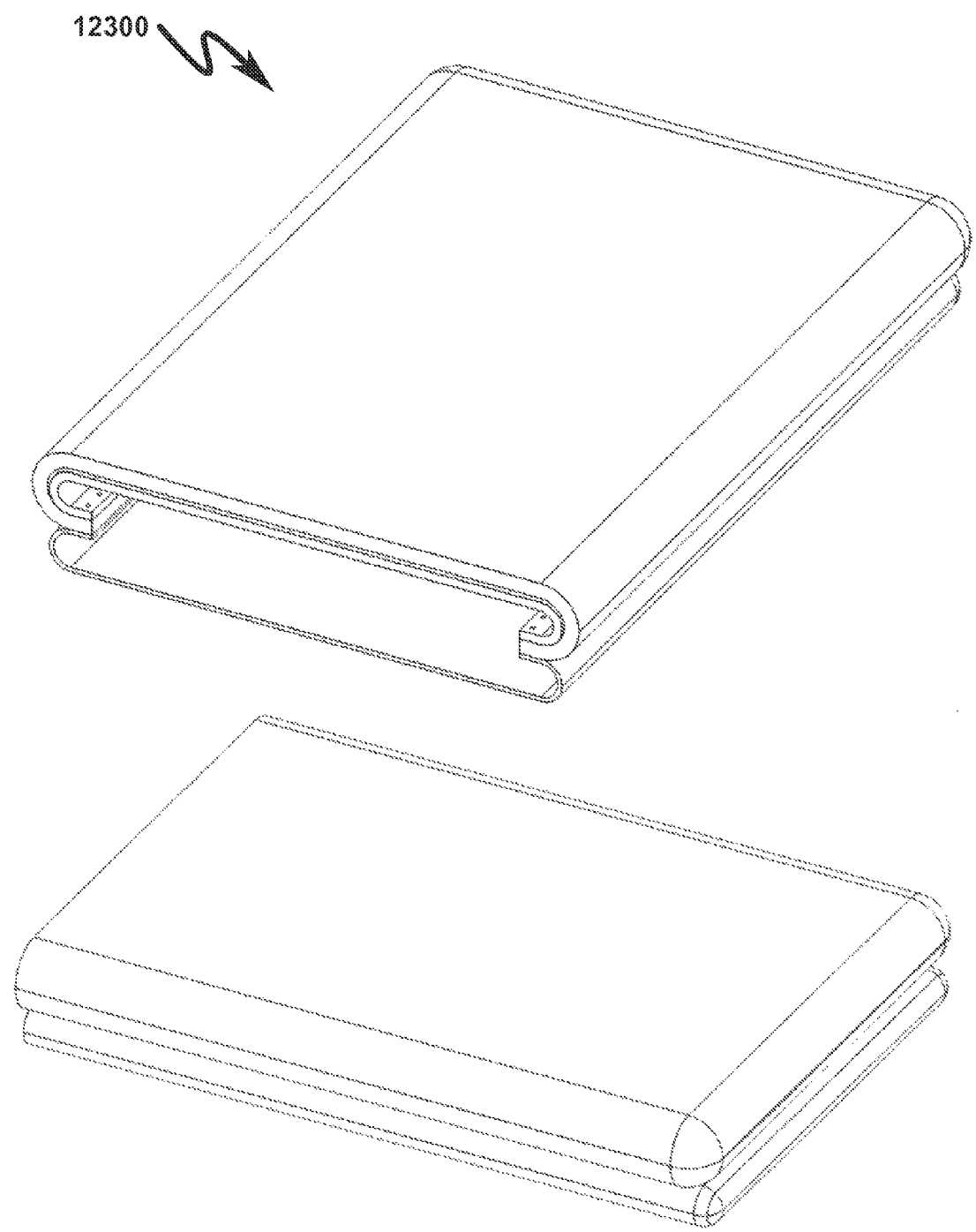
Figure 124:
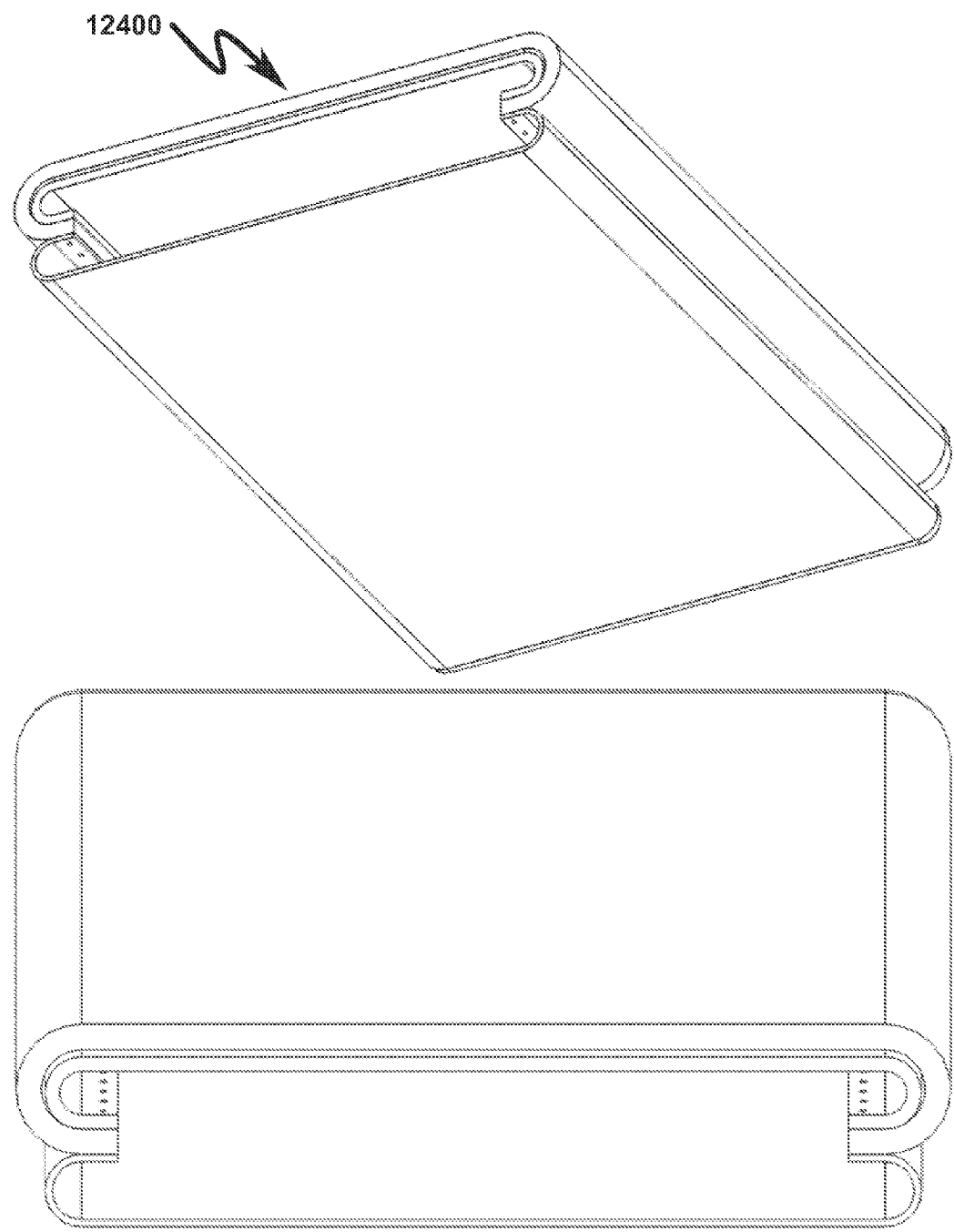

As previously discussed, the present invention may incorporate a number of layers within the PRS. As depicted in the exemplary 4-layer stack depicted in FIG. 122 (12200), each of the stack layers may permit eversion of the inner stack layers to the outside of the PRS (as generally depicted in the everted views of FIG. 123 (12300)-FIG. 124 (12400)) and thus present a new set of surface for use by the rag stack system. This flexibility permits a single rag stack to be used for both sides of each rag while isolating the rag surfaces from each other. The ability to multiply the number of rag surfaces available via the eversion process multiplies the usefulness of the rag stack system.

Exemplary Rag Stack Layers (12500)

Figure 125:
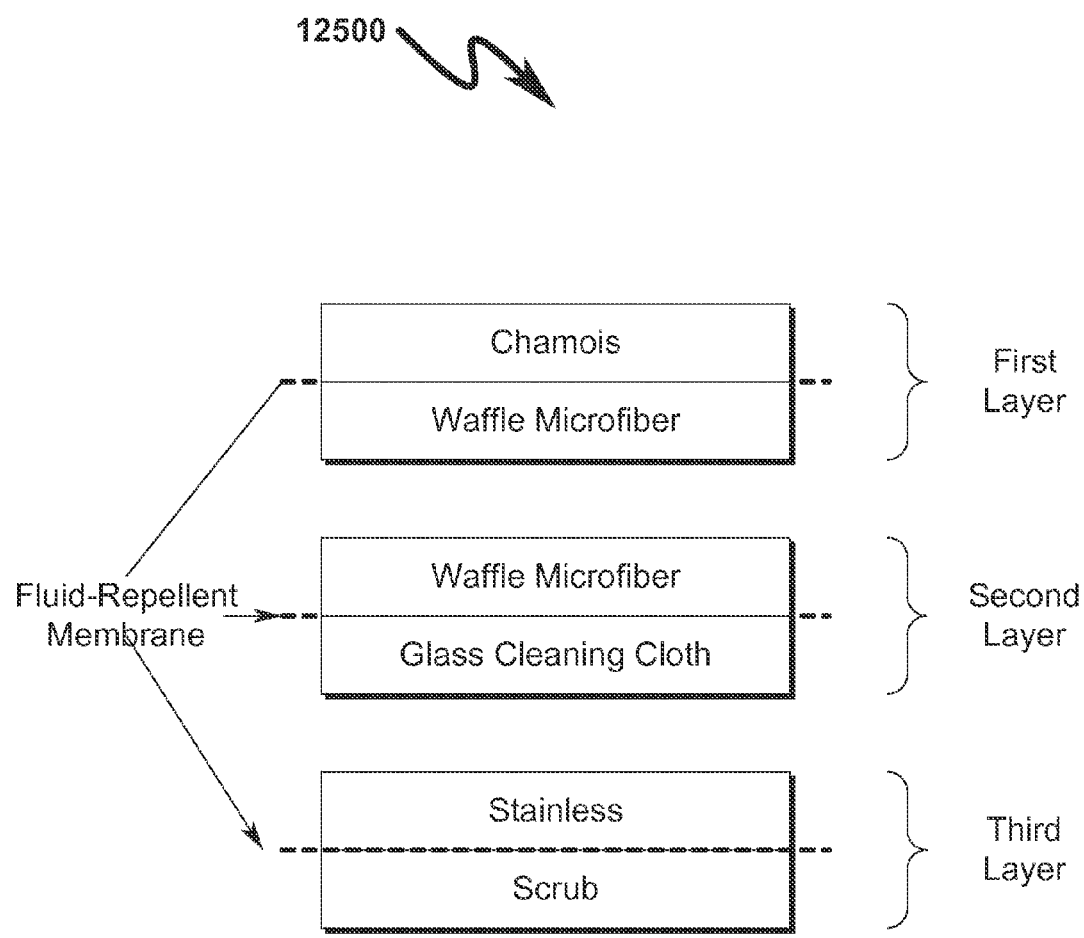

An exemplary rag stack incorporating three paired layers is generally depicted in FIG. 125 (12500) wherein a three-layer rag stack comprising chamois/waffle microfiber, waffle microfiber/glass cleaning cloth, and stainless/scrubbing cloth material pairs is depicted. As shown, each material pair is mated to a fluid-repellent barrier membrane layer (such as plastic, plastic film, or TYVEK®) that isolates one side of the material pair from the opposite side of the material pair.

This configuration permits each pair of sheets to be separated by and optionally attached together via the fluid-repellent barrier membrane layer. This fluid-repellent barrier membrane layer permits each side of the sheet material pair to be used without contaminating the remaining opposite side layer of the sheet. This, for example, permits a cleaning fluid to be applied with one side of the material pair while a buffing compound may be applied to the opposite side of the material pair without fear of these fluids interacting with each other.

Within the present invention context, the term "sheet pair" will be deemed to include the use of a fluid-repellent barrier membrane layer between individual sheets to prevent contamination between each individual sheet.

Method Overview (12600)

Figure 126:
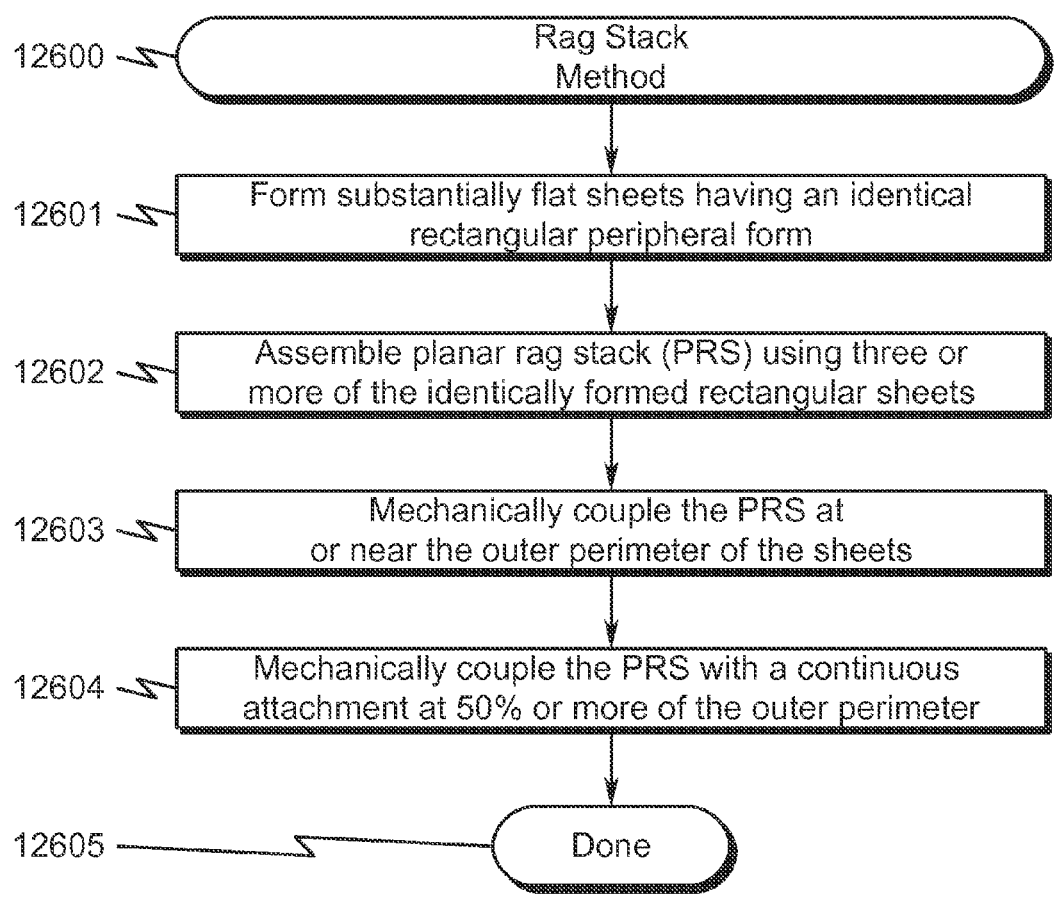

An exemplary present invention method can be generally described in the flowchart of FIG. 126 (12600) as incorporating the following steps:
(1) Form substantially flat sheets having an identical rectangular peripheral form (12601);
(2) Assemble planar rag stack (PRS) using three or more of the identically formed rectangular sheets (12602);
(3) Mechanically couple the PRS at or near an outer perimeter of the sheets (12603); and
(4) Mechanically couple the PRS with a continuous attachment at 50% or more of the PRS outer perimeter (12604).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Alternate Method Overview (12700)

Figure 127:
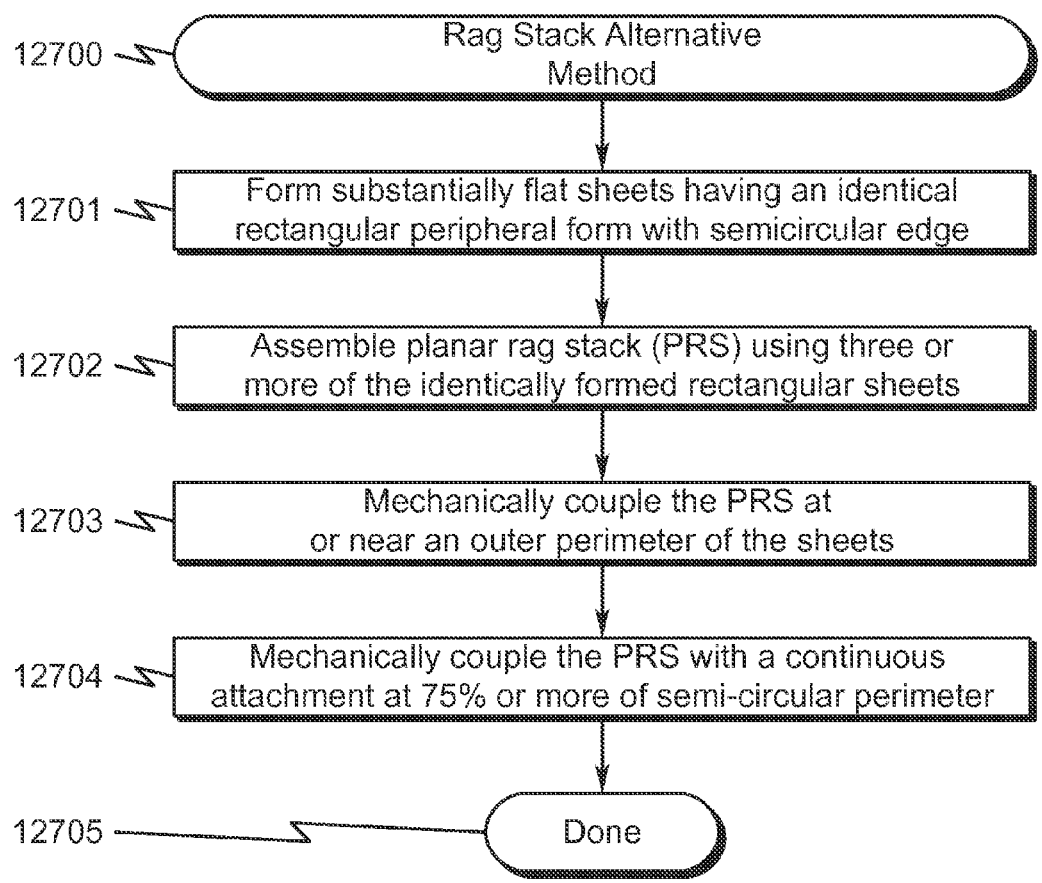

An alternate exemplary present invention method can be generally described in the flowchart of FIG. 127 (12700) as incorporating the following steps:
(1) Form substantially flat sheets having an identical rectangular peripheral form with semi-circular edge (12701);
(2) Assemble planar rag stack (PRS) using three or more of the identically formed rectangular sheets (12702);
(3) Mechanically couple the PRS at or near the outer perimeter of the sheets (12703); and
(4) Mechanically couple the PRS with a continuous attachment at 75% or more of the PRS outer perimeter including the semi-circular edge (12704).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Alternate Method Overview (12800)

Figure 128:
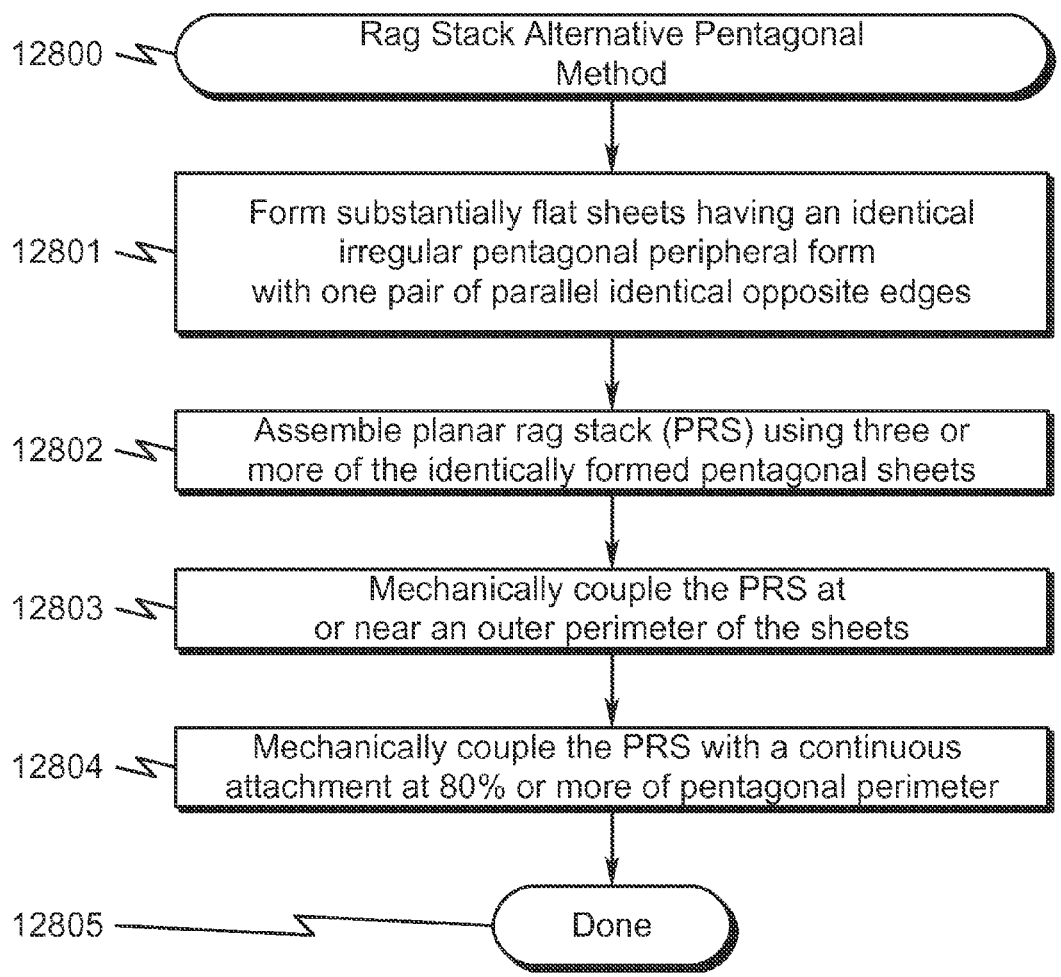

An alternate pentagonal exemplary present invention method can be generally described in the flowchart of FIG. 128 (12800) as incorporating the following steps:
(1) Form substantially flat sheets having an identical irregular pentagonal peripheral form with one pair of parallel identical opposite edges (12801);
(2) Assemble planar rag stack (PRS) using three or more of the identically formed pentagonal sheets (12802);
(3) Mechanically couple the PRS at or near the outer perimeter of the sheets (12803); and
(4) Mechanically couple the PRS with a continuous attachment at 80% or more of the PRS pentagonal outer perimeter including the opposite identical edges (12804).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Exemplary Construction Materials

Threads
The present invention anticipates that the optimal thread sizes for sewn invention embodiments range from 69-138.
Fluid-Repellent Membrane
The present invention anticipates that the fluid-repellent membrane may be optimally made of flexible plastic material or a more durable repellent material such as TYVEK® material.
Chamois
The present invention anticipates that the chamois material may be optimally selected from SHAMMY® brand chamois material or a synthetic variant such as SKILCRAFT® brand Synthetic Shammy Cloths or SUPER-CLEANS® brand shammy chamois cloth.

Waffle-Weave Microfiber

The present invention anticipates that the microfiber material may be optimally selected from a high quality microfiber cleaning waffle cloth comprising approximately 80% polyester and 20% polyamide, 100% polyester microfiber, or 70% polyester and 30% polyamide.

Glass Cloth

The present invention anticipates that the glass cleaning cloth may be optimally selected from a microfiber glass cloth that permits windows and mirrors to be cleaned without streaking or leaving lint behind. This soft, lint-free microfiber cloth safely cleans dirt and greasy fingerprints from glass mirrors and any reflective surfaces without using chemicals. The cloths can be used dry, or simply dampened with water for more cleaning power.

Stainless Steel Cloth

The present invention anticipates that the stainless steel cleaning cloth may optimally comprise 75% polyester, 15% polyamide, and 10% polypropylene.

Scrub/Scour Cloth

The present invention anticipates that the scrubbing/scouring cleaning cloth may be a microfiber cloth that has two different weaves and materials on each side of the cloth. These microfiber cloths are also known in the market as Microfiber Towels, Microfiber Rags, Microfiber Wipers, and Microfiber Combination Cloths. One side of the cloth is looped terry microfiber material which is adapted for absorbing and wiping surfaces and the other side is woven with vinyl loops, which makes it an aggressive scrubbing microfiber cloth. This cloth may be used with water only and no chemicals are typically needed. This microfiber cloth will eliminate scouring sponges in most cleaning applications and is generally much better because sponges breed bacteria and these cloths are 100% bacteria resistant. These cloths have a greater life expectancy than scouring sponges and typically are constructed of 80% Polyester/20% Polyamide with a weight of 200-300 grams/square meter.

System Summary

The present invention system anticipates a wide variety of variations in the basic theme of construction, but can be generalized as a rag stack system comprising:
  (a) planar rag stack (PRS); and
  (b) peripheral stack attachment (PSA);
  wherein
  the PRS comprises three or more sheets of substantially flat material of identical peripheral form;
  the peripheral form is rectangular;
  the PSA is configured to mechanically couple the PRS at or near the outer perimeter of the sheets; and
  the mechanical coupling of the PRS comprises continuous attachment at 50% or more of the outer perimeter.

This general system summary may be augmented by the various elements described herein to produce a wide variety of invention embodiments consistent with this overall design description.

Method Summary

The present invention method anticipates a wide variety of variations in the basic theme of implementation, but can be generalized as a rag stack method comprising:
  (1) forming a planar rag stack (PRS) comprising three or more sheets of substantially flat material of identical peripheral form; and
  (2) mechanically coupling the PRS at or near an outer perimeter of the sheets;
  wherein
  the peripheral form is rectangular; and
  the mechanical coupling of the PRS comprises continuous attachment at 50% or more of the outer perimeter.

This general method summary may be augmented by the various elements described herein to produce a wide variety of invention embodiments consistent with this overall design description.

Alternate Semi-Circular System Summary

An alternate present invention semi-circular system anticipates a wide variety of variations in the basic theme of construction, but can be generalized as a rag stack system comprising:
  (a) planar rag stack (PRS); and
  (b) peripheral stack attachment (PSA);
  wherein
  the PRS comprises three or more sheets of substantially flat material of identical peripheral form;
  the PSA is configured to mechanically couple the PRS at or near an outer perimeter of the sheets; and
  the peripheral form is rectangular in extent and has one semi-circular outer edge;
  the outer edge mechanically couples the PRS via the PSA;
  the mechanical coupling of the PRS comprises continuous attachment at 75% or more of the outer perimeter.

This general system summary may be augmented by the various elements described herein to produce a wide variety of invention embodiments consistent with this overall design description.

Alternate Pentagonal System Summary

An alternate present invention pentagonal system anticipates a wide variety of variations in the basic theme of construction, but can be generalized as a rag stack system comprising:
  (a) planar rag stack (PRS); and
  (b) peripheral stack attachment (PSA);
  wherein
  the PRS comprises three or more sheets of substantially flat material of identical peripheral form;
  the PSA is configured to mechanically couple the PRS at or near an outer perimeter of the sheets; and
  the peripheral form is pentagonal in extent having one pair of parallel identical opposite edges;
  the outer edge mechanically couples the PRS via the PSA;
  the mechanical coupling of the PRS comprises continuous attachment at 80% or more of the outer perimeter and includes the pair of parallel identical opposite edges.

This general system summary may be augmented by the various elements described herein to produce a wide variety of invention embodiments consistent with this overall design description.

Alternate Semi-Circular Method Summary

An alternate present invention semi-circular method anticipates a wide variety of variations in the basic theme of implementation, but can be generalized as a rag stack method comprising:
  (1) forming a planar rag stack (PRS) comprising three or more sheets of substantially flat material of identical peripheral form; and (2) mechanically coupling the PRS at or near an outer perimeter of the sheets;

wherein the peripheral form is rectangular in extent and has one semi-circular outer edge;

the outer edge mechanically couples the PRS via the PSA;

the mechanical coupling of the PRS comprises continuous attachment at 75% or more of the outer perimeter including the semi-circular outer edge.

This general method summary may be augmented by the various elements described herein to produce a wide variety of invention embodiments consistent with this overall design description.

Alternate Pentagonal Method Summary

An alternate present invention pentagonal method anticipates a wide variety of variations in the basic theme of implementation, but can be generalized as a rag stack method comprising:

(1) forming a planar rag stack (PRS) comprising three or more sheets of substantially flat material of identical peripheral form; and (2) mechanically coupling the PRS at or near an outer perimeter of the sheets;

wherein the peripheral form is pentagonal in extent having one pair of parallel identical opposite edges;

the outer edge mechanically couples the PRS via the PSA;

the mechanical coupling of the PRS comprises continuous attachment at 80% or more of the outer perimeter and includes the pair of parallel identical opposite edges.

This general method summary may be augmented by the various elements described herein to produce a wide variety of invention embodiments consistent with this overall design description.

Alternate System Kit Summary

An alternate present invention kit anticipates a wide variety of variations in the basic theme of construction, but can be generalized as a rag stack kit comprising:

(a) rag stack system (RSS); and
(b) rag stack canister (RSC);

wherein the RSC comprises a tubular cylinder configured with a fluid dispensing end (FDE) and a cloth retention end (CRE);

the CRE is configured to contain the RSS;

the FDE is configured to contain a fluid dispensing apparatus (FDA).

Variations on this basic theme as depicted in the drawings include embodiments wherein:

The RSC is a one-piece canister wherein the FDA is a pump spray integrated within the FDE;

The RSC is a one-piece canister wherein the FDA is a pump spray bottle retained within the FDE;

The RSC is a one-piece canister wherein the FDA is an aerosol spray can retained within the FDE;

The RSC is a two-piece canister wherein the FDA is a pump spray bottle retained within the FDE using screw end-caps; and The RSC is a two-piece canister wherein the FDA is an aerosol spray can retained within the FDE using screw end-caps.

As depicted in the dry erase marker embodiment, the rag stack kit may also be configured to comprise:

(a) rag stack system (RSS); and
(b) rag stack canister (RSC);

wherein the RSC comprises a tubular cylinder configured with a fluid dispensing end (FDE) and a marker retention end (MRE);

the MRE is configured to contain a plurality of dry erase markers;

the FDE is configured to contain a fluid dispensing apparatus (FDA) and a rag stack wrapped around the FDA.

This general system summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PRS comprises a three-sheet stack selected from a group consisting of:
(a) chamois/waffle microfiber sheet pair+waffle microfiber/glass cleaning cloth sheet pair+stainless steel cleaning cloth/scrubbing cloth sheet pair;
(b) finishing cloth+plastic sheet+finishing cloth;
(c) finishing cloth+plastic sheet+terry cloth;
(d) terry cloth+plastic sheet+terry cloth;
(e) terry cloth+plastic sheet+microfiber sheet;
(f) microfiber sheet+plastic sheet+microfiber sheet;
(g) microfiber sheet+plastic sheet+finishing cloth;
(h) microfiber sheet+plastic sheet+SCOTCH-BRITE® sheet;
(i) SCOTCH-BRITE® sheet+plastic sheet+SCOTCH-BRITE® sheet;
(j) SCOTCH-BRITE® sheet+plastic sheet+finishing cloth;
(k) SCOTCH-BRITE® sheet+plastic sheet+terry cloth; and
(l) SCOTCH-BRITE® sheet+plastic sheet+abrasive cloth.

An embodiment wherein the PRS comprises a four-sheet stack selected from a group consisting of:
(a) microfiber sheet+terry sheet+chamois sheet+finishing sheet; and
(b) microfiber sheet+terry sheet+SCOTCH-BRITE® sheet+finishing sheet.

An embodiment wherein the PRS further comprises a chamois sheet having a periphery that is configured to fit within the PSA and wherein the chamois sheet is placed between layers of the PRS and not attached to the PRS.

An embodiment wherein the PRS comprises stack layers further comprising sheet pairs separated by a fluid-repellent barrier membrane layer.

One skilled in the art will recognize that other embodiments are possible based on combinations of elements taught within the above invention description.

CONCLUSION

A multi-function multi-use rag system and method integrating a variety of substantially planar sheets in a unitized application context has been disclosed. The system/method physically integrates a stack of cleaning rags or other materials that may be of different types and have different functional characteristics. These rags are attached together at their outer periphery via sewing or other fastening means. A peripheral segment of the rag stack that is not attached to other layers may allow the stack to be everted to configure one set of a plurality of inner surfaces to form the outer surfaces of the rag stack system. Eversion of the rag stack thus permits formation of a number of different outer surface combinations that is equal to twice the number of stacked rags. Incorporation of internal stack barrier layers in some embodiments allows isolation of individual layers within the rag stack.

What is claimed is:

1. A rag stack system comprising:
   (a) planar rag stack (PRS); and
   (b) peripheral stack attachment (PSA);
   wherein said PRS comprises sheets of substantially flat material of identical peripheral form;
   said peripheral form is rectangular;
   said PSA is configured to mechanically couple said PRS at or near an outer perimeter of said sheets; and
said mechanical coupling of said PRS comprises continuous attachment at 50% or more of said outer perimeter, and wherein said PRS is selected from a group consisting of:
   (a) a four-sheet stack consisting of a microfiber sheet+terry sheet+chamois sheet+finishing sheet;
   (b) a four-sheet stack consisting of a microfiber sheet+terry sheet+non-woven scouring/abrasive material sheet+finishing sheet; and
   (c) a chamois sheet having a periphery that is configured to fit within said PSA and wherein said chamois sheet is placed between layers of said PRS and not attached to said PRS.

2. A rag stack system comprising:
   (a) planar rag stack (PRS); and
   (b) peripheral stack attachment (PSA);
   wherein
   said PRS comprises sheets of substantially flat material of identical peripheral form;
   said PSA is configured to mechanically couple said PRS at or near an outer perimeter of said sheets; and
   said peripheral form is rectangular in extent and has one semi-circular outer edge;
   said outer edge mechanically couples said PRS via said PSA;
said mechanical coupling of said PRS comprises continuous attachment at 75% or more of said outer perimeter and includes said semi-circular outer edge and wherein said PRS is selected from a group consisting of:
   (a) a four-sheet stack consisting of a microfiber sheet+terry sheet+chamois sheet+finishing sheet;
   (b) a four-sheet stack consisting of a microfiber sheet+terry sheet+non-woven scouring/abrasive material sheet+finishing sheet; and
   (c) a chamois sheet having a periphery that is configured to fit within said PSA and wherein said chamois sheet is placed between layers of said PRS and not attached to said PRS.

3. A rag stack system comprising:
   (a) planar rag stack (PRS); and
   (b) peripheral stack attachment (PSA);
   wherein
   said PRS comprises sheets of substantially flat material of identical peripheral form;
   said PSA is configured to mechanically couple said PRS at or near an outer perimeter of said sheets; and
   said peripheral form is pentagonal in extent having one pair of parallel identical opposite edges;
   said outer edge mechanically couples said PRS via said PSA;
   said mechanical coupling of said PRS comprises continuous attachment at 80% or more of said outer perimeter and includes said pair of parallel identical opposite edges, and wherein said PRS is selected from a group consisting of:
   (a) a four-sheet stack consisting of a microfiber sheet+terry sheet+chamois sheet+finishing sheet;
   (b) a four-sheet stack consisting of a microfiber sheet+terry sheet+non-woven scouring/abrasive material sheet+finishing sheet; and
   (c) a chamois sheet having a periphery that is configured to fit within said PSA and wherein said chamois sheet is placed between layers of said PRS and not attached to said PRS.

* * * * *